United States Patent
Tainer et al.

(10) Patent No.: US 12,491,188 B2
(45) Date of Patent: Dec. 9, 2025

(54) SMALL MOLECULE PARG INHIBITORS AND METHODS OF USE THEREOF

(71) Applicants: Board of Regents, The University of Texas System, Austin, TX (US); BioVentures, LLC, Little Rock, AR (US); Washington University, St. Louis, MO (US)

(72) Inventors: John A. Tainer, Houston, TX (US); Zamal Ahmed, Houston, TX (US); Darin E. Jones, Little Rock, AR (US); In-Kwon Kim, St. Louis, MO (US); Tom Ellenberger, St. Louis, MO (US); Chris Ho, St. Louis, MO (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 1013 days.

(21) Appl. No.: 17/600,049

(22) PCT Filed: Mar. 27, 2020

(86) PCT No.: PCT/US2020/025499
§ 371 (c)(1),
(2) Date: Sep. 29, 2021

(87) PCT Pub. No.: WO2020/205646
PCT Pub. Date: Oct. 8, 2020

(65) Prior Publication Data
US 2022/0202821 A1 Jun. 30, 2022

Related U.S. Application Data

(60) Provisional application No. 62/914,195, filed on Oct. 11, 2019, provisional application No. 62/826,836, filed on Mar. 29, 2019.

(51) Int. Cl.
*A61K 31/522* (2006.01)
*A61P 35/00* (2006.01)

(52) U.S. Cl.
CPC ............ *A61K 31/522* (2013.01); *A61P 35/00* (2018.01)

(58) Field of Classification Search
CPC ... A61K 31/522; A61P 35/00; C07D 239/545; C07D 473/08; C07D 473/20; C07D 473/22
See application file for complete search history.

(56) References Cited

U.S. PATENT DOCUMENTS

| 8,946,221 B2 | 2/2015 | Mevellec et al. | |
| 2003/0229108 A1* | 12/2003 | De Belin | A61K 31/515 514/270 |

(Continued)

FOREIGN PATENT DOCUMENTS

| WO | WO 2010/120524 A2 | 10/2010 |
| WO | WO 2015/157376 A1 | 10/2015 |

(Continued)

OTHER PUBLICATIONS

Amé, J.-C. et al., "Radiation-induced mitotic catastrophe in PARG-deficient cells," *J Cell Sci*, 122.12 (2009): 1990-2002.

(Continued)

Primary Examiner — Jeffrey S Lundgren
Assistant Examiner — W. Justin Youngblood
(74) Attorney, Agent, or Firm — pH IP Law

(57) ABSTRACT

The present disclosure provides methods of inhibiting PARG in cancer cells, including methods comprising administering a PARG inhibitor that modulates position Tyr795 in PARG. Also provided herein are methods of treating and/or preventing cancer comprising administering a PARG inhibitor. In some embodiments, the PARG inhibitors are of the formula: wherein the variables are defined herein.

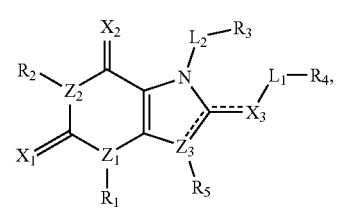

(I)

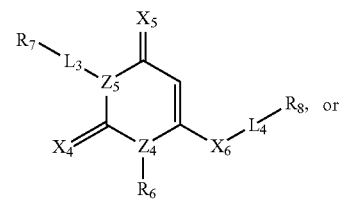

(II)

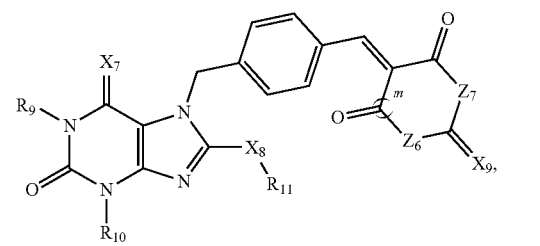

(VII)

3 Claims, 30 Drawing Sheets
Specification includes a Sequence Listing.

(56) References Cited

U.S. PATENT DOCUMENTS

| | | | |
|---|---|---|---|
| 2016/0090389 A1* | 3/2016 | Ho | A61P 37/00 544/262 |
| 2021/0128566 A1* | 5/2021 | Page | C07D 519/00 |
| 2022/0202821 A1† | 6/2022 | Tainer | |
| 2024/0109892 A1 | 4/2024 | Tainer et al. | |

FOREIGN PATENT DOCUMENTS

| | | |
|---|---|---|
| WO | WO2016097749 A1 † | 6/2016 |
| WO | WO 2017/021435 A1 | 2/2017 |
| WO | WO 2018/055627 A1 | 3/2018 |
| WO | WO 2018/237296 A1 | 12/2018 |
| WO | WO 2019/020828 A1 | 1/2019 |
| WO | WO 2022/159818 A1 | 7/2022 |

OTHER PUBLICATIONS

Andrabi, S.A. et al., "Poly(ADP-ribose) (PAR) polymer is a death signal," *Proc Natl Acad Sci U S A*, 103.48 (2006): 18308-18313.

Aninye, I. O et al., "8-Alkylthio-6-thio-substituted theophylline analogues as selective noncompetitive progesterone receptor antagonists," *Steroids*, 77 (2012): 596-601.

Badiaga, S. et al., "Human louse-transmitted infectious diseases", *Clinical Microbiology and Infection*, 18.4 (2012): 332-337.

Barkauskaite, E. et al., "Visualization of poly(ADP-ribose) bound to PARG reveals inherent balance between exo- and endo-glycohydrolase activities," *Nature Communication*, 4 (2013): 1-8.

Barkauskaite, E. et al., "Structures and Mechanisms of Enzymes Employed in the Synthesis and Degradation of PARP-Dependent Protein ADP-Ribosylation," *Mol Cell*, 58.6 (2015): 935-946.

Blenn, C. et al., "The ups and downs of tannins as inhibitors of poly(ADP-ribose)glycohydrolase," *Molecules*, 16.2 (2011): 1854-1877.

Brochu, G. et al., "Mode of action of poly(ADP-ribose) glycohydrolase," *Biochim Biophys Acta*, 1219.2 (1994): 342-350.

Cortes, U. et al., "Depletion of the 110-kilodalton isoform of poly(ADP-ribose) glycohydrolase increases sensitivity to genotoxic and endotoxic stress in mice," *Mol Cell Biol*, 24.16 (2004): 7163-7178.

Cossio, O. et al., "The Design and Synthesis of Novel Inhibitors of Poly(ADP-Ribose) Glycohydrolase (PARG) for Tumor-Selective Therapy," Abstract presented at Emerging Researchers National Conference in STEM, Feb. 21-23, 2019.

Cuzzocrea, S. et al., "PARG activity mediates intestinal injury induced by splanchnic artery occlusion and reperfusion," *FASEB J*, 19.6 (2005): 558-566.

Davidovic, L. et al., "Importance of poly(ADP-ribose) glycohydrolase in the control of poly(ADP-ribose) metabolism," *Exp Cell Res*, 268.1 (2001): 7-13.

Di Meglio, S. et al., "Dual role for poly(ADP-ribose)polymerase-1 and -2 and poly(ADP-ribose)glycohydrolase as DNA-repair and pro-apoptotic factors in rat germinal cells exposed to nitric oxide donors," *Biochim Biophys Acta*, 1692.1 (2004): 35-44.

Dunstan, M. S. et al., "Structure and mechanism of a canonical poly(ADP-ribose) glycohydrolase," *Nature Communications*, 3 (2012): 878, 1-6.

Extended European Search Report issued in European Patent Application No. 20782503.5, dated Nov. 4, 2022.

Falsig, J. et al., "Poly(ADP-ribose) glycohydrolase as a target for neuroprotective intervention: assessment of currently available pharmacological tools," *Eur J Pharmacol*, 497.1 (2004): 7-16.

Fathers, C. et al., "Inhibition of poly(ADP-ribose) glycohydrolase (PARG) specifically kills BRCA2-deficient tumor cells," *Cell Cycle*, 11.5 (2012): 990-997.

Finch, K. E. et al., "Selective small molecule inhibition of poly(ADP-ribose) glycohydrolase (PARG)," *ACS Chem Biol*, 7.3 (2012): 563-570.

Fisher, A. E. et al., "Poly(ADP-ribose) polymerase 1 accelerates single-strand break repair in concert with poly(ADP-ribose) glycohydrolase," *Mol Cell Biol*, 27.15 (2007): 5597-5605.

Fujihara, H. et al., "Poly(ADP-ribose) Glycohydrolase deficiency sensitizes mouse ES cells to DNA damaging agents," *Curr Cancer Drug Targets*, 9.8 (2009): 953-962.

Gagne, J. P. et al., "The expanding role of poly(ADP-ribose) metabolism: current challenges and new perspectives," *Curr Opin Cell Biol*, 18.2 (2006): 145-151.

Gibson, B. A. et al., "New insights into the molecular and cellular functions of poly(ADP-ribose) and PARPs.," *Nat Rev Mol Cell Biol*, 13.7 (2012): 411-424.

Gogola, E. et al., "Selective Loss of PARG Restores PARylation and Counteracts PARP Inhibitor-Mediated Synthetic Lethality," *Cancer Cell*, 33.6 (2018): 1078-1093.

Gupte, R. et al., "PARPs and ADP-ribosylation: recent advances linking molecular functions to biological outcomes," *Genes Dev.*, 31.2 (2017): 101-126.

Houl, J. H. et al., "Selective small molecule PARG inhibitor causes replication fork stalling and cancer cell death," *Nature Communications*, 10 (2019): 5654, 1-15.

James, D. I. et al., "First-in-Class Chemical Probes against Poly(ADP-ribose) Glycohydrolase (PARG) Inhibit DNA Repair with Differential Pharmacology to Olaparib," *ACS Chem. Biol.*, 11 (2016): 3179-3190.

Jankevicius, G. et al., "A family of macrodomain proteins reverses cellular mono-ADPribosylation," *Nature Structural & Molecular Biology*, 20 (2013): 508-514.

Kanai, M. et al., "Involvement of poly(ADP-Ribose) polymerase 1 and poly(ADPRibosyl) ation in regulation of centrosome function," *Mol Cell Biol.*, 23.7 (2003): 2451-2462.

Kassab, M. A. et al., "The role of dePARylation in DNA damage repair and cancer suppression," *DNA Repair (Amst)*, 76 (2019): 20-29.

Kim, I.-K. et al., Structure of mammalian poly(ADP-ribose) glycohydrolase reveals a flexible tyrosine clasp as a substrate-binding element, *Nat Struct Mol Biol.*, 19.6 (2012): 653-656.

Kim, I.-K. et al., "A quantitative assay reveals ligand specificity of the DNA scaffold repair protein XRCC1 and efficient disassembly of complexes of XRCC1 and the poly(ADP-ribose) polymerase 1 by poly(ADP-ribose) glycohydrolase," *J Biol Chem*, 290.6 (2015): 3775-3783.

Koh, D.W. et al., "SAR analysis of adenosine diphosphate (hydroxymethyl)pyrrolidinediol inhibition of poly(ADP-ribose) glycohydrolase," *J Med Chem*, 46 (2003): 4322-4332.

Margalef, P. et al., "Stabilization of Reversed Replication Forks by Telomerase Drives Telomere Catastrophe," *Cell*, 172.3 (2018): 439-453.

Marques, M. et al., "Oncogenic activity of poly (ADP-ribose) glycohydrolase," *Oncogene*, 38 (2019): 2177-2191.

Masutani, M. et al., "Poly(ADP-ribosyl)ation in relation to cancer and autoimmune disease," *Cell Mol Life Sci*, 62 (2005): 769-783.

Meyer-Ficca, M. L. et al., "Human poly(ADP-ribose) glycohydrolase is expressed in alternative splice variants yielding isoforms that localize to different cell compartments," *Exp Cell Res*, 297.2 (2004): 521-532.

Min, W. et al., "Poly (ADP-ribose) glycohydrolase (PARG) and its therapeutic potential," *Frontiers in bioscience*, 14.5 (2009): 1619-1626.

Mortusewicz, O. et al., "PARG is recruited to DNA damage sites through poly(ADP-ribose)- and PCNA-dependent mechanisms," *Nucleic Acids Research*, 39.12 (2011): 5045-5056.

Mueller-Dieckmann, C. et al. The structure of human ADP-ribosylhydrolase 3 (ARH3) provides insights into the reversibility of protein ADP-ribosylation, *Proc Natl Acad Sci U S A*, 103.41 (2006): 15026-15031.

Muller, C. et al., "Xanthines as adenosine receptor antagonists," *Handb Exp Pharmacol*, 151-99 (2011): 1-59.

Noll, A. et al., "PARG deficiency is neither synthetic lethal with BRCA1 nor PTEN deficiency," *Cancer Cell Int*, 16.53 (2016): 1-13.

PCT International Search Report and Written Opinion issued in International Patent Application No. PCT/US2020/025499, mailed Sep. 21, 2020.

(56) References Cited

OTHER PUBLICATIONS

PCT International Preliminary Report on Patentability issued in International Patent Application No. PCT/US2020/025499, mailed Oct. 14, 2021.
Rauh-Adelmann, C. et al., "Altered expression of BRCA1, BRCA2, and a newly identified BRCA2 exon 12 deletion variant in malignant human ovarian, prostate, and breast cancer cell lines," *Molecular Carcinogenesis*, 28 (2000): 236-246.
Ray Chaudhuri, A. et al., "Poly(ADP-ribosyl) glycohydrolase prevents the accumulation of unusual replication structures during unperturbed S phase," *Mol Cell Biol.*, 35.5 (2015): 856-865.
Rosenthal, F. et al., "Macrodomain-containing proteins are new mono-ADPribosylhydrolases," *Nat Struct Mol Biol.*, 20.4 (2013): 502-507.
Sharifi, R. et al., "Deficiency of terminal ADP-ribose protein glycohydrolase TARG1/C6orf130 in neurodegenerative disease," *EMBO J.*, 32.9 (2013): 1225-1237.
Shibata, A. et al., "DNA double-strand break repair pathway choice is directed by distinct MRE11 nuclease activities," *Mol Cell.*, 53.1 (2014): 7-18.
Shirai, H. et al., "PARG dysfunction enhances DNA double strand break formation in S-phase after alkylation DNA damage and augments different cell death pathways," *Cell Death Dis.*, 4.6 (2013): e656, 1-10.
Shirai, H. et al., "Parg deficiency confers radio-sensitization through enhanced cell death in mouse ES cells exposed to various forms of ionizing radiation," *Biochem Biophys Res Commun.*, 435.1 (2013): 100-106.
Slade, D. et al., "The structure and catalytic mechanism of a poly(ADP-ribose) glycohydrolase," *Nature*, 477.7366 (2011): 616-620.
Slama, J. T. et al., "Specific inhibition of poly(ADP-ribose) glycohydrolase by adenosine diphosphate (hydroxymethyl)pyrrolidinediol," *J Med Chem.*, 38.2 (1995): 389-393.
Sun, Y. et al., "Tannic acid, an inhibitor of poly(ADPribose) glycohydrolase, sensitizes ovarian carcinoma cells to cisplatin," *Anticancer Drugs*, 23.9 (2012): 979-990.
Tucker, J. A. et al., "Structures of the Human Poly (ADP-Ribose) Glycohydrolase Catalytic Domain Confirm Catalytic Mechanism and Explain Inhibition by ADP-HPD Derivatives," *PLOS ONE*, 7.12 (2012): 1-19.
Vilchez Larrea, S. C. et al., "Host Cell Poly(ADP-Ribose) Glycohydrolase Is Crucial for Trypanosoma cruzi Infection Cycle," *PLOS ONE*, 8.6 (2013): 1-16.
Vilchez Larrea, S. C. et al., "Poly(ADP-ribose) polymerase plays a differential role in DNA damage-response and cell death pathways in Trypanosoma crusi," *International Journal for Parasitology*, 41 (2011): 405-416.
Vyas, S. et al., "Family-wide analysis of poly(ADP-ribose) polymerase activity," *Nat Commun.*, 5 (2014): 4426, 1-13.
Walker, B. L. et al., "Synthesis of xanthine derivatives for the inhibition of PARG," Abstract presented at MCBIOS: XV, Mar. 29-31, 2018.
Wang, Z. et al., "The role of PARP1 in the DNA damage response and its application in tumor therapy," *Front Med.*, 6.2 (2012): 156-164.
Wang, Z. et al., "Crystallographic and biochemical analysis of the mouse poly(ADP-ribose) glycohydrolase," *PLoS One*, 9.1 (2014): e86010, 1-10.
Yu, S.-W. et al., "Apoptosis-inducing factor mediates poly(ADP-ribose) (PAR) polymer-induced cell death," *Proc Natl Acad Sci U S A*, 103.48 (2006): 18314-18319.
Abraham, R., et al., "Both ADP-Ribosyl-Binding and Hydrolase Activities of the Alphavirus nsP3 Macrodomain Affect Neurovirulence in Mice," mBio. II:e03253-19, American Society for Microbiology, United States (Feb. 2020).
Alhammad, Y.M.O., et al., "Viral Macrodomain Counters Host Antiviral ADP-Ribosylation," Viruses. 12:384, MDPI, Switzerland (Mar. 2020).

Altschul, S.F., et al., "Gapped BLAST and PSI-BLAST: a new generation of protein database search programs," Nucleic Acids Res. 25:3389-3402, Oxford University Press, United Kingdom (Sep. 1997).
Armougom, F., et al., "Expresso: automatic incorporation of structural information in multiple sequence alignments using 3D-Coffee," Nucleic Acids Res. 34:W604-608, Oxford University Press, United Kingdom (Jul. 2006).
Bertrand, B., et al., "Caffeine-based gold(I) N-heterocyclic carbenes as possible anticancer agents: synthesis and biological properties," Inorg Chem. 53:2296-2303, American Chemical Society, United States (Feb. 2014).
Blanco-Melo, D., et al., "Imbalanced Host Response to SARS-CoV-2 Drives Development ofCOVID-19," Cell. 181:1036-1045. e9, Cell Press, United States (May 2020).
Brosey, C.A., et al., "Defining NADH-Driven Allostery Regulating Apoptosis-Inducing Factor," Structure. 24:2067-2079, Cell Press, United States (Dec. 2016).
Bunkoczi, G., et al., "Phaser.MRage: automated molecular replacement," Acta Crystallogr D Biol Crystallogr. 69:2276-2286, Wiley, United States (Nov. 2013).
Caprara, G., et al., "PARP14 Controls the Nuclear Accumulation of a Subset of Type I IFN-Inducible Proteins," J Immunol. 200:2439-2454, American Association of Immunologists, United States (Apr. 2018).
Chen, S.-H., et al., "Targeting dePARylation selectively suppresses DNA repair-defective and PARP inhibitor-resistant malignancies," Science Advances. 5:eaav4340, American Association for the Advancement of Science, United States (Apr. 2019).
Chowdhury, P., et al., "Tea Bioactive Modulate Innate Immunity: In Perception to COVID-19 Pandemic," Front Immunol. 11:590716, Frontiers Media SA, Switzerland (Oct. 2020).
Claverie, J.M., "A Putative Role of de-Mono-ADP-Ribosylation of STA TI by the SARS-CoV-2 Nsp3 Protein in the Cytokine Storm Syndrome of COVID-19," Viruses. 12:646, MDPI, Switzerland (Jun. 2020).
Dai, M., et al., "Patients with Cancer Appear More Vulnerable to SARS-CoV-2: A Multicenter Study during the COVID-19 Outbreak," Cancer Discov. 10:783-791, American Association for Cancer Research, United States (Jun. 2020).
De La Fuente, J.C., et al., "Solubility of 1,3-Dimethyl-7H-purine-2,6-dione (Theophylline) in Supercritical Carbon Dioxide," J. Chem. Eng. Data 54(11):3034-3036, American Chemical Society, United States (Jul. 2009).
Eckelmann, B.J., et al., "XRCCI promotes replication restart, nascent fork degradation and mutagenic DNA repair in BRCA2-deficient cells," NAR Cancer. 2:zcaa013, Oxford University Press, United Kingdom (Sep. 2020).
Edgar, R.C., "MUSCLE: multiple sequence alignment with high accuracy and high throughput," Nucleic Acids Res. 32:1792-1797, Oxford University Press, United Kingdom (Mar. 2004).
Elliott, T.S., et al., "The use of phosphate bioisosteres in medicinal chemistry and chemical biology," MedChemComm. 3:735-751, Royal Society of Chemistry, United Kingdom (May 2012).
Emsley, P., et al., "Coot: model-building tools for molecular graphics," Acta Crystallogr D Biol Crystallogr. 60:2126-2132, Wiley, United States (Dec. 2004).
Fehr, A.R., et al., "The Conserved Coronavims Macrodomain Promotes Virulence and Suppresses the Innate Immune Response during Severe Acute Respiratory Syndrome Coronavims Infection," mBio. 7:e01721-16, American Society for Microbiology, United States (Dec. 2016).
Fehr, A.R., et al., "The nsp3 macrodomain promotes virulence in mice with coronavims-induced encephalitis," J Virol. 89:1523-36, American Society for Microbiology, United States (Feb. 2015).
Fehr, A.R., et al., "Viral Macrodomains: Unique Mediators of Viral Replication and Pathogenesis," Trends Microbiol. 26:598-610, Cell Press, United States (Jul. 2018).
Felsenstein, J., "Confidence limits on phylognies: An approach using the bootstrap," Evolution. 39:783-791, Wiley, United States (Jul. 1985).

(56) References Cited

OTHER PUBLICATIONS

Fraser, J.S., "Identifying new ligands for the SARS-CoV-2 Macrodomain by Fragment Screening and Multi-temperature Crystallography," (Version 1.0), Zenodo, Jul. 6, 2020, accessed at https://zenodo.org/records/3932380, 6 pages.

Frick, D.N., et al., "Molecular Basis for ADP-Ribose Binding to the Macl Domain of SARS-CoV-2 nsp3," Biochemistry 59:2608-2615, American Chemical Society, United States (Jun. 2020).

Garcin, E.D., et al., "Anchored plasticity opens doors for selective inhibitor design in nitric oxide synthase," Nat Chem Biol. 4:700-707, Springer, Germany (Nov. 2008).

Grunewald, M.E., et al., "The coronavims macrodomain is required to prevent PARP-mediated inhibition of vims replication and enhancement of IFN expression," PLOS Pathogens. 15:e1007756, Public Library of Science, United States (May 2019).

Guan, W.-J., et al., "Clinical Characteristics of Coronavirus Disease 2019 in China," New England Journal of Medicine. 382:1708-1720, Massachusetts Medical Society, United States (Apr. 2020).

Han, S., et al., "Evolution and mechanism from structures of an ADP-ribosylating toxin and NAD complex," Nature Structural Biology. 6:932-936, Springer, Germany (Oct. 1999).

Han, S., et al., "The ARTT motif and a unified structural understanding of substrate recognition in ADP-ribosylating bacterial toxins and eukaryotic ADP-ribosyltransferases," Int J Med Microbiol. 291:523-9, Elsevier, Netherlands (Feb. 2002).

Hisham, M., et al., "Synthesis and biological evaluation of novel xanthine derivatives as potential apoptotic antitumor agents," Eur J Med Chem. 176:117-128, Elsevier, Netherlands (Aug. 2019).

Holder, T., et al., "Deep transcriptome-sequencing and proteome analysis of the hydrothermal vent annelid Alvinella pompejana identifies the CvP-bias as a robust measure of eukaryotic thermostability," Biol Direct. 8:2, BioMed Central, United Kingdom (Jan. 2013).

International Search Report and Written Opinion for International Application No. PCT/US2022/013528, USPTO, United States, mailed on Jun. 14, 2022, 14 pages.

Iwata, H., et al., "PARP9 and PARP14 cross-regulate macrophage activation via STATI ADP-ribosylation," Nat Commun. 7:12849, Springer, Germany (Oct. 2016).

Kabsch, W., "XDS," Acta CrystallogrD Biol Crystallogr. 66:125-32, Wiley, United States (Feb. 2010).

Kumar, S., et al., "MEGA X: Molecular Evolutionary Genetics Analysis across Computing Platforms," Mol Biol Evol. 35:1547-1549, Oxford University Press, United Kingdom (Jun. 2018).

Lam, T.T.-Y., et al., "Identifying SARS-CoV-2-related coronaviruses in Malayan pangolins," Nature. 583:282-285, Springer, Germany (Jul. 2020).

Lambrecht, M.J., et al., "Synthesis of dimeric ADP-ribose and its structure with human poly(ADP-ribose) glycohydrolase," J Am Chem Soc. 137:3558-64, American Chemical Society, United States (Mar. 2015).

Liang, W., et al., "Cancer patients in SARS-Co V-2 infection: a nationwide analysis in China," Lancet Oncol. 21:335-337, Elsevier, Netherlands (Mar. 2020).

Lichtarge, 0., et al., "An evolutionary trace method defines binding surfaces common to protein families," J Mol Biol. 257:342-358, Elsevier, Netherlands (Mar. 1996).

Liebschner, D., et al., "Macromolecular structure determination using X-rays, neutrons and electrons: recent developments in Phenix," Acta Crystallogr D Struct Biol. 75:861-877, Wiley, United States (Oct. 2019).

Liebschner, D., et al., "Folder maps: improving OMIT maps by excluding bulk solvent," Acta CrystallogrD StructBiol. 73:148-157, Wiley, United States (Feb. 2017).

Lin, M.-H., et al., "Structural, Biophysical, and Biochemical Elucidation of the SARS- Co V-2 Nonstructural Protein 3 Macro Domain," ACS Infect Dis. 6:2970-2978, American Chemical Society, United States (Nov. 2020).

Lua, R.C., et al., "PyETV: a PyMOL evolutionary trace viewer to analyze functional site predictions in protein complexes," Bioinformatics. 26:2981-82, Oxford University Press, United Kingdom (Dec. 2010).

Mcpherson, R.L., et al., "ADP-ribosylhydrolase activity of Chikungunya vims macrodomain is critical for vims replication and virulence," Proceedings of the National Academy of Sciences. 114:1666-1671, National Academy of Sciences, United States (Feb. 2017).

Michalska, K., et al., "Crystal structures of SARS-Co V-2 ADP-ribose phosphatase: from the apo form to ligand complexes," IUCrJ. 7:814-824, International Union of Crystallography, United Kingdom (Jul. 2020).

Mihalek, I., et al., "A family of evolution-entropy hybrid methods for ranking protein residues by importance," J Mol Biol. 336:1265-82, Elsevier, Netherlands (Mar. 2004).

Moiani, D., et al., "Targeting Allostery with Avatars to Design Inhibitors Assessed by Cell Activity: Dissecting MRE11 Endo- and Exonuclease Activities," Methods Enzymol. 601:205-241, Elsevier, Netherlands (Feb. 2018).

Moriarty, N.W., et al., "electronic Ligand Builder and Optimization Workbench (eLBOW): a tool for ligand coordinate and restraint generation," Acta Crystallogr D Biol Crystallogr. 65:1074-80, Wiley, United States (Oct. 2009).

Morin, A., et al., "Collaboration gets the most out of software," eLife. 2:e01456, eLife Sciences Publications Ltd, United Kingdom (Sep. 2013).

Notredame, C., et al., "T-Coffee: A novel method for fast and accurate multiple sequence alignment," J Mol Biol. 302:205-17, Elsevier, Netherlands (Sep. 2000).

Omolo, C.A., et al., "Update on therapeutic approaches and emerging therapies for SARS-CoV- 2 vims," Eur J Pharmacol. 883:173348, Elsevier, Netherlands (Sep. 2020).

Pettersen, E.F., et al., "UCSF Chimera—a visualization system for exploratory research and analysis," J Comput Chem. 25:1605-1612, Wiley, United States (Oct. 2004).

Plante, J.A., et al., "Spike mutationD614G alters SARS-CoV-2 fitness," Nature 592:116-121, Springer, Germany (Apr. 2021).

Pourfarjam, Y., et al., "PARG has a robust endo-glycohydrolase activity that releases protein-free poly(ADP-ribose) chains," Biochemical and Biophysical Research Communications. 527:818-823, Elsevier, Netherlands (Jun. 2020).

Pouya, F.D., "The combination effects of theophylline and corticosteroids in COVID-19," Health Bioteclmology and Biopharma (HBB), 4(3):1-5, Health Bioteclmology And Biopharma, Iran (Dec. 2020).

Pruitt, K.D., et al., "NCBI reference sequences (RefSeq): a curated non-redundant sequence database of genomes, transcripts and proteins," Nucleic acids research. 35:D61-65, Oxford University Press, United Kingdom (Jan. 2007).

Rack, J.G.M., et al., "(ADP-ribosyl)hydrolases: structure, function, and biology," Genes & Development. 34:263-284, Cold Spring Harbor Laboratory Press, United States (Mar. 2020).

Rack, J.G.M., et al., "Macrodomains: Structure, Function, Evolution, and Catalytic Activities," Annual Review of Biochemistry. 85:431-454, Annual Reviews, United States (Jun. 2016).

Rack, J.G.M., et al., "Viral macrodomains: a structural and evolutionary assessment of the pharmacological potential," Open Biol. 10:200237, Royal Society, United Kingdom (Nov. 2020).

Russi, S., et al., "The Stanford Automated Mounter: pushing the limits of sample exchange at the SSRL macromolecular crystallography beamlines," J Appl Crystallogr. 49:622-626, International Union of Crystallography, United Kingdom (Feb. 2016).

Saitou, N., et al., "The neighbor-joining method: a new method for reconstructing phylogenetic trees," Molecular Biology and Evolution. 4:406-425, Oxford University Press, United Kingdom (Jul. 1987).

Seidel, S.A.I., et al., "Microscale thermophoresis quantifies biomolecular interactions under previously challenging conditions," Methods 59:301-315, Elsevier, Netherlands (Mar. 2013).

Shin, D.S., et al., "Superoxide dismutase from the eukaryotic thermophile Alvinella pompejana: structures, stability, mechanism, and insights into amyotrophic lateral sclerosis," J Mol Biol. 385:1534-55, Elsevier, Netherlands (Feb. 2009).

(56) References Cited

OTHER PUBLICATIONS

Shyr, Z.A., et al., "Drug discovery strategies for SARS-CoV-2," Journal of Pharmacology and Experimental Therapeutics. 375:127-138, American Society for Pharmacology and Experimental Therapeutics, United States (Oct. 2020).

Slade, D., "PARP and PARG inhibitors in cancer treatment," Genes Dev. 34:360-394, Cold Spring Harbor Laboratory Press. United States (Mar. 2020).

Soltis, S.M., et al., "New paradigm for macromolecular crystallography experiments at SSRL: automated crystal screening and remote data collection," Acta Crystallogr D Biol Crystallogr. 64:1210-1221, Wiley, United States (Dec. 2008).

Stanke, M., et al., "AUGUSTUS: a web server for gene prediction in eukaryotes that allows user-defined constraints," Nucleic Acids Res. 33:W465-467, Oxford University Press, United Kingdom (Jul. 2005).

Stecher, G., et al., "Molecular Evolutionary Genetics Analysis (MEGA) for macOS" Mol Biol Evol. 37:1237-1239, Oxford University Press, United Kingdom (Jan. 2020).

Suzek, B.E., et al., "UniRef clusters: a comprehensive and scalable alternative for improving sequence similarity searches," Bioinformatics. 31:926-932, Oxford University Press, United Kingdom (Mar. 2015).

Syed, A., et al., "The MRE11-RAD50-NBS1 Complex Conducts the Orchestration of Damage Signaling and Outcomes to Stress in DNA Replication and Repair," Annu Rev Biochem. 87:263-294, Annual Reviews, United States (Jun. 2018).

Tillett, R.L., et al., "Genomic evidence for reinfection with SARS-CoV-2: a case study," The Lancet Infectious Diseases. 21:52-58, Elsevier, Netherlands (Jan. 2021).

Touret, F., et al., "In vitro screening of a FDA approved chemical library reveals potential inhibitors of SARS-CoV-2 replication," Scientific Reports. 10:13093, Springer, Germany (Aug. 2020).

Wang, Y., et al., "Poly(ADP-ribose) (PAR) binding to apoptosis-inducing factor is critical for PAR polymerase-I-dependent cell death (parthanatos)," Sci Signal. 4:ra20, American Association for the Advancement of Science, United States (Apr. 2011).

Webb, T.E., et al., "Sequence homology between humanPARP14 and the SARS-CoV-ADP ribose !'-phosphatase," Immunol Lett. 224:38-39, Elsevier, Netherlands (Aug. 2020).

Wilson, D.M., et al., "Fragment- and structure-based drug discovery for developing therapeutic agents targeting the DNA Damage Response," Prog Biophys Mol Biol 163:130-142, Elsevier, Netherlands (Aug. 2021).

Winn, M.D., et al., "Overview of the CCP4 suite and current developments," Acta Crystallogr D Biol Crystallogr. 67:235-242, Wiley, United States (Apr. 2011).

Zandarashvili, L., et al., "Structural basis for allosteric PARP-1 retention on DNA breaks," Science. 368:eaax6367, American Association for the Advancement of Science, United States (Apr. 2020).

Zhang, C., et al., "Cytokine release syndrome in severe COVID-19: interleukin-6 receptor antagonist tocilizumab may be the key to reduce mortality," Int J Antimicrob Agents. 55:105954, Elsevier, Netherlands (May 2020).

Zhang, Y., et al., "PARP9-DTX3L ubiquitin ligase targets host histone H2BJ and viral 3C protease to enhance interferon signaling and control viral infection," Nat Immunol. 16:1215-1227, Springer, Germany (Dec. 2015).

Zhou, P., et al., "A pneumonia outbreak associated with a new coronavirus of probable bat origin," Nature. 579:270-273, Springer, Germany (Feb. 2020).

Tucker et al., PLOS One. (2012) 7(12):1-19. Published Dec. 10, 2012.†

Aninye et al., Steroids. (2012) 77(6):596-601, S1-S6 (Supplemental Materials). Published May 2012.†

Houl et al., Nature Communications. (2019) 10(1):5654. Published Dec. 11, 2019.†

Lovato et al., Frontiers in Pharmacology. (2012) 3:1-8. Published Dec. 27, 2012.†

James et al., ACS Chemical Biology, (2016) 11:3179-3190. Published Sep. 30, 2016.†

Fathers et al., Cell Cycle. (2012) 11(5):990-997. Published Mar. 1, 2012.†

\* cited by examiner
† cited by third party

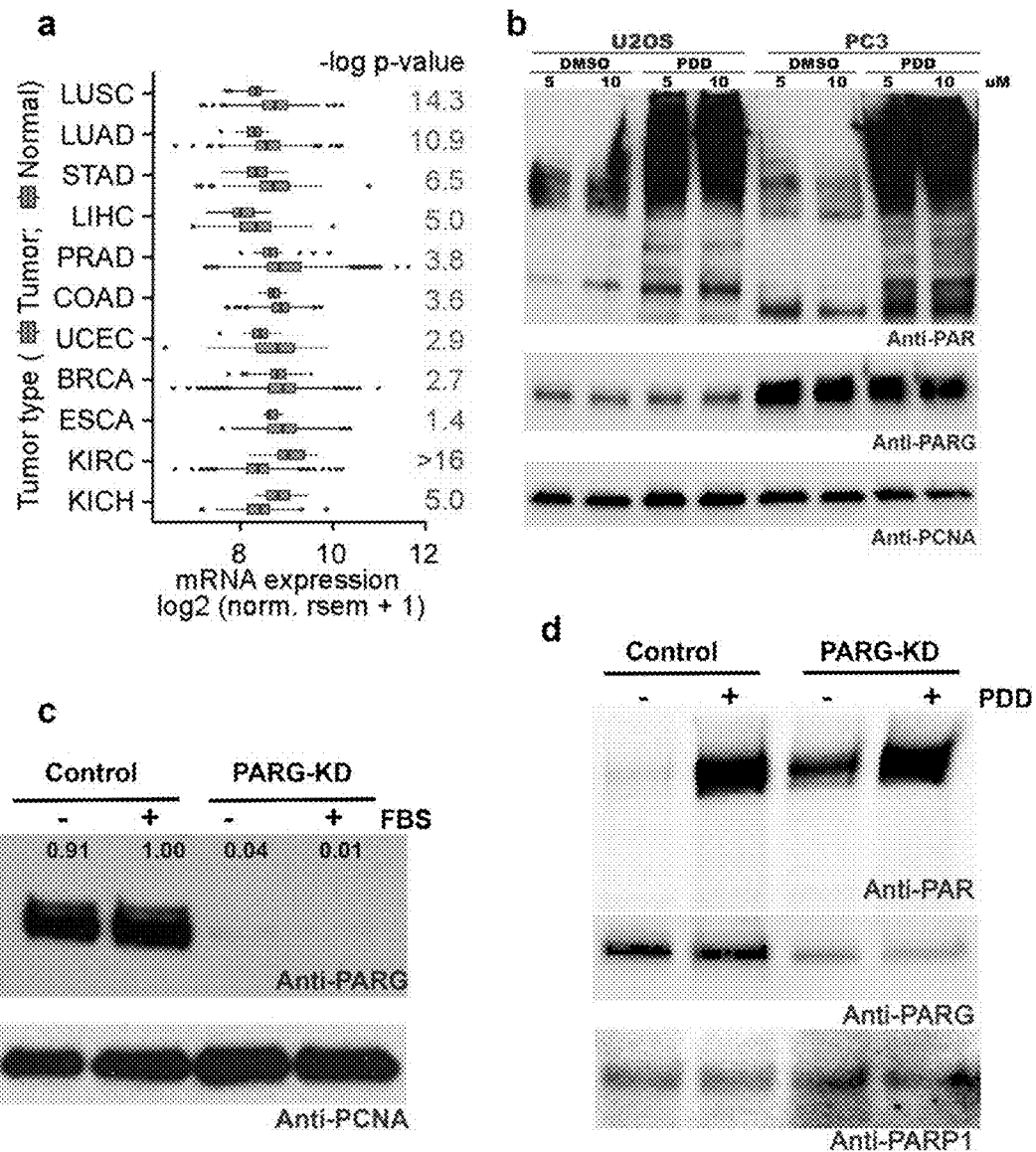
FIGS. 1a-d

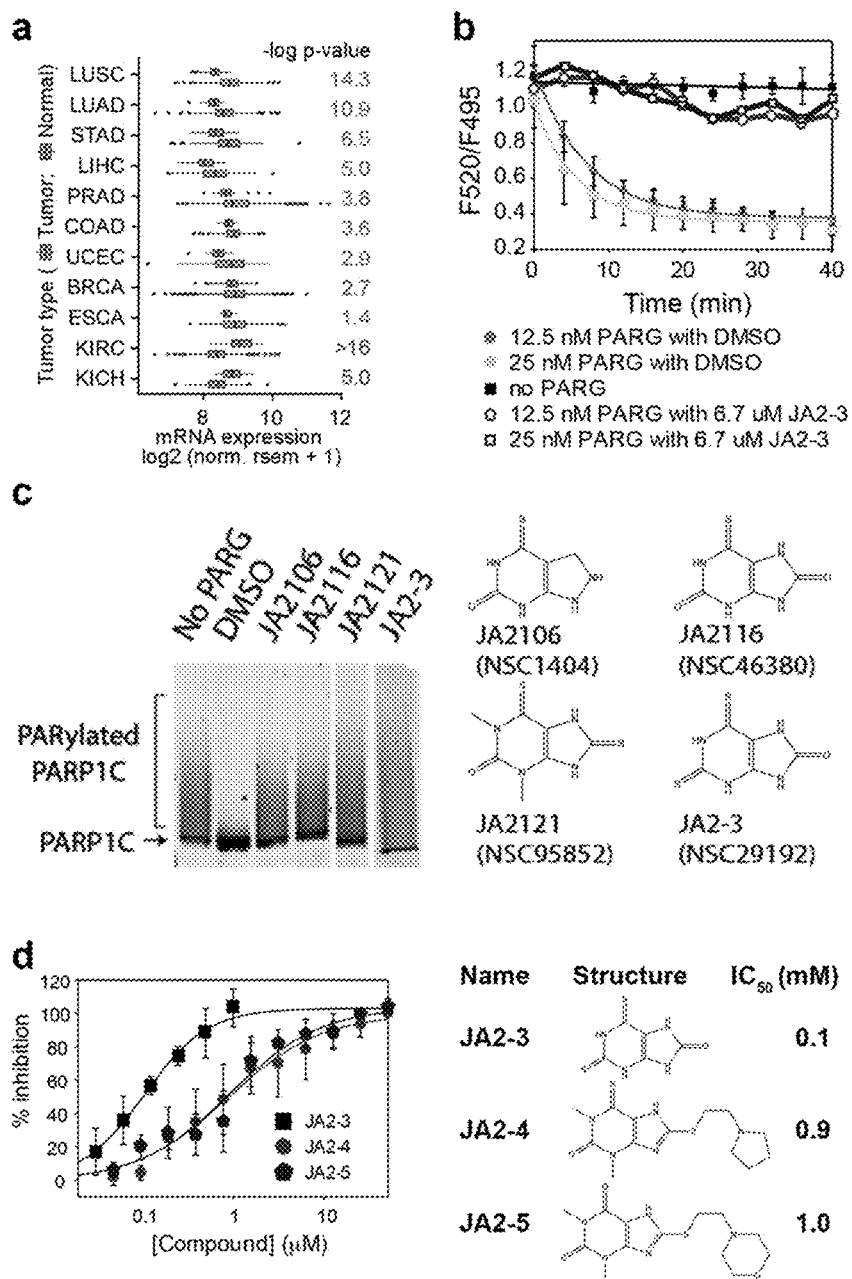
FIGS. 2a-d

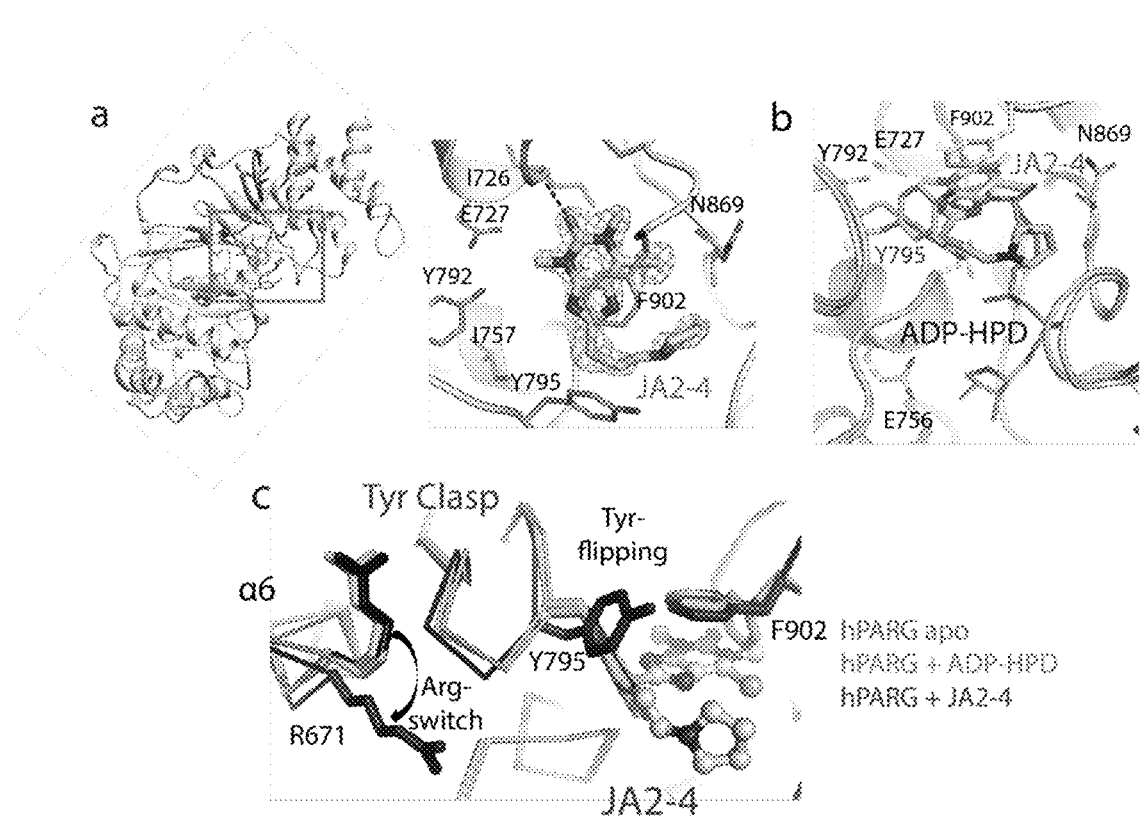
FIGS. 3a-c

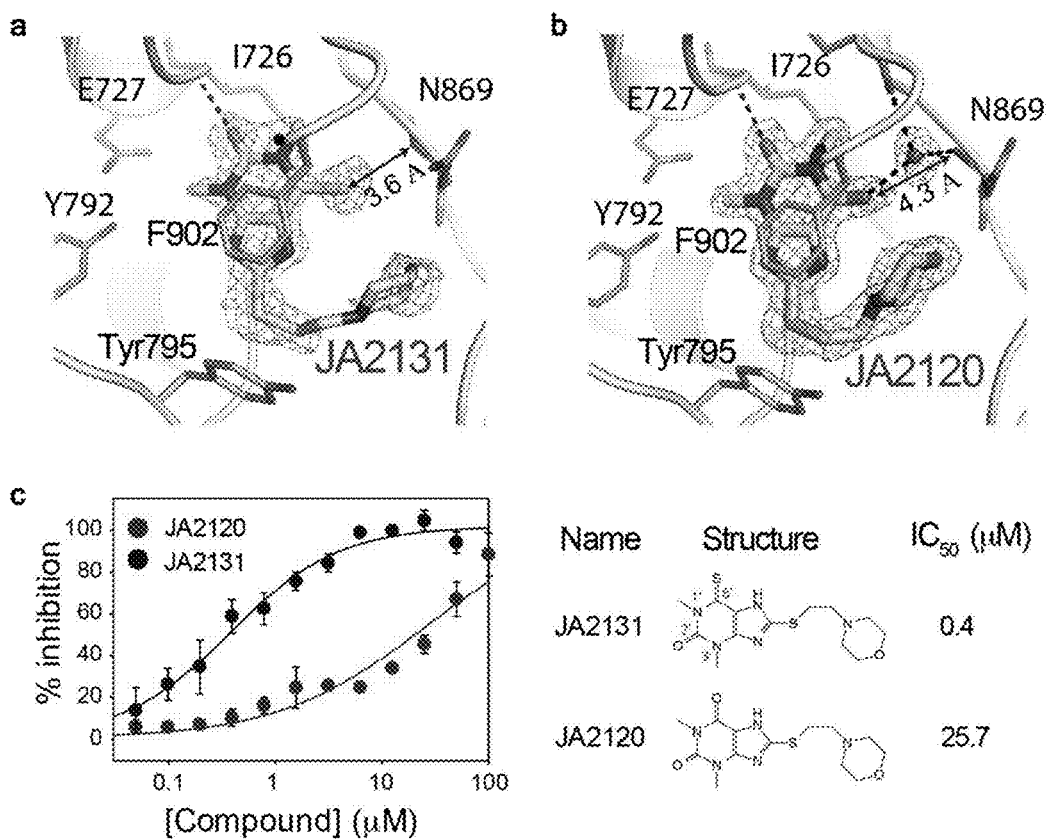
FIGS. 4a-c
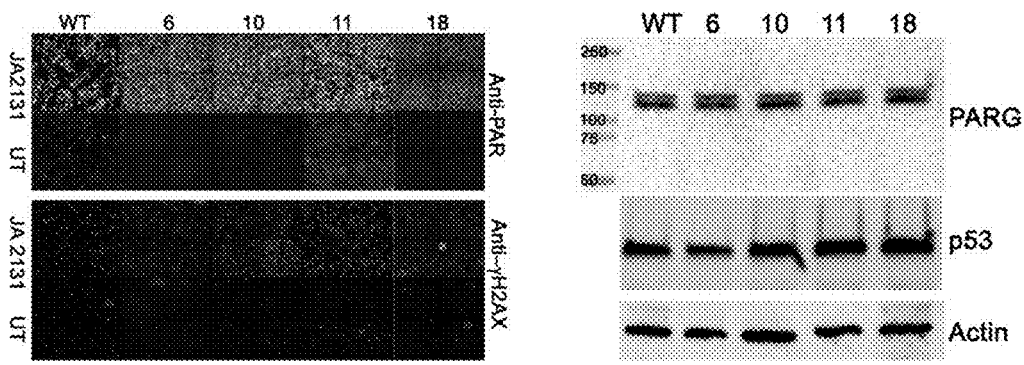
FIG. 5

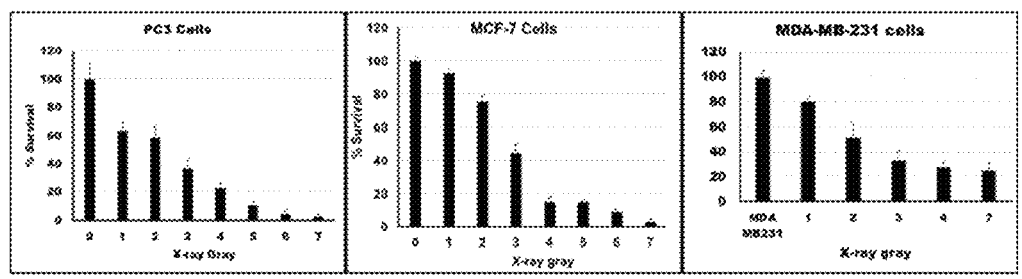
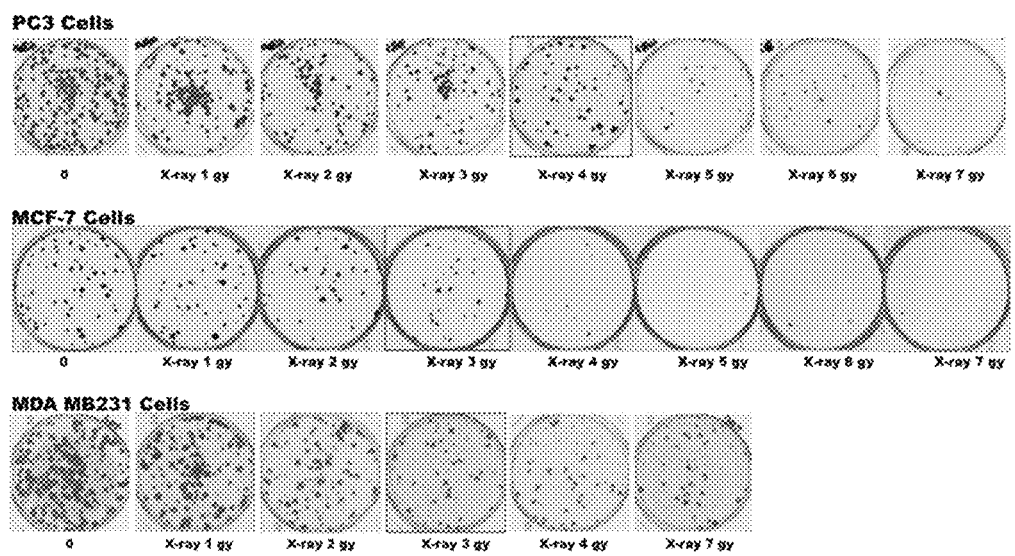
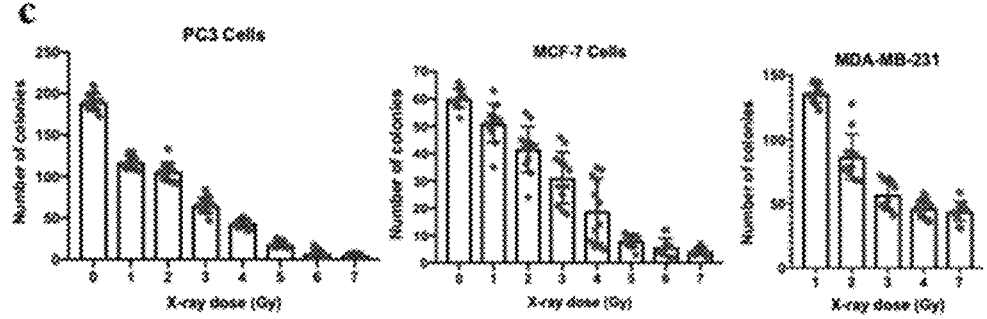
FIGS. 12a-c

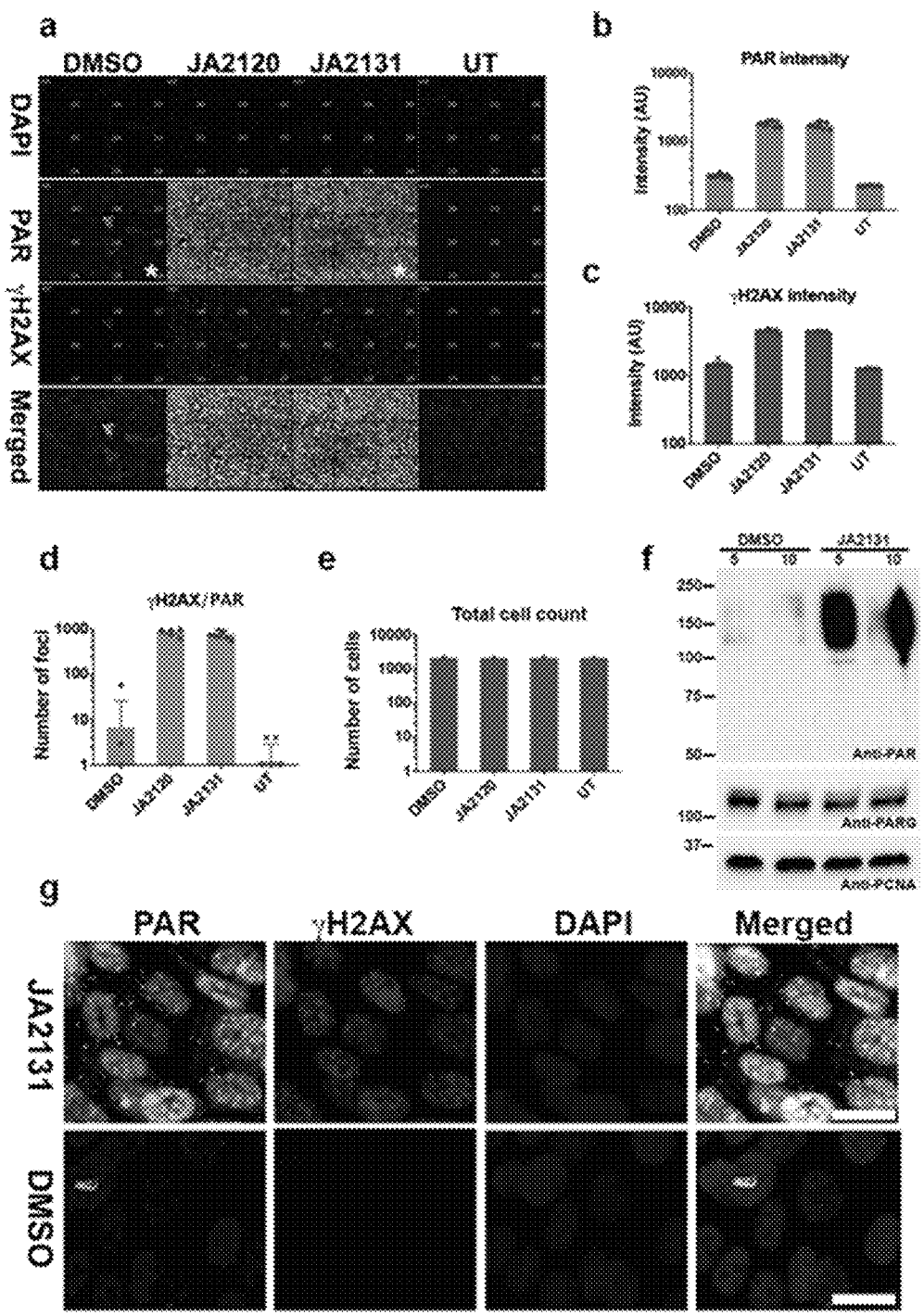
FIGS. 13a-g

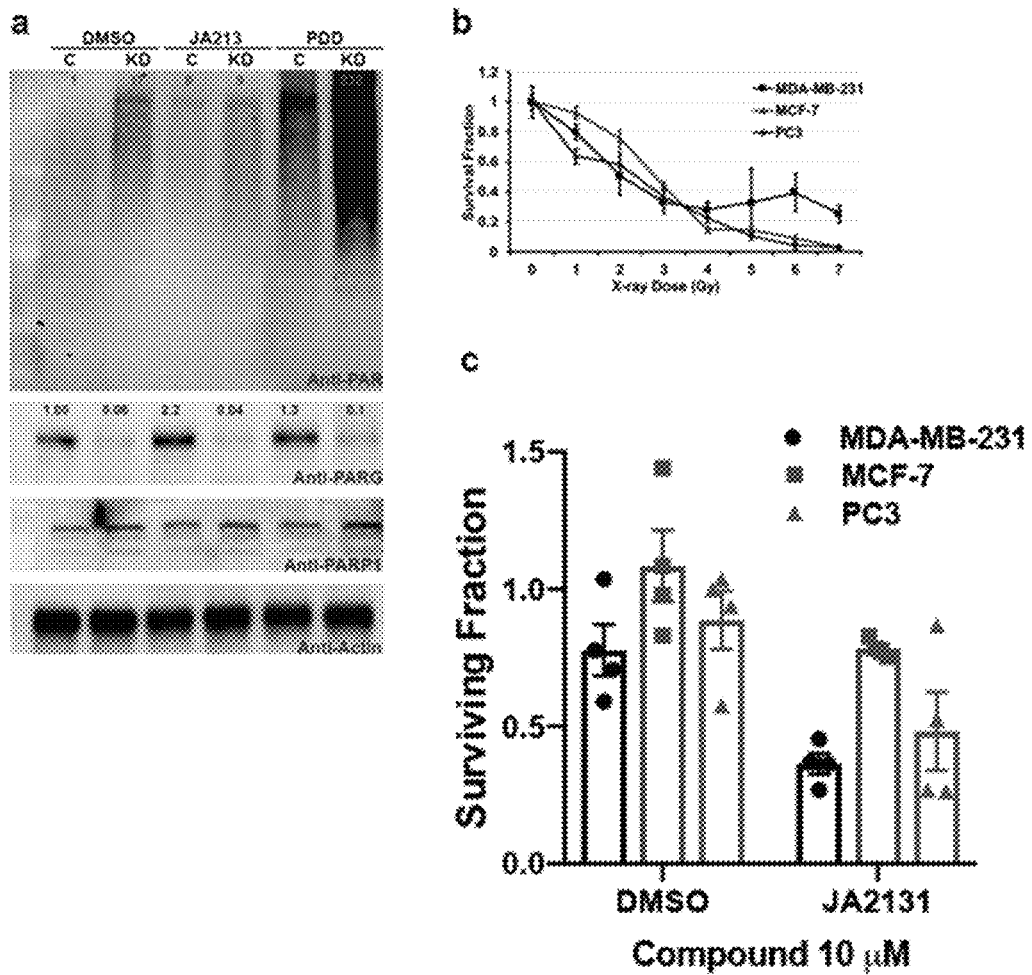
FIGS. 14a-c

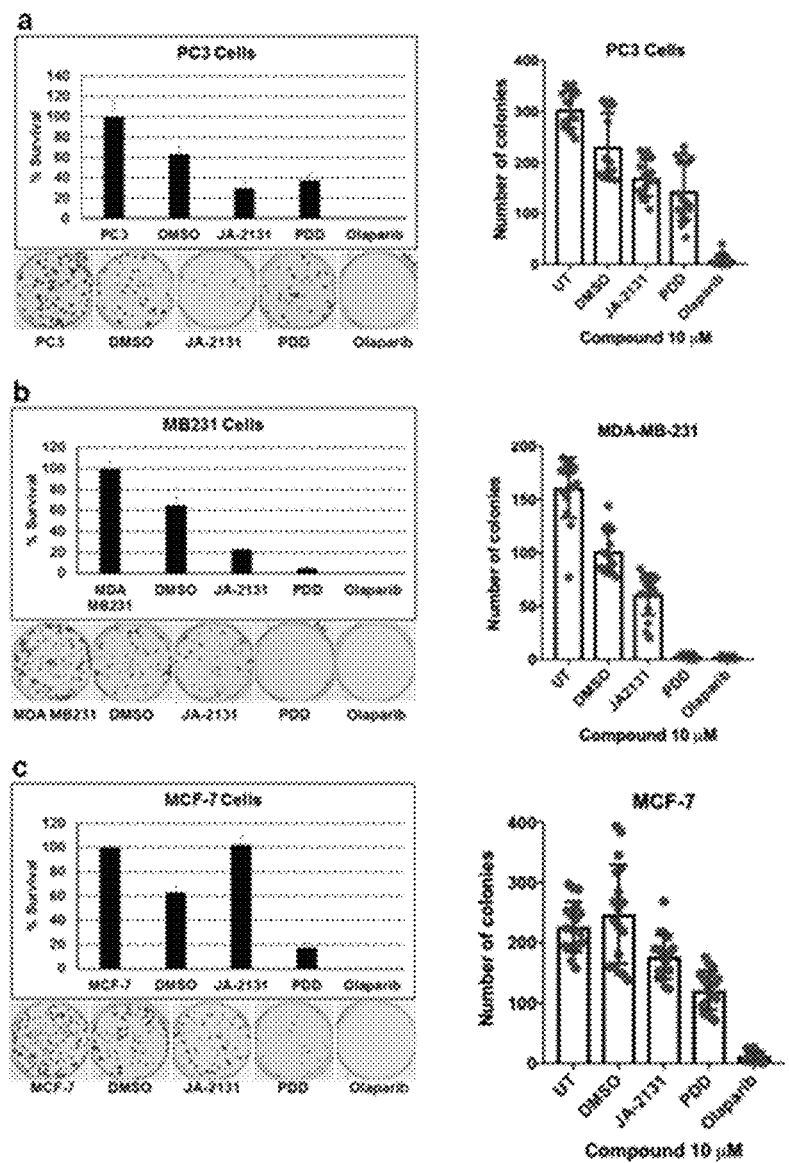
FIGS. 17a-c

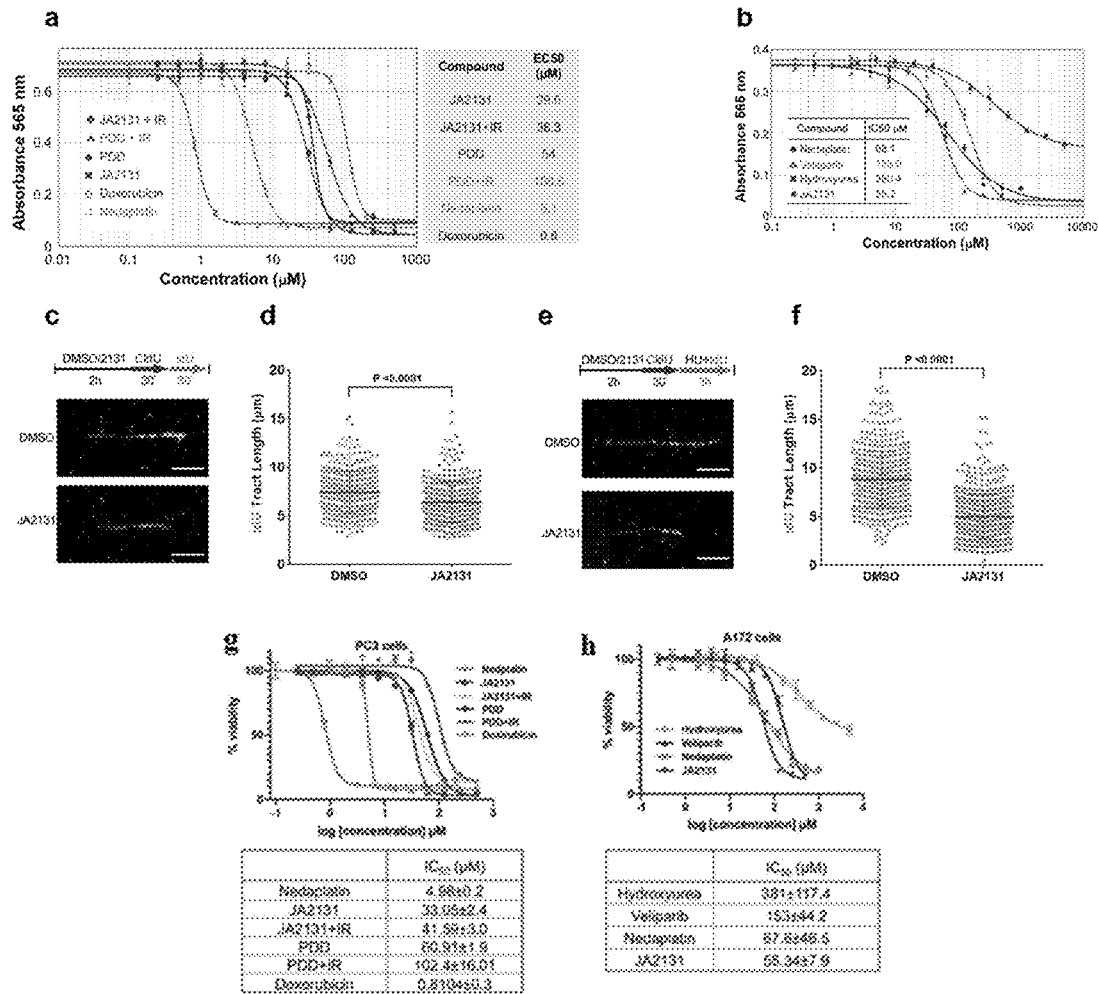
FIGS. 20a-h

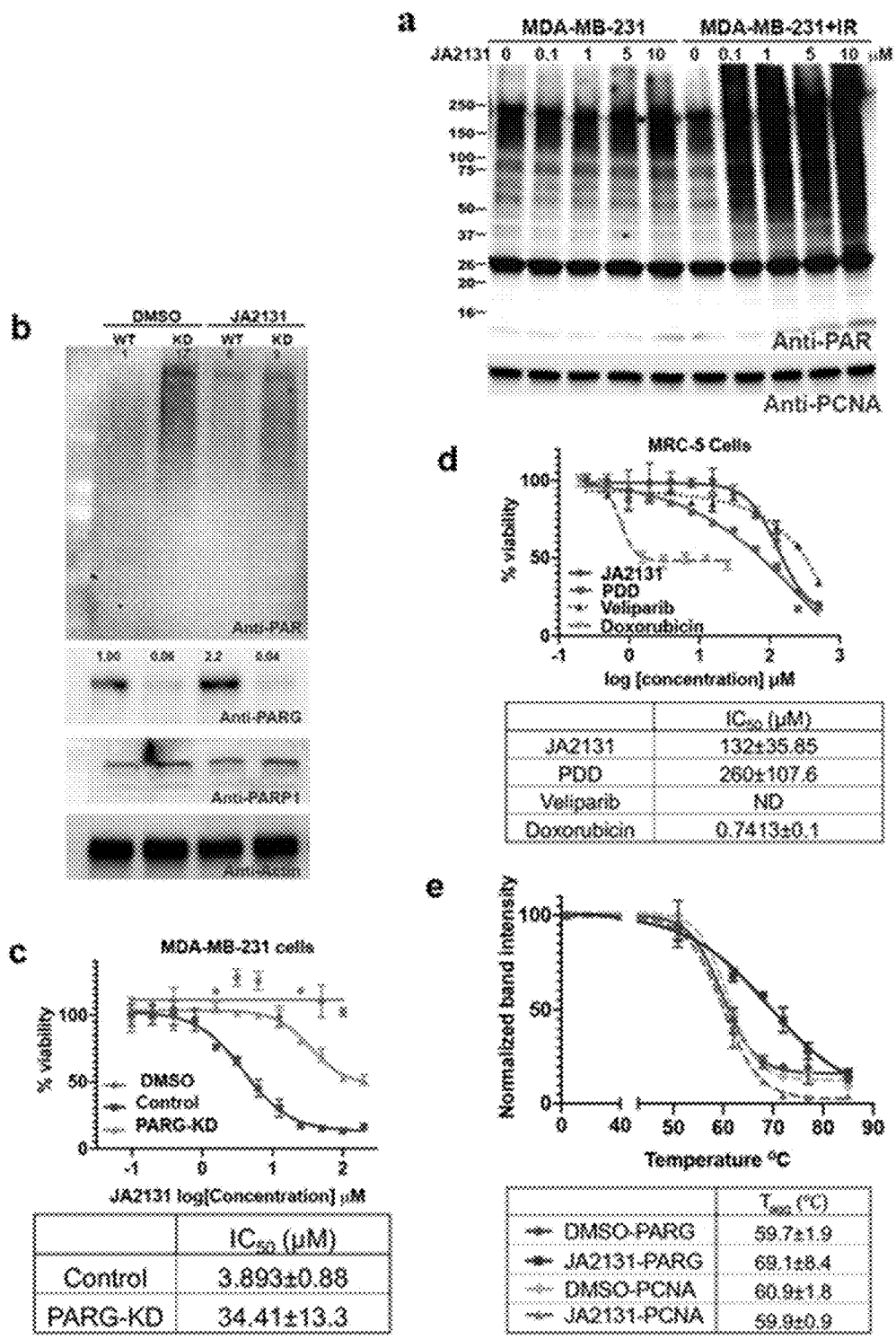
FIGS. 22a-e

FIGS. 28a-d

| Name of compound | Chemical structure | Dose-response inhibition of PARG activity | Estimated IC50 (µM) |
|---|---|---|---|
| JA1 | | | |
| JA1-1 (NSC19630) | | JA3-1 | 1 ~ 2 |
| JA1-2 (NSC58206) | | JA3-2 | ND |
| JA1-3 (NSC89575) | | JA3-3 | ~ 0.4 |
| JA1-4 (NSC192708) | | JA3-4 | ND |

FIG. 29

SMALL MOLECULE PARG INHIBITORS AND METHODS OF USE THEREOF

The present application is a national phase application under 35 U.S.C. § 371 of International Application No. PCT/US2020/025499, filed Mar. 27, 2020, which claims the priority benefit of U.S. Provisional Application Ser. No. 62/826,836, filed Mar. 29, 2019, and 62/914,195, filed Oct. 11, 2019, the entire contents of each of which are hereby incorporated by reference.

GOVERNMENT SUPPORT CLAUSE

This invention was made with government support under Grant Nos. RO1 CA200231 and P01 CA092584 awarded by the National Institutes of Health. The government has certain rights in the invention.

BACKGROUND

I. Field

The present disclosure relates in general to the field of chemistry and medicine, specifically to compositions of matter and methods of their use in medical indications, such as cancer.

II. Description of Related Art

Poly(ADP-ribose)ylation (PARylation) by PAR polymerase 1 (PARP1) and its reversal by PAR glycohydrolase (PARG) dictate multiple DNA damage responses (Davidovic et al., 2001; Gibson and Kraus, 2012; Min and Wang, 2009). PAR homeostasis regulates DNA damage responses by rapid and dynamic modulation of protein-protein and protein-DNA interactions essential for genomic integrity and cell survival (Gibson and Kraus, 2012). Reversible PARylation at DNA breaks and replication forks enforces control of modular assemblies of dynamic complexes enabling damage detection, signaling, compartmental localization, and repair (Gupte et al., 2017; Barkauskaite et al., 2015).

Consequently, blocking PAR synthesis by PARP inhibitors (PARPi) impairs signaling and the repair of damaged DNA (Wang et al., 2012) and causes centrosome amplification (Kanai et al., 2003). Accordingly, PARP1-null mice are more susceptible to carcinogenesis induced by DNA alkylating agents (Tatsumi et al., 2001; Masutani et al., 2005). In contrast, PARP1 hyperactivation causes excessive PAR accumulation that is cytotoxic and triggers release of apoptosis inducing factor (AIF) from mitochondria, leading to cell death (Andrabi et al., 2006; Yu et al., 2006). Similarly, mice lacking PARG show excessive PAR accumulation, resulting in early embryonic lethality and cell death (Koh et al., 2004), whereas PARG-deficient cells exhibit delayed repair of DNA single- and double-strand breaks (Shirai et al., 2013; Fisher et al., 2007) plus aberrant cell cycle progression (Ame et al., 2009).

The ability to control PARylation reversal by PAR glycohydrolases (Kassab and Yu, 2019) particularly PARG as the predominant enzyme that removes PAR chains at sites of DNA damage (Fisher et al., 2007; Brochu et al. 1994) offers the ability to control uniquely susceptible damage responses in cancer cells. Yet, there is no PARGi in the clinic and existing inhibitors show various limitations. A classic PAR inhibitor is Gallotannin (GT), a large naturally occurring polyphenol that exhibits inhibition of PARG with $IC_{50}$ of <5 µM (Falsig et al., 2004). GT retards DNA repair (Di Meglio et al., 2004), protects against $H_2O_2$-mediated cell death (Falsig et al., 2004), sensitizes cancer cells to cisplatin (Sun et al., 2012), and can specifically kill BRCA-deficient breast cancer cells (Fathers et al., 2012). However, concerns exist about GT's possible nonspecific mode of action and membrane permeability as well as its antioxidant activity (Blenn et al., 2011). Salicylanilides derivatives appear to be non-specific PARG inhibitors (Finch et al., 2012). RBPIs are selective PARG inhibitors in vitro with low micromolar potency, but their bioavailability and cellular activity remain questionable (Finch et al., 2012).

Quinazolinedione sulfonamide derivatives target the PARG active site, however rapid clearance in vivo renders them unsuitable as therapeutic agents (James et al., 2016). The small molecule PARGi PDD000172173 (James et al., 2016) has strong effects on cellular PAR metabolism. Yet, tests with PARG-depleted cells suggest a less than specific mode of action in mammalian cells (Houl et al., 2019). Therefore, there remains a therapeutic need to develop new and effective methods of methods for the inhibition of PARG, as well as the treatment of associated diseases and disorders, including cancer and the symptoms therefore.

SUMMARY

The present disclosure provides methods of inhibiting PARG in a cancer cell, for example, through the use of small molecule PARG inhibitors and pharmaceutical compositions thereof. Also provided are methods of treating and/or preventing cancer in a patient, using PARG inhibitors. The disclosure also provides methods for identifying PARG inhibitors.

In some aspects, the present disclosure provides methods of treating or preventing cancer in a patient in need thereof comprising administering to the patient a therapeutically effective amount of a PARG inhibitor. In some embodiments, the disease or disorder is cancer or is associated with a parasite. In further embodiments, the disease or disorder is associated with a parasite, such as *Trypanosoma brucei, Trypanosoma curzi, Toxoplasma gondii*, or a louse. In some embodiments, the disease or disorder is African sleeping sickness, Chagas disease, toxoplasmosis, or a disease associated with lice. In some embodiments, the disease or disorder is cancer.

In some embodiments, the patient is a mammal, such as a human. In some embodiments, the therapeutically effective amount is sufficient to modulate the activity of the patient's PARG. In some embodiments, the PARG inhibitor binds to the adenine-binding pocket of PARG. In some embodiments, the PARG inhibitor causes a first displacement of Tyr795 relative to Tyr795 in PARG not contacted with the PARG inhibitor. In some embodiments, the method further causes a second displacement of Arg671 relative to Arg671 in PARG not contacted with the PARG inhibitor. In some embodiments, first displacement is from about 0.1 Å to about 10 Å. In further embodiments, the first displacement is from about 0.5 Å to about 10 Å. In still further embodiments, the first displacement is from about 2 Å to about 10 Å, for example, from about 2 Å to about 4 Å, from about 4 Å to about 8 Å, or from about 5 Å to about 10 Å. In some embodiments, the second displacement is from about 1 Å to about 20 Å. In further embodiments, the second displacement is from about 3 Å to about 12 Å, for example, from about 3 Å to about 6 Å, or from about 6 Å to about 12 Å. In still further embodiments, the second displacement is from about 5 Å to about 10 Å. In still further embodiments, the second displacement is from about 6 Å to about 15 Å.

In some embodiments, the PARG inhibitor makes an interaction with the Phe902 side chain. In further embodiments, the interaction with the Phe902 side chain is a π-stacking interaction. In some embodiments, the PARG inhibitor binds to Ile726. In further embodiments, the bond to Ile726 is a hydrogen bond. In some embodiments, the method does not significantly affect the patient's PARPi activity. In some embodiments, the method does not significantly inhibit the patient's PARP1 activity. In some embodiments, the method results in selectively inhibiting the patients's PARG with respect to the patient's PARP1. In some embodiments, the PARG inhibitor $IC_{50}$ activity is less than about 200 μM. In further embodiments, the PARG inhibitor $IC_{50}$ activity is less than about 30 μM. In still further embodiments, the PARG inhibitor $IC_{50}$ activity is less than about 20 μM. In yet further embodiments, the PARG inhibitor $IC_{50}$ activity is less than about 1 μM. In further embodiments, the PARG inhibitor $IC_{50}$ activity is less than about 0.5 μM. In some embodiments, the cancer is breast cancer, ovarian cancer, or prostate cancer. In further embodiments, the cancer is breast cancer, such as triple-negative breast cancer. In some embodiments, the cancer comprises intact BRCA1 and/or BRCA2 genes. In some embodiments, the cancer comprises homologous recombination (HR) defects.

In some embodiments, the method further comprises a second anti-cancer therapy. In further embodiments, the second anti-cancer therapy is surgery, chemotherapy, radiotherapy, hormonal therapy, toxin therapy, immunotherapy, and cryotherapy. In still further embodiments, the second anti-cancer therapy is chemotherapy or radiotherapy. In some embodiments, the second anti-cancer therapy is provided prior to administering the PARG inhibitor. In some embodiments, the second anti-cancer therapy is provided after administering the PARG inhibitor. In some embodiments, the second anti-cancer therapy is provided at the same time as the PARG inhibitor.

In another aspect, the present disclosure provides methods of inhibiting PARG in a human cancer cell comprising contacting the cell with an effective amount of a PARG inhibitor, wherein the PARG inhibitor causes a first displacement of Tyr795 relative to Tyr795 in PARG not contacted with the PARG inhibitor. In some embodiments, the PARG inhibitor further causes a second displacement of Arg671 relative to Arg671 in PARG not contacted with the PARG inhibitor. In some embodiments, the first displacement is from about 0.1 Å to about 20 Å. In further embodiments, the first displacement is from about 0.5 Å to about 10 Å. In still further embodiments, the first displacement is from about 2 Å to about 10 Å. In further embodiments, the first displacement is from about 5 Å to about 10 Å. In some embodiments, the second displacement is from about 1 Å to about 20 Å. In further embodiments, the second displacement is from about 3 Å to about 12 Å. In still further embodiments, the second displacement is from about 5 Å to about 10 Å. In some embodiments, the method does not significantly affect PARP1 activity. In some embodiments, wherein the method does not significantly inhibit PARP1 activity. In some embodiments, the method does not significantly decrease PAR synthesis. In some embodiments, the PARG inhibitor $IC_{50}$ activity is less than about 200 μM. In some embodiments, the PARG inhibitor $IC_{50}$ activity is less than about 30 μM. In further embodiments, the PARG inhibitor $IC_{50}$ activity is less than about 20 μM. In still further embodiments, the PARG inhibitor $IC_{50}$ activity is less than about 1 μM. In further embodiments, the PARG inhibitor $IC_{50}$ activity is less than about 0.5 μM. In some embodiments, the cancer cell is a breast cancer cell, ovarian cancer cell, or prostate prostate cell. In further embodiments, the cancer cell is a breast cancer cell, such as a triple-negative breast cancer cell. In some embodiments, the cell comprises intact BRCA1 and/or BRCA2 genes.

In some embodiments, the PARG inhibitor is a compound of the formula:

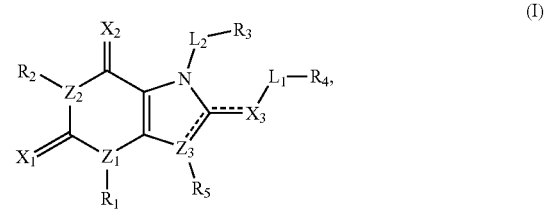

(I)

wherein:
$L_1$ is absent or a covalent bond; or
-alkanediyl$_{(C≤12)}$-, -alkanediyl$_{(C≤12)}$-C(O)— -Alkenediyl$_{(C≤12)}$-, -alkenediyl$_{(C≤12)}$-C(O)—, or a substituted version of any of these groups;

$L_1$ and $R_3$ are taken together and are -alkanetriyl$_{(C≤12)}$-, -alkanetriyl$_{(C≤12)}$-C(O)—, alkenetriyl$_{(C≤12)}$-, -alkenetriyl$_{(C≤12)}$-C(O)—, or a substituted version of any of these groups; or $L_1$ and $R_5$ are taken together and are -alkanetriyl$_{(C≤12)}$-, -alkanetriyl$_{(C≤12)}$-C(O)—, -alkenetriyl$_{(C≤12)}$-, -alkenetriyl$_{(C≤12)}$-C(O)—, or a substituted version of any of these groups;

$L_2$ is a covalent bond or —C(O)—; or
alkanediyl$_{(C≤12)}$-, -alkanediyl$_{(C≤12)}$-C(O)— -alkenediyl$_{(C≤12)}$-, alkenediyl$_{(C≤12)}$-C(O)—, or a substituted version of any of these groups;

$R_1$ and $R_2$ are each independently hydrogen; or
alkyl$_{(C≤12)}$, alkenyl$_{(C≤12)}$, alkynyl$_{(C≤12)}$, aryl$_{(C≤12)}$, aralkyl$_{(C≤12)}$, heteroaryl$_{(C≤12)}$, heteroaralkyl$_{(C≤12)}$, cycloalkyl$_{(C≤12)}$, heterocycloalkyl$_{(C≤12)}$, -alkanediyl$_{(C≤12)}$-cycloalkyl$_{(C≤12)}$,
alkanediyl$_{(C≤12)}$-heterocycloalkyl$_{(C≤12)}$, or a substituted version of any of these groups;

$R_3$ and $R_5$ are each independently hydrogen, hydroxy, amino, or phenyl-4-carbaldehyde; or
alkyl$_{(C≤12)}$, alkenyl$_{(C≤12)}$, alkynyl$_{(C≤12)}$, alkoxy$_{(C≤12)}$, aryl$_{(C≤12)}$, cycloalkyl$_{(C≤12)}$, heterocycloalkyl$_{(C≤12)}$, heteroaryl$_{(C≤12)}$, or a substituted version of any of these groups; or a group of the formula:

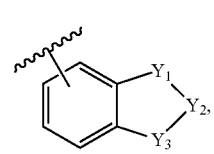

(Ia)

wherein:
$Y_1$, $Y_2$, and $Y_3$ are each independently —C(O)—, —C(S)—, or —NH—; or a group of the formula:

R$_3$ and L$_1$ are taken together and are -alkanetriyl$_{(C≤12)}$-, -alkanetriyl$_{(C≤12)}$-C(O)—, -alkenetriyl$_{(C≤12)}$-, -alkenetriyl$_{(C≤12)}$-C(O)—, or a substituted version of any of these groups; or R$_5$ and L$_1$ are taken together and are -alkanetriyl$_{(C≤12)}$-, -alkanetriyl$_{(C≤12)}$-C(O)—, -alkenetriyl$_{(C≤12)}$-, -alkenetriyl$_{(C≤12)}$-C(O)—, or a substituted version of any of these groups;

R$_4$ is absent, hydrogen, hydroxy, amino, or phenyl-4-carbaldehyde; or alkyl$_{(C≤12)}$, alkenyl$_{(C≤12)}$, alkynyl$_{(C≤12)}$, alkoxy$_{(C≤12)}$, aryl$_{(C≤12)}$, aralkyl$_{(C≤12)}$, heteroaryl$_{(C≤12)}$, heteroaralkyl$_{(C≤12)}$, cycloalkyl$_{(C≤12)}$, heterocycloalkyl$_{(C≤12)}$, or a substituted version of any of these groups; or a group of the formula:

(Ia)

wherein:
Y$_1$, Y$_2$, and Y$_3$ are each independently —C(O)—, —C(S)—, or —NH—; or a group of the formula:

X$_1$ and X$_2$ are each independently O or S;
X$_3$ is a covalent bond, O, S, N, or NH;
Z$_1$ and Z$_2$ are each independently CH or N; and
Z$_3$ is C, CH, or N;
provided R$_5$ is absent when and only when Z$_3$ and an atom to which it is attached form a double bond and Z$_3$ is N; and
provided that both L$_1$ and R$_4$ are absent when and only when X$_3$ and an atom to which it is attached form a double bond; or a compound of the formula:

(II)

wherein:
L$_3$ and L$_4$ are each independently a covalent bond; or alkanediyl$_{(C≤12)}$-, -alkanediyl$_{(C≤12)}$—C(O)— -alkenediyl$_{(C≤12)}$-, -alkenediyl$_{(C≤12)}$-C(O)—, or a substituted version of any of these groups;

R$_6$ and R$_7$ are each independently hydrogen; or
alkyl$_{(C≤12)}$, alkenyl$_{(C≤12)}$, alkynyl$_{(C≤12)}$, aryl$_{(C≤12)}$, aralkyl$_{(C≤12)}$, heteroaryl$_{(C≤12)}$, heteroaralkyl$_{(C≤12)}$, cycloalkyl$_{(C≤12)}$, heterocycloalkyl$_{(C≤12)}$, -alkanediyl$_{(C≤12)}$-cycloalkyl$_{(C≤12)}$, alkanediyl$_{(C≤12)}$-heterocycloalkyl$_{(C≤12)}$, or a substituted version of any of these groups;

R$_8$ is hydrogen; or
alkyl$_{(C≤12)}$, alkenyl$_{(C≤12)}$, alkynyl$_{(C≤12)}$, alkoxy$_{(C≤12)}$, aryl$_{(C≤12)}$, aralkyl$_{(C≤12)}$, heteroaryl$_{(C≤12)}$, heteroaralkyl$_{(C≤12)}$, cycloalkyl$_{(C≤12)}$, heterocycloalkyl$_{(C≤12)}$, or a substituted version of any of these groups;

X$_4$ and X$_5$ are each independently O or S;
X$_6$ is a covalent bond, O, S, or NH; and
Z$_4$ and Z$_5$ are each independently CH or N; or
a compound of the formula:

(VII)

wherein:
m is 0 or 1;
R$_9$ and R$_{10}$ are each independently hydrogen, alkyl$_{(C≤12)}$, or substituted alkyl$_{(C≤12)}$;
R$_{11}$ is hydrogen; or
heterocycloalkyl$_{(C≤12)}$, substituted heterocycloalkyl$_{(C≤12)}$, -alkanediyl$_{(C≤12)}$-heterocycloalkyl$_{(C≤12)}$, or substituted -alkanediyl$_{(C≤12)}$-heterocycloalkyl$_{(C≤12)}$;
X$_7$ and X$_9$ are each independently O or S;
X$_8$ is a covalent bond, O, S, or NH;
Z$_6$ and Z$_7$ are each independently O, S, or NR$_a$, wherein:
R$_a$ is hydrogen, alkyl$_{(C≤12)}$, or substituted alkyl$_{(C≤12)}$;
or a pharmaceutically acceptable salt of any of these formulae.

In some embodiments, the PARG inhibitor is a compound of the formula:

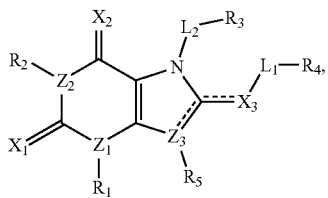
(I)

wherein:

$L_1$ is absent or a covalent bond; or alkanediyl$_{(C≤12)}$-, -alkanediyl$_{(C≤12)}$-C(O)— -alkenediyl$_{(C≤12)}$-, -alkenediyl$_{(C≤12)}$-C(O)—, or a substituted version of any of these groups;

$L_1$ and $R_3$ are taken together and are -alkanetriyl$_{(C≤12)}$-, -alkanetriyl$_{(C≤12)}$-C(O)—, -alkenetriyl$_{(C≤12)}$-, -alkenetriyl$_{(C≤12)}$-C(O)—, or a substituted version of any of these groups; or $L_1$ and $R_5$ are taken together and are -alkanetriyl$_{(C≤12)}$-, -alkanetriyl$_{(C≤12)}$-C(O)—, -alkenetriyl$_{(C≤12)}$-, -alkenetriyl$_{(C≤12)}$-C(O)—, or a substituted version of any of these groups;

$L_2$ is a covalent bond or —C(O)—; or alkanediyl$_{(C≤12)}$, -alkanediyl$_{(C≤12)}$-C(O)— -alkenediyl$_{(C≤12)}$-, -alkenediyl$_{(C≤12)}$-C(O)—, or a substituted version of any of these groups;

$R_1$ and $R_2$ are each independently hydrogen; or alkyl$_{(C≤12)}$, alkenyl$_{(C≤12)}$, alkynyl$_{(C≤12)}$, aryl$_{(C≤12)}$, aralkyl$_{(C≤12)}$, heteroaryl$_{(C≤12)}$, heteroaralkyl$_{(C≤12)}$, cycloalkyl$_{(C≤12)}$, heterocycloalkyl$_{(C≤12)}$, -alkanediyl$_{(C≤12)}$-cycloalkyl$_{(C≤12)}$, -alkanediyl$_{(C≤12)}$-heterocycloalkyl$_{(C≤12)}$, or a substituted version of any of these groups;

$R_3$ is hydrogen, hydroxy, amino, or phenyl-4-carbaldehyde; or cycloalkyl$_{(C≤12)}$, heterocycloalkyl$_{(C≤12)}$, heteroaryl$_{(C≤12)}$, or a substituted version of any of these groups; or $R_3$ and $L_1$ are taken together and are -alkanetriyl$_{(C≤12)}$-, -alkanetriyl$_{(C≤12)}$-C(O)—, -alkenetriyl$_{(C≤12)}$-, -alkenetriyl$_{(C≤12)}$-C(O)—, or a substituted version of any of these groups;

$R_4$ is absent, hydrogen, hydroxy, or amino; or alkyl$_{(C≤12)}$, alkenyl$_{(C≤12)}$, alkynyl$_{(C≤12)}$, alkoxy$_{(C≤12)}$, aryl$_{(C≤12)}$, aralkyl$_{(C≤12)}$, heteroaryl$_{(C≤12)}$, heteroaralkyl$_{(C≤12)}$, cycloalkyl$_{(C≤12)}$, heterocycloalkyl$_{(C≤12)}$, or a substituted version of any of these groups; or a group of the formula:

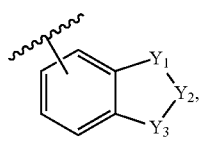
(Ia)

wherein:

$Y_1$, $Y_2$, and $Y_3$ are each independently —C(O)—, —C(S)—, or —NH—; or a group of the formula:

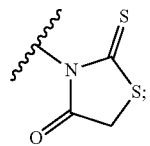

$R_5$ is absent or hydrogen; or alkyl$_{(C≤12)}$, alkenyl$_{(C≤12)}$, alkynyl$_{(C≤12)}$, aryl$_{(C≤12)}$, aralkyl$_{(C≤12)}$, heteroaryl$_{(C≤12)}$, heteroaralkyl$_{(C≤12)}$, cycloalkyl$_{(C≤12)}$, heterocycloalkyl$_{(C≤12)}$, or a substituted version of any of these groups; or $R_5$ and $L_1$ are taken together and are -alkanetriyl$_{(C≤12)}$-, -alkanetriyl$_{(C≤12)}$-C(O)—, -alkenetriyl$_{(C≤12)}$-, -alkenetriyl$_{(C≤12)}$-C(O)—, or a substituted version of any of these groups;

$X_1$ and $X_2$ are each independently O or S;

$X_3$ is a covalent bond, O, S, N, or NH;

$Z_1$ and $Z_2$ are each independently CH or N; and $Z_3$ is C, CH, or N;

provided $R_5$ is absent when and only when $Z_3$ and an atom to which it is attached form a double bond and $Z_3$ is N; and provided that both $L_1$ and $R_4$ are absent when and only when $X_3$ and an atom to which it is attached form a double bond; or a compound of the formula:

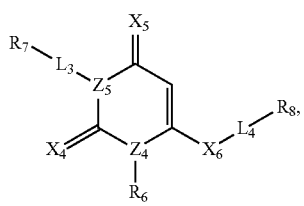
(II)

wherein:

$L_3$ and $L_4$ are each independently a covalent bond; or alkanediyl$_{(C≤12)}$, -alkanediyl$_{(C≤12)}$-C(O)— -alkenediyl$_{(C≤12)}$-, -alkenediyl$_{(C≤12)}$-C(O)—, or a substituted version of any of these groups;

$R_6$ and $R_7$ are each independently hydrogen; or alkyl$_{(C≤12)}$, alkenyl$_{(C≤12)}$, alkynyl$_{(C≤12)}$, aryl$_{(C≤12)}$, aralkyl$_{(C≤12)}$, heteroaryl$_{(C≤12)}$, heteroaralkyl$_{(C≤12)}$, cycloalkyl$_{(C≤12)}$, heterocycloalkyl$_{(C≤12)}$, -alkanediyl$_{(C≤12)}$-cycloalkyl$_{(C≤12)}$, -alkanediyl$_{(C≤12)}$-heterocycloalkyl$_{(C≤12)}$, or a substituted version of any of these groups;

$R_8$ is hydrogen; or alkyl$_{(C≤12)}$, alkenyl$_{(C≤12)}$, alkynyl$_{(C≤12)}$, alkoxy$_{(C≤12)}$, aryl$_{(C≤12)}$, aralkyl$_{(C≤12)}$, heteroaryl$_{(C≤12)}$, heteroaralkyl$_{(C≤12)}$, cycloalkyl$_{(C≤12)}$, heterocycloalkyl$_{(C≤12)}$, or a substituted version of any of these groups;

$X_4$ and $X_5$ are each independently O or S;

$X_6$ is a covalent bond, O, S, or NH; and $Z_4$ and $Z_5$ are each independently CH or N; or a compound of the formula:

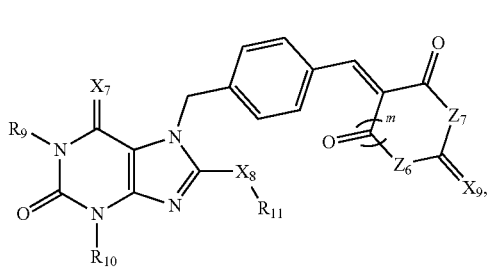

wherein:
m is 0 or 1;
$R_9$ and $R_{10}$ are each independently hydrogen, $alkyl_{(C\leq12)}$, or substituted $alkyl_{(C\leq12)}$;
$R_{11}$ is hydrogen; or
heterocycloalkyl$_{(C\leq12)}$, substituted heterocycloalkyl$_{(C\leq12)}$, -alkanediyl$_{(C\leq12)}$-heterocycloalkyl$_{(C\leq12)}$, or substituted -alkanediyl$_{(C\leq12)}$-heterocycloalkyl$_{(C\leq12)}$;
$X_7$ and $X_9$ are each independently O or S;
$X_8$ is a covalent bond, O, S, or NH;
$Z_6$ and $Z_7$ are each independently O, S, or $NR_a$, wherein:
$R_a$ is hydrogen, $alkyl_{(C\leq12)}$, or substituted $alkyl_{(C\leq12)}$;
or a pharmaceutically acceptable salt of any of these formulae.

In some embodiments of any of the above aspects, the PARG inhibitor is a compound of the formula:

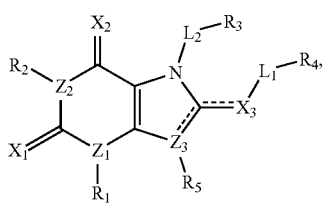

wherein:
$L_1$ is absent or a covalent bond; or
alkanediyl$_{(C\leq12)}$-, -alkanediyl$_{(C\leq12)}$-C(O)— -alkenediyl$_{(C\leq12)}$-, -alkenediyl$_{(C\leq12)}$-C(O)—, or a substituted version of any of these groups;
$L_1$ and $R_3$ are taken together and are -alkanetriyl$_{(C\leq12)}$-, -alkanetriyl$_{(C\leq12)}$-C(O)—, -alkenetriyl$_{(C\leq12)}$-, -alkenetriyl$_{(C\leq12)}$-C(O)—, or a substituted version of any of these groups; or
$L_1$ and $R_5$ are taken together and are -alkanetriyl$_{(C\leq12)}$-, -alkanetriyl$_{(C\leq12)}$-C(O)—, -alkenetriyl$_{(C\leq12)}$-, -alkenetriyl$_{(C\leq12)}$-C(O)—, or a substituted version of any of these groups;
$L_2$ is a covalent bond or —C(O)—; or
alkanediyl$_{(C\leq12)}$, -alkanediyl$_{(C\leq12)}$-C(O)— -alkenediyl$_{(C\leq12)}$-, -alkenediyl$_{(C\leq12)}$-C(O)—, or a substituted version of any of these groups;
$R_1$ and $R_2$ are each independently hydrogen; or
alkyl$_{(C\leq12)}$, alkenyl$_{(C\leq12)}$, alkynyl$_{(C\leq12)}$, aryl$_{(C\leq12)}$, aralkyl$_{(C\leq12)}$, heteroaryl$_{(C\leq12)}$, heteroaralkyl$_{(C\leq12)}$, cycloalkyl$_{(C\leq12)}$, heterocycloalkyl$_{(C\leq12)}$, -alkanediyl$_{(C\leq12)}$-cycloalkyl$_{(C\leq12)}$, alkanediyl$_{(C\leq12)}$-heterocycloalkyl$_{(C\leq12)}$, or a substituted version of any of these groups;

$R_3$ is hydrogen, hydroxy, or amino; or
alkyl$_{(C\leq12)}$, alkenyl$_{(C\leq12)}$, alkynyl$_{(C\leq12)}$, alkoxy$_{(C\leq12)}$, aryl$_{(C\leq12)}$, cycloalkyl$_{(C\leq12)}$, heterocycloalkyl$_{(C\leq12)}$, heteroaryl$_{(C\leq12)}$, or a substituted version of any of these groups; or
$R_3$ and $L_1$ are taken together and are -alkanetriyl$_{(C\leq12)}$-, -alkanetriyl$_{(C\leq12)}$-C(O)—, -alkenetriyl$_{(C\leq12)}$-, -alkenetriyl$_{(C\leq12)}$-C(O)—, or a substituted version of any of these groups;
$R_4$ is absent, hydrogen, hydroxy, or amino; or
alkyl$_{(C\leq12)}$, alkenyl$_{(C\leq12)}$, alkynyl$_{(C\leq12)}$, alkoxy$_{(C\leq12)}$, aryl$_{(C\leq12)}$, aralkyl$_{(C\leq12)}$, heteroaryl$_{(C\leq12)}$, heteroaralkyl$_{(C\leq12)}$, cycloalkyl$_{(C\leq12)}$, heterocycloalkyl$_{(C\leq12)}$, or a substituted version of any of these groups; or
a group of the formula:

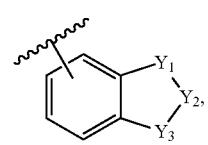

wherein:
$Y_1$, $Y_2$, and $Y_3$ are each independently —C(O)—, —C(S)—, or —NH—; or
a group of the formula:

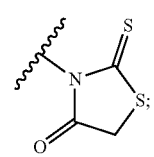

$R_5$ is absent or hydrogen; or
alkyl$_{(C\leq12)}$, alkenyl$_{(C\leq12)}$, alkynyl$_{(C\leq12)}$, aryl$_{(C\leq12)}$, aralkyl$_{(C\leq12)}$, heteroaryl$_{(C\leq12)}$, heteroaralkyl$_{(C\leq12)}$, cycloalkyl$_{(C\leq12)}$, heterocycloalkyl$_{(C\leq12)}$, or a substituted version of any of these groups; or
$R_5$ and $L_1$ are taken together and are -alkanetriyl$_{(C\leq12)}$-, -alkanetriyl$_{(C\leq12)}$-C(O)—, -alkenetriyl$_{(C\leq12)}$-, -alkenetriyl$_{(C\leq12)}$-C(O)—, or a substituted version of any of these groups;
$X_1$ and $X_2$ are each independently O or S;
$X_3$ is a covalent bond, O, S, N, or NH;
$Z_1$ and $Z_2$ are each independently CH or N; and
$Z_3$ is C, CH, or N;
provided $R_5$ is absent when and only when $Z_3$ and an atom to which it is attached form a double bond and $Z_3$ is N; and
provided that both $L_1$ and $R_4$ are absent when and only when $X_3$ and an atom to which it is attached form a double bond; or
a compound of the formula:

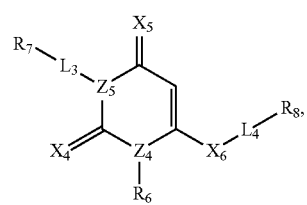

wherein:
L$_3$ and L$_4$ are each independently a covalent bond; or
alkanediyl$_{(C≤12)}$-, -alkanediyl$_{(C≤12)}$-C(O)—, -alkenediyl$_{(C≤12)}$-, -alkenediyl$_{(C≤12)}$-C(O)—, or a substituted version of any of these groups;
R$_6$ and R$_7$ are each independently hydrogen; or
alkyl$_{(C≤12)}$, alkenyl$_{(C≤12)}$, alkynyl$_{(C≤12)}$, aryl$_{(C≤12)}$, aralkyl$_{(C≤12)}$, heteroaryl$_{(C≤12)}$, heteroaralkyl$_{(C≤12)}$, cycloalkyl$_{(C≤12)}$, heterocycloalkyl$_{(C≤12)}$, -alkanediyl$_{(C≤12)}$-cycloalkyl$_{(C≤12)}$, alkanediyl$_{(C≤12)}$-heterocycloalkyl$_{(C≤12)}$, or a substituted version of any of these groups;
R$_8$ is hydrogen; or
alkyl$_{(C≤12)}$, alkenyl$_{(C≤12)}$, alkynyl$_{(C≤12)}$, alkoxy$_{(C≤12)}$, aryl$_{(C≤12)}$, aralkyl$_{(C≤12)}$, heteroaryl$_{(C≤12)}$, heteroaralkyl$_{(C≤12)}$, cycloalkyl$_{(C≤12)}$, heterocycloalkyl$_{(C≤12)}$, or a substituted version of any of these groups;
X$_4$ and X$_5$ are each independently O or S;
X$_6$ is a covalent bond, O, S, or NH; and
Z$_4$ and Z$_5$ are each independently CH or N;
or a pharmaceutically acceptable salt of either of these formulae.

In some embodiments, the compound is further defined as:

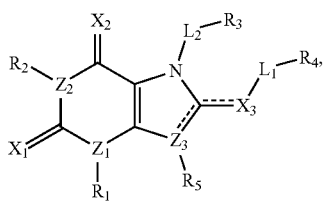

(I)

wherein:
L$_1$ is absent or a covalent bond; or
alkanediyl$_{(C≤12)}$-, -alkanediyl$_{(C≤12)}$-C(O)—, -alkenediyl$_{(C≤12)}$-, -alkenediyl$_{(C≤12)}$-C(O)—, or a substituted version of any of these groups;
L$_1$ and R$_3$ are taken together and are -alkanetriyl$_{(C≤12)}$-, -alkanetriyl$_{(C≤12)}$-C(O)—, -alkenetriyl$_{(C≤12)}$-, -alkenetriyl$_{(C≤12)}$-C(O)—, or a substituted version of any of these groups; or
L$_1$ and R$_5$ are taken together and are -alkanetriyl$_{(C≤12)}$-, -alkanetriyl$_{(C≤12)}$-C(O)—, -alkenetriyl$_{(C≤12)}$-, -alkenetriyl$_{(C≤12)}$-C(O)—, or a substituted version of any of these groups;
L$_2$ is a covalent bond or —C(O)—; or
alkanediyl$_{(C≤12)}$-, -alkanediyl$_{(C≤12)}$-C(O)—, -alkenediyl$_{(C≤12)}$-, -alkenediyl$_{(C≤12)}$-C(O)—, or a substituted version of any of these groups;
R$_1$ and R$_2$ are each independently hydrogen; or
alkyl$_{(C≤12)}$, alkenyl$_{(C≤12)}$, alkynyl$_{(C≤12)}$, aryl$_{(C≤12)}$, aralkyl(cs12>, heteroaryl$_{(C≤12)}$, heteroaralkyl$_{(C≤12)}$, cycloalkyl$_{(C≤12)}$, heterocycloalkyl$_{(C≤12)}$, alkanediyl$_{(C≤12)}$-cycloalkyl$_{(C≤12)}$, alkanediyl$_{(C≤12)}$-heterocycloalkyl$_{(C≤12)}$, or a substituted version of any of these groups;
R$_3$ is hydrogen, hydroxy, or amino; or
alkyl$_{(C≤12)}$, alkenyl(cs12), alkynyl$_{(C≤12)}$, alkoxy$_{(C≤12)}$, aryl$_{(C≤12)}$, cycloalkyl$_{(C≤12)}$, heterocycloalkyl$_{(C≤12)}$, heteroaryl$_{(C≤12)}$, or a substituted version of any of these groups; or R$_3$ and L$_1$ are taken together and are -alkanetriyl$_{(C≤12)}$-, -alkanetriyl(cs12)-C(O)—, -alkenetriyl$_{(C≤12)}$-, -alkenetriyl$_{(C≤12)}$-C(O)—, or a substituted version of any of these groups;
R$_4$ is absent, hydrogen, hydroxy, or amino; or
alkyl$_{(C≤12)}$, alkenyl$_{(C≤12)}$, alkynyl$_{(C≤12)}$, alkoxy$_{(C≤12)}$, aryl$_{(C≤12)}$, aralkyl$_{(C≤12)}$, heteroaryl$_{(C≤12)}$, heteroaralkyl$_{(C≤12)}$, cycloalkyl$_{(C≤12)}$, heterocycloalkyl$_{(C≤12)}$, or a substituted version of any of these groups; or
a group of the formula:

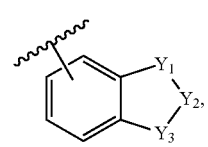

(Ia)

wherein:
Y$_1$, Y$_2$, and Y$_3$ are each independently —C(O)—, —C(S)—, or —NH—; or
a group of the formula:

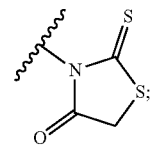

R$_5$ is absent or hydrogen; or
alkyl$_{(C≤12)}$, alkenyl$_{(C≤12)}$, alkynyl$_{(C≤12)}$, aryl$_{(C≤12)}$, aralkyl$_{(C≤12)}$, heteroaryl$_{(C≤12)}$, heteroaralkyl$_{(C≤12)}$, cycloalkyl$_{(C≤12)}$, heterocycloalkyl$_{(C≤12)}$, or a substituted version of any of these groups; or
R$_5$ and L$_1$ are taken together and are -alkanetriyl$_{(C≤12)}$-, -alkanetriyl$_{(C≤12)}$-C(O)—, -alkenetriyl$_{(C≤12)}$-, -alkenetriyl$_{(C≤12)}$-C(O)—, or a substituted version of any of these groups;
X$_1$, and X$_2$ are each independently O or S;
X$_3$ is a covalent bond, O, S, N, or NH;
Z$_1$ and Z$_2$ are each independently CH or N; and
Z$_3$ is C, CH, or N;
provided R$_5$ is absent when and only when Z$_3$ and an atom to which it is attached form a double bond and Z$_3$ is N; and
provided that both L$_1$ and R$_4$ are absent when and only when X$_3$ and an atom to which it is attached form a double bond;
or a pharmaceutically acceptable salt thereof.

In some embodiments, the compound is further defined as:

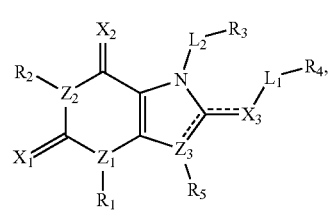

(I)

wherein:
L$_1$ is absent or a covalent bond; or
alkanediyl$_{(C\leq12)}$, -alkanediyl$_{(C\leq12)}$-C(O)—
-alkenediyl$_{(C\leq12)}$-, -alkenediyl$_{(C\leq12)}$-C(O)—, or a
substituted version of any of these groups;
L$_2$ is a covalent bond or —C(O)—; or
alkanediyl$_{(C\leq12)}$, -alkanediyl$_{(C\leq12)}$-C(O)—
-alkenediyl$_{(C\leq12)}$-, -alkenediyl$_{(C\leq12)}$-C(O)—, or a
substituted version of any of these groups;
R$_1$ and R$_2$ are each independently hydrogen; or
alkyl$_{(C\leq12)}$, alkenyl$_{(C\leq12)}$, alkynyl$_{(C\leq12)}$, aryl$_{(C\leq12)}$, aralkyl$_{(C\leq12)}$, heteroaryl$_{(C\leq12)}$, heteroaralkyl$_{(C\leq12)}$, cycloalkyl$_{(C\leq12)}$, heterocycloalkyl$_{(C\leq12)}$, -alkanediyl$_{(C\leq12)}$-cycloalkyl$_{(C\leq12)}$, alkanediyl$_{(C\leq12)}$-heterocycloalkyl$_{(C\leq12)}$, or a substituted version of any of these groups;
R$_3$ is hydrogen, hydroxy, or amino; or
alkyl$_{(C\leq12)}$, alkenyl$_{(C\leq12)}$, alkynyl$_{(C\leq12)}$, alkoxy$_{(C\leq12)}$, aryl$_{(C\leq12)}$, cycloalkyl$_{(C\leq12)}$, heterocycloalkyl$_{(C\leq12)}$, heteroaryl$_{(C\leq12)}$, or a substituted version of any of these groups; or
R$_4$ is absent, hydrogen, hydroxy, or amino; or
alkyl$_{(C\leq12)}$, alkenyl$_{(C\leq12)}$, alkynyl$_{(C\leq12)}$, alkoxy$_{(C\leq12)}$, aryl$_{(C\leq12)}$, aralkyl$_{(C\leq12)}$, heteroaryl$_{(C\leq12)}$, heteroaralkyl$_{(C\leq12)}$, cycloalkyl$_{(C\leq12)}$, heterocycloalkyl$_{(C\leq12)}$, or a substituted version of any of these groups; or
a group of the formula:

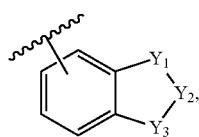

(Ia)

wherein:
Y$_1$, Y$_2$, and Y$_3$ are each independently —C(O)—, —C(S)—, or —NH—; or
a group of the formula:

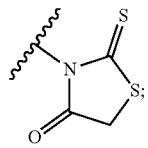 [SMILES: *N1C(=O)CSC1=S]

R$_5$ is absent or hydrogen; or
alkyl$_{(C\leq12)}$, alkenyl$_{(C\leq12)}$, alkynyl$_{(C\leq12)}$, aryl$_{(C\leq12)}$, aralkyl$_{(C\leq12)}$, heteroaryl$_{(C\leq12)}$, heteroaralkyl$_{(C\leq12)}$, cycloalkyl$_{(C\leq12)}$, heterocycloalkyl$_{(C\leq12)}$, or a substituted version of any of these groups; or
X$_1$ and X$_2$ are each independently O or S;
X$_3$ is a covalent bond, O, S, N, or NH;
Z$_1$ and Z$_2$ are each independently CH or N; and
Z$_3$ is C, CH, or N;
provided R$_5$ is absent when and only when Z$_3$ and an atom to which it is attached form a double bond and Z$_3$ is N; and
provided that both L$_1$ and R$_4$ are absent when and only when X$_3$ and an atom to which it is attached form a double bond;
or a pharmaceutically acceptable salt thereof.
In some embodiments, the compound is further defined as:

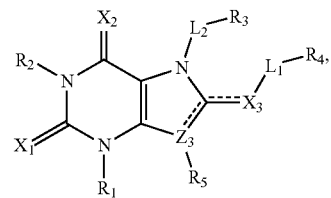

(III)

wherein:
L$_1$ is absent or a covalent bond; or
alkanediyl$_{(C\leq12)}$-, -alkanediyl$_{(C\leq12)}$-C(O)— -alkenediyl$_{(C\leq12)}$-, -alkenediyl$_{(C\leq12)}$-C(O)—, or a substituted version of any of these groups;
L$_2$ is a covalent bond or —C(O)—; or
alkanediyl$_{(C\leq12)}$-, -alkanediyl$_{(C\leq12)}$—C(O)— -alkenediyl$_{(C\leq12)}$-, -alkenediyl$_{(C\leq12)}$-C(O)—, or a substituted version of any of these groups;
R$_1$ and R$_2$ are each independently hydrogen; or
alkyl$_{(C\leq12)}$, alkenyl$_{(C\leq12)}$, alkynyl$_{(C\leq12)}$, aryl$_{(C\leq12)}$, aralkyl$_{(C\leq12)}$, heteroaryl$_{(C\leq12)}$, heteroaralkyl$_{(C\leq12)}$, cycloalkyl$_{(C\leq12)}$, heterocycloalkyl$_{(C\leq12)}$, -alkanediyl$_{(C\leq12)}$-cycloalkyl$_{(C\leq12)}$, alkanediyl$_{(C\leq12)}$-heterocycloalkyl$_{(C\leq12)}$, or a substituted version of any of these groups;
R$_3$ is hydrogen, hydroxy, or amino; or
alkyl$_{(C\leq12)}$, alkenyl$_{(C\leq12)}$, alkynyl$_{(C\leq12)}$, alkoxy$_{(C\leq12)}$, aryl$_{(C\leq12)}$, cycloalkyl$_{(C\leq12)}$, heterocycloalkyl$_{(C\leq12)}$, heteroaryl$_{(C\leq12)}$, or a substituted version of any of these groups; or
R$_4$ is absent, hydrogen, hydroxy, or amino; or
alkyl$_{(C\leq12)}$, alkenyl$_{(C\leq12)}$, alkynyl$_{(C\leq12)}$, alkoxy$_{(C\leq12)}$, aryl$_{(C\leq12)}$, aralkyl$_{(C\leq12)}$, heteroaryl$_{(C\leq12)}$, heteroaralkyl$_{(C\leq12)}$, cycloalkyl$_{(C\leq12)}$, heterocycloalkyl$_{(C\leq12)}$, or a substituted version of any of these groups; or
a group of the formula:

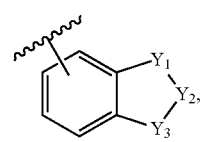

(Ia)

wherein:
Y$_1$, Y$_2$, and Y$_3$ are each independently —C(O)—, —C(S)—, or —NH—; or
a group of the formula:

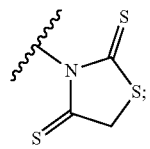

R$_5$ is absent or hydrogen; or
alkyl$_{(C\leq12)}$, alkenyl$_{(C\leq12)}$, alkynyl$_{(C\leq12)}$, aryl$_{(C\leq12)}$, aralkyl$_{(C\leq12)}$, heteroaryl$_{(C\leq12)}$, heteroaralkyl$_{(C\leq12)}$, cycloalkyl$_{(C\leq12)}$, heterocycloalkyl$_{(C\leq12)}$, or a substituted version of any of these groups; or
X$_1$ and X$_2$ are each independently O or S;

$X_3$ is a covalent bond, O, S, N, or NH; and
$Z_3$ is C, CH, or N;
provided $R_5$ is absent when and only when $Z_3$ and an atom to which it is attached form a double bond and $Z_3$ is N; and
provided that both $L_1$ and $R_4$ are absent when and only when $X_3$ and an atom to which it is attached form a double bond;
or a pharmaceutically acceptable salt thereof.

In some embodiments, the compound is further defined as:

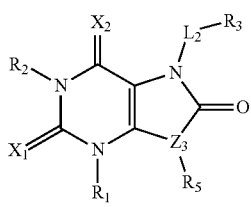

(IV)

wherein:
$L_2$ is a covalent bond or —C(O)—; or
alkanediyl$_{(C\leq12)}$-, -alkanediyl$_{(C\leq12)}$-C(O)— -alkenediyl$_{(C\leq12)}$-, -alkenediyl$_{(C\leq12)}$-C(O)—, or a substituted version of any of these groups;
$R_1$ and $R_2$ are each independently hydrogen; or
alkyl$_{(C\leq12)}$, alkenyl$_{(C\leq12)}$, alkynyl$_{(C\leq12)}$, aryl$_{(C\leq12)}$, aralkyl$_{(C\leq12)}$, heteroaryl$_{(C\leq12)}$, heteroaralkyl$_{(C\leq12)}$, cycloalkyl$_{(C\leq12)}$, heterocycloalkyl$_{(C\leq12)}$, -alkanediyl$_{(C\leq12)}$-cycloalkyl$_{(C\leq12)}$, alkanediyl$_{(C\leq12)}$-heterocycloalkyl$_{(C\leq12)}$, or a substituted version of any of these groups;
$R_3$ is hydrogen; or
alkyl$_{(C\leq12)}$, alkenyl$_{(C\leq12)}$, alkynyl(cs12), alkoxy$_{(C\leq12)}$, aryl$_{(C\leq12)}$, cycloalkyl$_{(C\leq12)}$, heterocycloalkyl$_{(C\leq12)}$, heteroaryl$_{(C\leq12)}$, or a substituted version of any of these groups; or
$R_5$ is absent or hydrogen; or
alkyl$_{(C\leq12)}$, alkenyl$_{(C\leq12)}$, alkynyl$_{(C\leq12)}$, aryl$_{(C\leq12)}$, aralkyl$_{(C\leq12)}$, heteroaryl$_{(C\leq12)}$, heteroaralkyl$_{(C\leq12)}$, cycloalkyl$_{(C\leq12)}$, heterocycloalkyl$_{(C\leq12)}$, or a substituted version of any of these groups; or
$X_1$ and $X_2$ are each independently O or S; and
$Z_3$ is CH or N;
or a pharmaceutically acceptable salt thereof.

In some embodiments, the compound is further defined as:

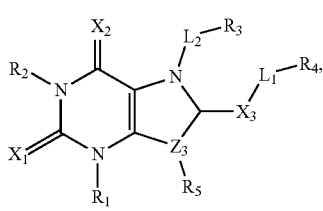

(V)

wherein:
$L_1$ is absent or a covalent bond; or
alkanediyl$_{(C\leq12)}$, -alkanediyl$_{(C\leq12)}$-C(O)— -alkenediyl$_{(C\leq12)}$-, -alkenediyl$_{(C\leq12)}$-C(O)—, or a substituted version of any of these groups;
$L_2$ is a covalent bond or —C(O)—; or
alkanediyl$_{(C\leq12)}$-, -alkanediyl$_{(C\leq12)}$-C(O)— -alkenediyl$_{(C\leq12)}$-, -alkenediyl$_{(C\leq12)}$-C(O)—, or a substituted version of any of these groups;
$R_1$ and $R_2$ are each independently hydrogen; or
alkyl$_{(C\leq12)}$, alkenyl$_{(C\leq12)}$, alkynyl$_{(C\leq12)}$, aryl$_{(C\leq12)}$, aralkyl$_{(C\leq12)}$, heteroaryl$_{(C\leq12)}$, heteroaralkyl$_{(C\leq12)}$, cycloalkyl$_{(C\leq12)}$, heterocycloalkyl$_{(C\leq12)}$, -alkanediyl$_{(C\leq12)}$-cycloalkyl$_{(C\leq12)}$, alkanediyl$_{(C\leq12)}$-heterocycloalkyl$_{(C\leq12)}$, or a substituted version of any of these groups;
$R_3$ is hydrogen, hydroxy, or amino; or
alkyl$_{(C\leq12)}$, alkenyl$_{(C\leq12)}$, alkynyl$_{(C\leq12)}$, alkoxy$_{(C\leq12)}$, aryl$_{(C\leq12)}$, cycloalkyl$_{(C\leq12)}$, heterocycloalkyl$_{(C\leq12)}$, heteroaryl$_{(C\leq12)}$, or a substituted version of any of these groups; or
$R_4$ is absent, hydrogen, hydroxy, or amino; or
alkyl$_{(C\leq12)}$, alkenyl$_{(C\leq12)}$, alkynyl$_{(C\leq12)}$, alkoxy$_{(C\leq12)}$, aryl$_{(C\leq12)}$, aralkyl$_{(C\leq12)}$, heteroaryl$_{(C\leq12)}$, heteroaralkyl$_{(C\leq12)}$, cycloalkyl$_{(C\leq12)}$, heterocycloalkyl$_{(C\leq12)}$, or a substituted version of any of these groups; or
a group of the formula:

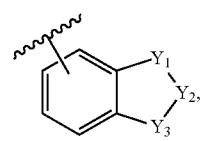

(Ia)

wherein:
$Y_1$, $Y_2$, and $Y_3$ are each independently —C(O)—, —C(S)—, or —NH—; or
a group of the formula:

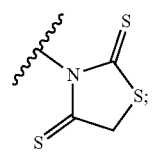

$R_5$ is absent or hydrogen; or
alkyl$_{(C\leq12)}$, alkenyl$_{(C\leq12)}$, alkynyl$_{(C\leq12)}$, aryl$_{(C\leq12)}$, aralkyl$_{(C\leq12)}$, heteroaryl$_{(C\leq12)}$, heteroaralkyl$_{(C\leq12)}$, cycloalkyl$_{(C\leq12)}$, heterocycloalkyl$_{(C\leq12)}$, or a substituted version of any of these groups; or
$X_1$ and $X_2$ are each independently O or S;
$X_3$ is a covalent bond, O, S, or NH; and
or a pharmaceutically acceptable salt thereof.

In some embodiments, $R_5$ is absent. In other embodiments, $R_5$ is hydrogen. In some embodiments, $Z_3$ is N. In other embodiments, $Z_3$ is NH. In some embodiments, $X_3$ is NH. In other embodiments, $X_3$ is S. In still other embodiments, $X_3$ is a covalent bond. In some embodiments, $X_1$ is O. In other embodiments, $X_1$ is S. In some embodiments, $X_2$ is O. In other embodiments, $X_2$ is S. In some embodiments, $R_1$ is hydrogen. In other embodiments, $R_1$ is alkyl$_{(C\leq12)}$ or substituted alkyl$_{(C\leq12)}$. In further embodiments, $R_1$ is alkyl$_{(C\leq12)}$, such as methyl. In other embodiments, $R_1$ is substituted alkyl$_{(C\leq12)}$, such as hydroxyethyl, hydroxypropyl, or methoxyethyl. In some embodiments, $R_2$ is hydrogen. In other embodiments, $R_2$ is alkyl$_{(C\leq12)}$, such as methyl. In still other embodiments, $R_2$ is -alkanediyl$_{(C\leq12)}$-cycloalkyl$_{(C\leq12)}$, such as —CH$_2$-cyclopropyl. In some embodiments, $L_2$ is -alkanediyl$_{(C\leq12)}$- or -alkenediyl$_{(C\leq12)}$-. In further embodiments, $L_2$ is -alkanediyl$_{(C≤12)}$-, such as methanediyl, ethanediyl, or propanediyl. In some embodiments, $L_2$ is -alkenediyl$_{(C≤12)}$, such as propenediyl. In other embodiments, $L_2$ is -alkanediyl$_{(C≤12)}$-C(O)— or -alkenediyl$_{(C≤12)}$-C(O)—. In further embodiments, $L_2$ is -alkanediyl$_{(C≤12)}$-C(O)—, such as —CH$_2$C(O)—, —CH$_2$CH$_2$C(O)—, or —CH$_2$CH$_2$CH$_2$C(O)—. In some embodiments, $L_2$ is -alkenediyl$_{(C≤12)}$-C(O)—, such as —CHCHC(O)—. In other embodiments, $L_2$ is —C(O)—. In still other embodiments, $L_2$ is a covalent bond.

In some embodiments, $R_3$ is alkyl$_{(C≤12)}$ or substituted alkyl$_{(C≤12)}$. In further embodiments, $R_3$ is alkyl$_{(C≤12)}$, such as $R_3$ is methyl. In some embodiments, $R_3$ is substituted alkyl$_{(C≤12)}$, such as —CH$_2$CH$_2$CH$_2$NHCO$_2$(CH$_3$)$_3$. In other embodiments, $R_3$ is alkenyl$_{(C≤12)}$, such as prop-2-en-1-yl or prop-2-en-2-yl. In still other embodiments, $R_3$ is alkoxy$_{(C≤12)}$, such as ethoxy or t-butoxy. In other embodiments, $R_3$ is cycloalkyl$_{(C≤12)}$, such as cyclopropyl. In still other embodiments, $R_3$ is heterocycloalkyl$_{(C≤12)}$, such as oxiranyl or N-morpholinyl. In other embodiments, $R_3$ is aryl$_{(C≤12)}$ or substituted aryl$_{(C≤12)}$. In some embodiments, $R_3$ is aryl$_{(C≤12)}$, such as phenyl. In some embodiments, $R_3$ is substituted aryl$_{(C≤12)}$, such as p-nitrophenyl or p-fluorophenyl. In other embodiments, $R_3$ is amino. In still other embodiments, $R_3$ is hydroxyl. In other embodiments, $R_3$ is hydrogen.

In some embodiments, $L_1$ is -alkanediyl$_{(C≤12)}$- or substituted -alkanediyl$_{(C≤12)}$-. In some embodiments, $L_1$ is -alkanediyl$_{(C≤12)}$-, such as methanediyl, ethanediyl, or propanediyl. In some embodiments, $L_1$ is substituted -alkanediyl$_{(C≤12)}$-, such as —CH(NH$_2$)—. In other embodiments, $L_1$ is -alkenediyl$_{(C≤12)}$-, such as propenediyl. In still other embodiments, $L_1$ is -alkanediyl$_{(C≤12)}$-C(O)—, such as —CH$_2$C(O)—, —CH$_2$CH$_2$C(O)—, or —CH$_2$CH$_2$CH$_2$C(O)—. In other embodiments, $L_1$ is a covalent bond. In some embodiments, $R_4$ is hydrogen. In other embodiments, $R_4$ is amino. In still other embodiments, $R_4$ is hydroxy. In some embodiments, $R_4$ is alkyl$_{(C≤12)}$ or substituted alkyl$_{(C≤12)}$. In some embodiments, $R_4$ is alkyl$_{(C≤12)}$, such as isopropyl. In some embodiments, $R_4$ is substituted alkyl$_{(C≤12)}$, such as 1-mercaptoethan-2-yl. In other embodiments, $R_4$ is alkenyl$_{(C≤12)}$, such as —CH$_2$CH$_2$CH(CH$_3$)CH$_2$CH$_2$CHC(CH$_2$)$_2$. In still other embodiments, $R_4$ is cycloalkyl$_{(C≤12)}$, such as cyclopropyl. In other embodiments, $R_4$ is heterocycloalkyl$_{(C≤12)}$ or substituted heterocycloalkyl$_{(C≤12)}$. In some embodiments, $R_4$ is heterocycloalkyl$_{(C≤12)}$, such as N-piperidinyl, piperazin-1-yl, 4-methylpiperazin-1-yl, N-pyrrolidinyl, or N-morpholinyl. In embodiments, $R_4$ is N-piperidinyl, piperazin-1-yl, 4-methylpiperazin-1-yl, N-pyrrolidinyl, or N-morpholinyl. In other embodiments, $R_4$ is substituted heterocycloalkyl$_{(C≤12)}$, such as N-Boc-piperidin-4-yl. In still other embodiments, $R_4$ is alkoxy$_{(C≤12)}$, such as ethoxy or t-butoxy. In other embodiments, $R_4$ is heteroaryl$_{(C≤12)}$, such as pyridine-3-yl or 1,3-dimethyl-1H-pyrazol-5-yl. In still other embodiments, $R_4$ is aralkyl$_{(C≤12)}$, such as benzyl. In other embodiments, $R_4$ is heteroaralkyl$_{(C≤12)}$, such as 1H-pyrazol-5-ylmethyl. In still other embodiments, $R_4$ is a group of the formula:

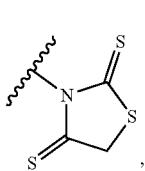 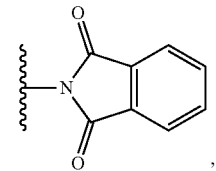

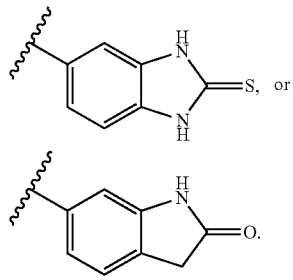

In other embodiments, $R_4$ is aryl$_{(C≤12)}$ or substituted aryl$_{(C≤12)}$. In some embodiments, $R_4$ is aryl$_{(C≤12)}$, such as phenyl. In other embodiments, $R_4$ is substituted aryl$_{(C≤12)}$, such as 4-fluorophenyl, 3-fluorophenyl, 4-methoxyphenyl, 4-methylphenyl, 3-methoxyphenyl, 3-cyanophenyl, 4-trifluoromethylphenyl, 3-trifluoromethylphenyl, 3-chlorophenyl, 2-chlorophenyl, 3-chlorophenyl, 4-bromophenyl, 3-bromophenyl, 3-nitrophenyl, 4-dimethylaminophenyl, 4-SO$_2$Me-phenyl, 3,4-dichlorophenyl, 1,3-dichlorophenyl, 2,4-dichlorophenyl, 2,4-dimethylphenyl, 3,4-dihydroxyphenyl, 1-hydroxy-4-nitrophen-2-yl.

In some embodiments, the compound is further defined as:

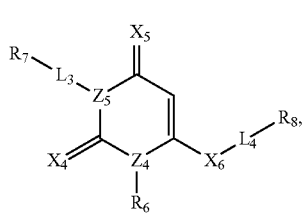

(II)

wherein:

$L_3$ and $L_4$ are each independently a covalent bond; or
  alkanediyl$_{(C≤12)}$, -alkanediyl$_{(C≤12)}$-C(O)—, -alkenediyl$_{(C≤12)}$-, -alkenediyl$_{(C≤12)}$-C(O)—, or a substituted version of any of these groups;

$R_6$ and $R_7$ are each independently hydrogen; or
  alkyl$_{(C≤12)}$, alkenyl$_{(C≤12)}$, alkynyl$_{(C≤12)}$, aryl$_{(C≤12)}$, aralkyl$_{(C≤12)}$, heteroaryl$_{(C≤12)}$, heteroaralkyl$_{(C≤12)}$, cycloalkyl$_{(C≤12)}$, heterocycloalkyl$_{(C≤12)}$, -alkanediyl$_{(C≤12)}$-cycloalkyl$_{(C≤12)}$,
  alkanediyl$_{(C≤12)}$-heterocycloalkyl$_{(C≤12)}$, or a substituted version of any of these groups;

$R_8$ is hydrogen; or
  alkyl$_{(C≤12)}$, alkenyl$_{(C≤12)}$, alkynyl$_{(C≤12)}$, alkoxy$_{(C≤12)}$, aryl$_{(C≤12)}$, aralkyl$_{(C≤12)}$, heteroaryl$_{(C≤12)}$, heteroaralkyl$_{(C≤12)}$, cycloalkyl$_{(C≤12)}$, heterocycloalkyl$_{(C≤12)}$, or a substituted version of any of these groups;

$X_4$ and $X_5$ are each independently O or S;

$X_6$ is a covalent bond, O, S, or NH; and $Z_4$ and $Z_5$ are each independently CH or N;

or a pharmaceutically acceptable salt thereof.

In some embodiments, the compound is further defined as:

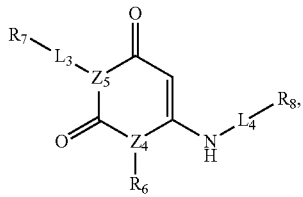

(VI)

wherein:

$L_3$ and $L_4$ are each independently a covalent bond; or alkanediyl$_{(C\leq 12)}$-, -alkanediyl$_{(C\leq 12)}$-C(O)—, -alkenediyl$_{(C\leq 12)}$-, -alkenediyl$_{(C\leq 12)}$-C(O)—, or a substituted version of any of these groups;

$R_6$ and $R_7$ are each independently hydrogen; or alkyl$_{(C\leq 12)}$, alkenyl$_{(C\leq 12)}$, alkynyl$_{(C\leq 12)}$, aryl$_{(C\leq 12)}$, aralkyl$_{(C\leq 12)}$, heteroaryl$_{(C\leq 12)}$, heteroaralkyl$_{(C\leq 12)}$, cycloalkyl$_{(C\leq 12)}$, heterocycloalkyl$_{(C\leq 12)}$, -alkanediyl$_{(C\leq 12)}$-cycloalkyl$_{(C\leq 12)}$, alkanediyl$_{(C\leq 12)}$-heterocycloalkyl$_{(C\leq 12)}$, or a substituted version of any of these groups; and $R_8$ is hydrogen; or alkyl$_{(C\leq 12)}$, alkenyl$_{(C\leq 12)}$, alkynyl$_{(C\leq 12)}$, alkoxy$_{(C\leq 12)}$, aryl$_{(C\leq 12)}$, aralkyl$_{(C\leq 12)}$, heteroaryl$_{(C\leq 12)}$, heteroaralkyl$_{(C\leq 12)}$, cycloalkyl$_{(C\leq 12)}$, heterocycloalkyl$_{(C\leq 12)}$, or a substituted version of any of these groups;

or a pharmaceutically acceptable salt thereof.

In some embodiments, $R_6$ is hydrogen. In other embodiments, $R_6$ is alkyl$_{(C\leq 12)}$, such as methyl. In some embodiments, $L_4$ is a covalent bond. In other embodiments, $L_4$ is -alkanediyl$_{(C\leq 12)}$-, such as ethanediyl. In some embodiments, $L_3$ is a covalent bond. In other embodiments, $L_3$ is -alkanediyl$_{(C\leq 12)}$-, such as ethanediyl. In other embodiments, $L_3$ is -alkanediyl$_{(C\leq 12)}$-C(O)—, such as —CH$_2$C(O)—. In some embodiments, $R_5$ is hydrogen. In other embodiments, $R_8$ is heterocycloalkyl$_{(C\leq 12)}$, such as N-morpholinyl or N-methylpiperazin-4-yl. In other embodiments, $R_8$ is substituted aryl$_{(C\leq 12)}$, such as 4-hydroxyphenyl or 4-methoxyphenyl.

In some embodiments, the compound is further defined as:

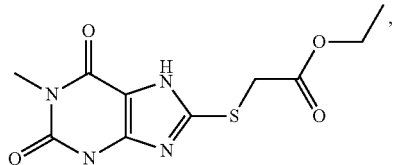

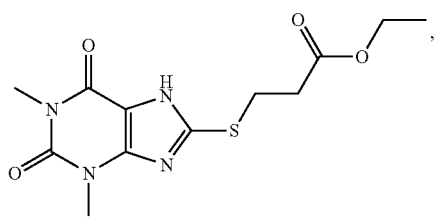

-continued

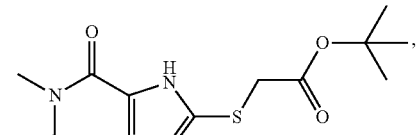

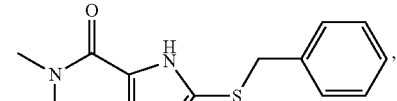

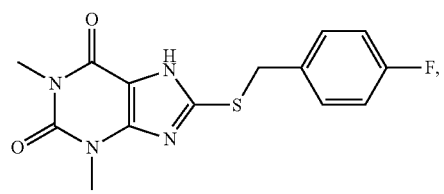

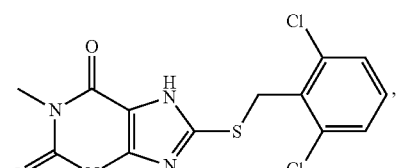

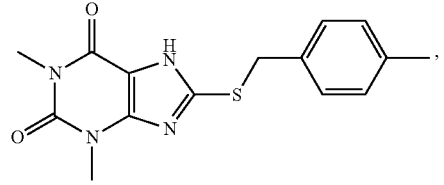

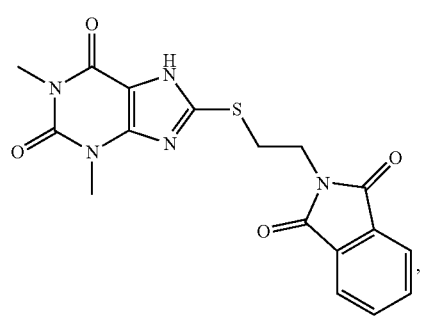

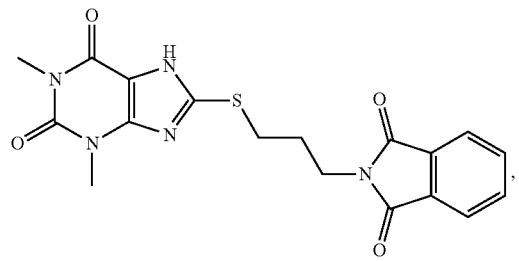

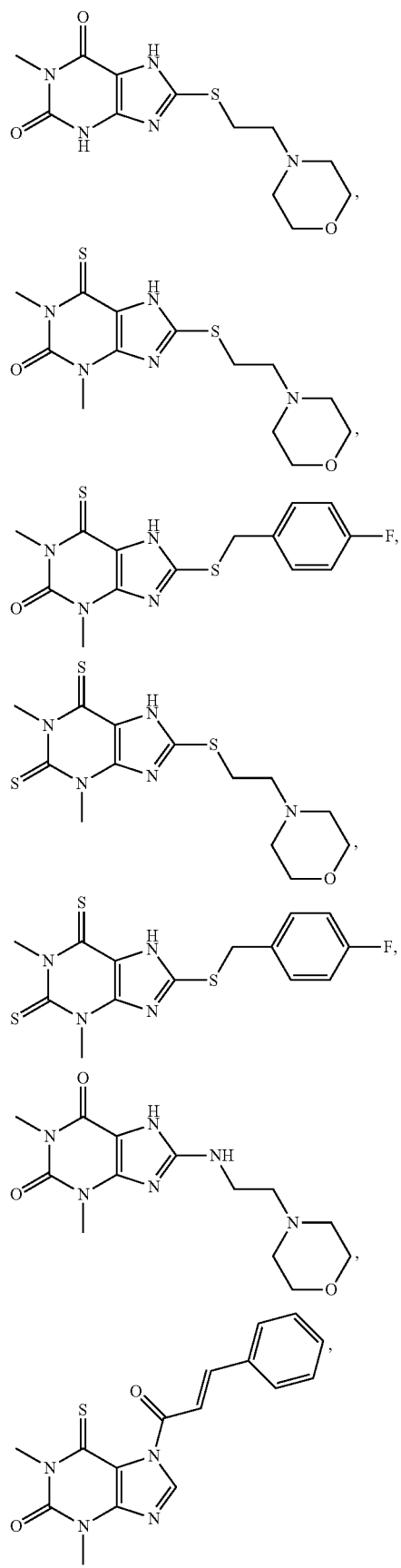
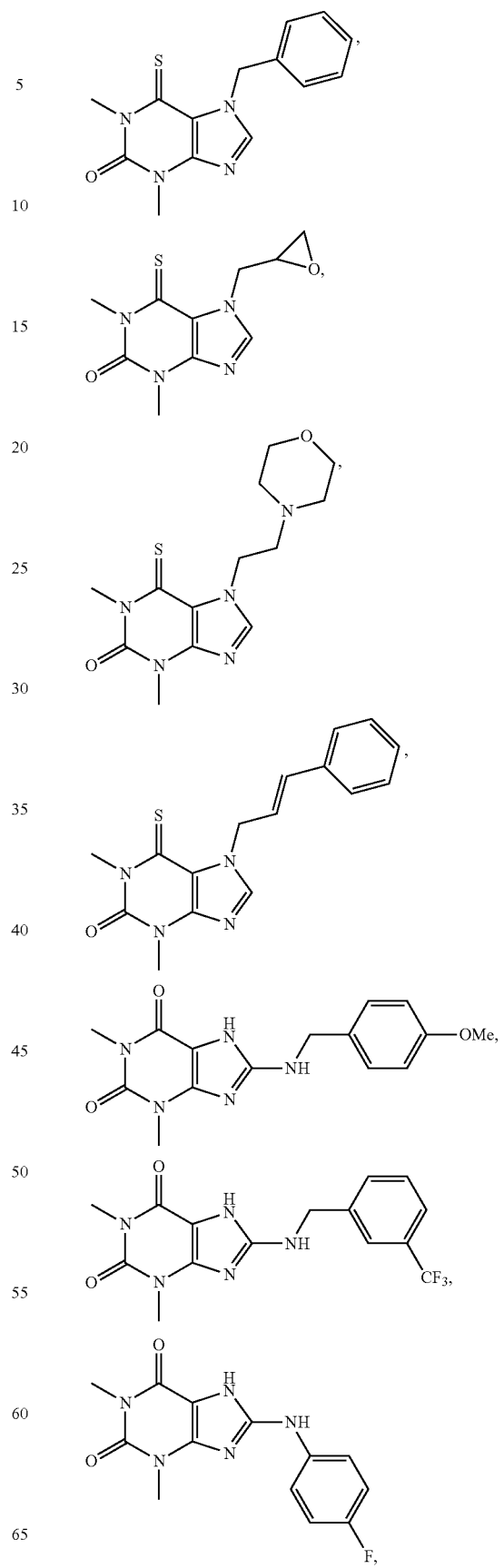

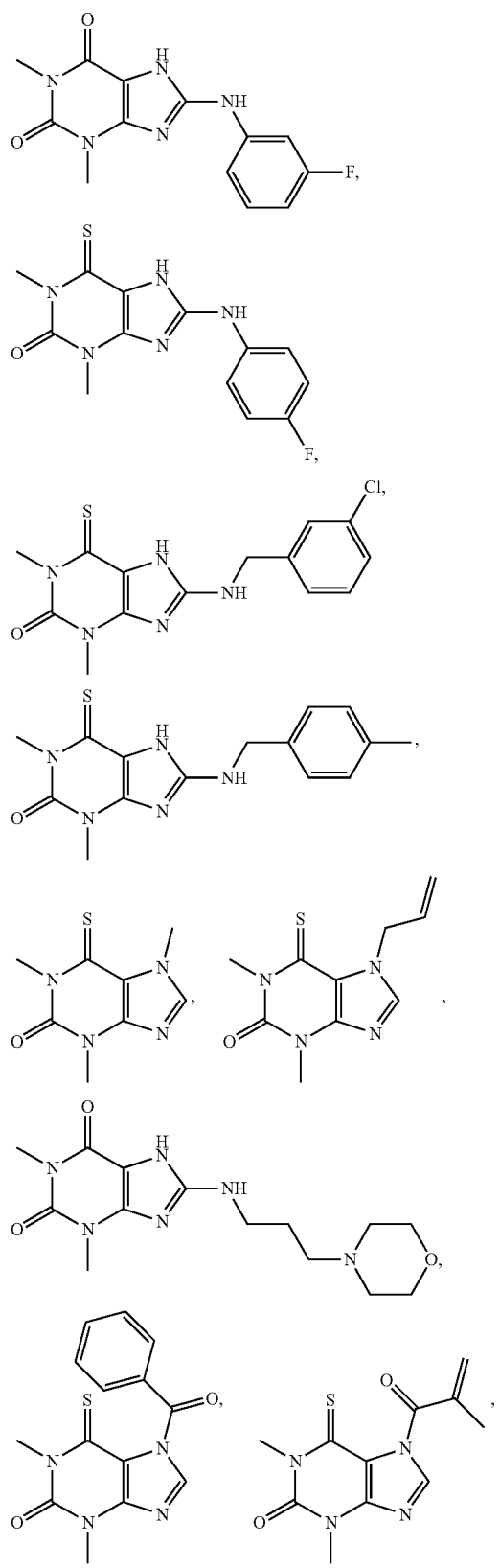
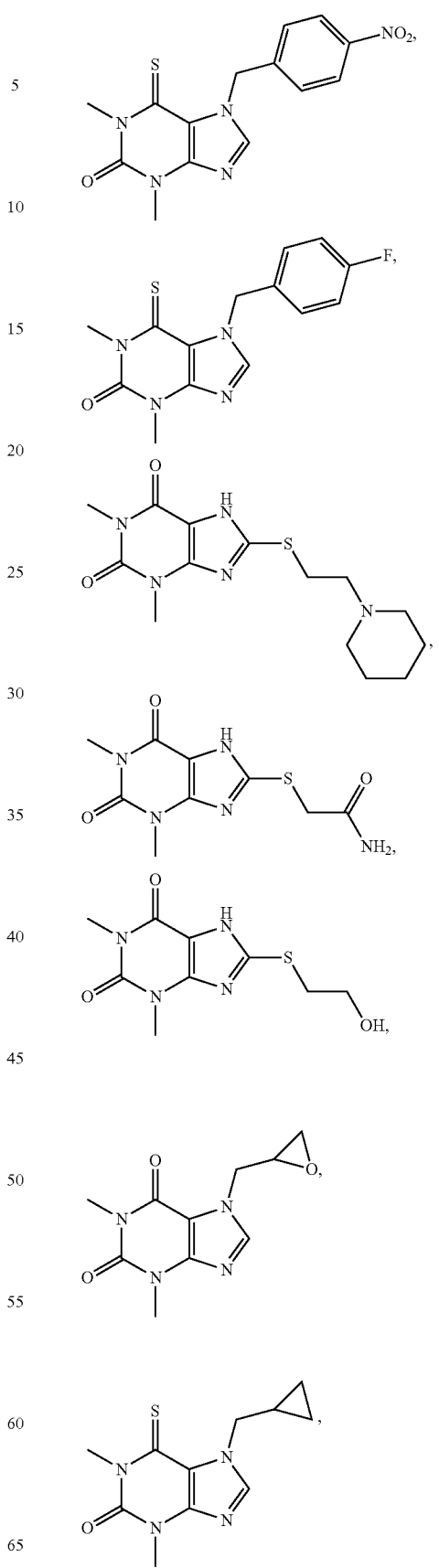

25
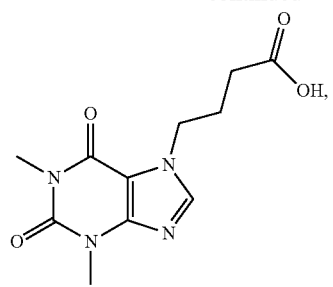
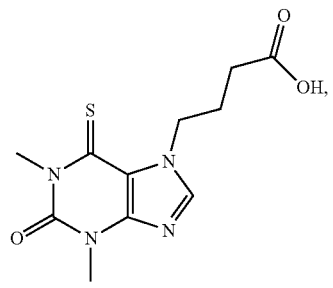
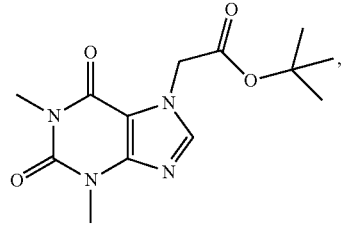
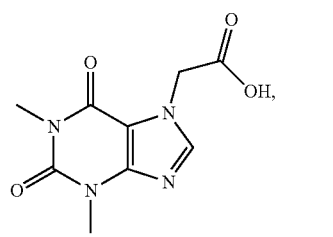
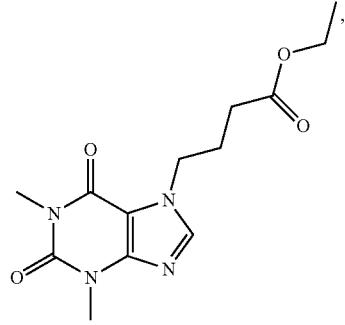
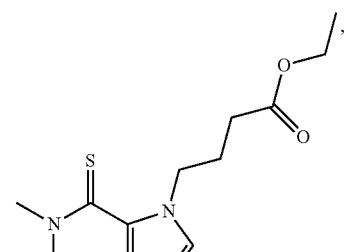
26
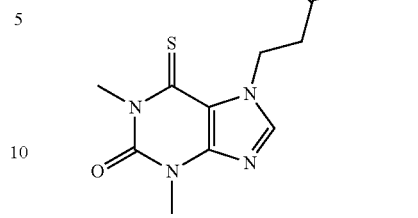
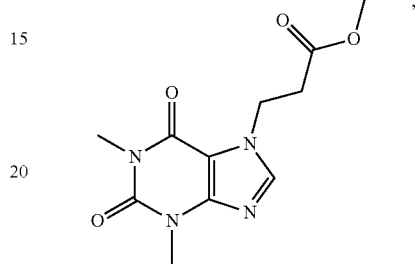
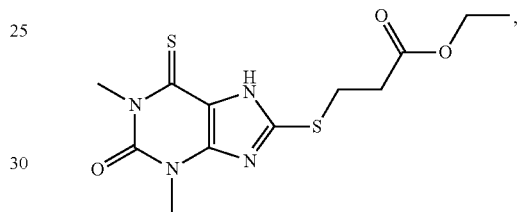
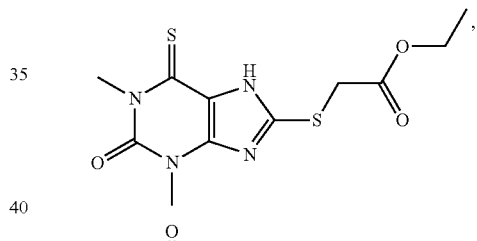
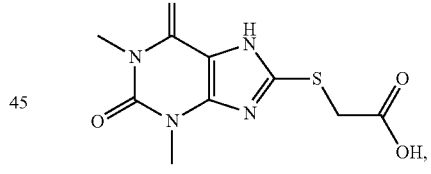
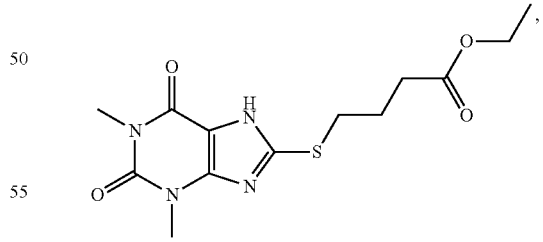
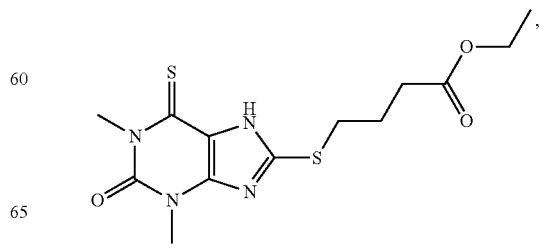

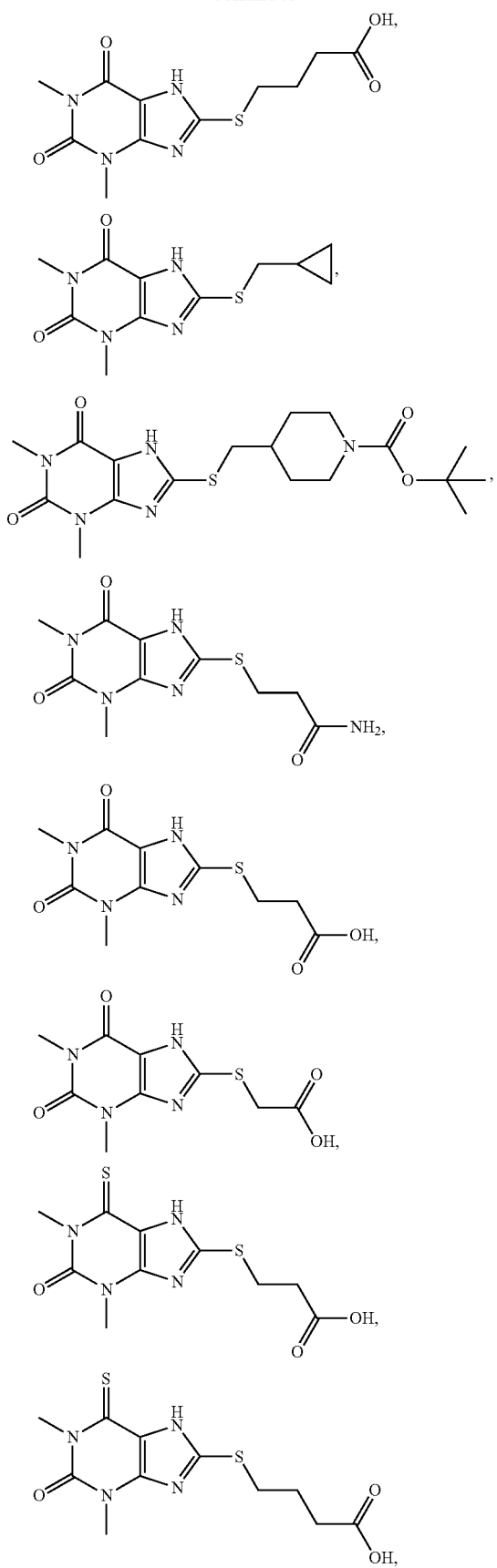
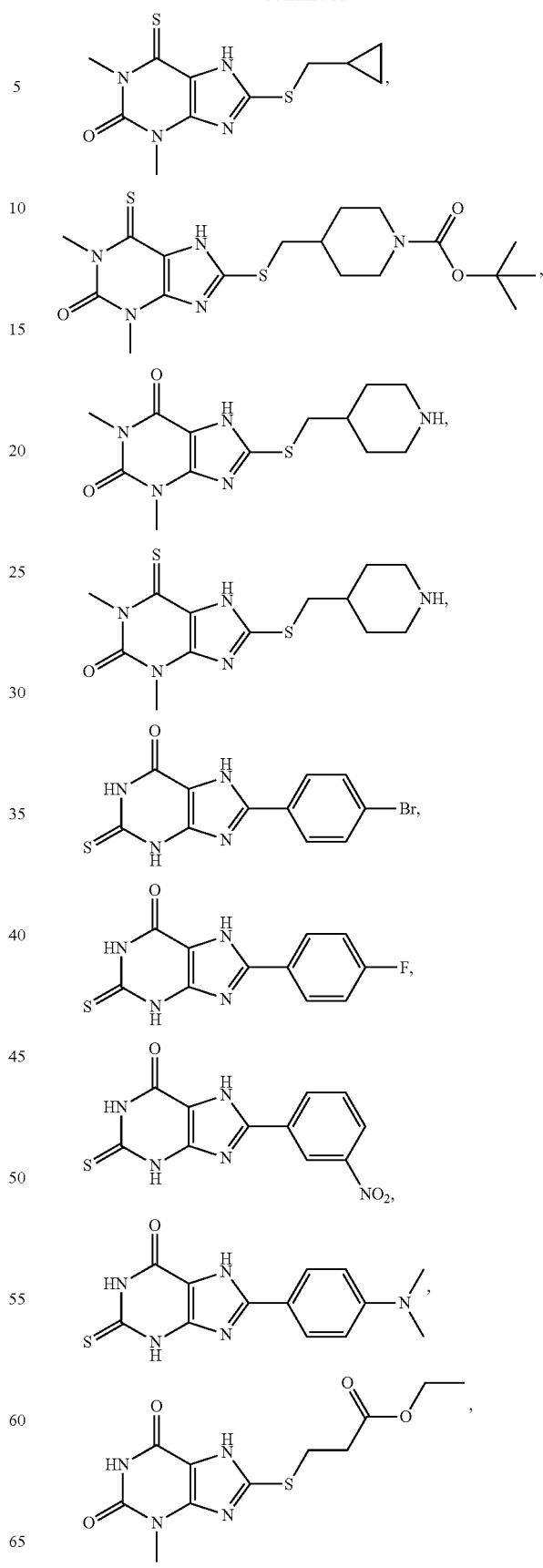

29
-continued
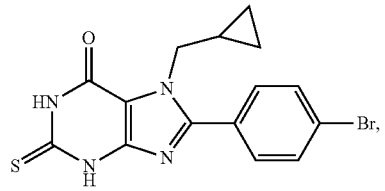
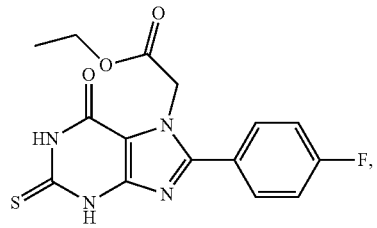
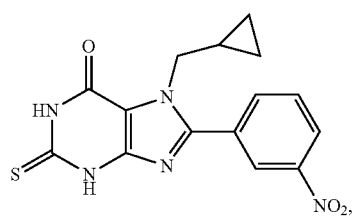
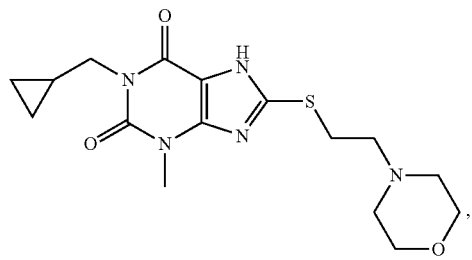
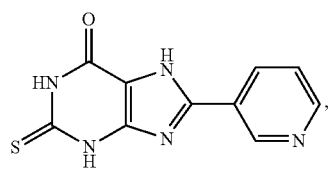
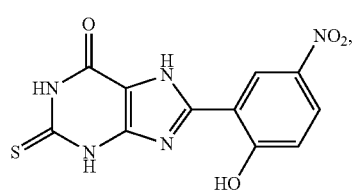
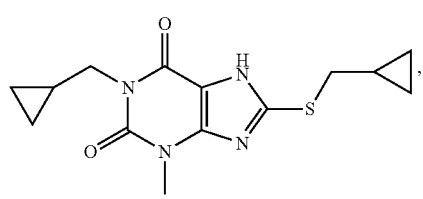
30
-continued
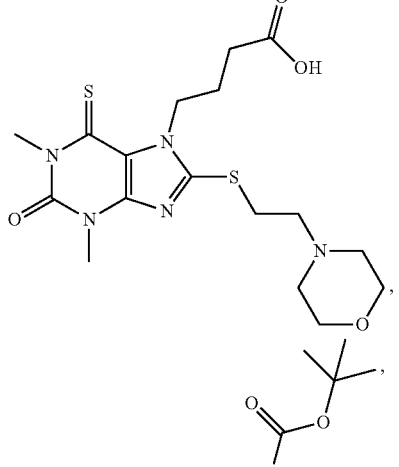
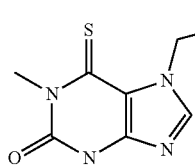
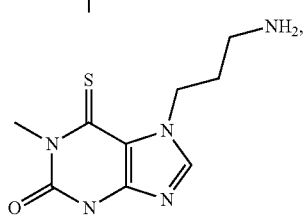
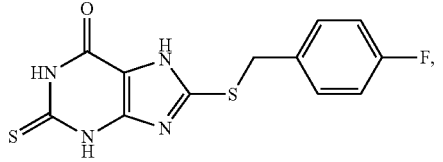
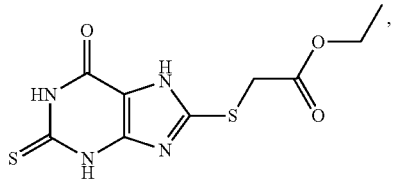
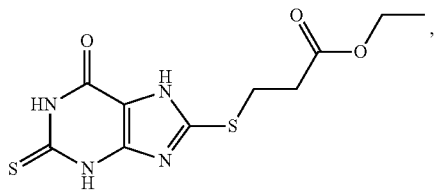
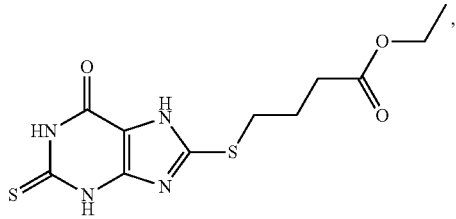

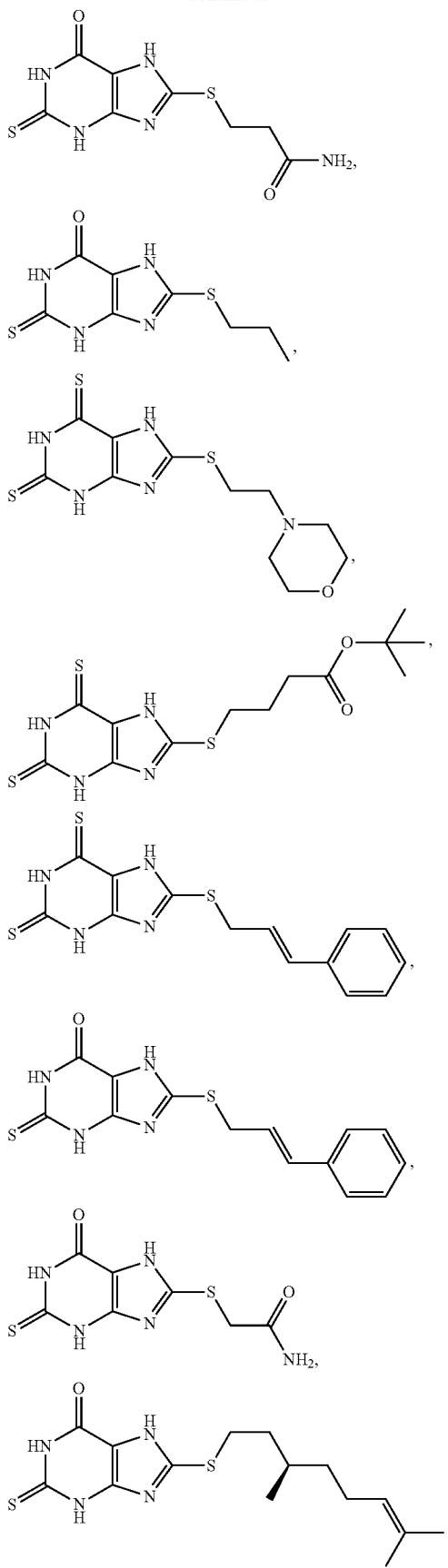
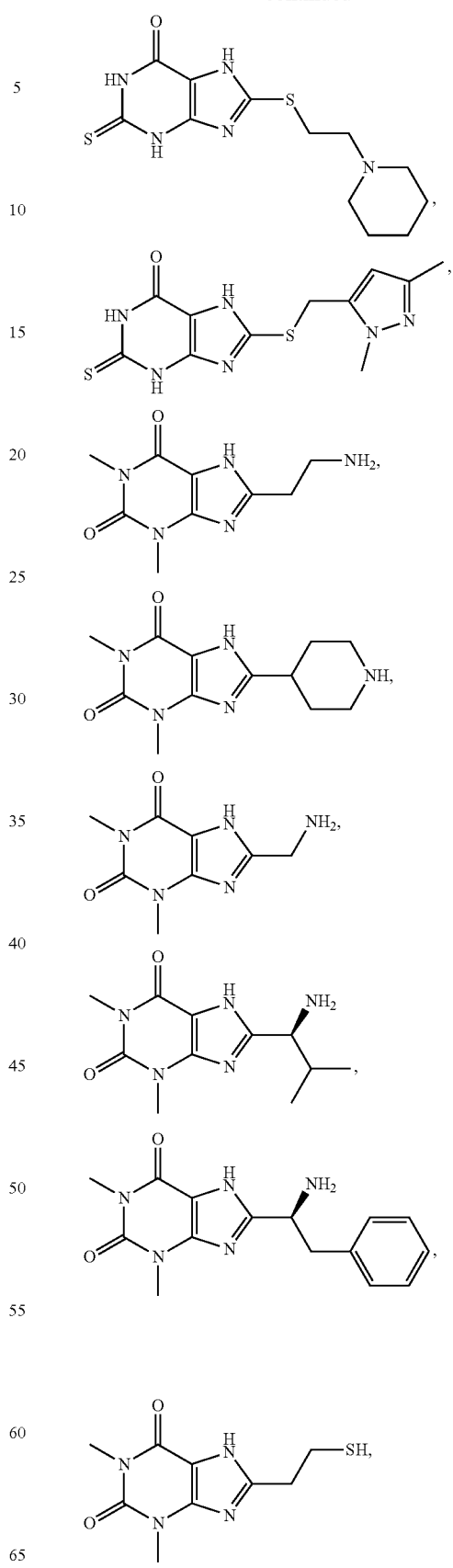

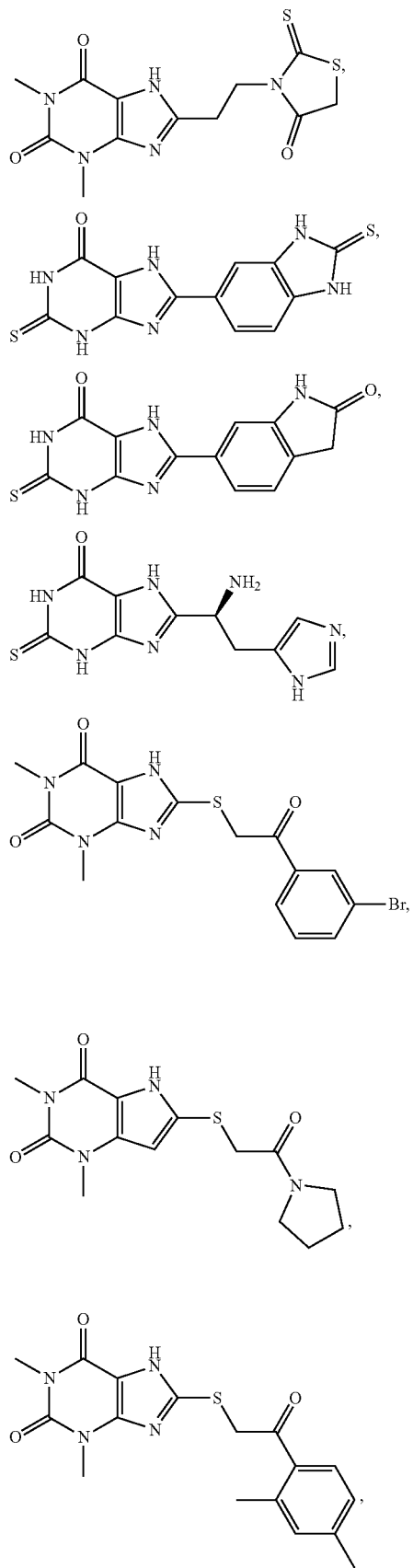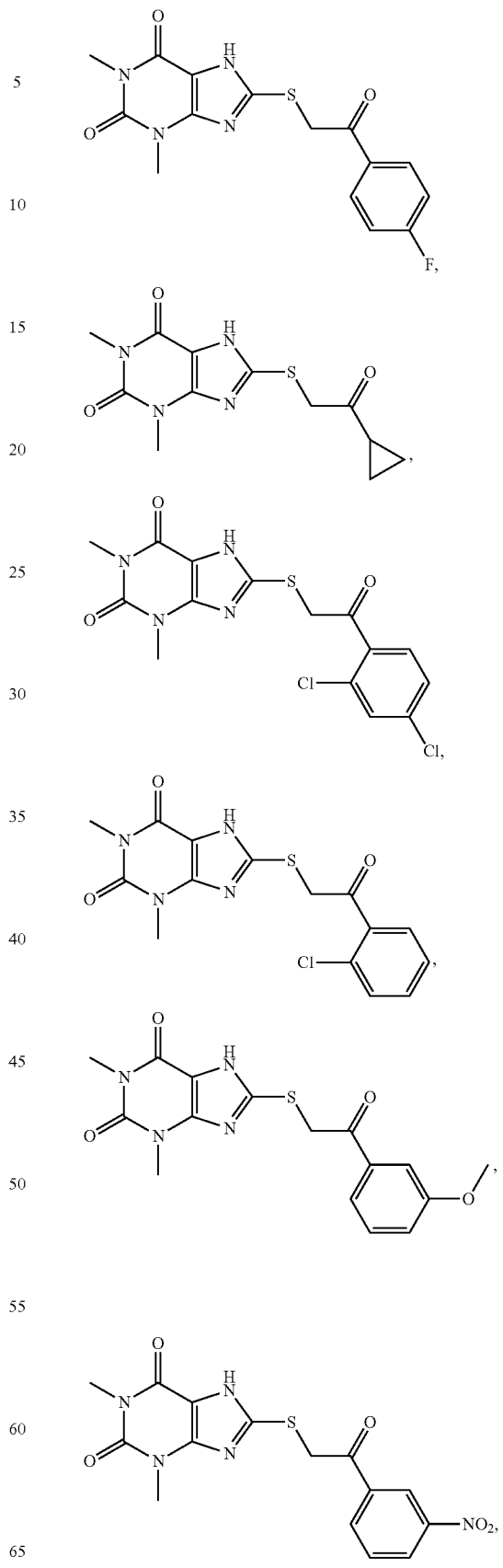

-continued
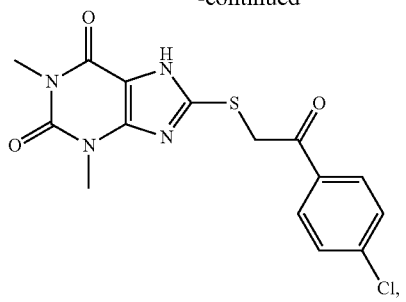
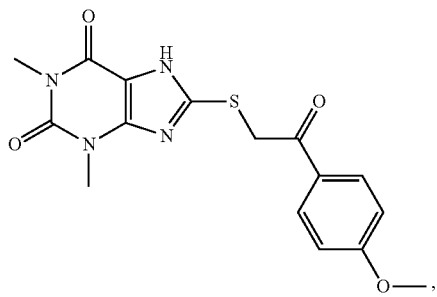
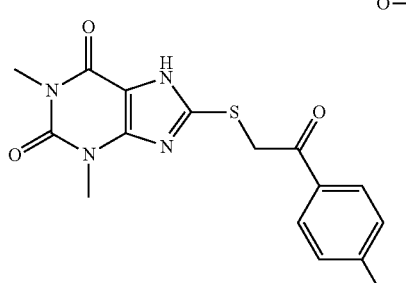
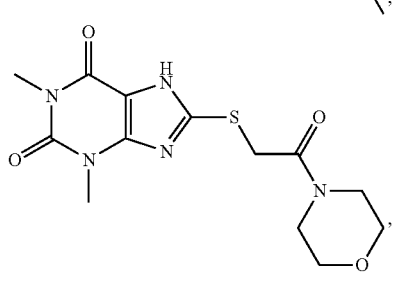
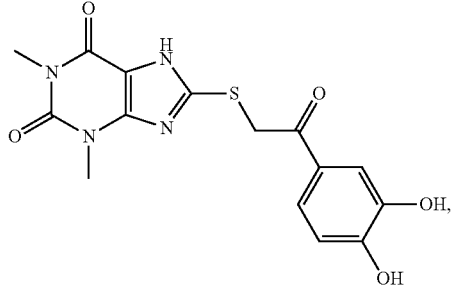
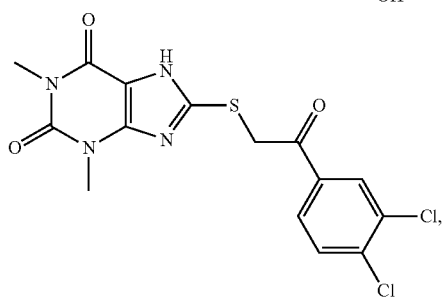
-continued
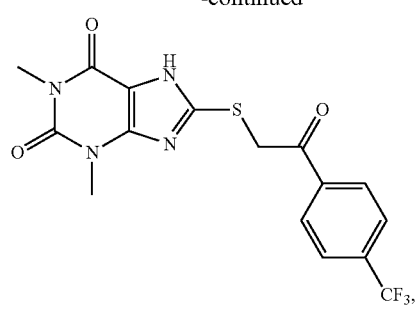
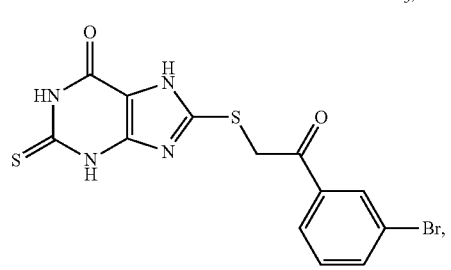
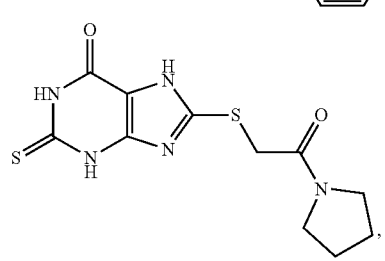
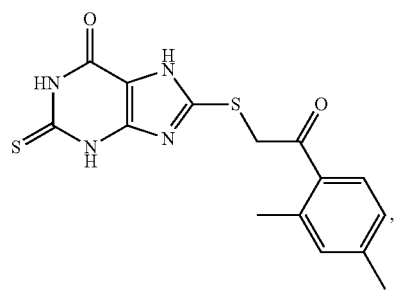
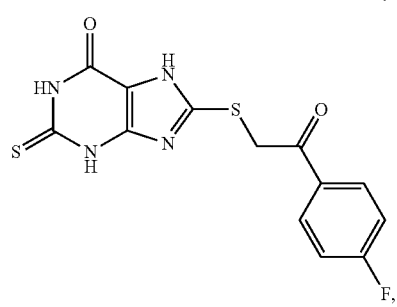
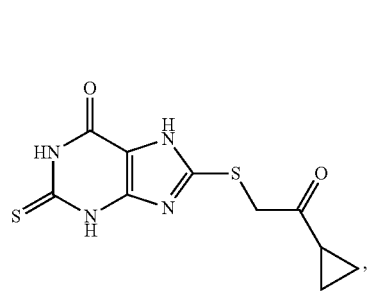

37
-continued
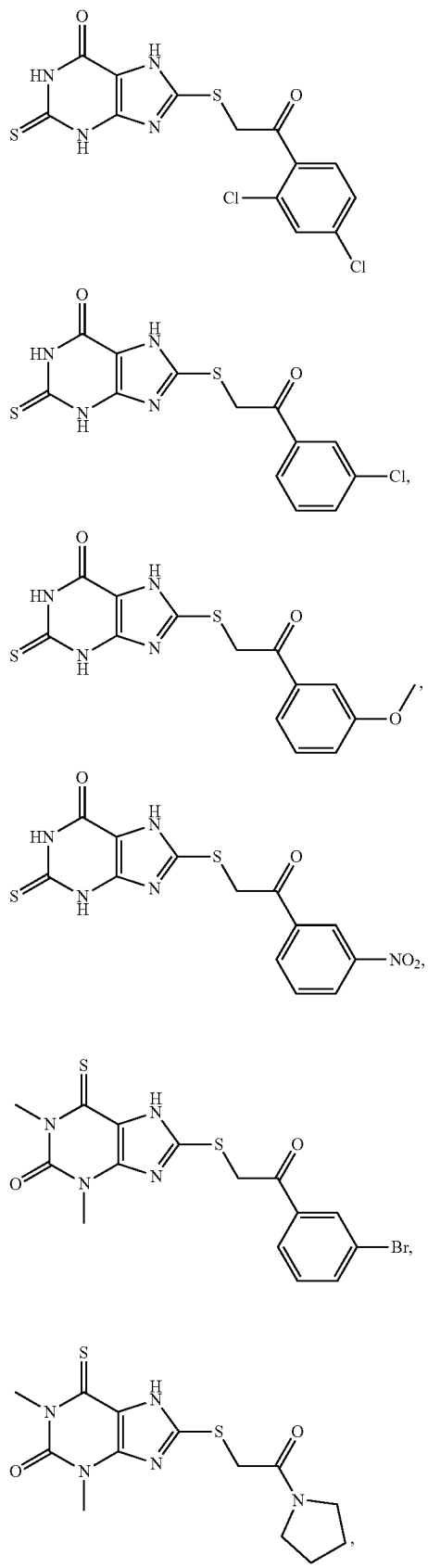
38
-continued
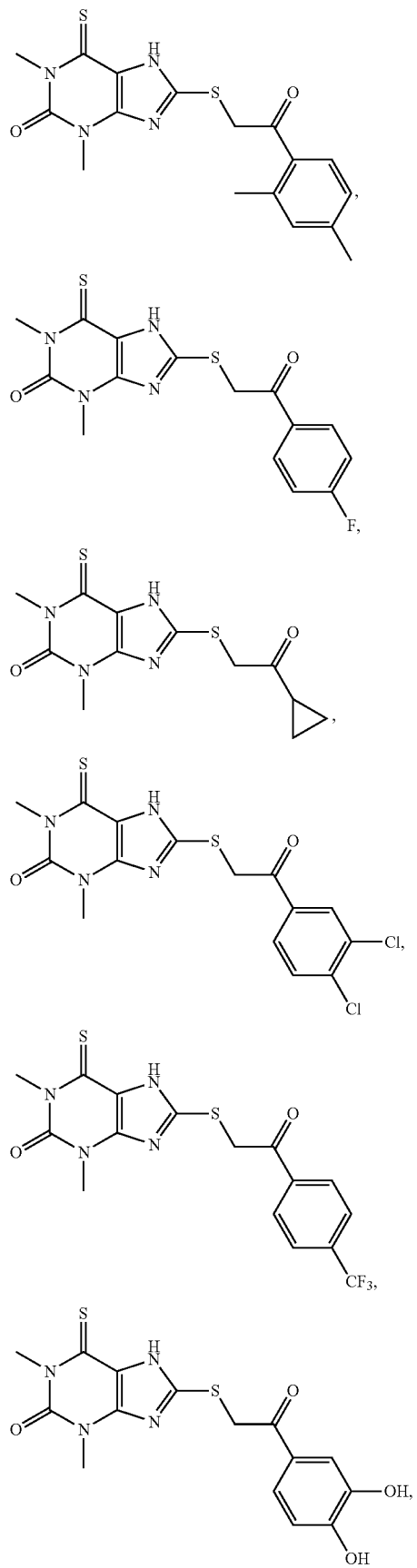

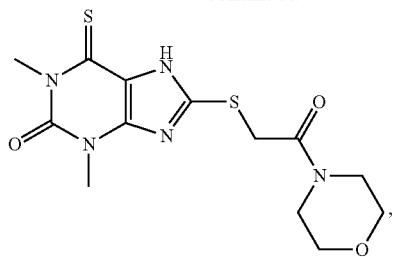
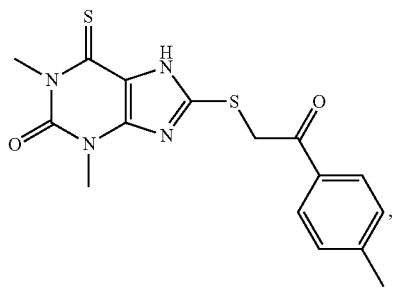
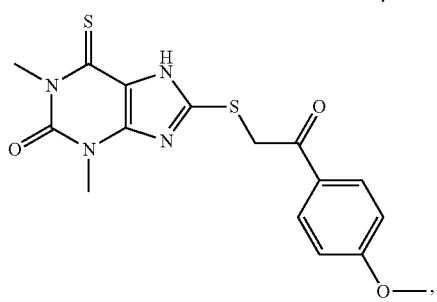
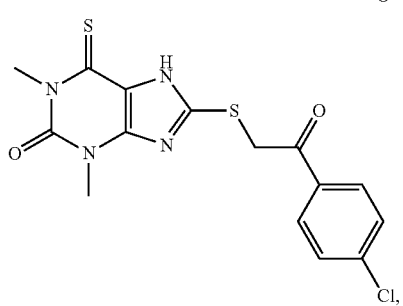
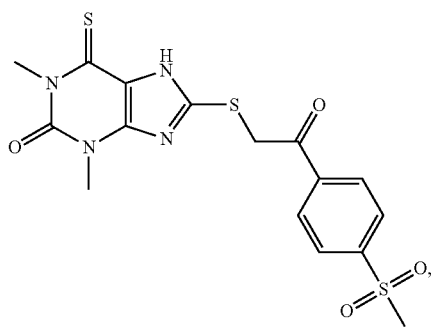
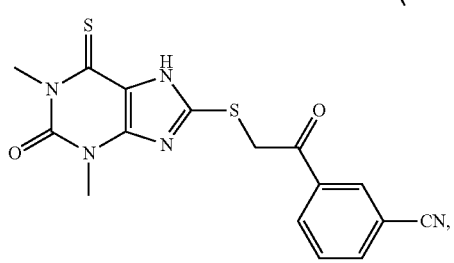
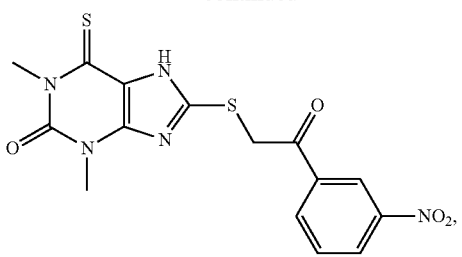
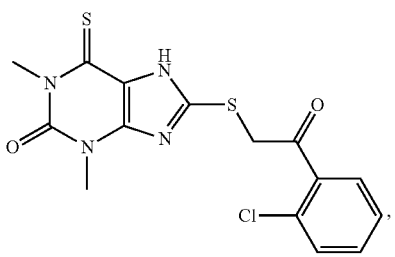
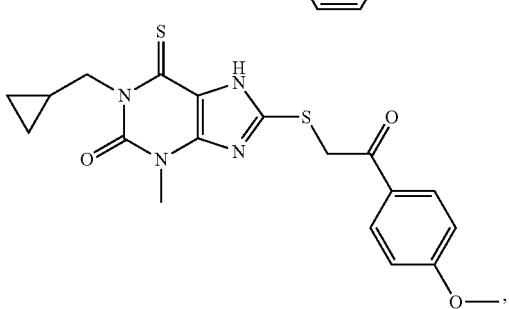
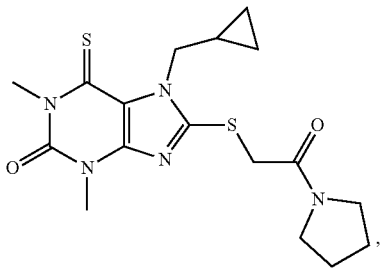
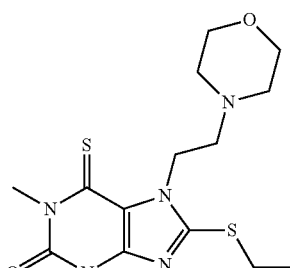
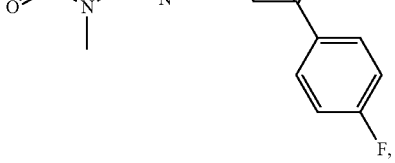

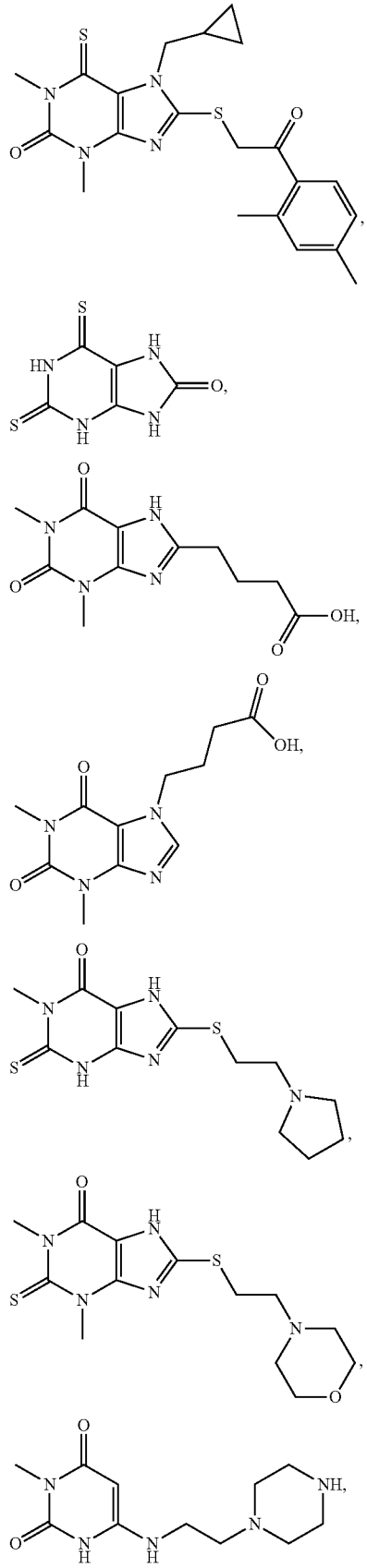
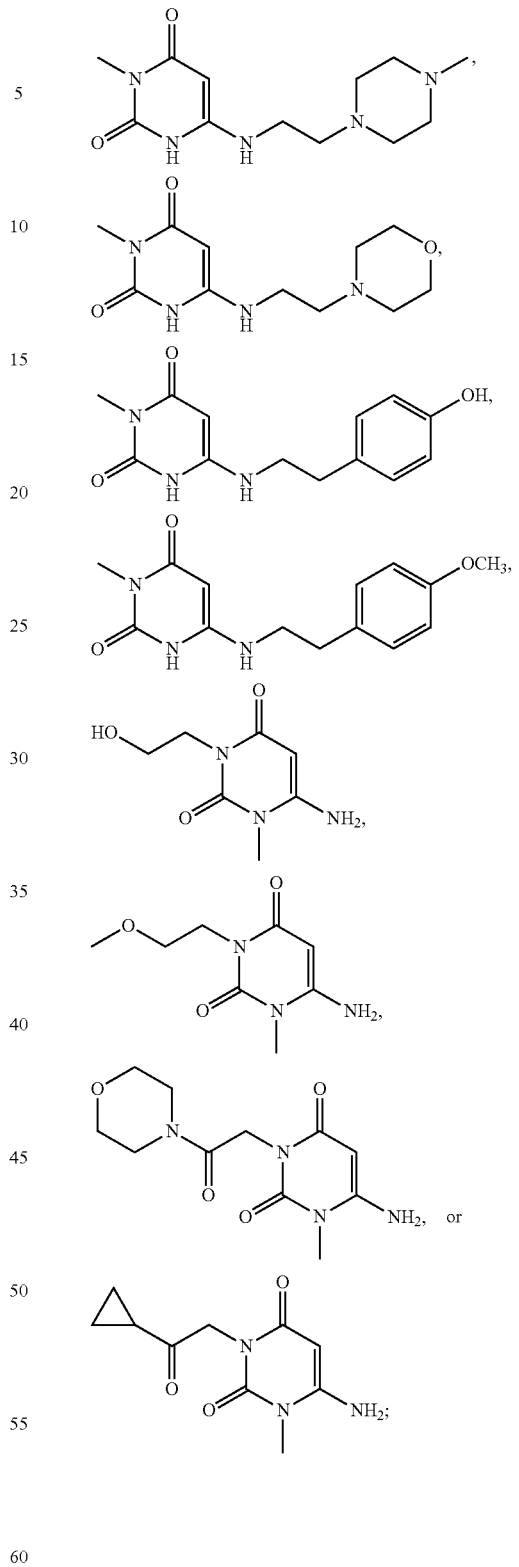
or a pharmaceutically acceptable salt thereof.
In some embodiments, the compound is further defined as:

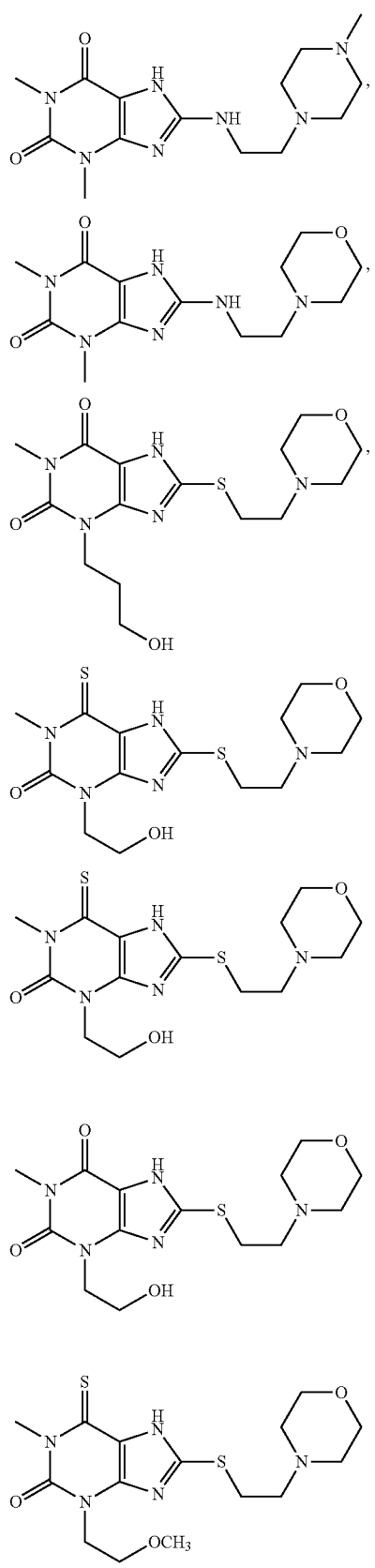
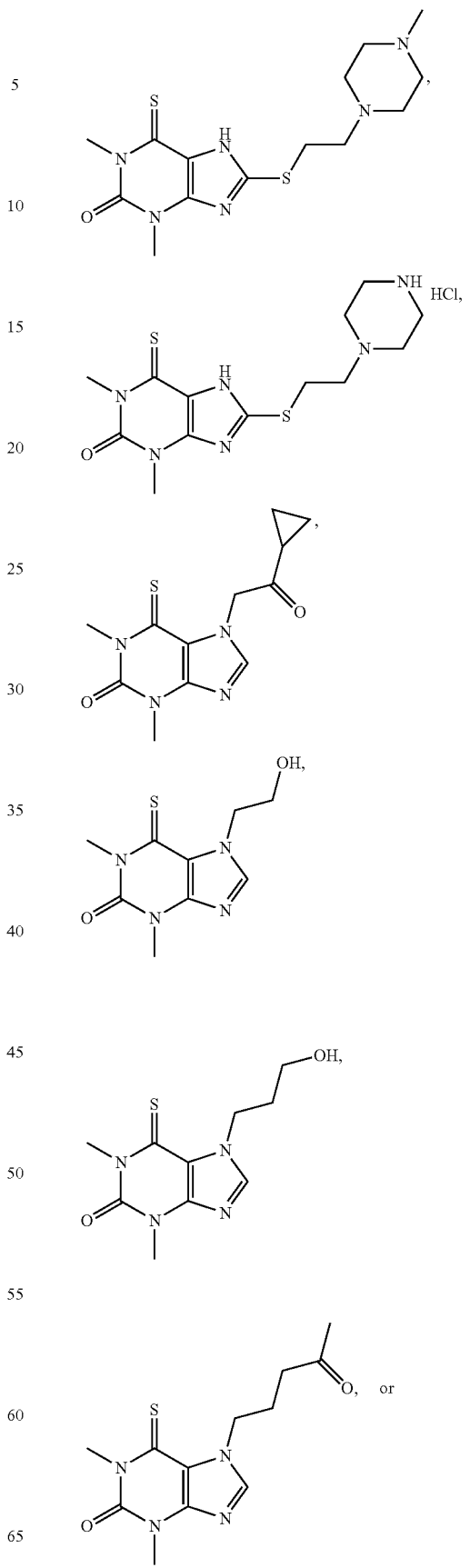

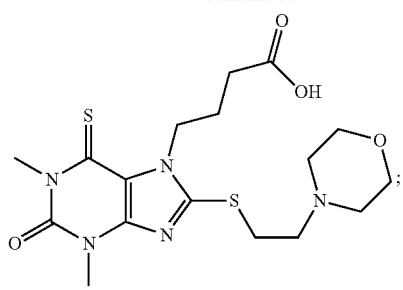
or a pharmaceutically acceptable salt thereof.
In some embodiments, the compound is further defined as:
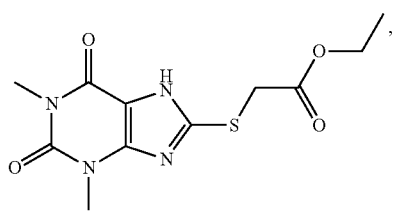
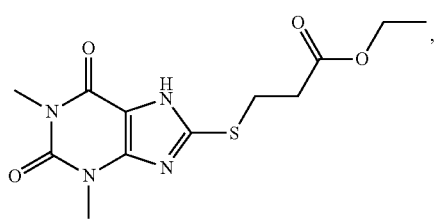
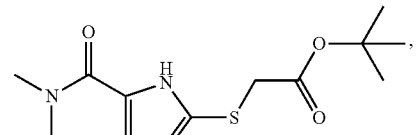
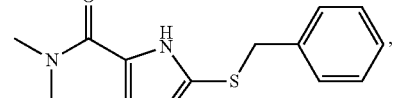
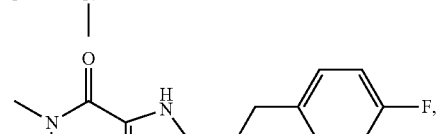
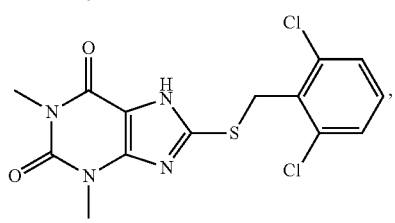
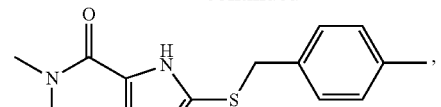
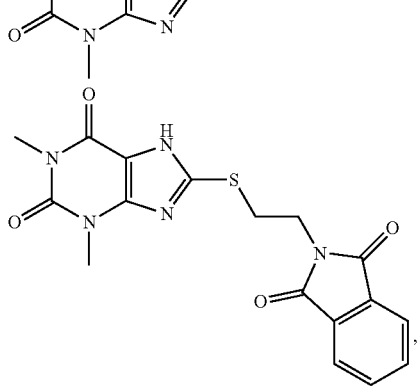
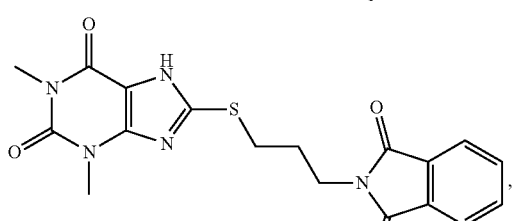
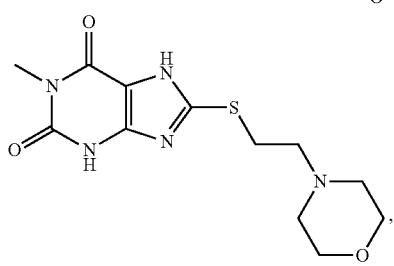
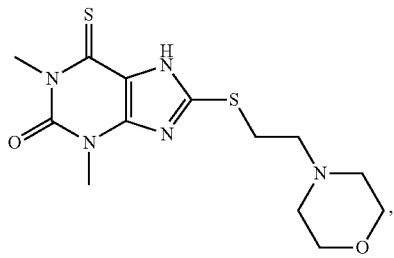
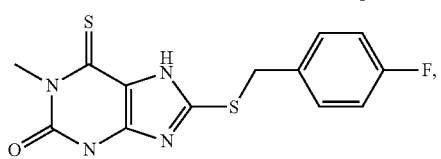
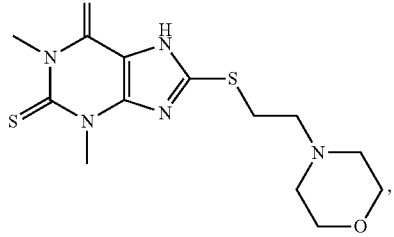

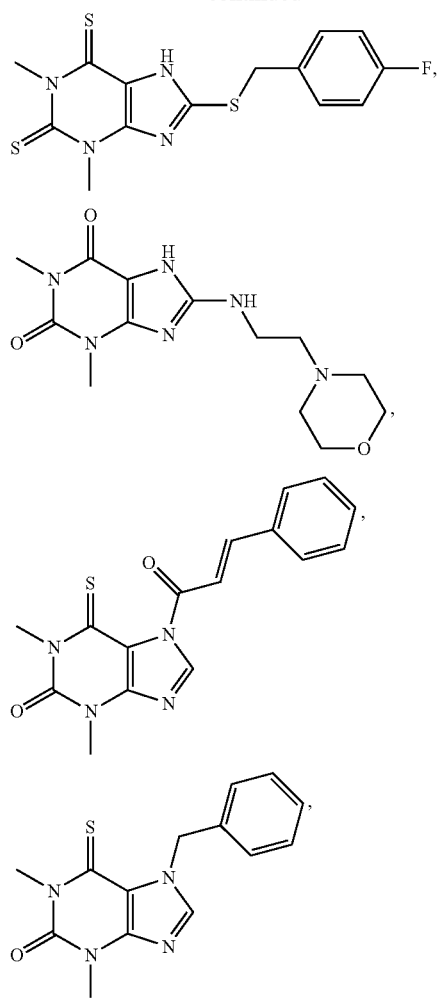
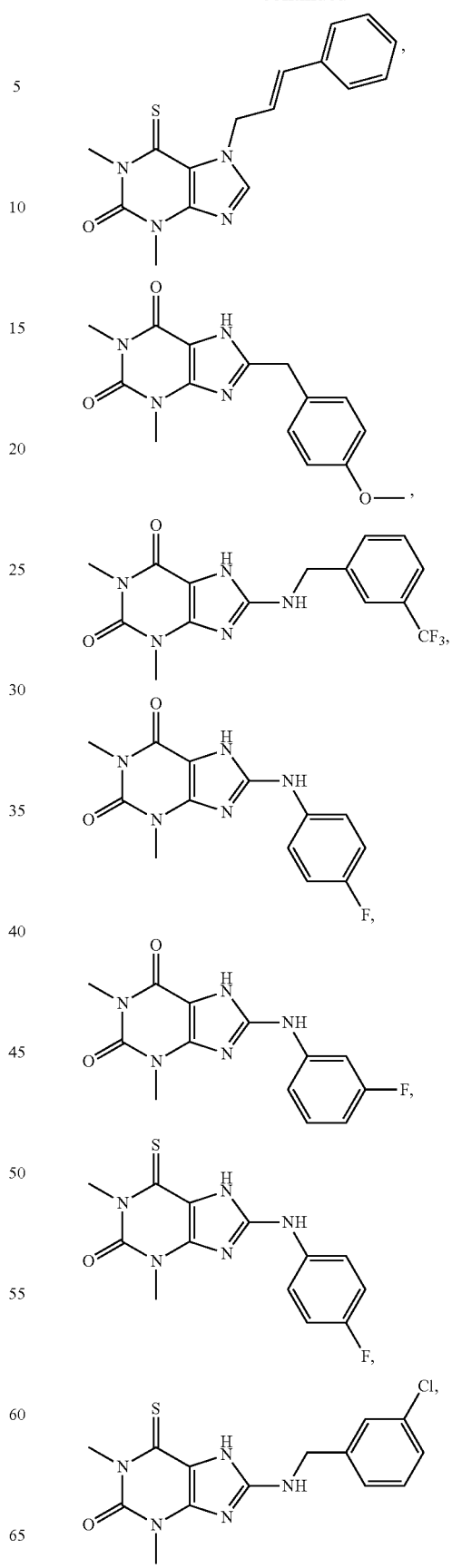

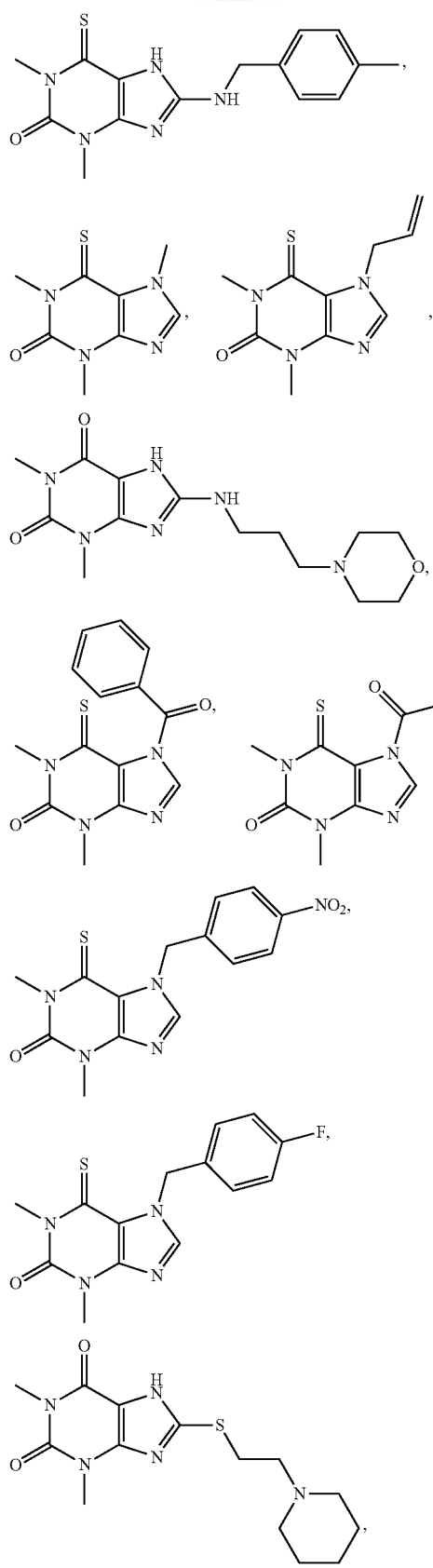
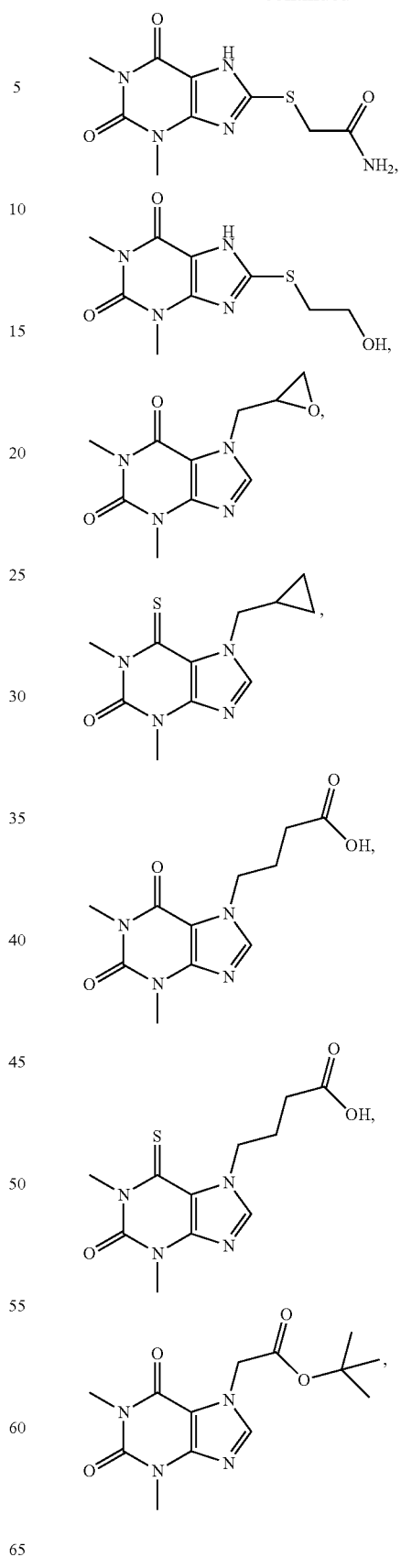

51
-continued
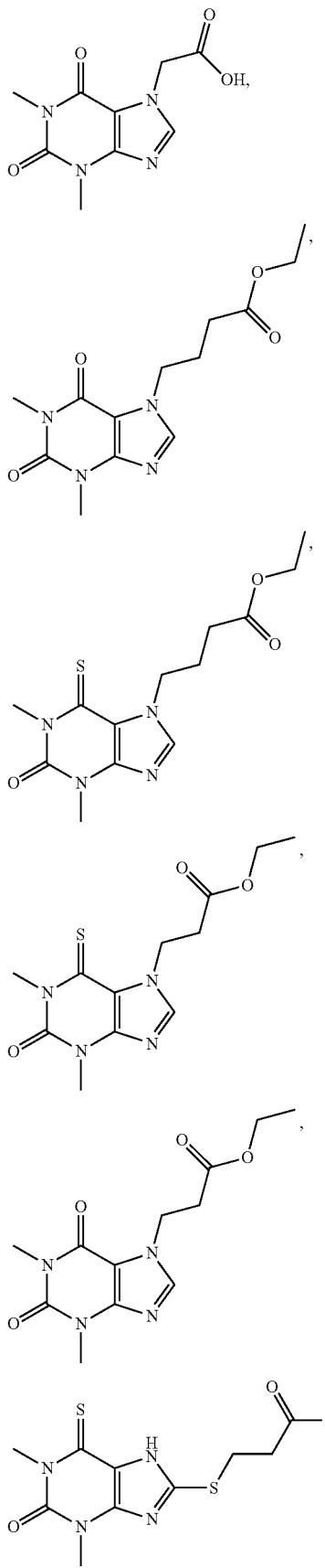
52
-continued
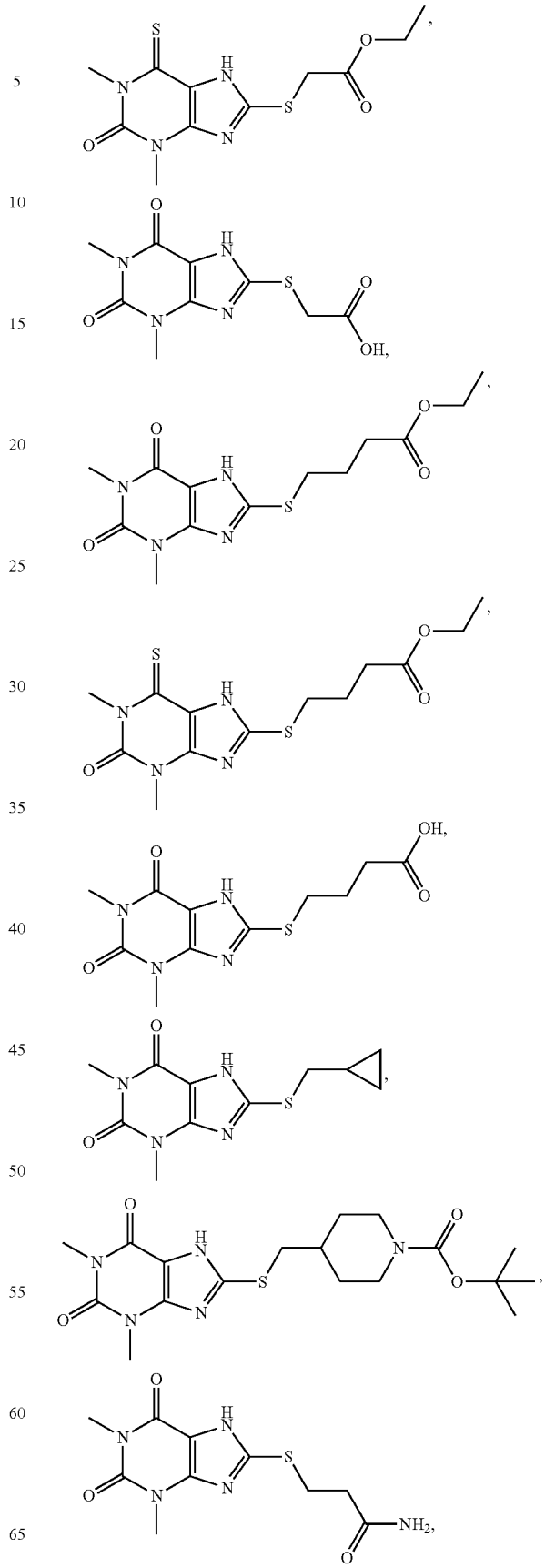

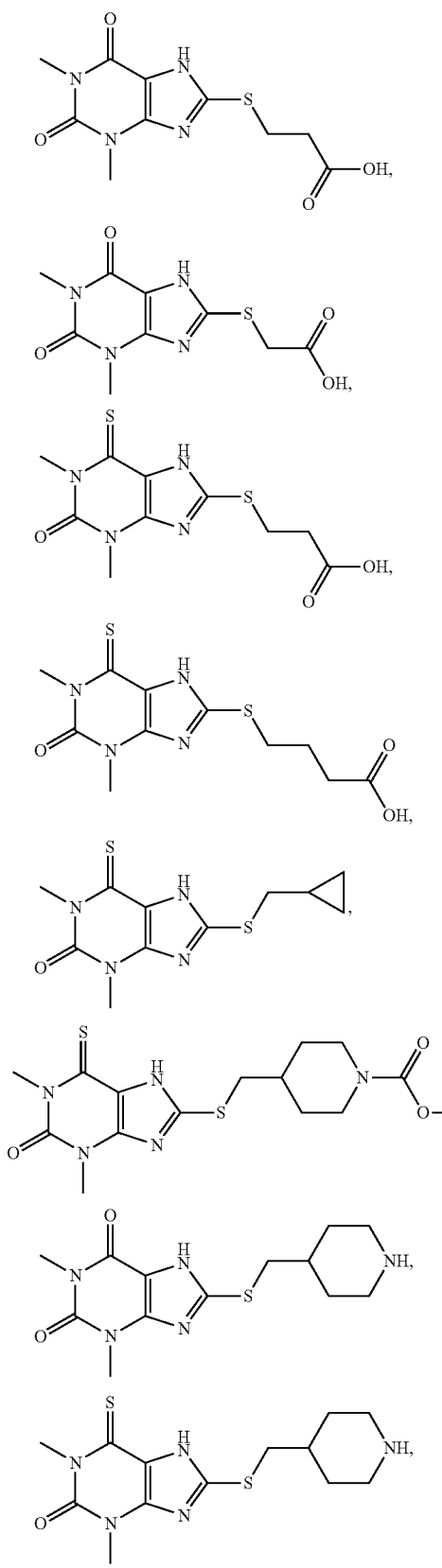
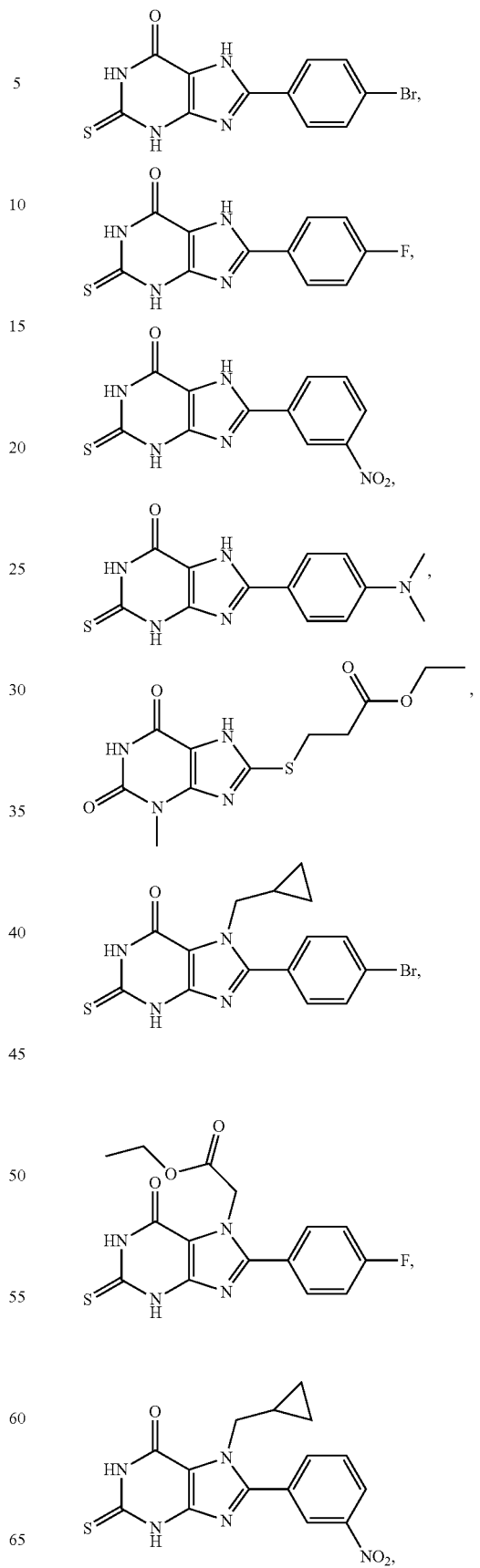

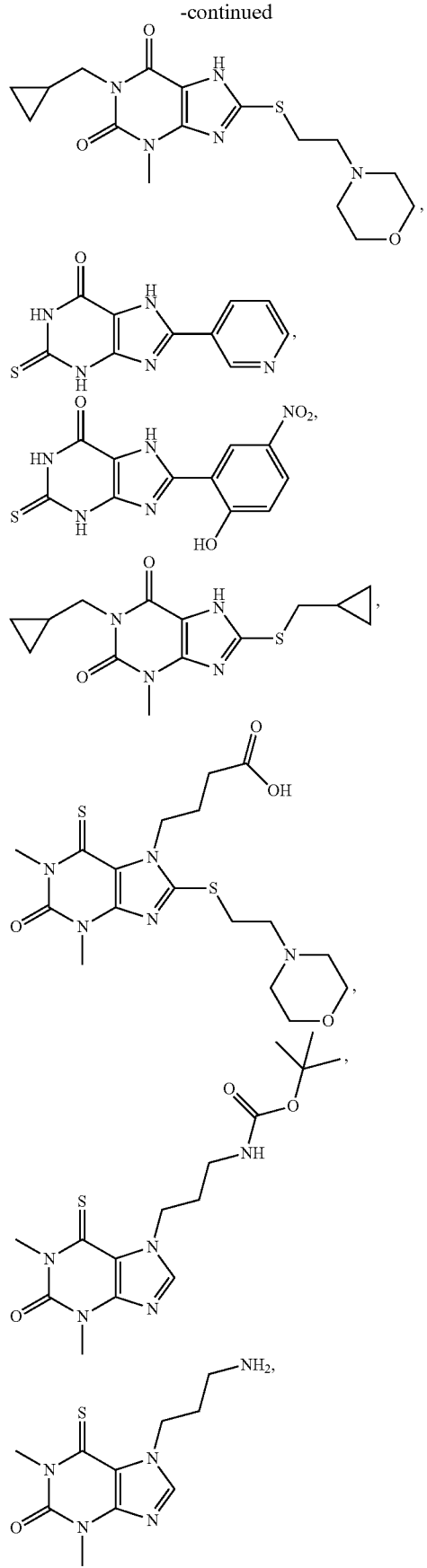
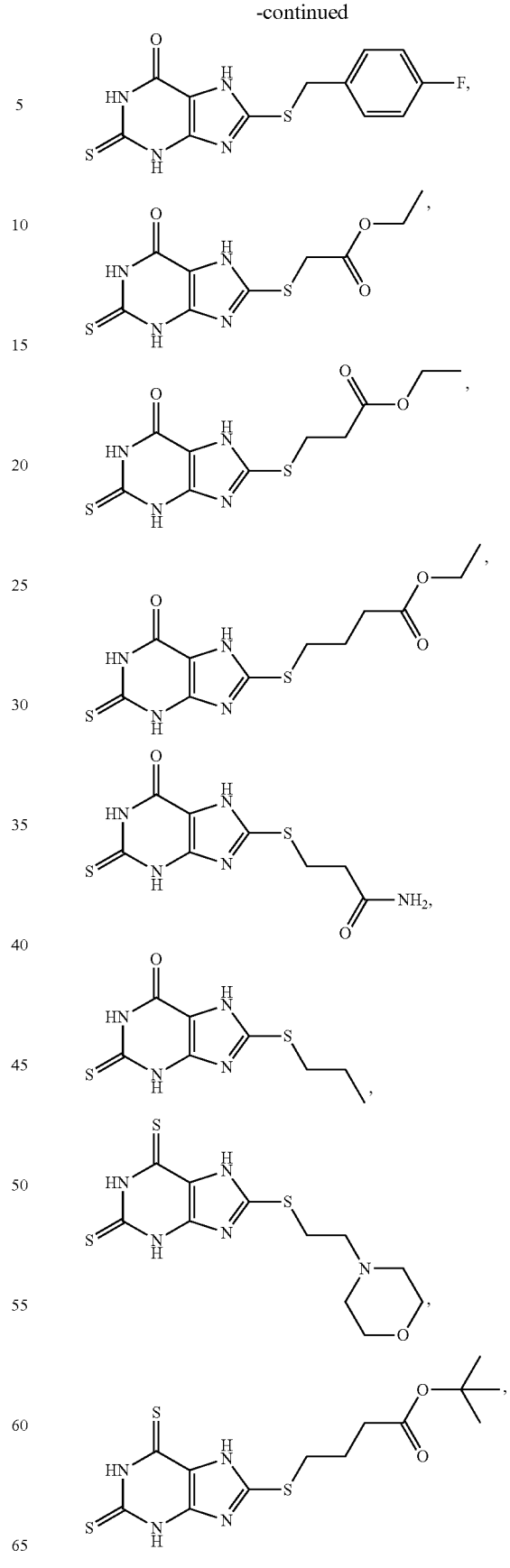

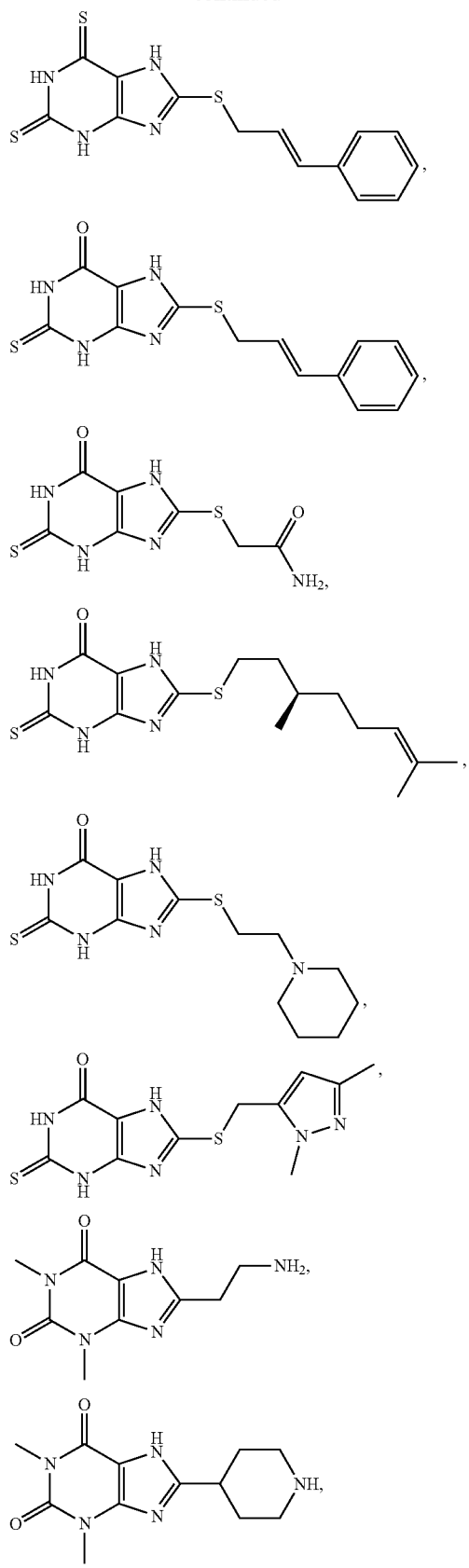
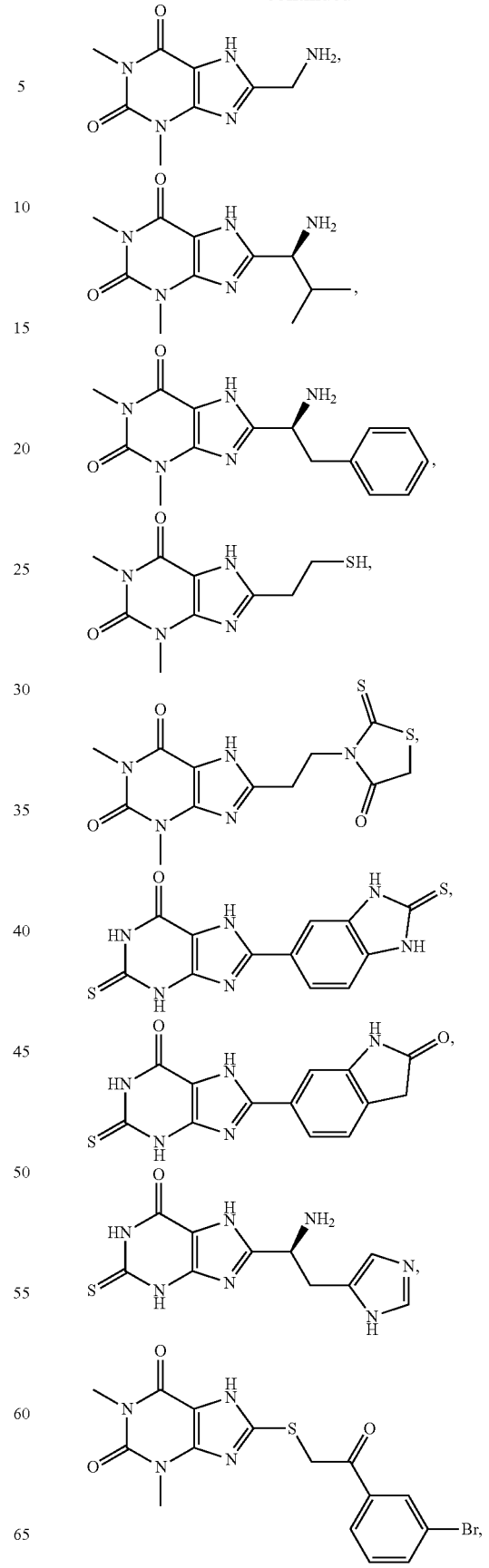

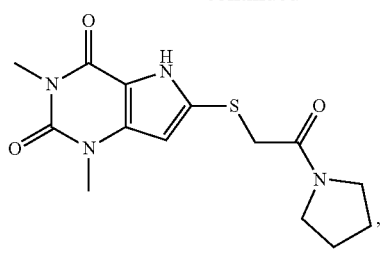
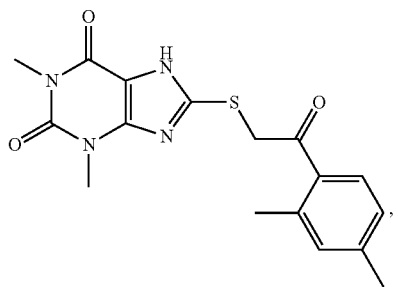
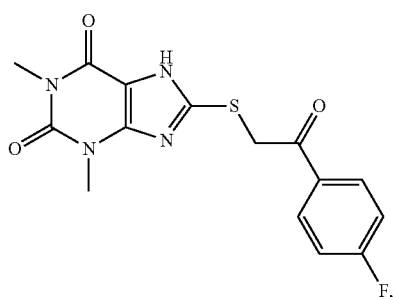
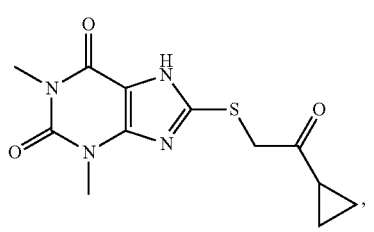
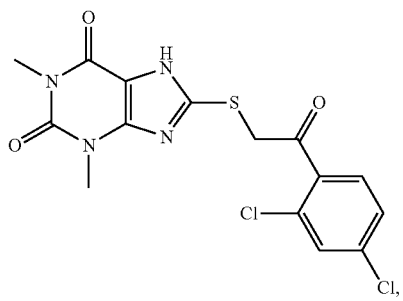
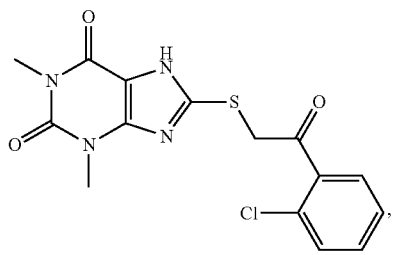
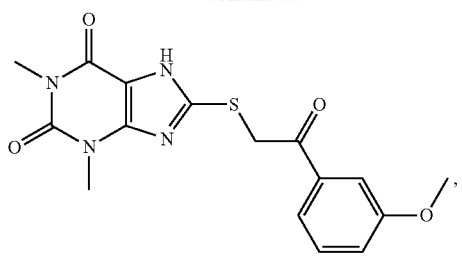
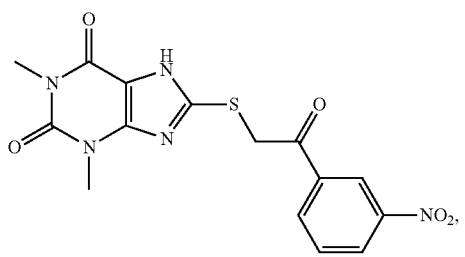
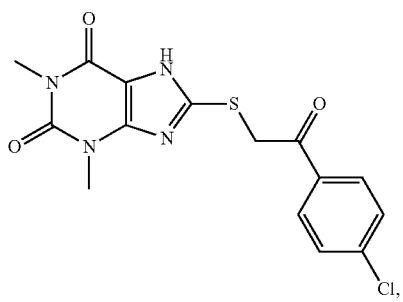
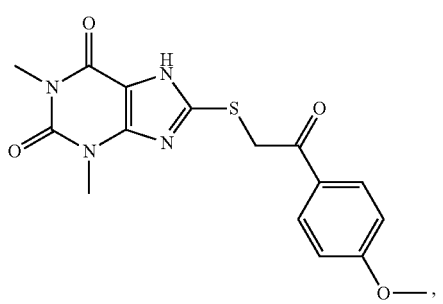
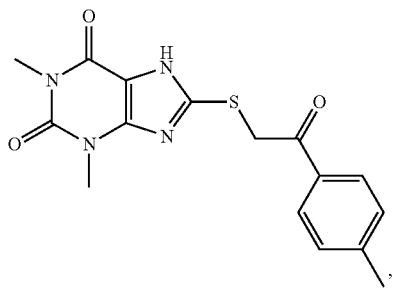
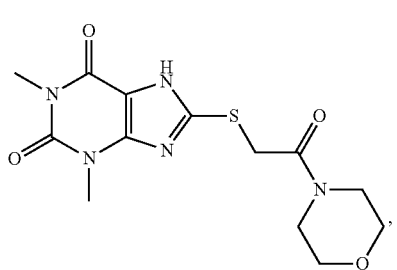

-continued
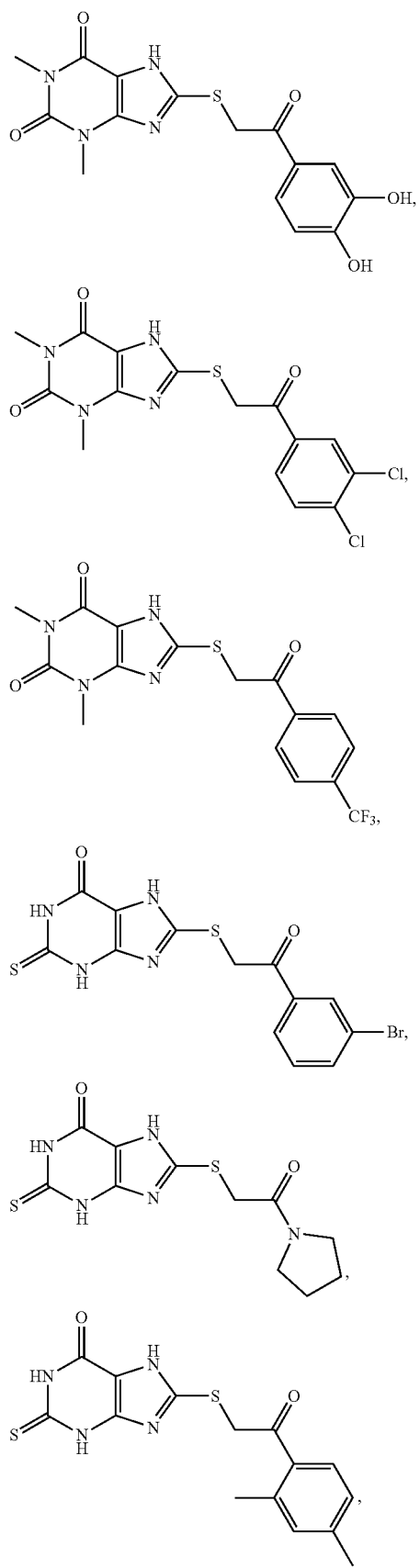
-continued
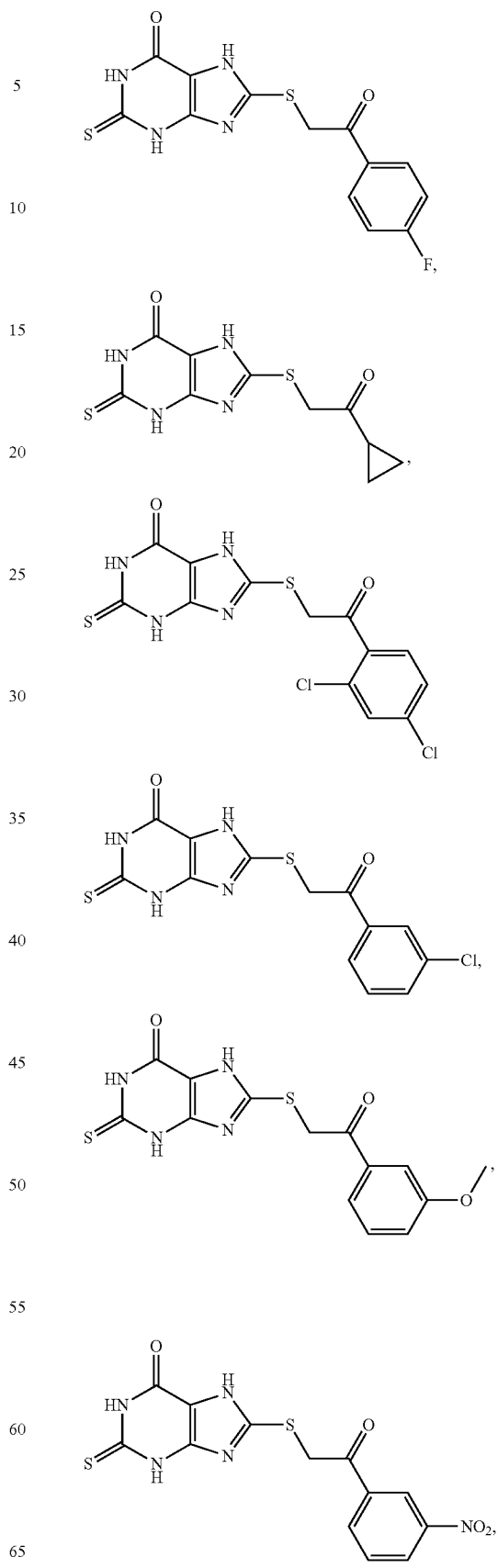

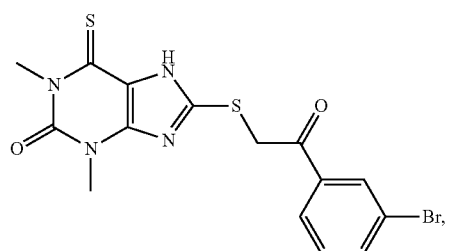
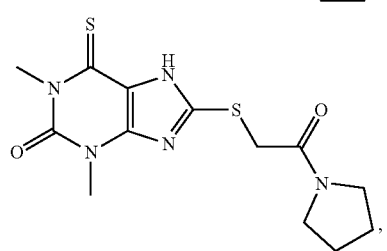
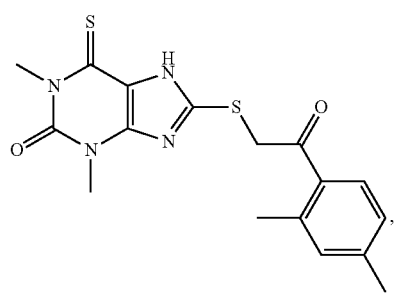
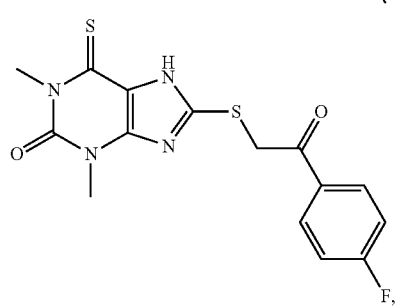
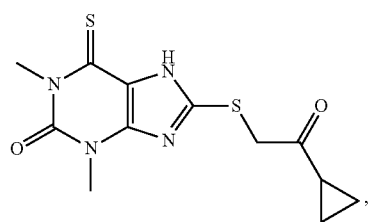
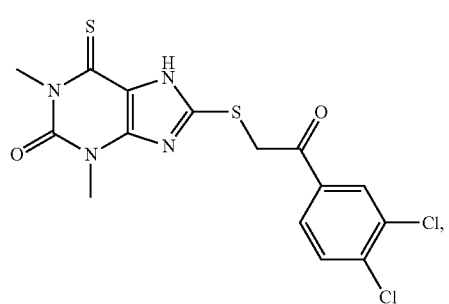
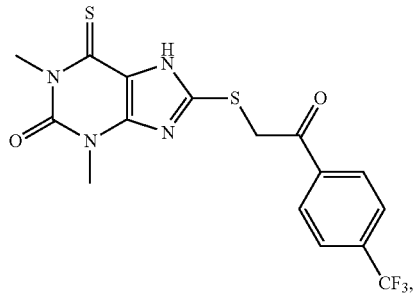
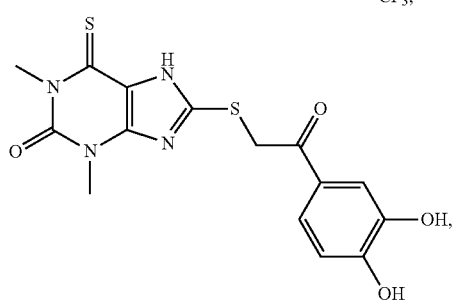
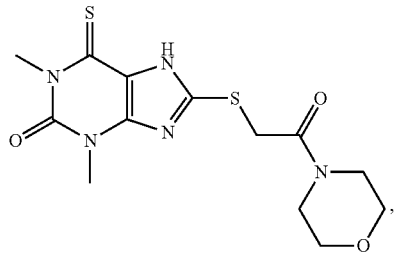
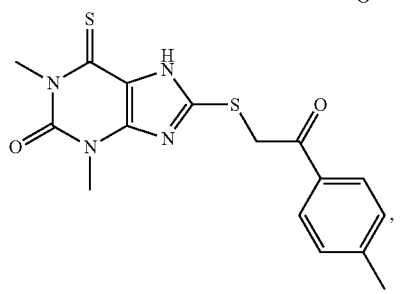
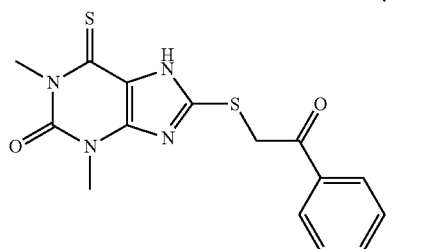
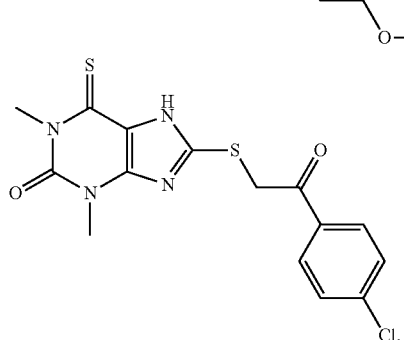

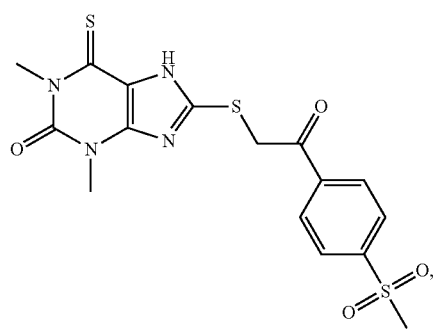
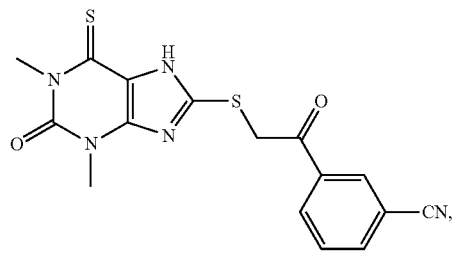
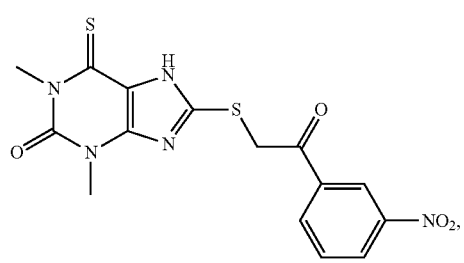
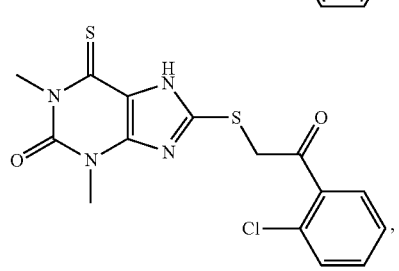
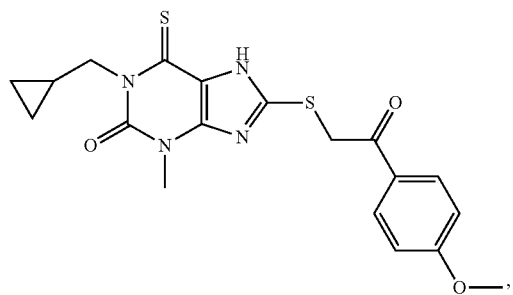
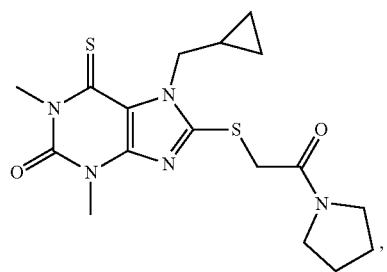
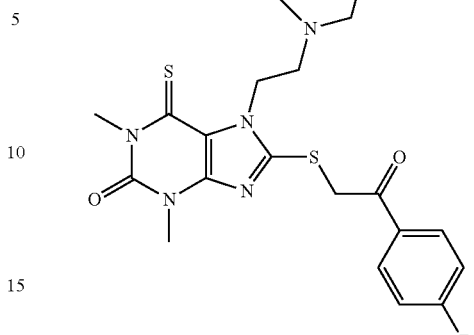
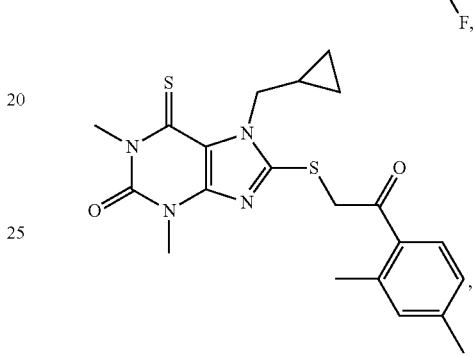
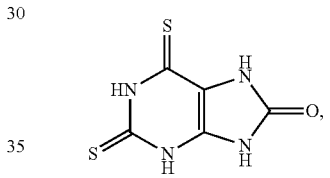
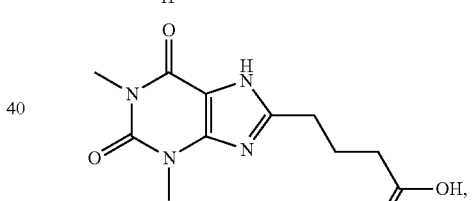
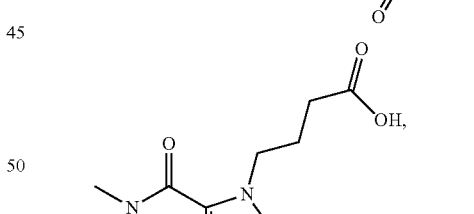
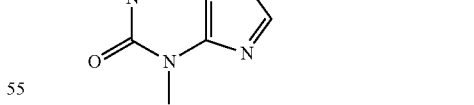
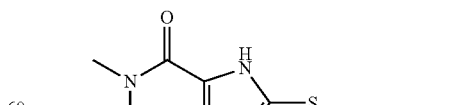
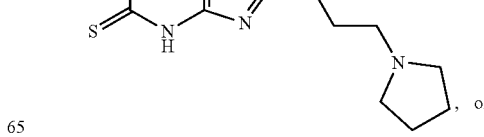, or

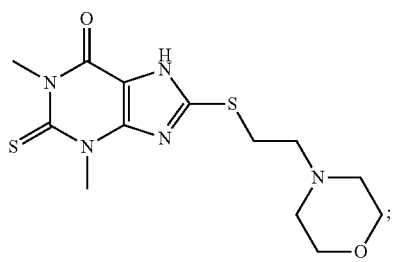

or a pharmaceutically acceptable salt thereof.

In some embodiments, the pharmaceutically acceptable salt comprises HCl. In some embodiments, the compound is further defined as:

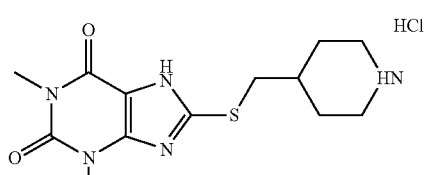

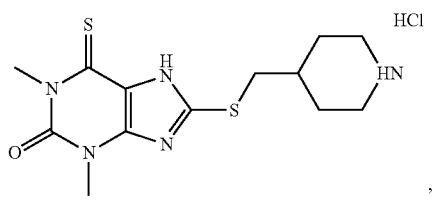

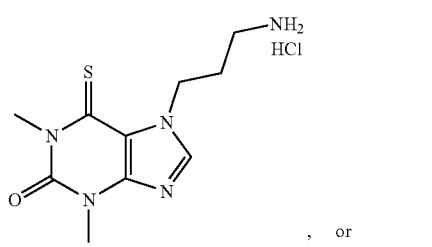

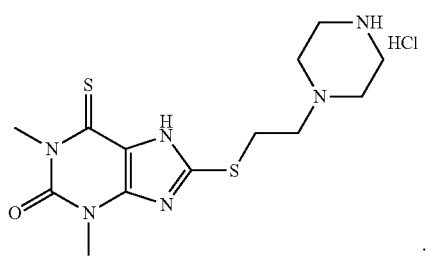

In some embodiments, the compound is further defined as:

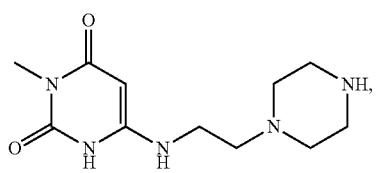

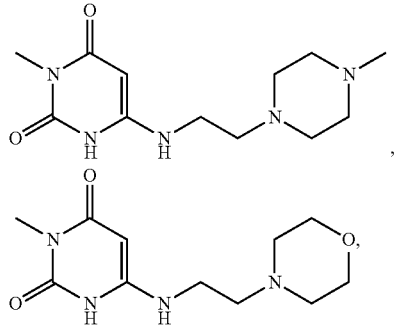

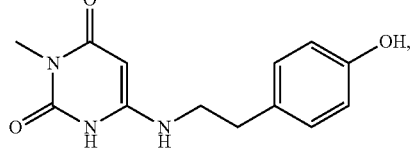

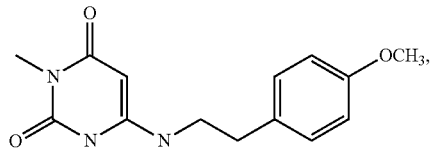

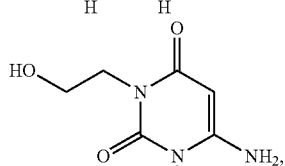

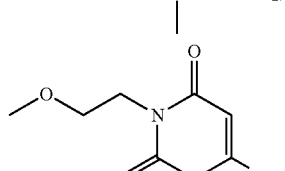

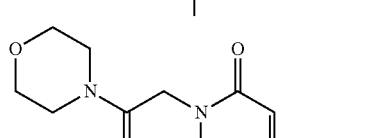

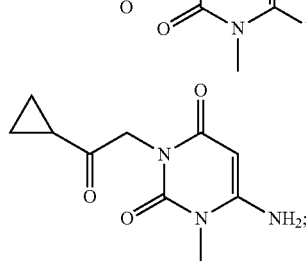

or a pharmaceutically acceptable salt thereof.

In some embodiments, the compound in the methods described above comprise a compound of formula (VII), and/or any limitations described therefore, below.

In still other aspects, the present disclosure provides compounds of the formula:

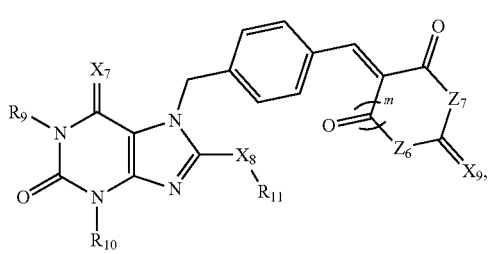

(VII)

wherein:

m is 0 or 1;

$R_9$ and $R_{10}$ are each independently hydrogen, alkyl$_{(C \leq 12)}$, or substituted alkyl$_{(C \leq 12)}$;

$R_{11}$ is hydrogen; or heterocycloalkyl$_{(C \leq 12)}$, substituted heterocycloalkyl$_{(C \leq 12)}$, -alkanediyl$_{(C \leq 12)}$-heterocycloalkyl$_{(C \leq 12)}$, or substituted -alkanediyl$_{(C \leq 12)}$-heterocycloalkyl$_{(C \leq 12)}$;

$X_7$ and $X_9$ are each independently O or S;

$X_8$ is a covalent bond, O, S, or NH; and $Z_6$ and $Z_7$ are each independently O, S, or $NR_a$, wherein:

$R_a$ is hydrogen, alkyl$_{(C \leq 12)}$, or substituted alkyl$_{(C \leq 12)}$;

or a pharmaceutically acceptable salt thereof.

In some embodiments, m is 0. In other embodiments, m is 1. In some embodiments, $R_9$ is alkyl$_{(C \leq 12)}$ or substituted alkyl$_{(C \leq 12)}$. In further embodiments, $R_9$ is alkyl$_{(C \leq 12)}$, such as methyl. In some embodiments, $R_{10}$ is alkyl$_{(C \leq 12)}$ or substituted alkyl$_{(C \leq 12)}$. In further embodiments, $R_{10}$ is alkyl$_{(C \leq 12)}$, such as methyl. In some embodiments, $X_7$ is O. In other embodiments, $X_7$ is S. In some embodiments, $X_9$ is O. In other embodiments, $X_9$ is S. In some embodiments, $X_8$ is a covalent bond or S. In some embodiments, $R_{11}$ is hydrogen. In other embodiments, $R_{11}$ is heterocycloalkyl$_{(C \leq 12)}$ or substituted heterocycloalkyl$_{(C \leq 12)}$. In further embodiments, $R_{11}$ is heterocycloalkyl$_{(C \leq 12)}$, such as N-morpholinyl. In some embodiments, $Z_6$ is S. In other embodiments, $Z_6$ is $NR_a$. In some embodiments, $R_a$ is hydrogen. In other embodiments, $R_a$ is alkyl$_{(C \leq 12)}$ or substituted alkyl$_{(C \leq 12)}$. In further embodiments, $R_a$ is alkyl$_{(C \leq 12)}$, such as methyl. In some embodiments, $Z_7$ is $NR_a$. In some embodiments, $R_a$ is hydrogen. In other embodiments, $R_a$ is alkyl$_{(C \leq 12)}$ or substituted alkyl$_{(C \leq 12)}$. In further embodiments, $R_a$ is alkyl$_{(C \leq 12)}$, such as methyl. In other embodiments, $R_a$ is substituted alkyl$_{(C \leq 12)}$, such as $R_a$ is —$CH_2C(O)OH$ or —$CH_2CH_2C(O)OH$.

In some embodiments, the compound is further defined as:

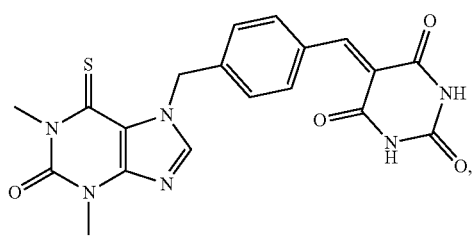

-continued

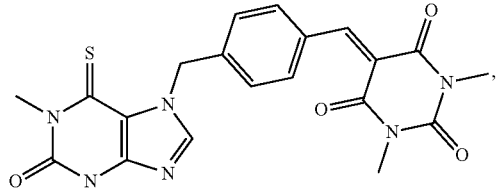

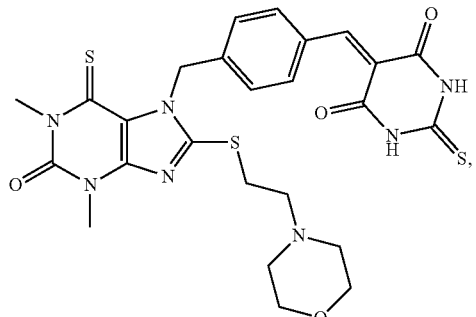

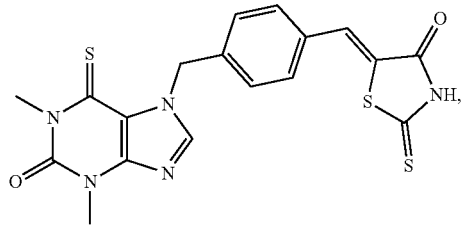

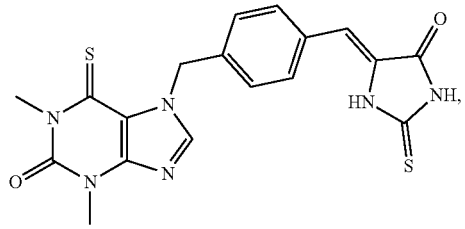

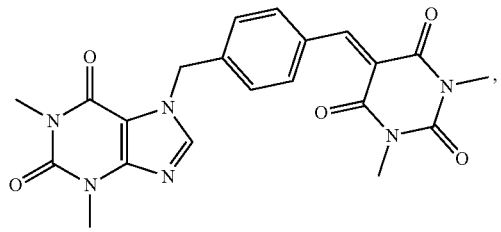

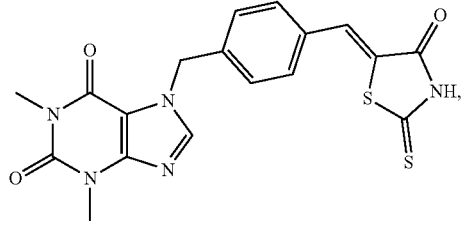

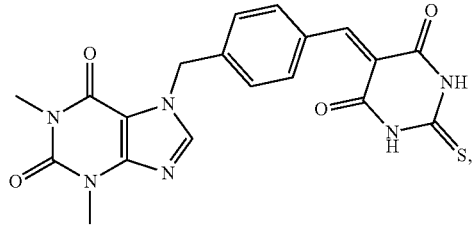

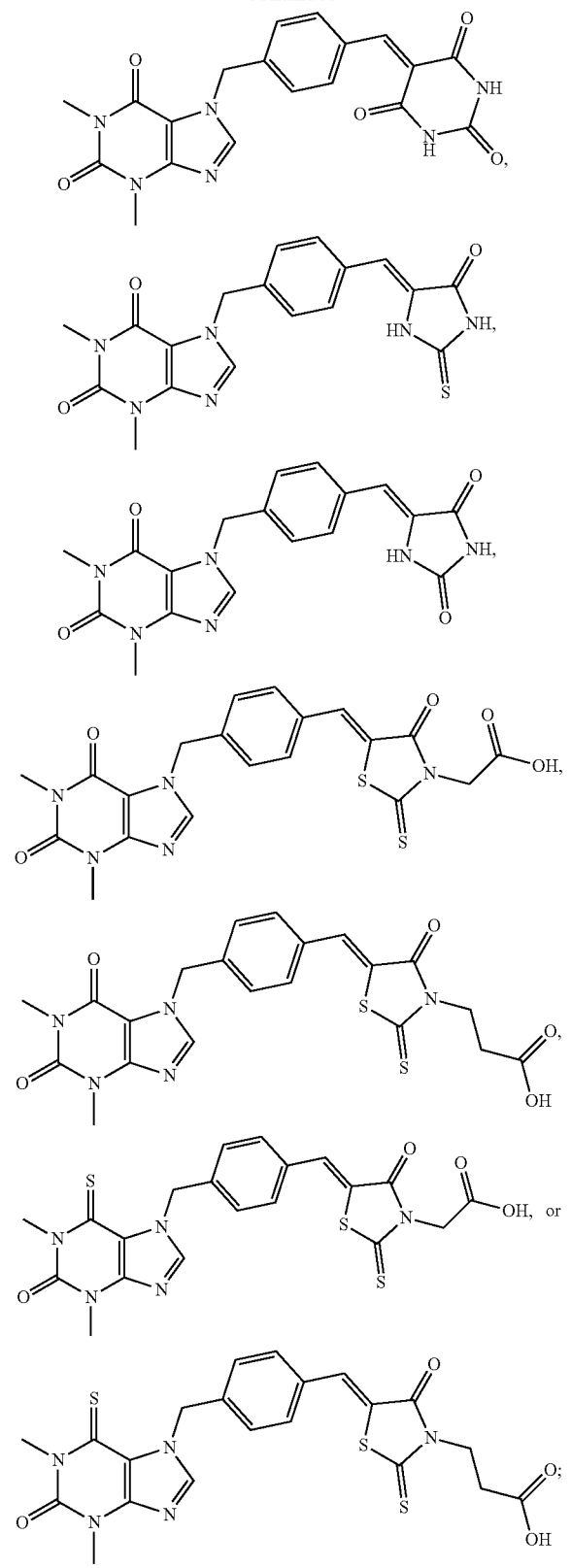
or a pharmaceutically acceptable salt thereof.
In still another aspect, the present disclosure provides compounds of the formula:
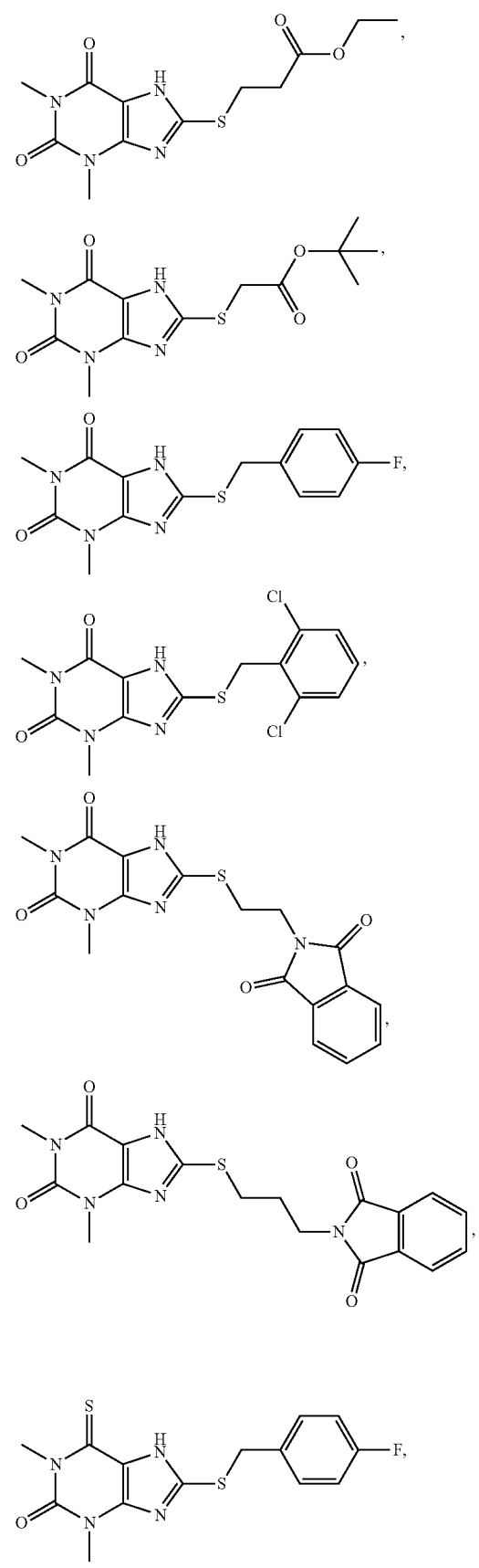

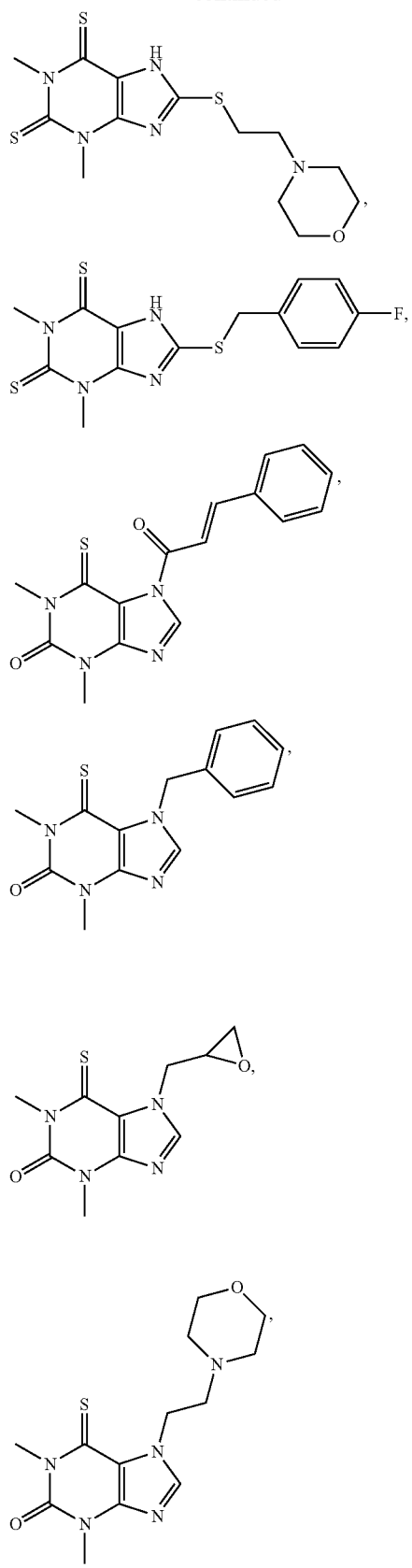
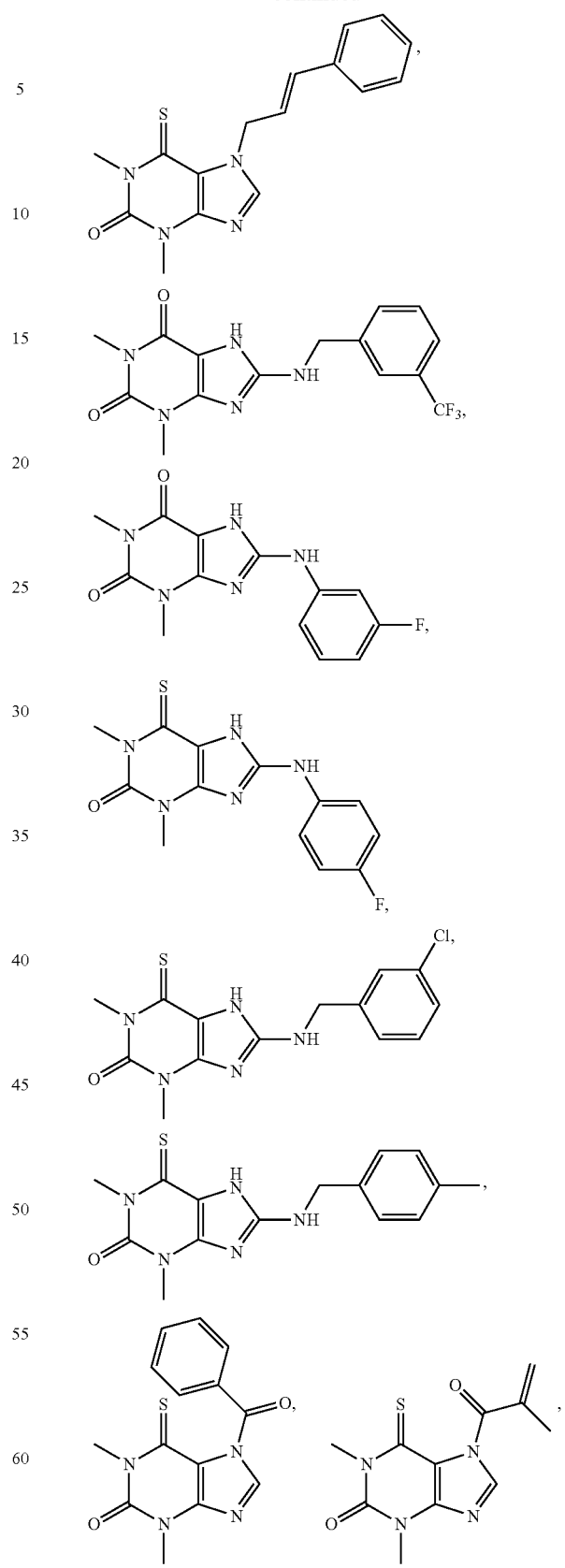

75
-continued
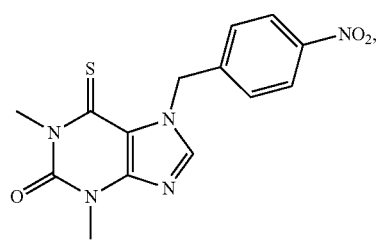
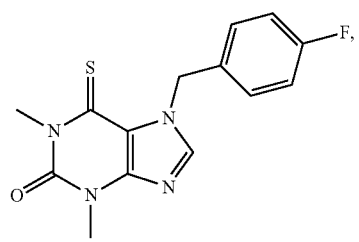
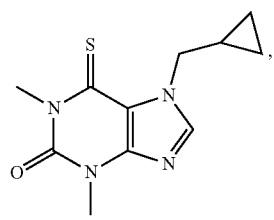
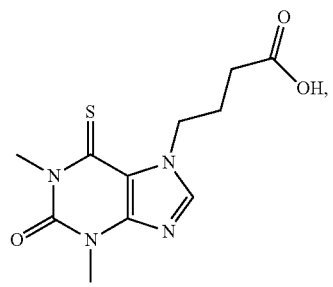
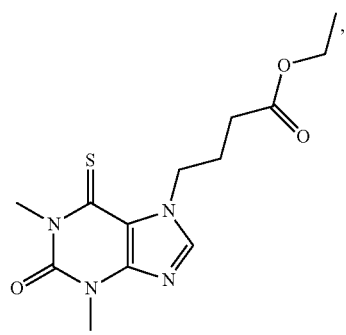
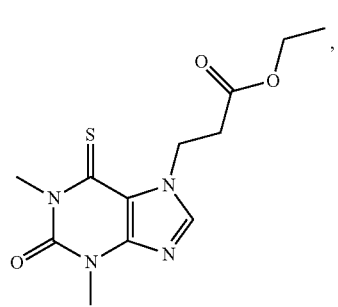
76
-continued
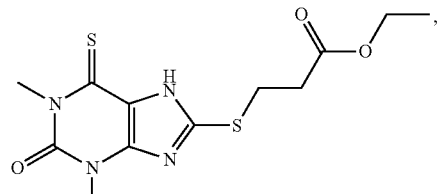
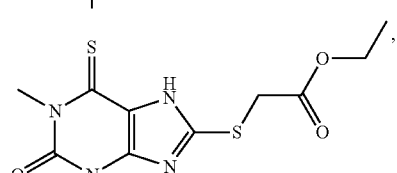
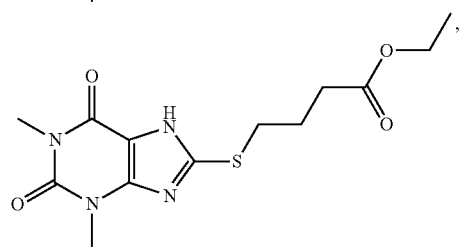
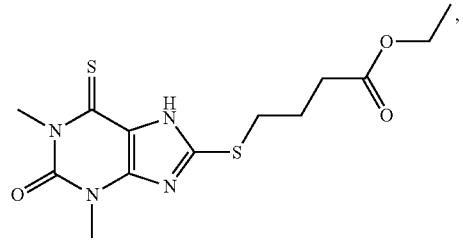
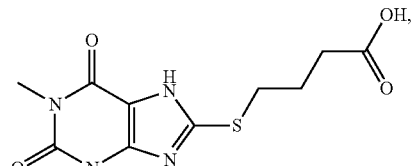
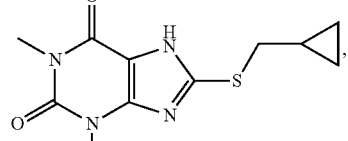
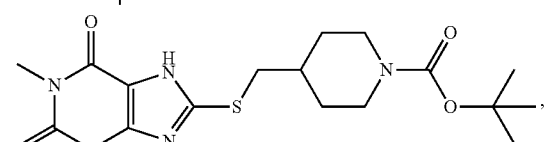
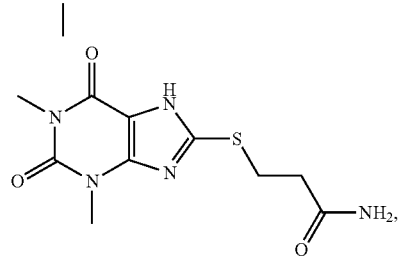

77
-continued
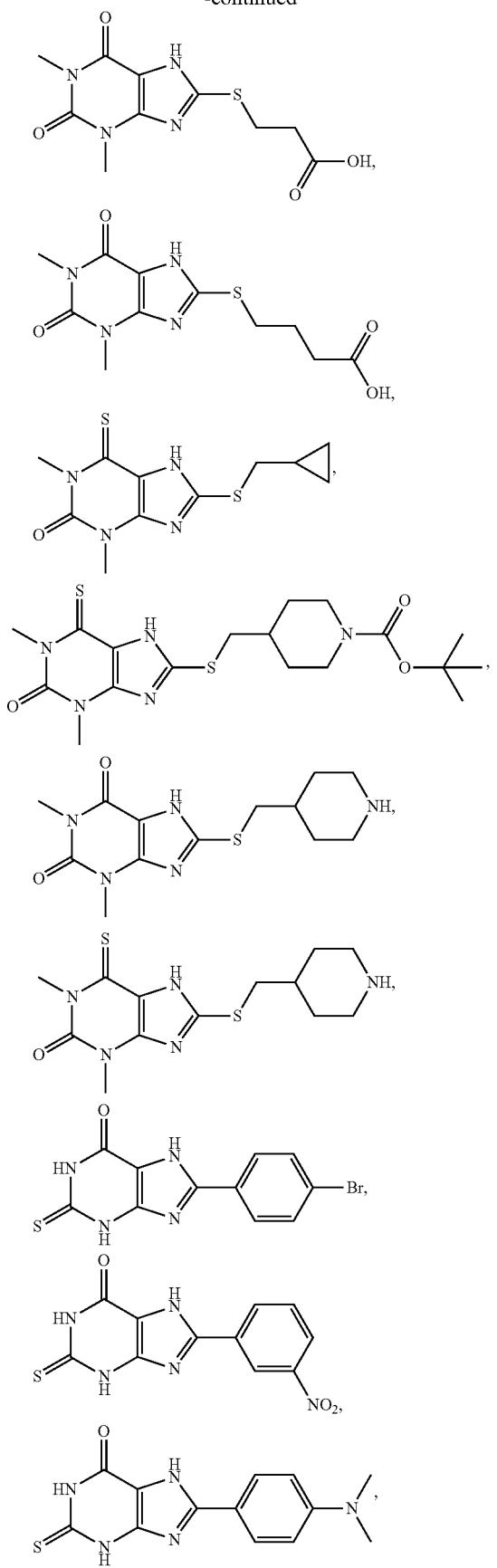
78
-continued
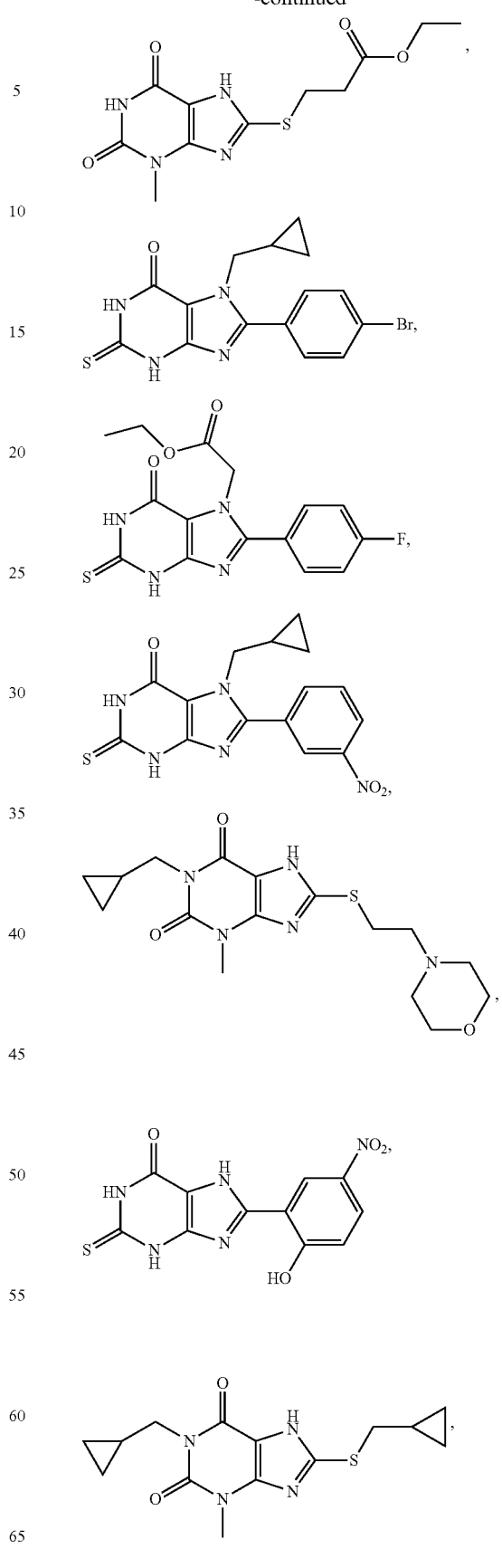

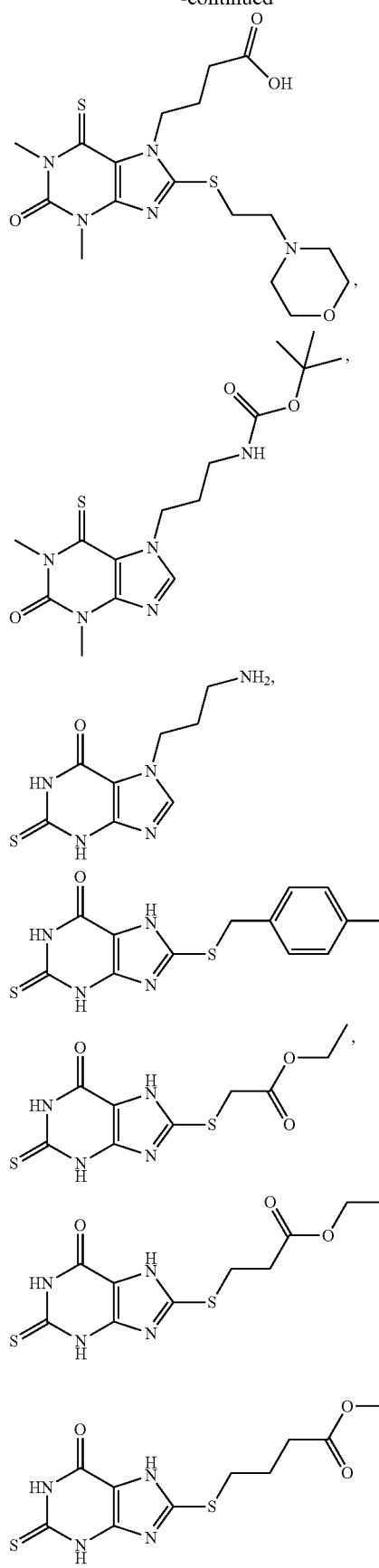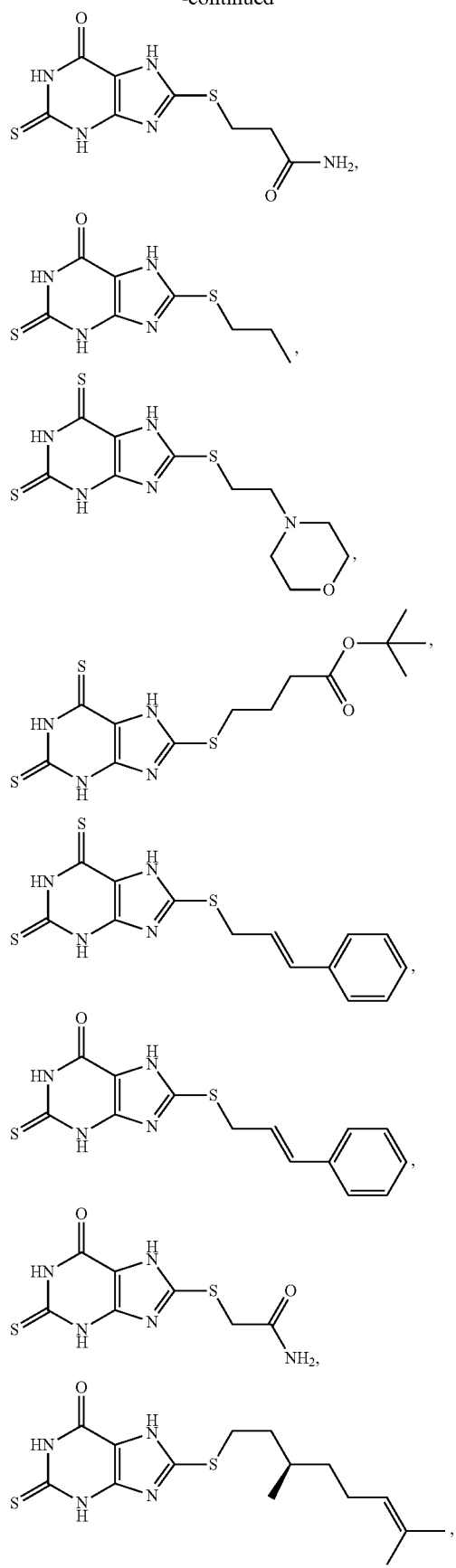

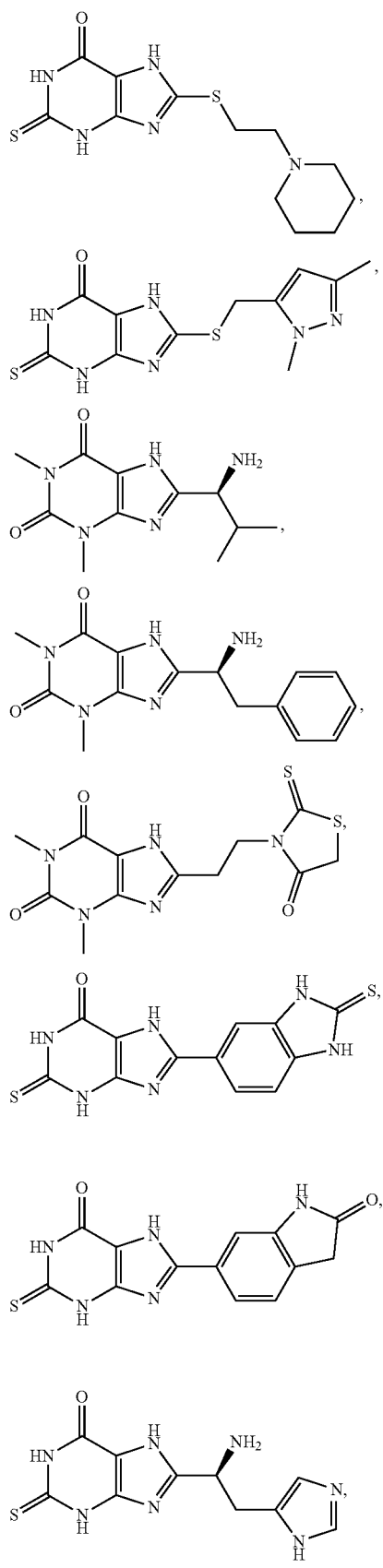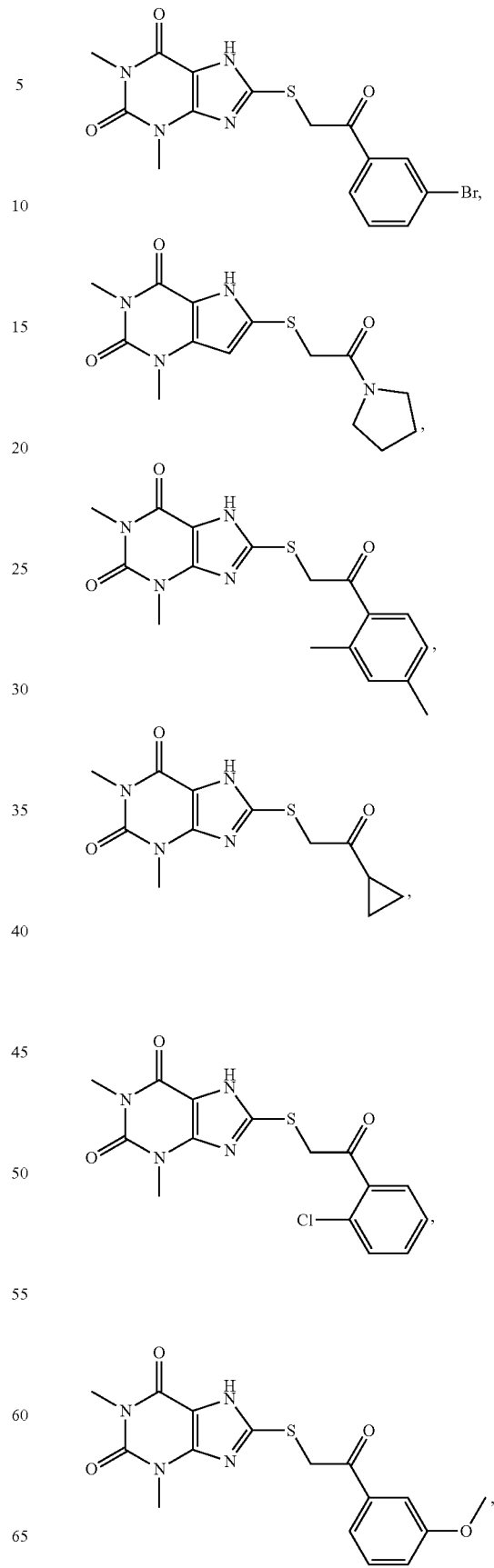

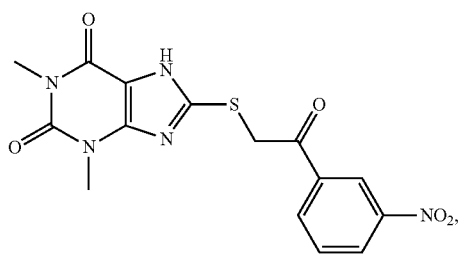
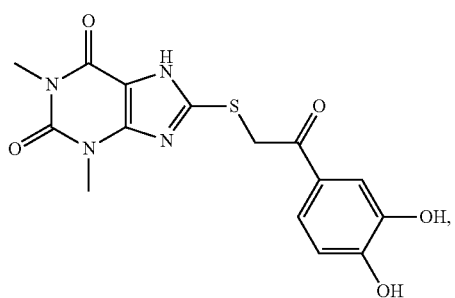
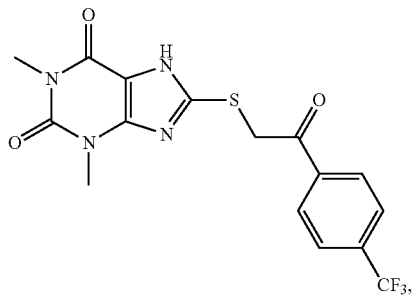
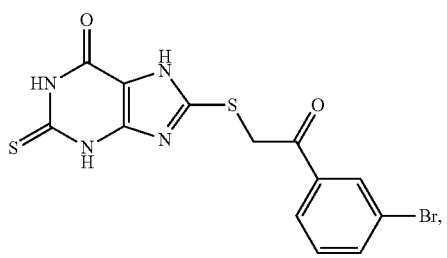
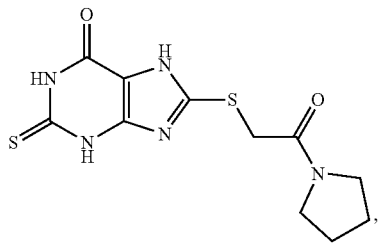
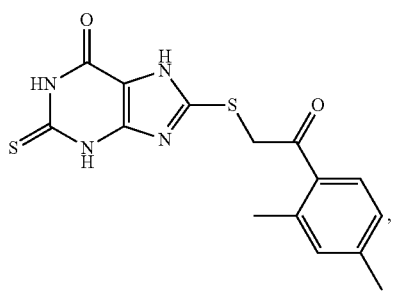
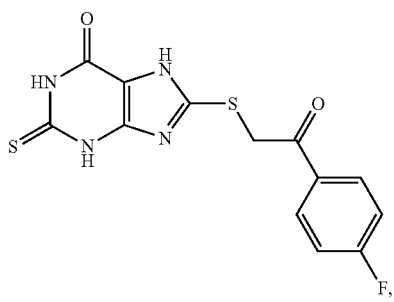
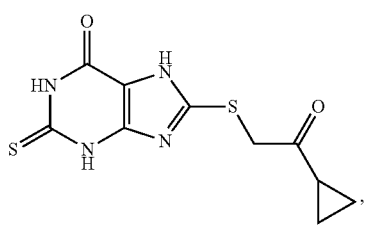
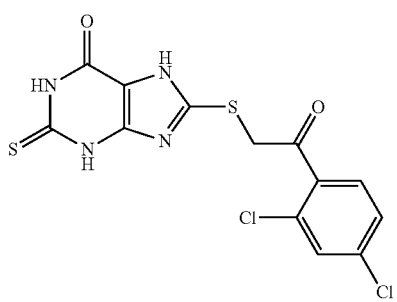
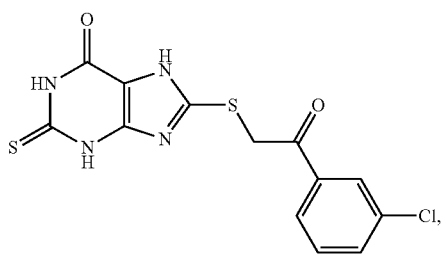
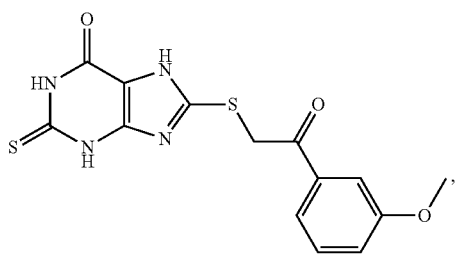
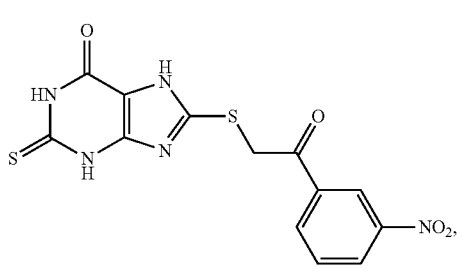

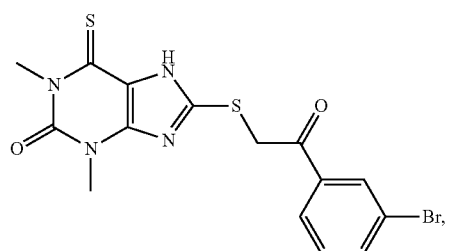
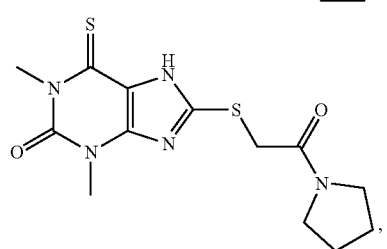
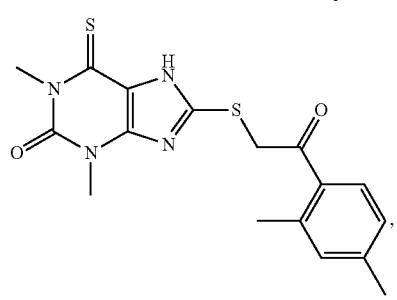
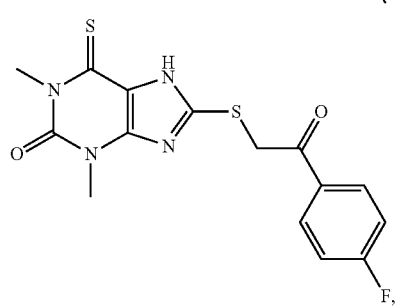
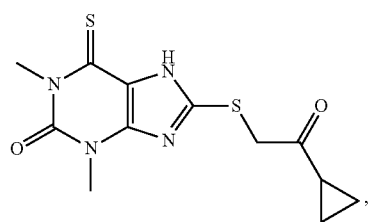
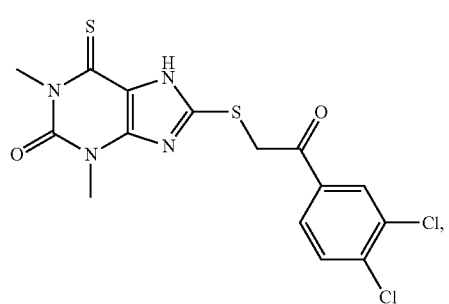
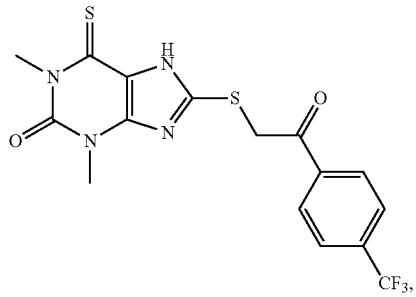
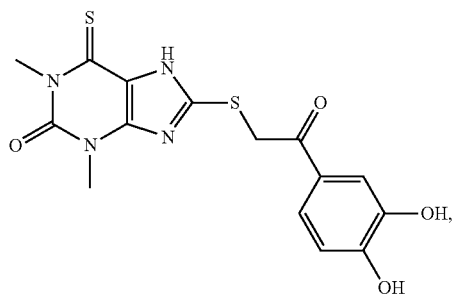
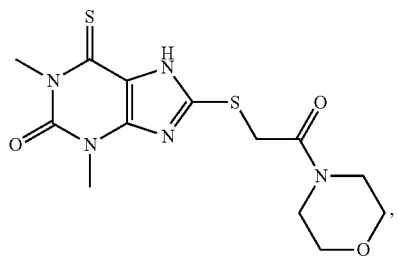
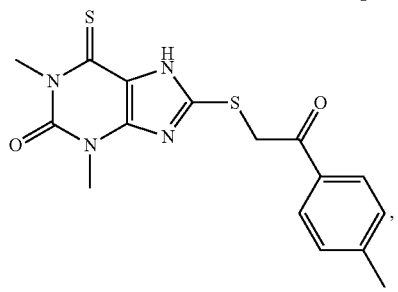
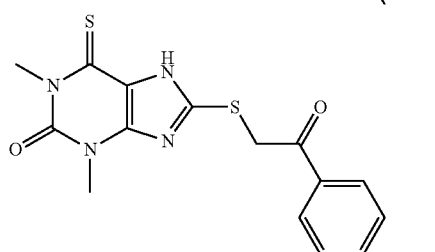
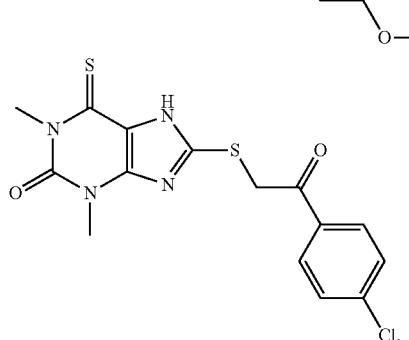

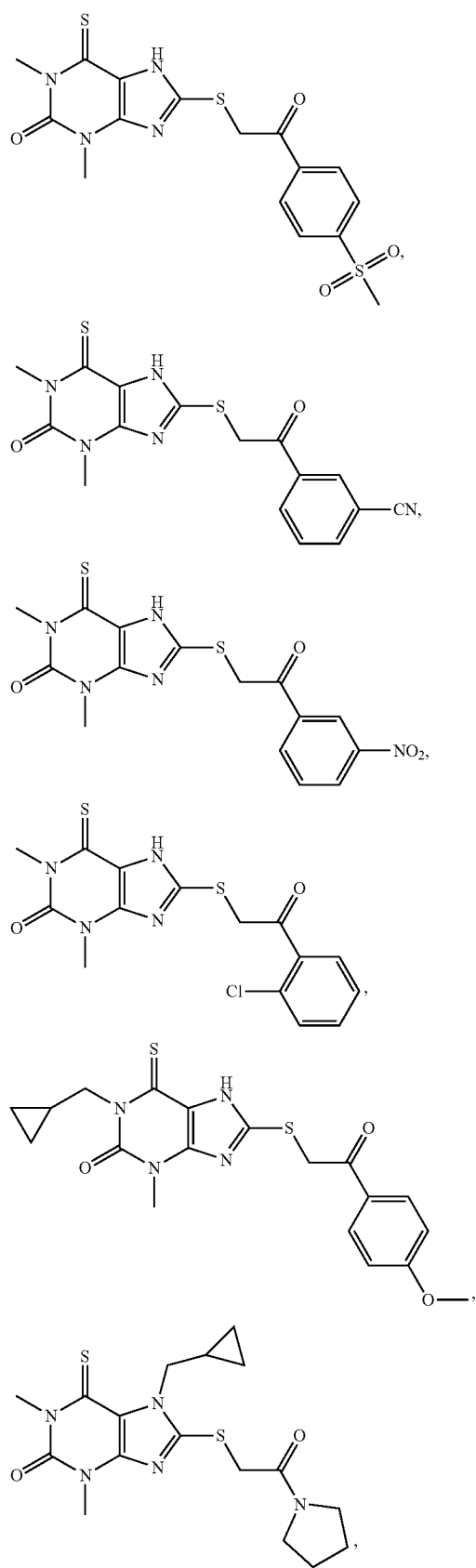
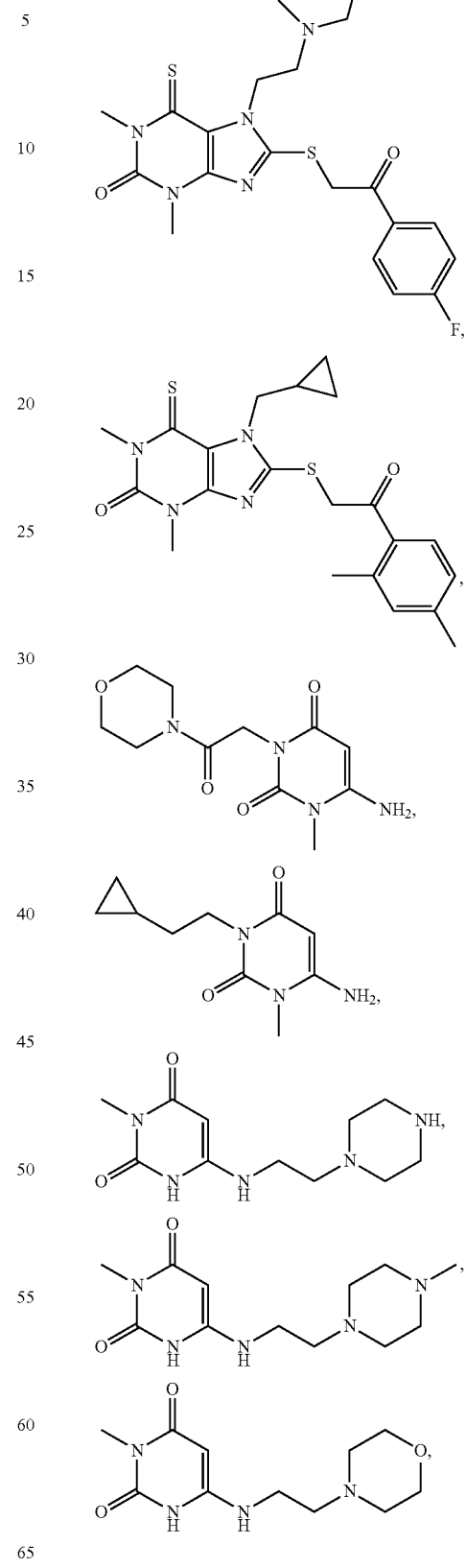

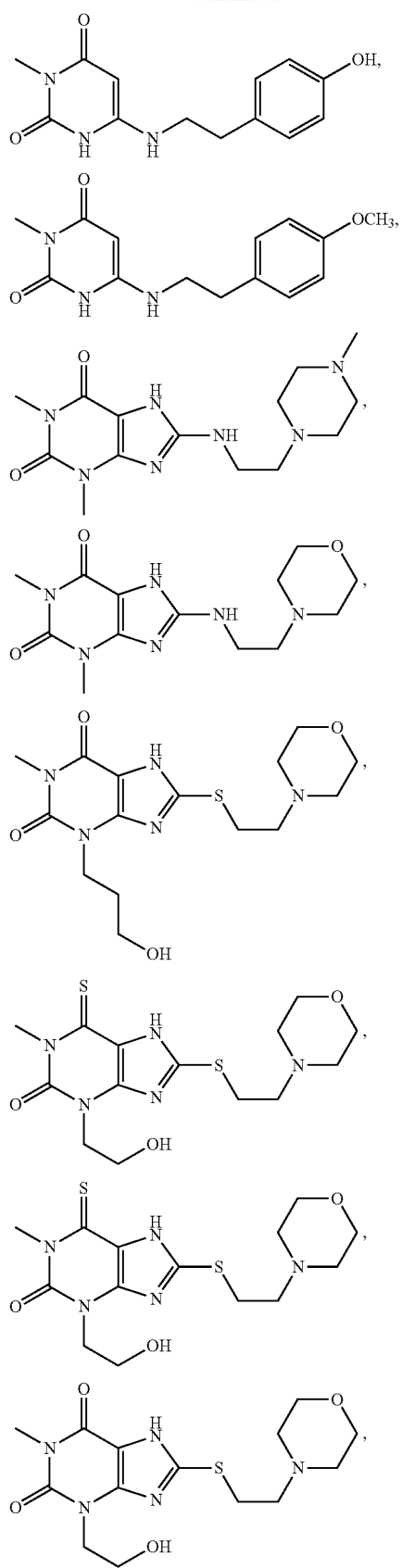
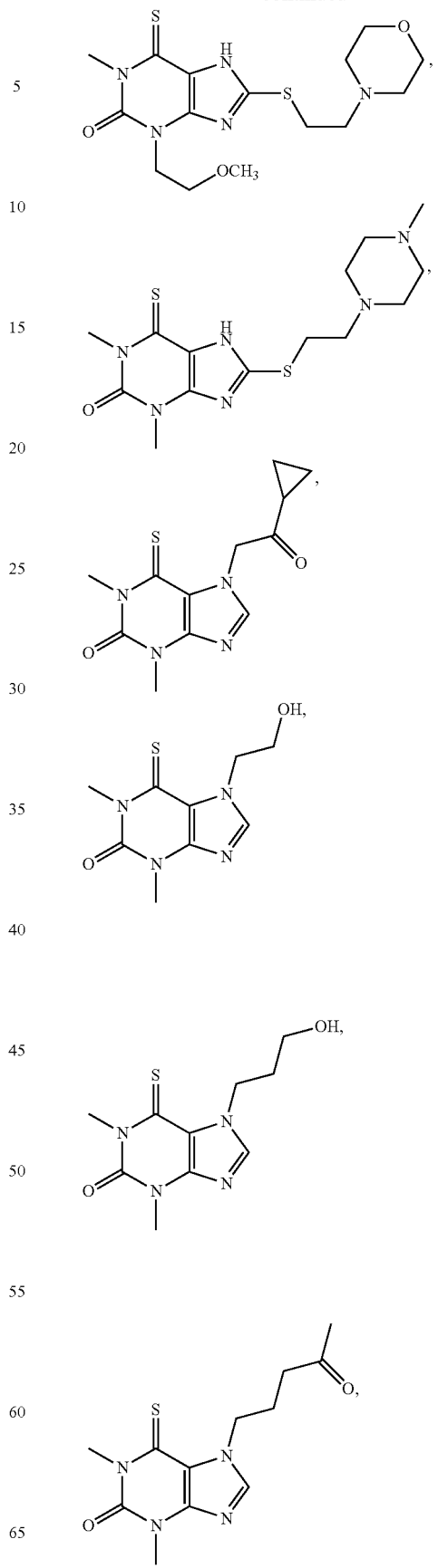

-continued

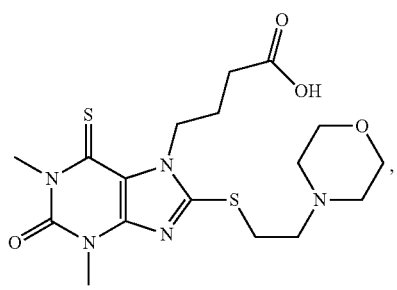

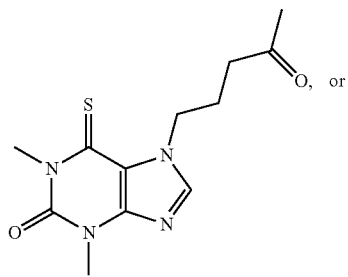

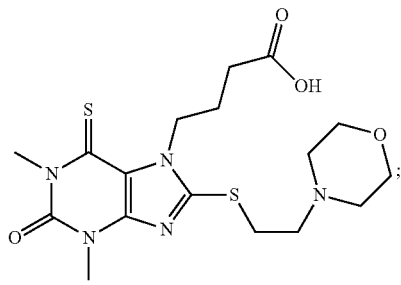

or a pharmaceutically acceptable salt thereof. In some embodiments, the pharmaceutically acceptable salt comprises HCL. In some embodiments, the compound is further defined as:

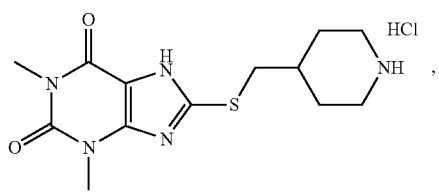

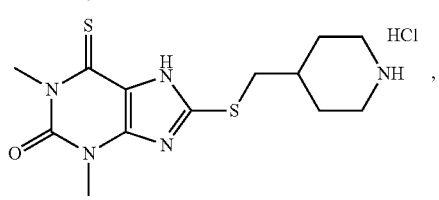

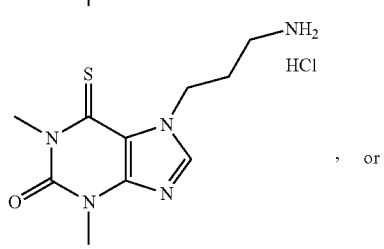

-continued

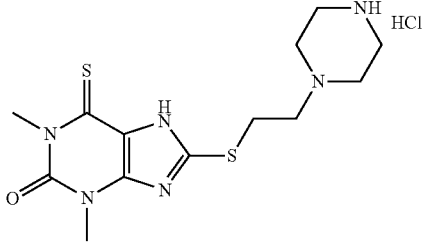

In yet another aspect, the present disclosure provides pharmaceutical compositions comprising:
(a) a compound of the present disclosure; and
(b) an excipient.

In some embodiments, the pharmaceutical composition is formulated for administration: orally, intraadiposally, intraarterially, intraarticularly, intracranially, intradermally, intralesionally, intramuscularly, intranasally, intraocularly, intrapericardially, intraperitoneally, intrapleurally, intraprostatically, intrarectally, intrathecally, intratracheally, intratumorally, intraumbilically, intravaginally, intravenously, intravesicularlly, intravitreally, liposomally, locally, mucosally, parenterally, rectally, subconjunctival, subcutaneously, sublingually, topically, transbuccally, transdermally, vaginally, in cremes, in lipid compositions, via a catheter, via a lavage, via continuous infusion, via infusion, via inhalation, via injection, via local delivery, or via localized perfusion. In some embodiments, the pharmaceutical composition is formulated for oral, intraarterial, or intravenous administration. In some embodiments, the pharmaceutical composition is formulated as a unit dose.

In another aspect, the present disclosure provides methods of treating or preventing cancer in a patient comprising administering to the patient in need thereof a therapeutically effective amount of a compound or composition of the present disclosure.

In still another aspect, the present disclosure provides crystals comprising a substantially pure poly(ADP-ribose) glycohydrolase fragment and a PARG inhibitor. In some embodiments, the crystal has lattice constants of a=44.6 Å, b=65.8 Å, c=88.4 Å, α=90.0°, β=95.2°, γ=90.0°. In some embodiments, the crystal has lattice constants of a=44.7 Å, b=66.0 Å, c=88.6 Å, α=90.0°, β=95.5°, γ=90.0°. In some embodiments, the crystal has lattice constants of a=44.6 Å, b=65.7 Å, c=88.4 Å, α=90.0°, β=95.0°, γ=90.0°. In some embodiments, the crystal has lattice constants of a=44.7 Å, b=66.0 Å, c=88.6 Å, α=90.0°, ρ=95.2°, γ=90.0°. In some embodiments, the crystal has lattice constants of a=44.7 Å, b=66.2 Å, c=88.9 Å, α=90.0°, β=95.6°, γ=90.0°. In some embodiments, the crystal has a space group of $P2_1$. In some embodiments, the crystal has a crystal structure as defined in Table 4. In some embodiments, the PARG inhibitor is a compound of formula (I), (II), (III), (IV), (V), (VI), and/or (VII).

In another aspect, the present disclosure provides tangible computer-readable media comprising the crystal structure constants of a crystal of the present disclosure.

In still another aspect, the present disclosure provides methods for identifying a PARG inhibitor having an improved property, the method comprising:
(a) obtaining a crystal or tangible computer-readable media of the present disclosure; and
(b) identifying one or more atoms of interest for substitution, deletion, or insertion predicted to provide the improved property.

The use of the word "a" or "an" when used in conjunction with the term "comprising" in the claims and/or the specification may mean "one," but it is also consistent with the meaning of "one or more," "at least one," and "one or more than one."

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. The skilled artisan will understand that typically there is no limit on the number of items or terms in any combination, unless otherwise apparent from the context.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present disclosure will become apparent from the following detailed description. It should be understood, however, that the detailed description and the specific examples, while indicating specific embodiments of the disclosure, are given by way of illustration only, since various changes and modifications within the spirit and scope of the disclosure will become apparent to those skilled in the art from this detailed description. Note that simply because a particular compound is ascribed to one particular generic formula doesn't mean that it cannot also belong to another generic formula.

BRIEF DESCRIPTION OF THE DRAWINGS

For a more complete understanding of the features and advantages of the present disclosure, reference is now made to the detailed description of the disclosure along with the accompanying figures and in which:

FIGS. 1a-d show PARG expression is upregulated in majority of human cancers (FIG. 1a). TCGA database analysis of PARG expression in tumor matched normal tissue (FIG. 1a) Western blot analysis of PAR accumulation (upper panel) and then re-probed with anti-PARG antibody (middle panel) in response to PDD00017273 (PDD) in high and low PARG protein expressing cells. Cells were treated with designated concentration of PDD for one hour followed by 7Gy ionizing radiation and allowed to recover for 4 hrs before lysis and immunoblotting of total cell lysates. Anti-PCNA was used as loading control. (FIG. 1b) Stable MDA-MB-231 cells with control lentivirus or PARG shRNA (PARG-KD) were grown in either serum (+FBS) or in serum free media (−FBS) overnight and the resulting cell-lysates were immunoblotted with anti-PARG antibody. Anti PCNA blot was used as loading control. (FIG. 1c) Control and PARG-KD cells were treated with PDD as in (FIG. 1b) and immunoblotted with anti-PAR antibody (upper panel) and then re-probed with anti-actin (lower panel) as loading control (FIG. 1d).

FIGS. 2a-d show Identification of thio-xanthine/methylxanthine derivatives as PARG inhibitors. (FIG. 2a) The high reproducibility of the TR-FRET assay for PARG activity is reflected by Z-factor of 0.6-0.8. Using this assay (FIG. 7), a kinetic high throughput screen was performed against the NCI Div Set II library (1,990 compounds in seven 384-well plates) at 6.7 μM compound concentrations and two PARG concentrations (12.5 nM and 25 nM). (FIGS. 2b-2d) Thio-xanthine/methylxanthine derivatives are potent PARG inhibitors. Among five chemotypes identified from the HTS (FIG. 8), The JA2 xanthine/methylxanthine series was selected as the lead pharmacophore, based on its structural similarities to adenine, potency in vitro, and favorable drug-like characteristics. Dose-dependent inhibition of PARG activity by the JA2 series compounds was quantitatively analyzed using a gel-based PARG activity assay (FIG. 9). Three representative HTS hits of the JA2 chemotype (JA2-3, JA2-4, and JA2-5) show a potent PARG inhibition with the sub-micromolar range of $IC_{50}$ values. The raw data of HTS for JA2-3 is shown in panel (FIG. 2b).

FIGS. 3a-c show JA2-4 binds to the adenine-binding pocket of hPARG by virtue of the flexibility of the Tyr clasp. (FIG. 3a) The 1.7 Å crystal structure of human PARG bound to JA2-4 reveals specific and extensive inhibitor interactions with the adenine-binding pocket. The 6'-thiocarbonyl sulfur of JA2-4 was assigned by comparing the size and orientation of the electron density to that of the corresponding 6'-carbonyl oxygen of JA2120 (FIG. 4b). JA2-4 is shown with a Fo-Fc map (contoured at 2a) that was calculated prior to the addition of JA2-4 to the model. (FIG. 3b) A structural comparison of the binding interactions of JA2-4 and ADP-HPD is consistent with a competitive inhibition mechanism for JA2-4. The structure of hPARG bound to ADP-HPD (wheat) is overlaid onto that bound to JA2-4 (white). The methylxanthine core of JA2-4 makes extensive interactions and occupies the same binding site as the adenosine moiety of ADP-HPD and. (FIG. 3c) The Tyr clasp changes conformation to enable binding of JA2-4. JA2-4 binding shifts the position of the Tyr clasp in concert with the rotation of the Tyr795 side chain and rearrangement of Arg671. The structural flexibility of the Tyr clasp creates room for JA2-4 and facilitates interactions with Asn869 and I726 that contribute to potent inhibition of PARG activity ($IC_{50}$ of 0.9 μM).

FIGS. 4a-c show the 6'-thiocarbonyl group contributes to the potency of methylxanthine PARG inhibitors. (FIGS. 4a & 4b) Crystal structures of human PARG bound to JA2131 (FIG. 4a) and JA2120 (FIG. 4b). JA2131 and JA2120 occupy the adenine-binding pocket of hPARG in the same orientation as JA2-4. The 6'-thiocarbonyl of JA2131 makes a direct van der Waals contact with the main chain amide of Asn869 (3.6 Å; FIG. 4a), whereas the 6'-carbonyl of the less potent inhibitor JA2120 makes water-mediated hydrogen bonds to the main chain amide of Asn869 (4.3 Å) and the main chain carbonyl of Phe900 (FIG. 4b). These findings indicate that the 6'-thiocarbonyl group of JA2-4 series inhibitors increases potency by introducing a direct interaction with hPARG. (FIG. 4c) The structure-activity relationships (SAR) for JA2-4 series inhibitors. The direct interaction between the 6'-thiocarbonyl group of JA2131 and hPARG increases potency more than 50-fold in comparison to JA2120.

FIG. 5 shows (left) PARGi sensitizes PARP1i resistant breast cancer cells. PARPi resistant SUM149PT cells clone 6, 10, 11, 18 together with the wild type (WT) were treated with 10 μM JA2131 for 2 hours, irradiated 3Gy ionizing radiation and then fixed, immunofluorescence labelled for PAR and γH2AX. High content imaging showing specific accumulation of PAR and DNA damage induction observed with γH2AX signal in cells treated with PARGi. (Right) Immunoblotting of total cell-lysates of PARP1i resistant SUM149PT cells showing no change in the PARG (upper panel) and p53 (middle panel) protein expression level. Anti-actin was used as loading control (bottom panel).

(FIG. 9a) A total of 34 representative HTS hits and commercially available analogues from each chemotype (FIG. 7 and FIG. 29) were analyzed using the gel-based PARG activity assay. This gel-based assay directly monitors the change of PARylation status of PARP1 as a substrate of PARG. Candidate inhibitors (25 µM) were preincubated with rat PARG (12.5 nM) for 1 hr at room temperature, and the reaction was started by addition of PARylated PARP1 (500 nM). The reaction was quenched after a 30 min incubation at room temperature by adding SDS-PAGE sample buffer. PARylated PARP1C runs as a smear on SDS-PAGE that is reduced to a single band by PARG treatment. These results are in good agreement with $IC_{50}$ values estimated from dose-response studies using the TR-FRET assay (FIG. 29). (FIG. 9b) Quantification of the dose-response PARG inhibition by JA2-3 using the gel-based PARG activity assay. hPARG (1 nM) was preincubated with increasing concentrations (0.032-1 µM) of JA2-3 for 1 hr at room temperature before PARylated PARP1C (500 nM) was added. The reaction was quenched after a 30 min incubation at room temperature. PARylated PARP1C migrates slower than unmodified PARP1C and was quantified using ImageJ. To determine the $IC_{50}$ value, the dose-response data were plotted as a function of JA2-3 concentration and fitted to the four-parameter logistic equation using SigmaPlot. The rate of the PARG-dependent signal loss in the TR-FRET PAR turnover assay is not equivalent to the steady-state rate of PAR turnover, because the TR-FRET assay can't detect signal loss until the length of PAR chains become shorter than 7 ADP-ribose units. Therefore, the gel-based PARG activity assay to accurately determine the $IC_{50}$ values throughout the present disclosure.

The reaction was quenched after a 30 mm incubation at room temperature. PARylated PARP1C migrates slower than unmodified PARP1C and was quantified using ImageJ. To determine the $IC_{50}$ value, the dose-response data were plotted as a function of ADP-HDP concentration and fitted to the four-parameter logistic equation using SigmaPlot. The rate of the PARG-dependent signal loss in the TR-FRET PAR turnover assay is not equivalent to the steady-state rate of PAR turnover, because the TR-FRET assay can't detect signal loss until the length of PAR chains become shorter than 7 ADP-ribose units. Therefore, the gel-based PARG activity assay to accurately determine the $IC_{50}$ values throughout the present disclosure.

Figures 11A, 11B, 11C, 11D, 11E:
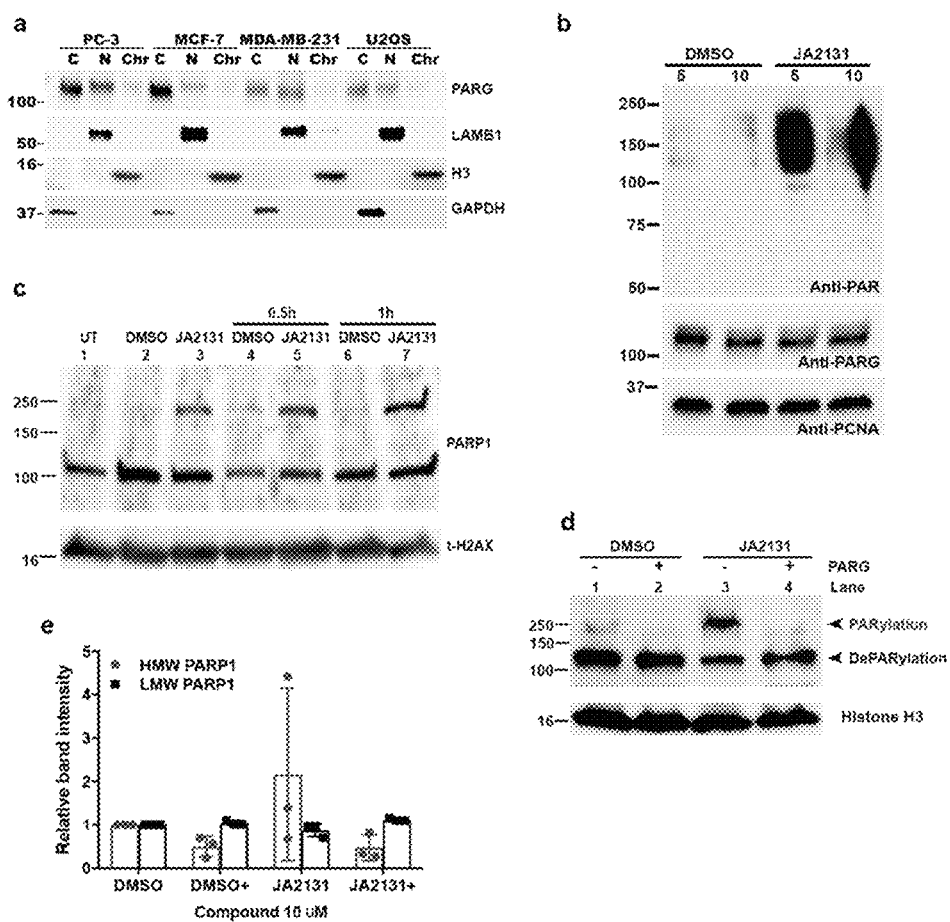

FIGS. 11a-e show subcellular PARG protein expression patterns in cultured cells (FIG. 11a). Sub-cellular fractionated lysates were immunoblotted with anti-PARG, (upper panel) followed by nuclear (N) marker anti-Laminin Subunit Beta 1 (LAMB1, upper middle panel), chromatin (Chr) marker anti-Histone H3 (H3, lower middle panel) and the cytoplasmic (C) marker anti-Glyceraldehyde 3-phosphate dehydrogenase (GAPDH, lower panel). PARG inhibition induce hyper PARylation of PARP1 (FIG. 11a). PARGi 2131-treated PC3 cells showing inhibitor-induced cellular PARylation. Cells were treated with 2131 for 2 h followed by 7 Gy IR then allowed to recover for 1 h before lysis. Total cell lysates were immunoblotted with anti-PAR (upper panel) followed by anti-PARG (middle panel) and Anti-PCNA (lower panel) as loading controls. (FIG. 11b). JA2131 induces hyperPARylation of PARP1. PC3 cells treated with DMSO or PARG inhibitor JA-2131 (2131) for 2 hours then irradiated with 7Gy and allowed to recover for 0.5 hour or 1.0 hour before lysis and subcellular fractionation. Chromatin bound cell-extracts were analyzed with anti-PARP1 antibody (upper panel) followed by total H2AX (lower panel) as loading control. (FIG. 11c). DMSO or 2131 treated PC3 cells were irradiated and recovered for two hours as above, chromatin fractions were then incubated with or without purified PARG enzyme (+/−PARG) for 1 hour at 37C. then immunoblotted with anti-PARP1 (Upper panel) and then with anti-histone H3 (lower panel) as loading control. (FIG. 11d) Quantitative analysis of western blot of (FIG. 11b), where expression of PARP1 levels in DMSO treated is 1. High molecular weight (HMW) PARP1 is significantly decreased in the presence of purified truncated PARG protein while the low molecular weight PARP1 bands were not affected, n=3 (FIG. 11e).

FIGS. 12a & 12b show X-ray dosage for the three cell-lines (FIG. 12a) and corresponding clonogenic assay to determine the $IC_{50}$ value (FIG. 12b). (FIG. 12c) Dose response survival curve obtained from counting colonies from three independent.

FIGS. 13a-g show PARGi sensitizes cells to ionizing radiation damage. (FIG. 13a) A low-resolution fixed intensity image-montage of the total cell numbers 3×(3×3) imaged per experimental group. A high level of PAR accumulation and γH2AX foci formation in cells exposed to PARGi. PC3 cells treated DMSO or PARG inhibitors (2120 or 2131) for 2 hours, irradiated 7Gy, recovered for 1 hour were fixed and immuno-stained with Poly(ADP)-Ribose (PAR, green), γH2AX (red) and Hoechst (blue) antibodies. Cells were analyzed with quantitative high content imaging. (FIGS. 13b-e) Quantitative analysis of PAR intensity (FIG. 13b), γH2AX intensities (FIG. 13c), the number of cells showing PAR/γH2AX co-localizations (FIG. 13d) and nucleus count for the total number of cells analyzed for each group (FIG. 13e). (FIG. 13f) Immunoblotting of PARGi 2131 treated PC3 cells showing inhibitor induced cellular PARylation. Cells were treated with 2131 for an hour followed by 7Gy ionizing radiation then allowed to recover for 2 h before total cell-lysate preparation and immunoblotting with anti-PAR (upper panel) followed by anti-PARG (middle) and Anti-PCNA (lower) as controls. (FIG. 13g) Enlarged individual representative images taken from one quadrant of the 3×(3×3) square shown in FIG. 13a. This shows the quality of the image used to perform quantification for puncta and colocalization calculations. Anti-PAR (green), Anti-γH2AX (red) and Hoechst 33342 (blue). Scale bar 25 μm.

FIGS. 14a-c show selective inhibition of PARG by xanthine derivative JA2131. (FIG. 14a) PARG knockdown MDA-MB-231 cells were treated with 5 μM JA2131 or PDD for two hours, lysed and total lysates were immunoblotted for anti-PAR (upper panel) followed by anti-PARG (upper middle), anti-PARP1 (lower middle) and anti-actin (bottom). (FIG. 14b) Clonogenic assay radiation dose determination for MDA-MB-231, MCF-7 and PC3 cells. 500 cells were exposed to indicated dose of radiation and colonies were allowed to form for each cell-lines. The surviving colonies from each group were counted and normalized against non-irradiated. The results of three independent experiments are shown here. Error bars=SEM. (FIG. 14c) Clonogenic survival assays of PC3, MDA MB231 and MCF-7 cells treated with PARGi. 500 cells were treated with either DMSO or 10 μM JA2131 for 2 hours, irradiated 3Gy ionizing radiation and grown for approximately 2-3 weeks, then colonies were fixed methanol and stained with crystal violet. Cells were analysed as above. The results of three independent experiments are shown here. Error bars=SEM.

Figure 15:
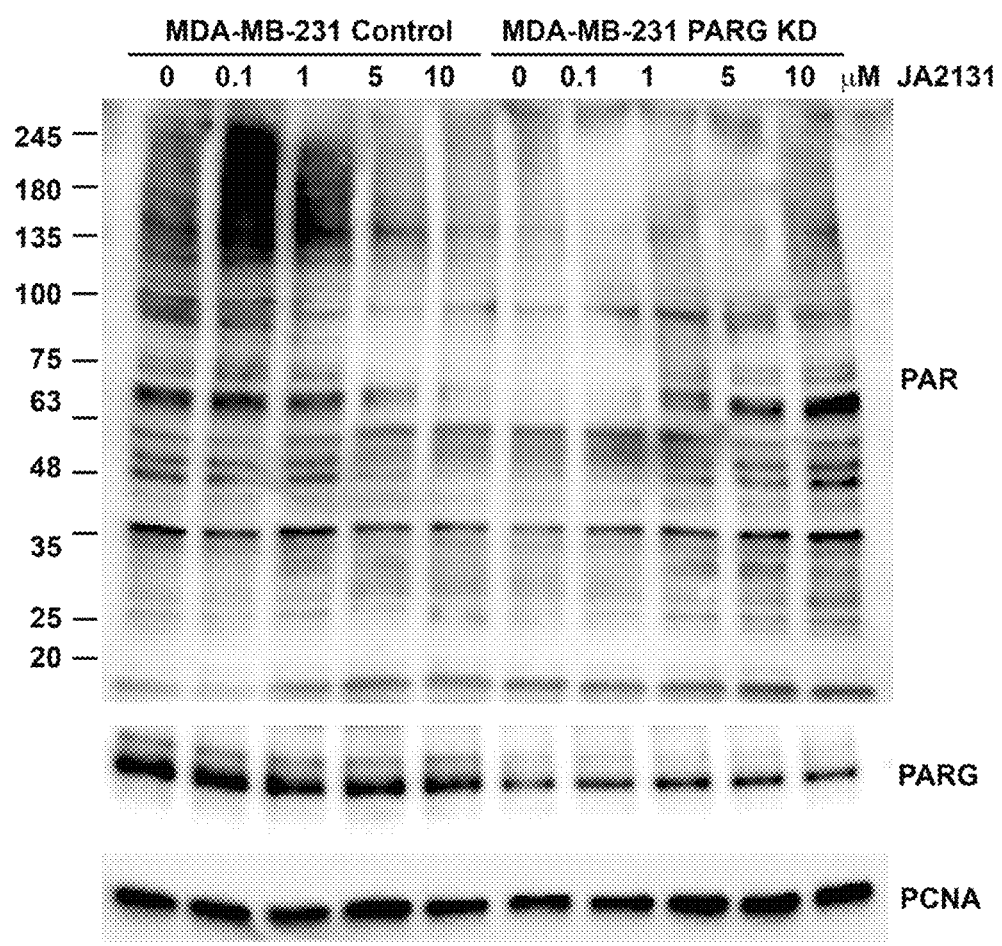

FIG. 15 shows JA2131 dose response in PARG depleted and normal control cells: MDA-MB-231 cells with or without PARG depletion were treated with identical concentration of JA2131 overnight, cell lysates were immunoblotted with anti-PAR followed by PARG and PCNA. The results here show PAR accumulation in control cells treated with JA2131 but not in the PARG-depleted cells. This suggests selectivity of the JA2131 for PARG over all other glycohydrolase in cells.

Figure 16A:
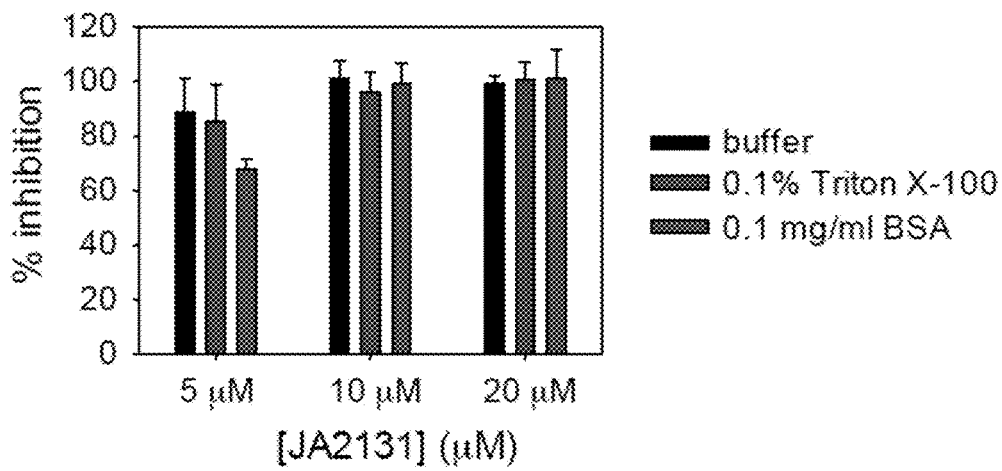
Figure 16B:
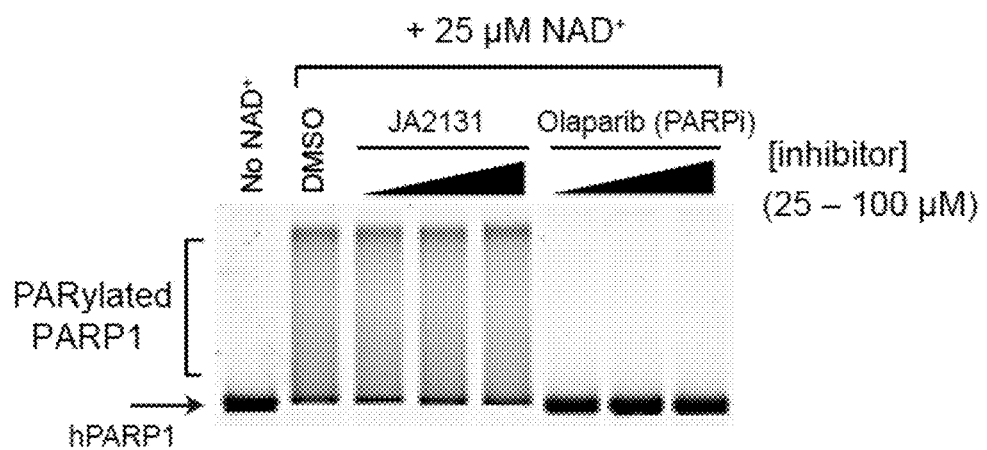

FIGS. 16a & 16b show testing JA2131 specificity. (FIG. 16a) In vitro specificity against hPARG in the presence and absence of detergent (Triton-X 100, 0.1%) and a non-specific target protein (bovine serum albumin BSA, 0.1 mg/ml). The Triton-X 100 concentration is -10-fold higher than its critical micelle concentration (CMC, 0.0155%) so can effectively distinguish promiscuous and aggregating compounds. Neither the addition of Triton-X 100 nor BSA altered the PARG inhibition by JA2131 significantly. (FIG. 16b) JA2131 does not inhibit PARP1. Here in vitro PARP1 auto PARylation was measured in the presence of increasing concentration of either JA2131 or Olaparib. The results show while Olaparib inhibits PARP1 auto-PARylation, JA2131 has no effect. This clearly show JA2131 has no effect in PARP1 therefore is not an inhibitor of PARylation.

FIGS. 17a-c show clonogenic survival assay with different PARGi with PARPi Olaparib. Cells were treated with 10 μM indicated compounds for 1 hour followed by 4 Gy IR and allowed to recover for 14 days. The surviving colonies were fixed with methanol, stained with crystal violet and analyzed using an automated colony counter, GelCount instrument (Oxford Optronix Ltd). Here PC3 cells, which has the highest PARG protein expression show most sensitivity to PARGi 2131. MCF-7 cells with lowest level of PARG has the least JA2131-induced cell-mortality, assessed by the fact there are comparable number of colonies as DMSO treated.

Figures 18A, 18B:
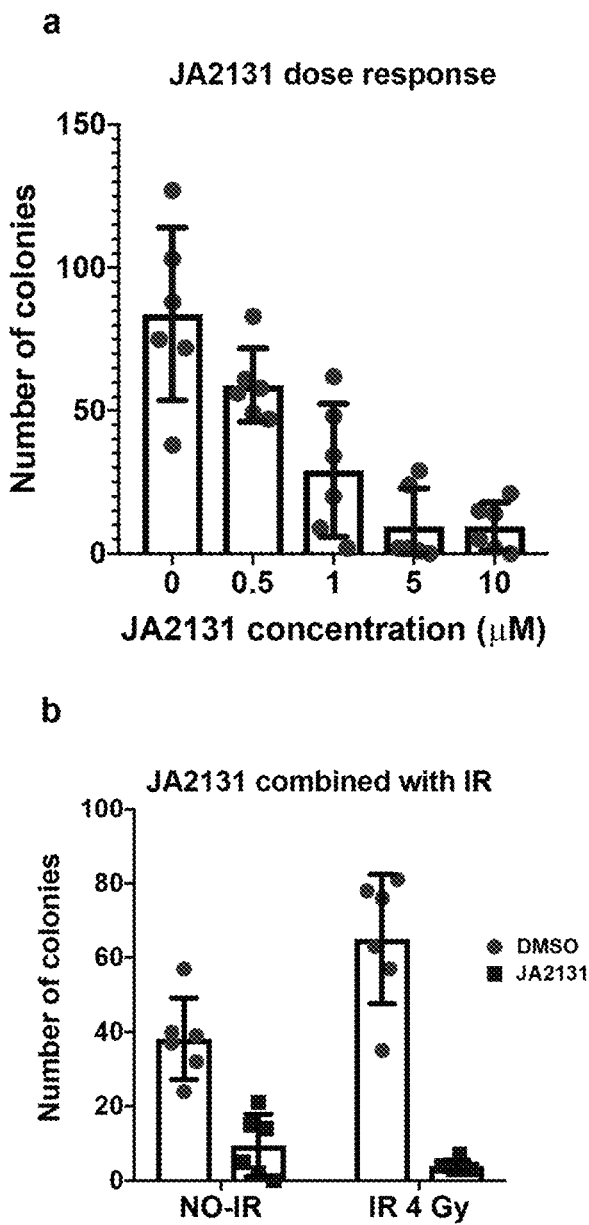

FIGS. 18a & 18b show inhibition of cell-growth by JA2131. (FIG. 18a) Dose-dependent PC3 cells survival in the presence of titrating concentration of JA2131. (FIG. 18b) PC3 cells treated with 10 μM JA2131 or equivalent DMSO then either irradiated with 4 Gy IR or left untreated. Following two weeks surviving colonies were counted and presented.

Figure 19:
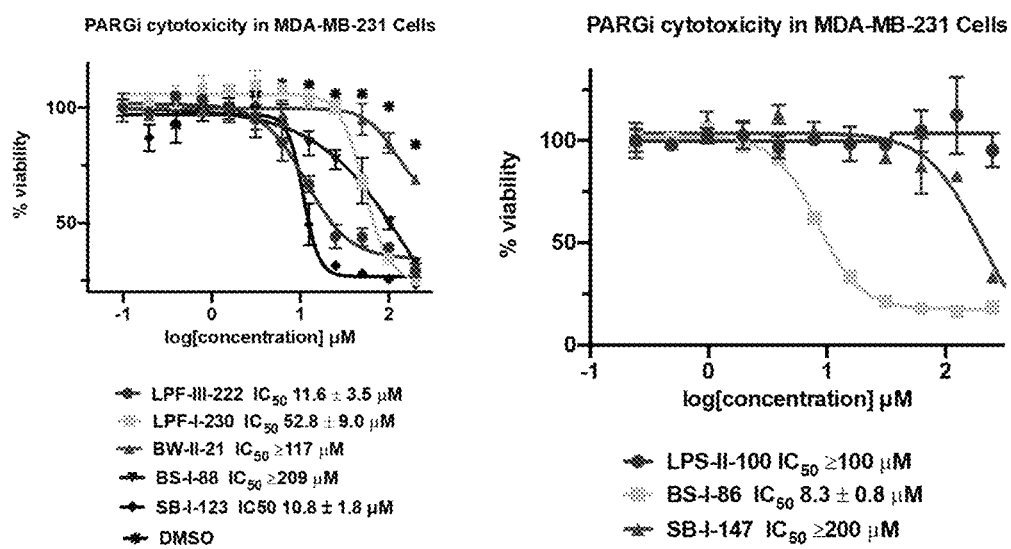

FIG. 19 show SRB cytotoxicity assay for indicated compounds in MDA-MB-231 triple negative breast cancer cells. Serial titration of the indicated compounds in triplicates in 96-well plate. Cells were incubated for 72 hrs. before fixation and SRB staining as described in the materials and methods. Insert table showing $IC_{50}$ determined using SoftMax Pro 7.0 software and 4-parameter data fitting.

FIGS. 20a-f show cytotoxicity and Fork stalling induced by PARGi. (FIG. 20a) Sulforhodamine B assay evaluating cytotoxicity of the indicated compounds. Dose response curves showing surviving PC3 cells following 72 h treatment. Concentration is plotted against the normalized absorbance at 565 nm. Error bars represents standard error. (FIG. 20b) Relative cytotoxicity of JA2031 against the designated DNA damaging agents for A172 glioblastoma cells. Inhibitor treatment and absorbance measurements was done as above (FIG. 20c) A schematic of the dual labeling regime used for the replication fork progression DNA fiber assay and representative DNA fiber images of replication tract from DMSO and JA2131 treated Hela cells. Scale bar 5 μm. (FIG. 20d) Quantification of the IdU tract analysis for more than 380 replication forks. (FIG. 20e) Schematic representation of HU (0.4 μM) treatment for fork progression analysis and the representative DNA fiber image of replication tracts of DMSO and JA2131 treated Hela cells. Scale bar 5 μm. (FIG. 20f) Quantification of the IdU tract of more than 470 replication forks for each data group. Mann-Whitney test was used to generate the p-value. The DNA spread assay is the representation of two independently repeated experiments.

Figures 21A, 21B:
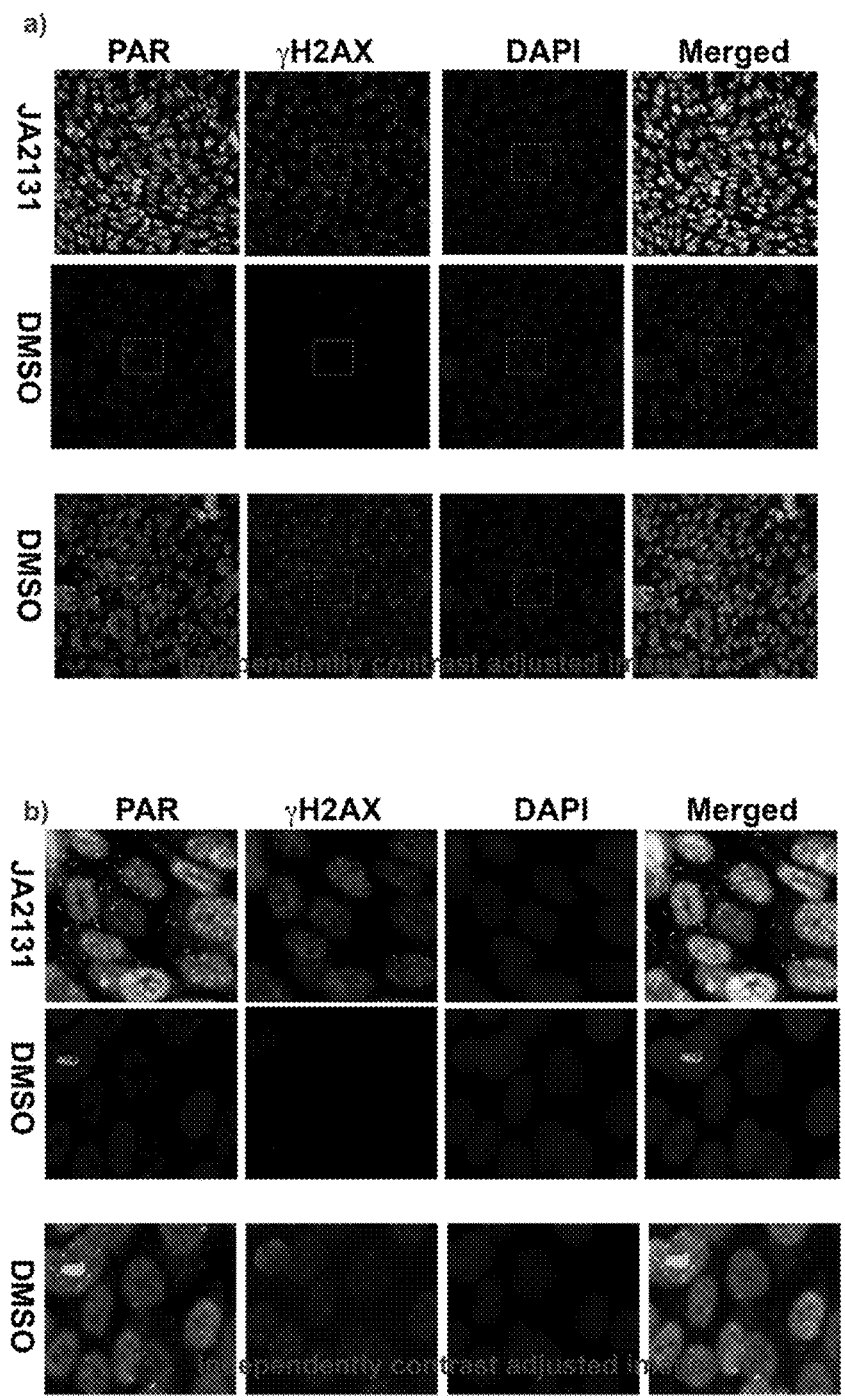

FIGS. 21a & 21b show magnified images that were used for quantitative analysis. (FIG. 21a) Magnified 1×1 image of the denoted * of the 3×3 data on FIG. 13a. The quantitative image with matched contrast with JA2131 and independently contrast adjusted images for DMSO is shown below (FIG. 21b) for the second magnification of the image marked with red box on (FIG. 21a). As above, an independently contrast adjusted DMSO image shown in the bottom.

FIGS. 22a-e show PARGi combined with IR induced a massive increase in cellular PARylation at 100 nM (FIG. 22a). Cells treated with radiation alone shown in lane 1. Cells treated with inhibitor alone, shown in lanes 2-5, did not show the level of PARylation observed when both treatments were combined, see lanes 7-10. (FIG. 22b) MDA-MB-231 control cells and PARG-KD cells were treated with JA2131, then total cell lysates were subjected to immunoblotting with anti-PAR antibody, followed by immunodetection for anti-PARG, PARP1, and Actin antibody. (FIG.

22c) Sulforhodamine B (SRB) cytotoxicity tests in MDA-MB-231 control and PARG-KD cells. (FIG. 22d) Cytotoxic dose of JA2131 in MRC-5 cells is an order of magnitude higher than that seen for MDA-MB-231 cells. (FIG. 22e) shows cellular thermal shift assay (CETSA) on PC3 cells treated with either DMSO or JA2131. JA2131 induced a 9° C. stabilization of PARG proteins in cells (FIG. 22e and FIG. 26) whereas, the PCNA control showed no significant change in thermal stability in response to JA2131 treatment (FIG. 22e).

Figure 23:
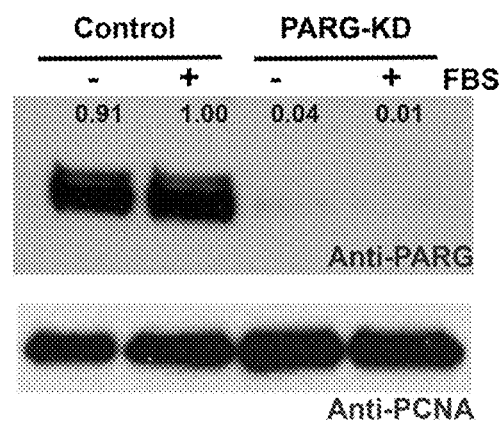

FIG. 23 shows validation of PARG knockdown cells in MDA-MB-231 cells. Cells in normal growth media (+FBS) and under overnight serum starved condition (−FBS) were lysed. Total cell lysates were immunoblotted with anti-PARG antibody then with anti-PCNA as loading control.

Figure 24:
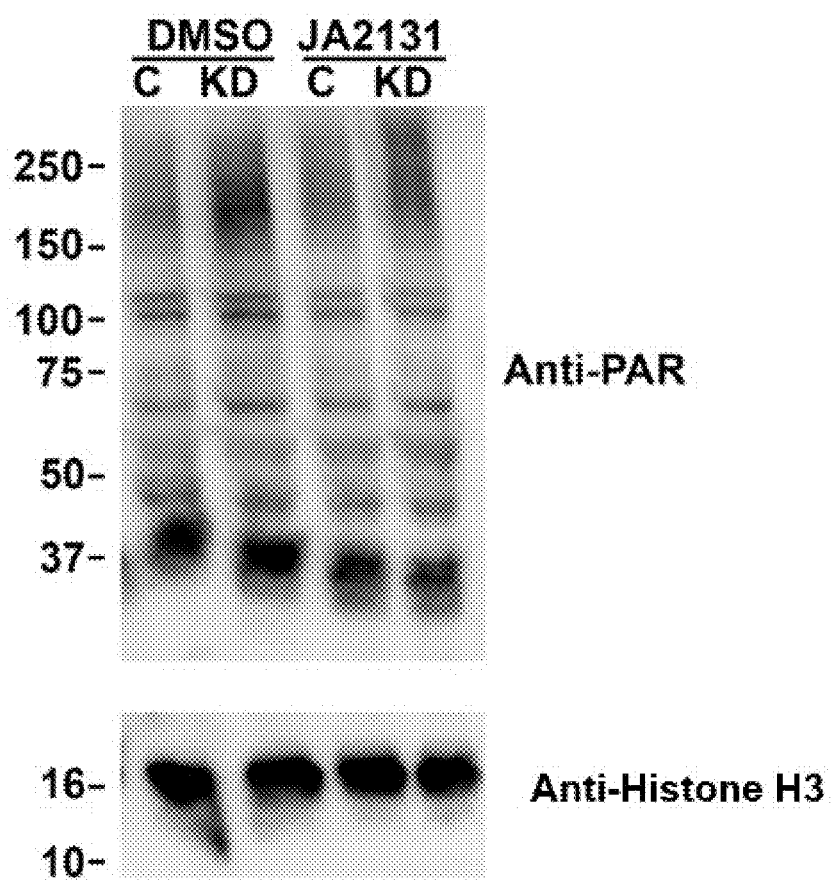

FIG. 24 shows PARylation induced by PARG knockdown in MDA-MB-231 cells. Stable PARG knockdown MDA-MB-231 cells were treated with 5 µM JA2131 for two hours, followed by 7 Gy X-ray and 1 hour recovery. Total lysates were immunoblotted for anti-PAR (upper panel) followed by anti-histone H3 (lower middle). C, Stable MDA-MB-231 cells with scramble shRNA; KD, PARG knockdown stable MDA-MB-231 cells with shPARG.

Figures 25A, 25B:
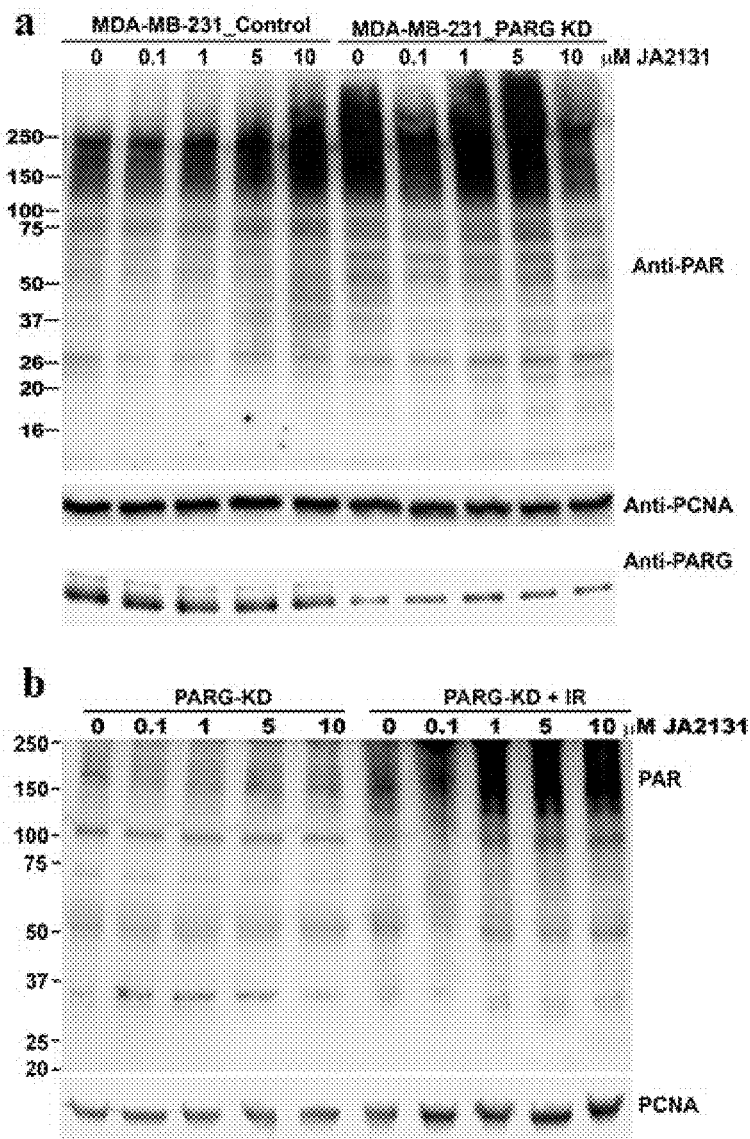

FIGS. 25a & 25b show PARG knockdown cells show reduced JA2131 PAR response. (FIG. 25a) JA2131 dose response comparing control cells with PARG-KD. Cells were treated with indicated concentration of JA2131 for 2 hours before lysis and western blotting analysis. Anti-PCNA antibody was used as loading control and anti-PARG for expression level. (FIG. 25b) The same experiment as outlined with respect to FIG. 25a except cells were treated with 7 Gy IR and recovered for an hour before lysis and western analysis with designated antibody.

Figure 26:
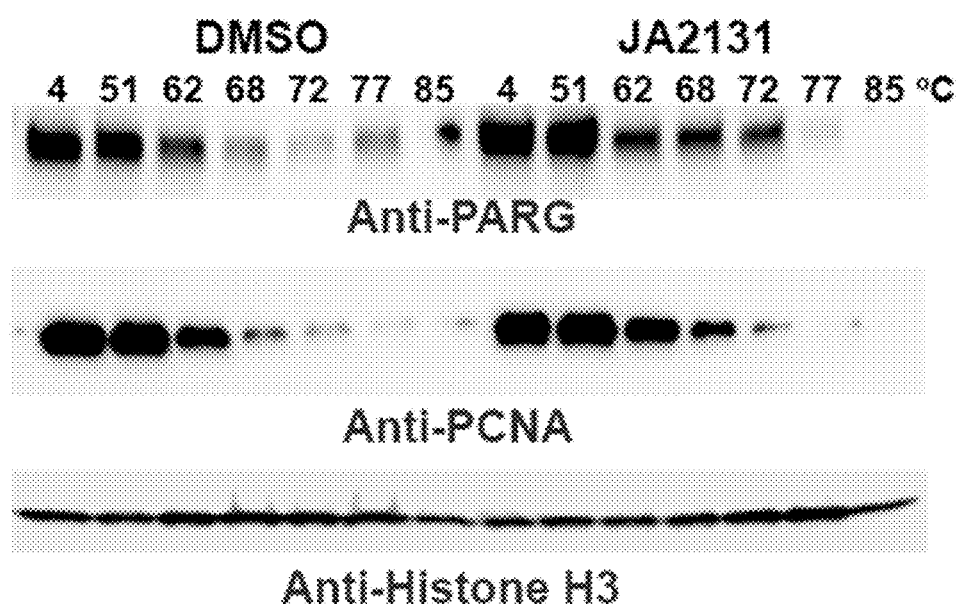

FIG. 26 shows representative CETSA western blots for PARG and PCNA. PC3 cells treated with 10 µM JA2131 or DMSO were temperature shocked as described in the Examples and the resulting non-aggregated proteins were analyzed with Anti-PARG or Anti-PCNA antibody. Anti-Histone H3 was used as loading control.

Figure 27:
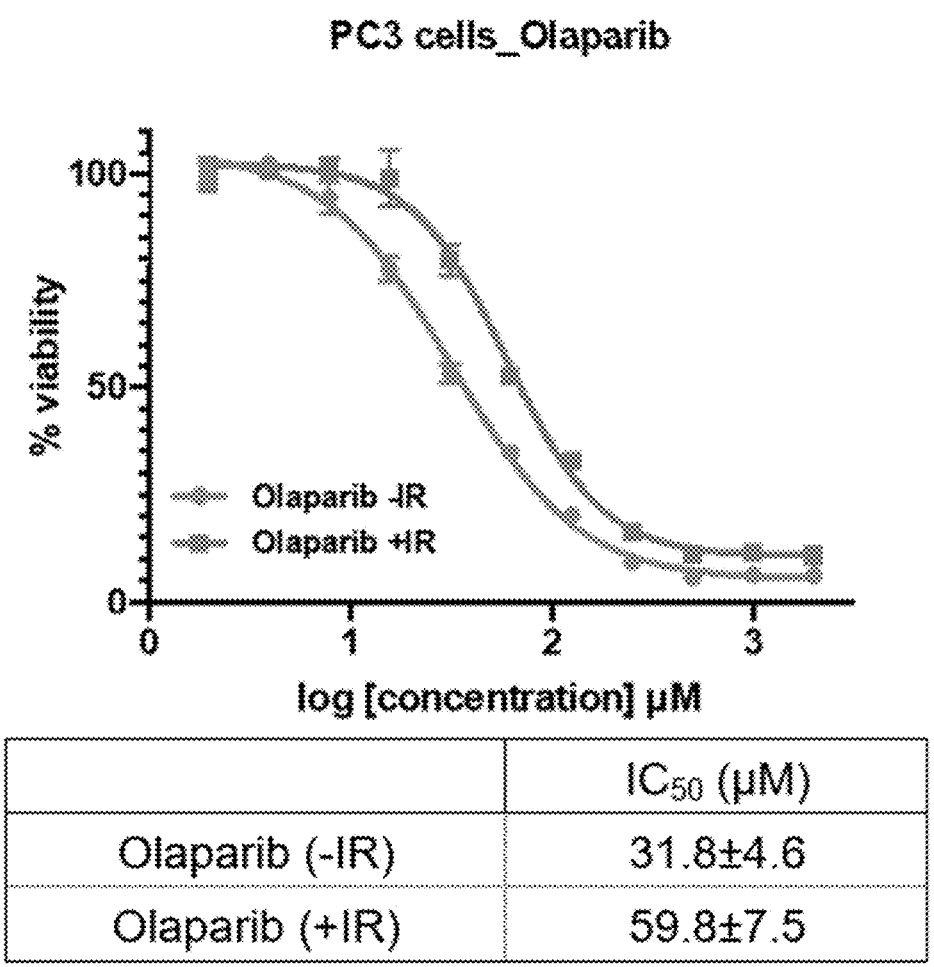

FIG. 27 shows cytotoxicity of Olaparib in PC3 cells. PC3 cells were treated with increasing concentration of Olaparib for an hour and then either treated with 7.0 Gy ionizing radiation (+IR) or left untreated (−IR) for 72 h. SRB assay was performed according to the protocol described in the Examples. Normalized data was fitted with 4-parameter equation in GraphPad Prism 8. The resulting $IC_{50}$ values are shown in the table below the graph. Error bars show the percent coefficient of variation.

Figure 28:
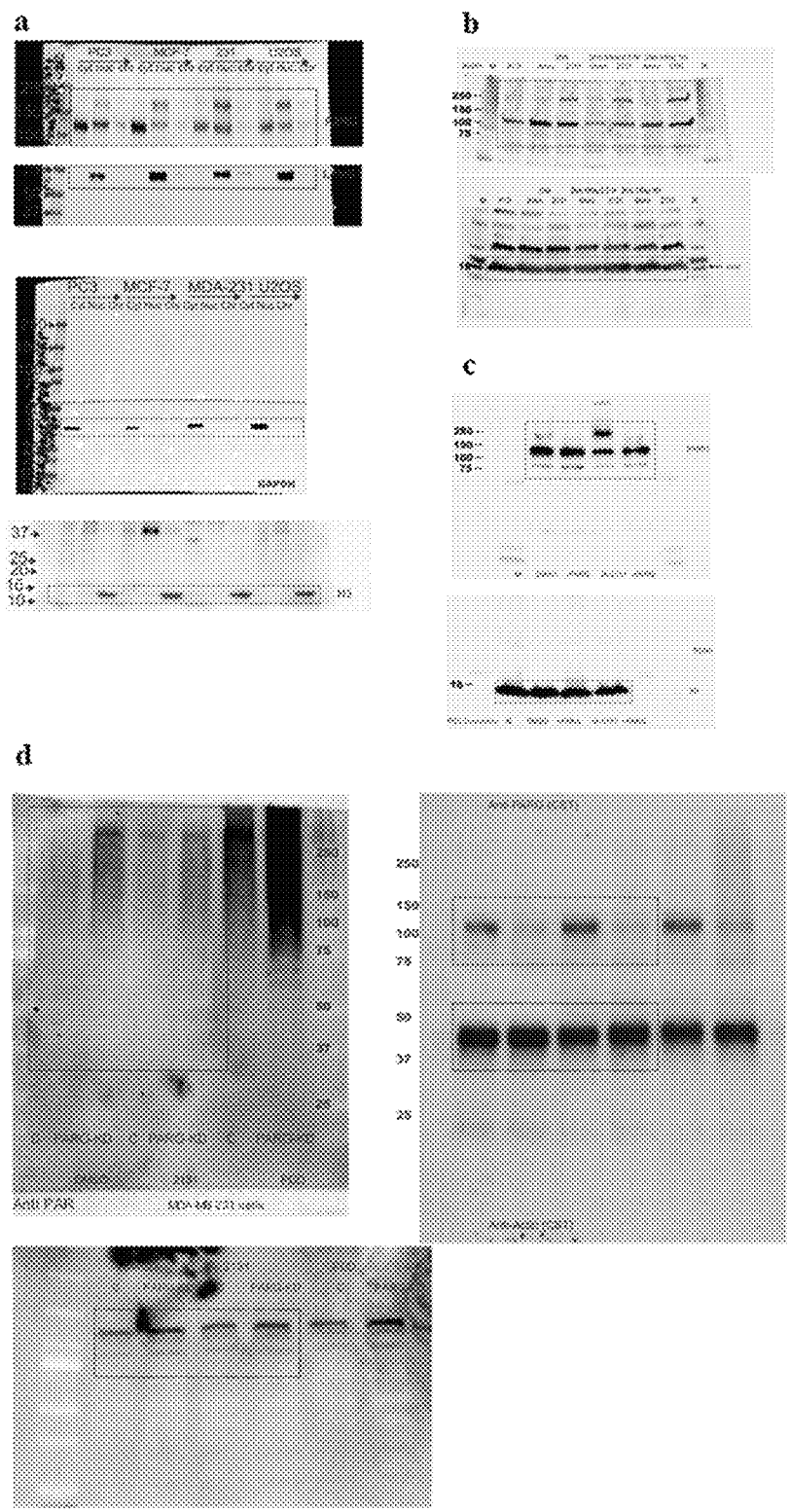

FIGS. 28a-d show un-cropped western blots related to FIG. 11a (FIG. 28a), FIG. 11c (FIG. 28b), FIG. 11d (FIG. 28c), and FIG. 22b (FIG. 28c).

Figure 29:
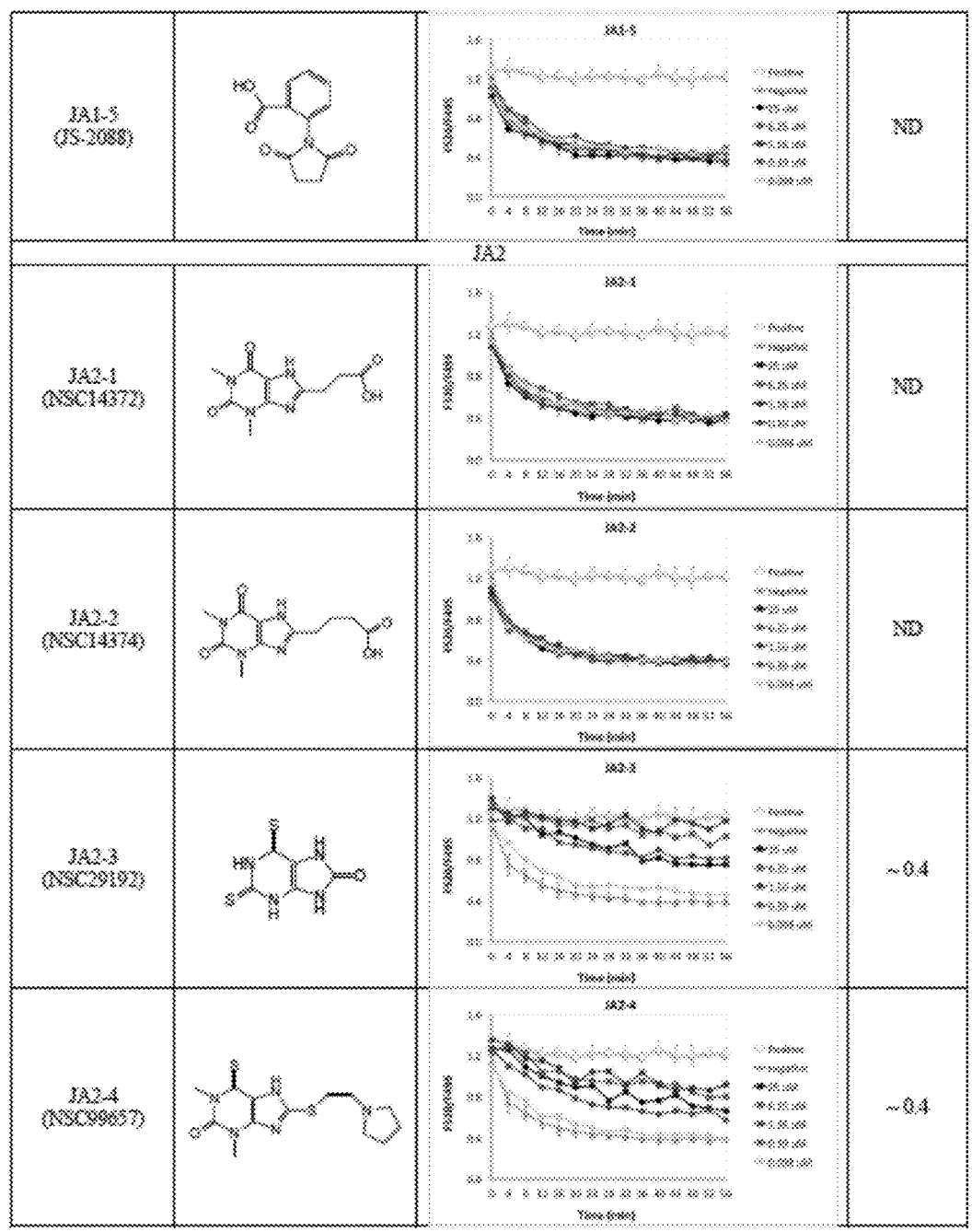
Figure 29:
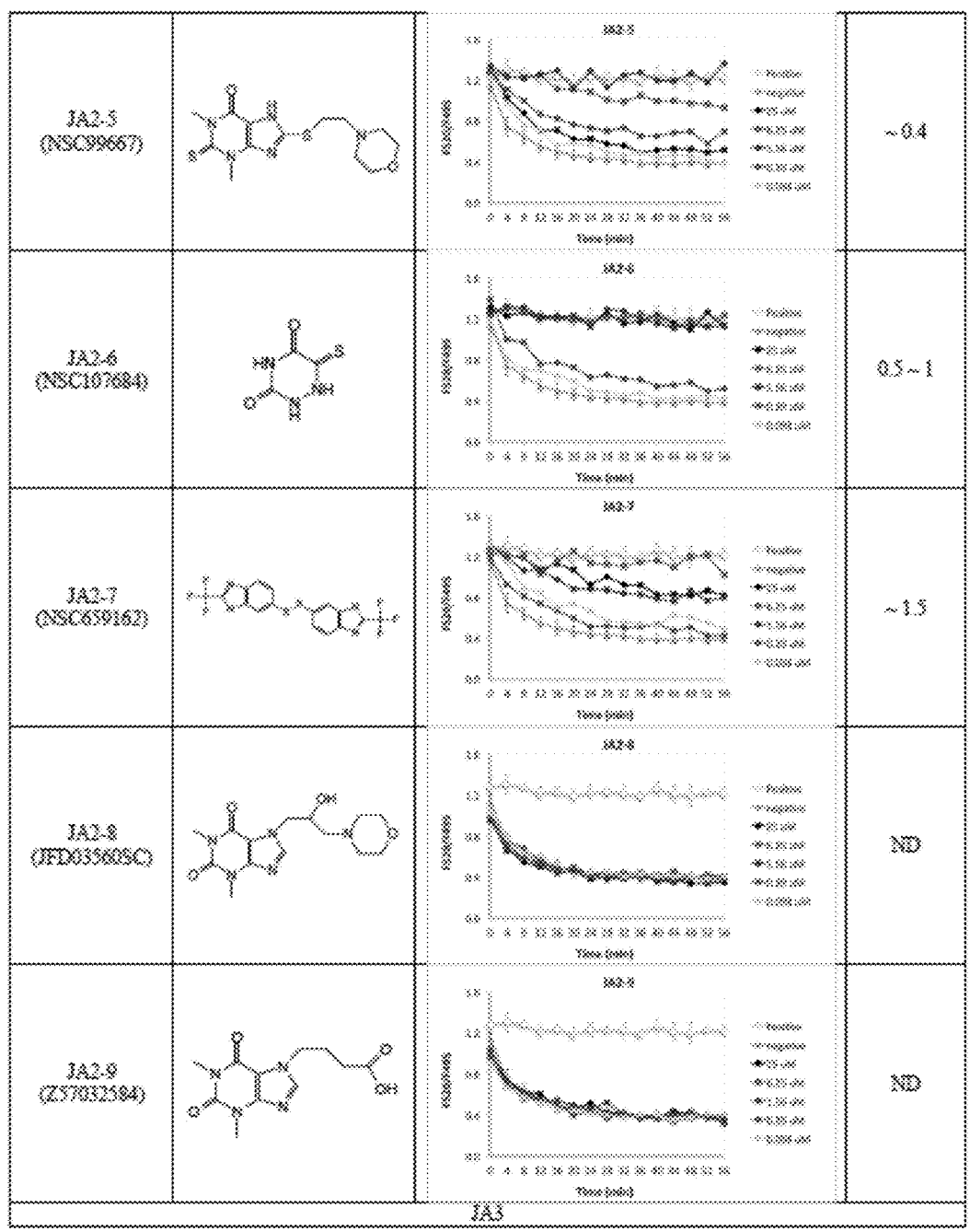
Figure 29:
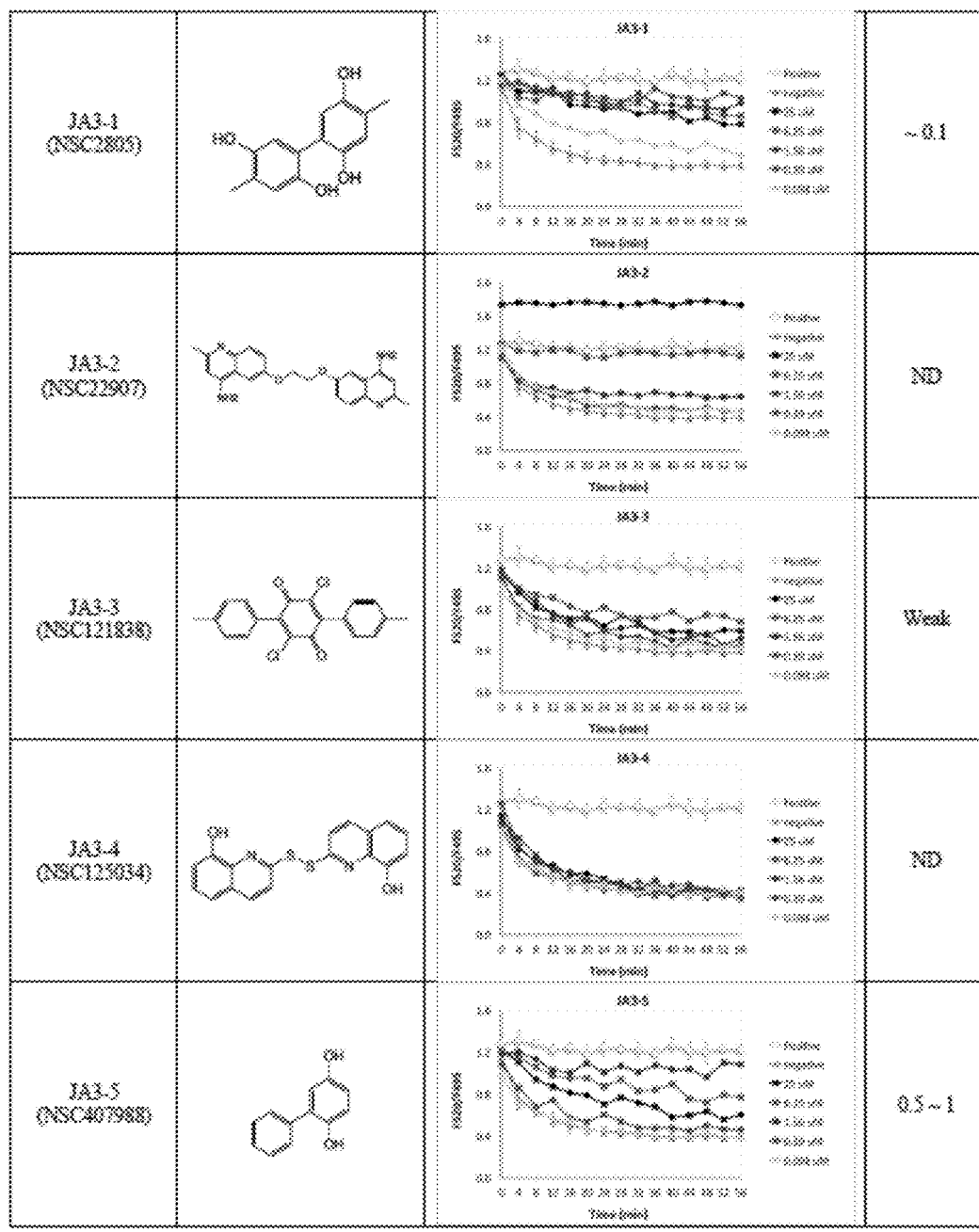
Figure 29:
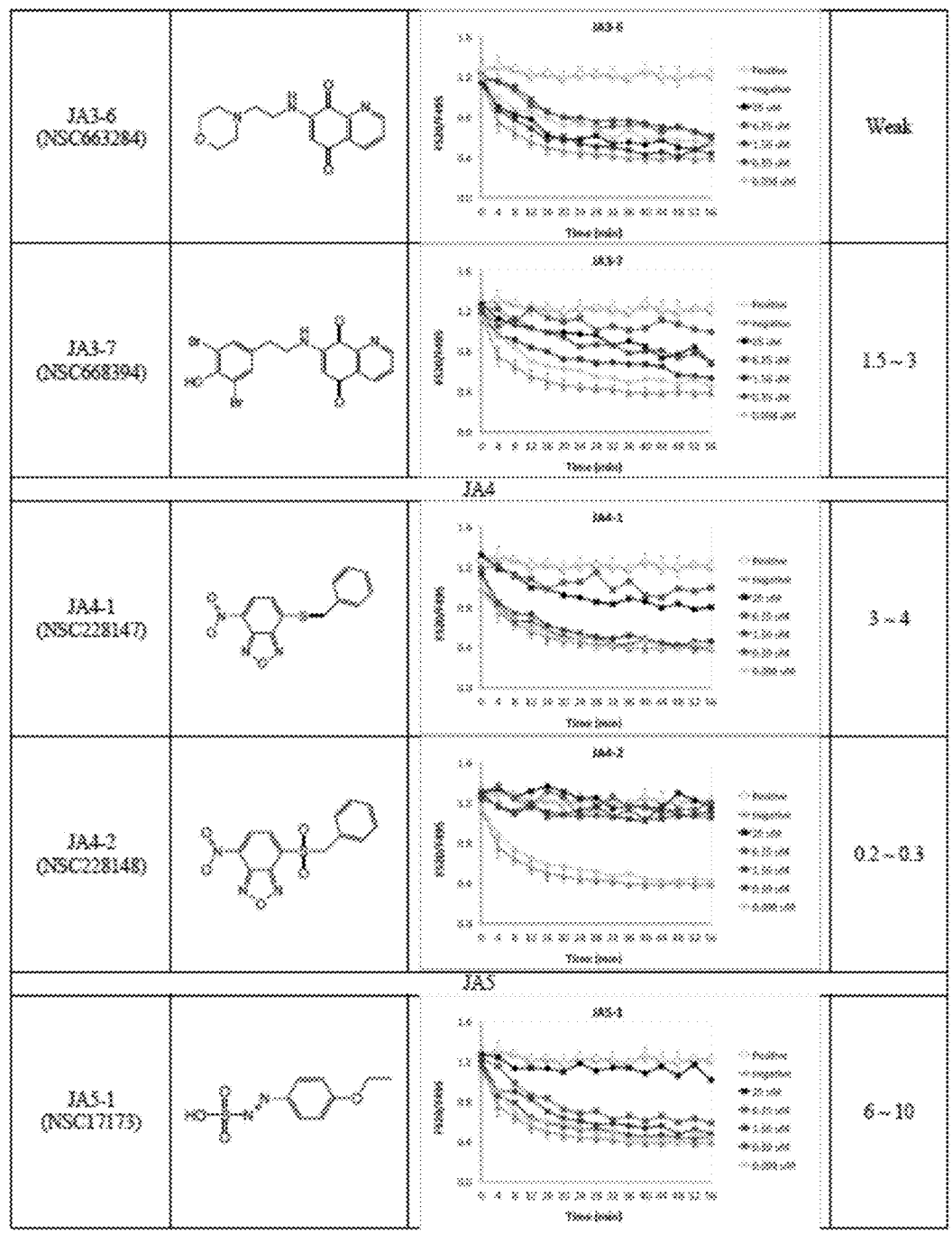
Figure 29:
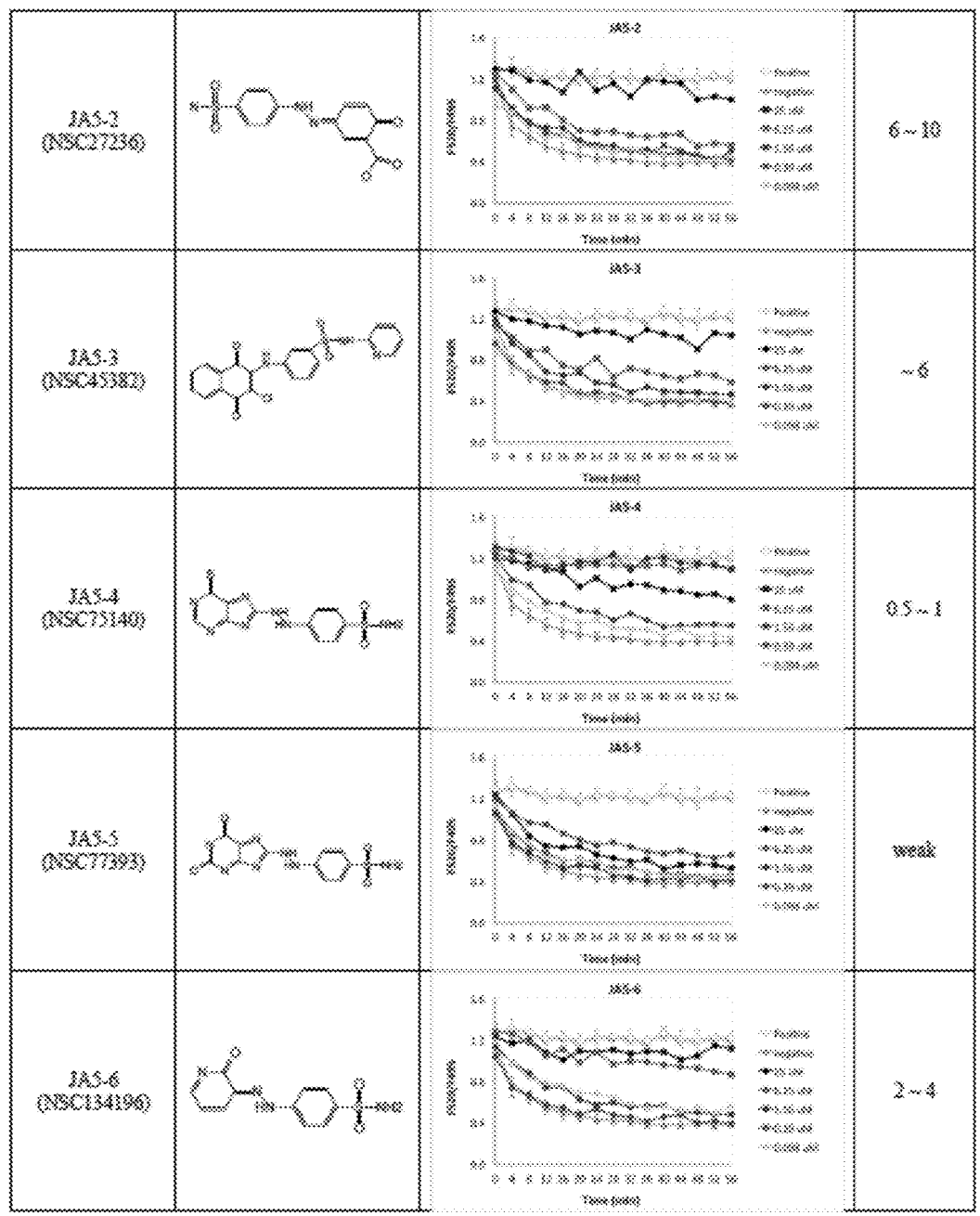
Figure 29:
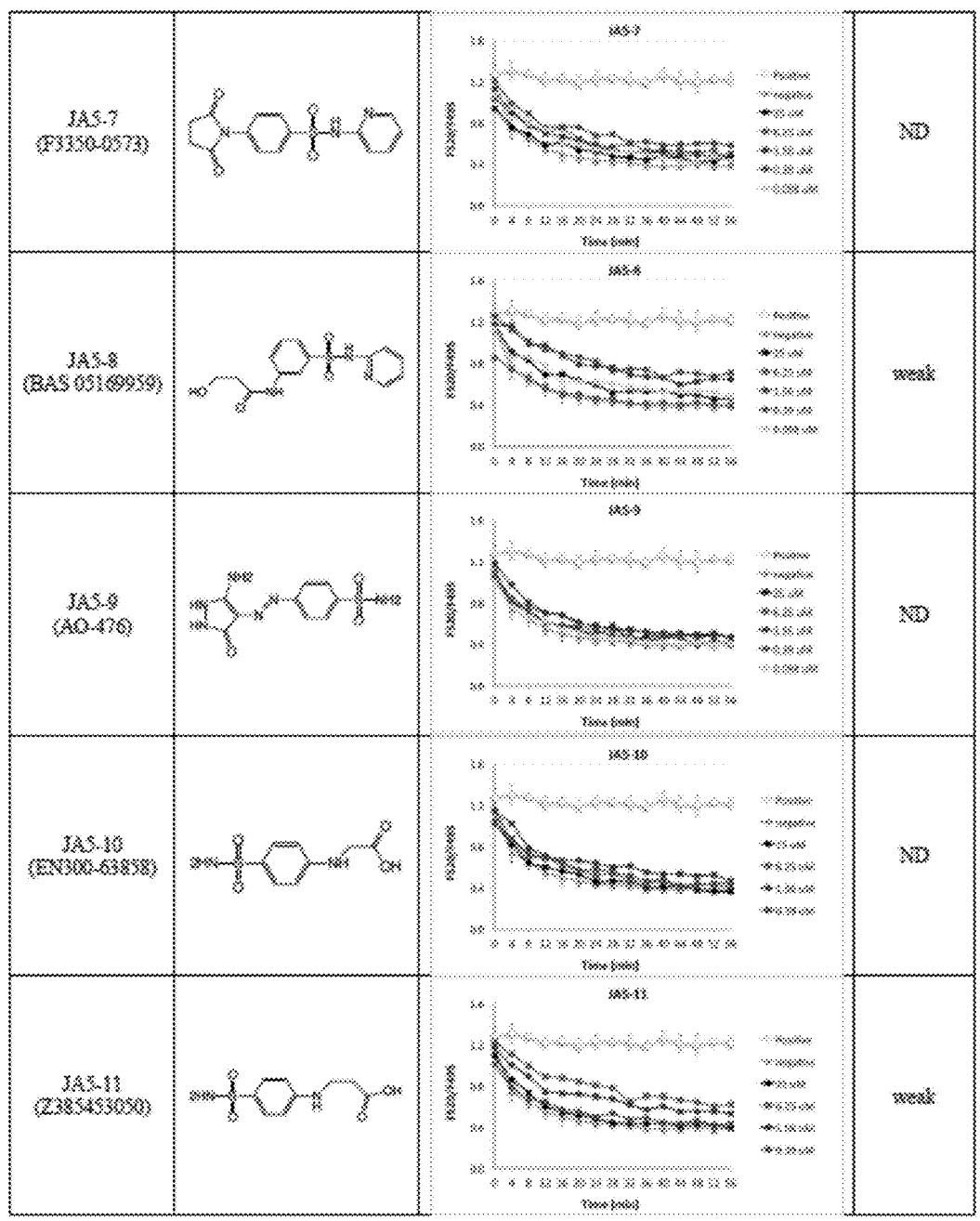

FIG. 29 shows SAR for compounds from five representative chemotypes identified by high-throughput screening.

DETAILED DESCRIPTION

The present disclosure relates to the use of small molecule PARG inhibitors and methods for their use in the treatment and/or prevention of cancer. These compounds may be used to inhibit PARG, including, for example, selective inhibition of PARG. These and other properties, applications, and details are described below.

I. POLY(ADP-RIBOSE)YLATION GLYCOHYDROLASE (PARG)

PARG, a single gene alternatively spliced to generate five isoforms, is an endo- and exo-glycohydrolase that rapidly degrades PAR generated by PARP1 to coordinate DNA repair (Gagne et al., 2006; Min and Wang, 2009). PARG hydrolyzes α(1"-2')O-glycosidic linkages in PAR chains to release ADP-ribose and oligo(ADP-ribose) chains that may signal genotoxic stress. Bacterial, protozoan, and mammalian PARG structures (Slade et al., 2011; Dunstan et al., 2012; Kim et al., 2012; Wang et al., 2014; Tucker et al., 2012; Barkauskaite et al., 2013) reveal a macrodomain fold with conserved active site resides and 'tyrosine clasp' (Tyr clasp) unique to PARG enzymes, which suggest a common mechanism for PAR hydrolysis. However, PARG does not cleave the terminal ADP-ribosyl group linked to the target residue, which is turned over by macrodomain-containing mono(ADP-ribose) (MAR) hydrolases (Sharifi et al., 2013; Rosenthal et al., 2013; Jankevicius et al., 2013). Yet, deletion of all PARG isoforms is embryonically lethal (Koh et al., 2004), and deletion of the nuclear isoform causes sensitivity to alkylating agents and ionizing radiation (Cortes et al., 2004). PARG is recruited to DNA damage sites through interaction with PCNA and PARP1 (Mortusewicz et al., 2011), prevents IR-induced mitotic catastrophe (Ame et al., 2009) and maintains replication fork stability in a BRCA2-dependent manner (Fathers et al., 2012). Conversely, PARG depletion can also prevent replication fork restart (Margalef et al., 2018). PARG genetic knock-down sensitizes various cancer cells to chemotherapeutic agents and radiation (Shirai et al., 2013; Ame et al., 2009; Shirai et al., 2013; Fujihara et al., 2009), and may cause tumor-specific killing in BRCA2-deficient cancer cells (Fathers et al., 2012). In some embodiments, the methods of the present disclosure may be used to inhibit PARG. In some embodiments, the methods of the present disclosure inhibit PARG selectively. In some embodiments, the methods of the present disclosure may inhibit PARG in cells that have intact BRCA1 and BRCA2 genes, such as PC3 cells.

Furthermore, reduced PARG activity can decrease cytotoxicity associated with inflammation, ischemia, and stroke (Min and Wang, 2009; Cuzzocrea et al., 2005) and reduce liver metastases of colon carcinoma (Wang et al., 2019). PARG furthermore regulates proliferation and differentiation of dendritic cells and T cells via PARP/NF-κB in tumour metastases of colon carcinoma (Wang et al., 2012). Yet, PARG inhibition as a therapeutic strategy is directly questioned by reports showing that PARG down regulation enables PARPi resistance in BRCA2 and p53 null mouse cell-line (Gogola et al., 2018) and that PARG deficiency had little impact on BRCA1- and/or PTEN-deficient tumour cells (Noll et al., 2016).

To further clarify these seemingly conflicting reports, the TCGA database was examined and it was found that in most human cancers PARG expression is up regulated, supporting the notion that PARG enzymatic function can be required for tumorigenesis (Marques et al., 2018). In testing PARG inhibition in cancer cells it was found that although existing PARG inhibitors (PARGi) have proven valuable(Shirai et al., 2009; Fujihara et al., 2009; Cuzzocrea et al., 2005; Ray Chaudhuri et al., 2015), issues with potency, bioavailability, rapid clearance, selectivity, or defined mechanism of action can cloud their applications for biology. Reasoning that a bioavailable and specific PARG inhibitor would be an enabling tool, chemical library screening was employed that led to the discovery of the xanthine derivatives of the present disclosure as bioavailable, potent and specific PARG inhibitors. High-resolution crystal structures of human PARG bound to these methylxanthine inhibitors revealed detailed interactions that support a mechanism of competitive inhibition. In particular, it was found that conformational switching of the Tyr clasp that distinguishes PARG from MAR and other glyocohydrolases enables specific engagement of methylxanthine derivatives in the PARG active site. The cell-based assays show effective cellular activity, including PAR accumulation in cells, inhibited PARP1 dePARylation and increased γH2AX foci formation. Indeed, H2AX phosphorylation levels in cells treated with PARGi uncover synergistic strong sensitization to ionizing radiation. Furthermore, PARGi induces replication fork defects resembling those reported with PARG knockdown (Ray Chaudhuri et al., 2015), and causes cellular sensitivity in PARP1-inhibitor resistant cells. In some embodiments, the compounds of the present disclosure are PARG-selective and do not target other cellular glycohydrolases at the relevant doses. The selective inhibitors reveal PARG functions that support and extend previous genetic findings, providing insights into PAR metabolism following IR and establishing these PARGi as enabling tools for investigating PAR biology with potential for advanced therapeutic strategies.

The JA2 series of xanthine/methylxanthine derivatives were the most attractive for several reasons. In some embodiments, these compounds are structurally analogous to the adenine base of ADP-ribose (ADPR), an enzymatic product of PARG, and may be used for site-specific binding. In some embodiments, the compounds of the present disclosure show good bioavailability. For example, three thioxanthine/methylxanthine derivatives (JA2-3/NSC29192, JA2-4/NSC99657, and JA2-5/NSC99667) were among the most potent dose-dependent inhibitors of PARG activity, with $IC_{50}$ values between 0.1 and 1.0 μM (FIG. 2d).

The active JA2-4 series compounds (JA2-4 and JA2131) identified here display multiple complementary features and specific interactions with the hPARG active site, consistent with the observed sub-micromolar $IC_{50}$. These PARGi are small in comparison to most drugs, so provide suitable prototypes that suggest sites for modifications to improve potency and pharmacokinetic properties. Current structural data furthermore reveals the molecular bases of the specific and competitive PARG inhibition by thio-methylxanthine derivatives (FIGS. 2 & 3). From the protein-ligand interactions identified here, the 6'-thio-methylxanthine derivatives JA2-4 and JA2131 compete with the adenine moiety of PAR substrates for active site binding.

The structures furthermore unveil how the hPARG Tyr clasp switches between two conformational states to specifically engage methylxanthine derivatives containing different functional groups. This structural plasticity of the Tyr clasp is a feature accompanying binding of the potent JA2-4 series inhibitors. The Tyr clasp is a unique feature of PARG that is absent in other macrodomains PAR glycohydrolase and ARH3 (Muller-ieckmann et al., 2006) explaining why PARG-KD cells show specific PARG inhibition by JA2131 (FIG. 13a).

Identification and characterization of JA2131 as a selective PARGi enabled direct examination of PARG signaling and the nature of PARP1-PARG relationship in DNA damage responses in cells. Notably, PARP1 is both the main polymerase and acceptor of PAR in response to DNA damage. The present data revealed that PARGi trapped PARPi in a PARylated form (FIG. 4). DePARylated PARP1 showed a single step change in molecular weight that suggests the potential for PARG to act primarily as an endo-glycohydrolase for rapid and efficient removal of PAR chains from PARP1. This would provide an efficient method for alleviating the inhibition of PARP1 imposed by autoPARylation at the DNA damage site. Indeed, this idea is consistent with the observed rapid PARG activity post DNA damage. For the DNA repair nuclease MRE11, specific inhibition of exo- and endonuclease activities aided in defining its role in repair pathway choice of homologous recombination versus non-homologous endjoining (Shibata et al., 2014). For further investigations to elucidate endo- versus exo-ADP glycohydrolase activity of PARG and its effect on PARP1/PARG interaction in cells, the JA2131 inhibitor may prove to be an excellent tool.

PARG inhibition as a therapeutic option is directly questioned by a report showing PARG down regulation as a mechanism for acquiring PARPi resistance in BRCA2 and p53 null mouse cell-line (Gogola et al., 2018). Therefore, PARPi-resistant human breast cancer cell-lines were generated to investigate PARG protein expression. The PARPi-resistant SUM149 human triple negative breast cancer cell-line is BRCA2 and p53 proficient, and any change in PARG protein expression was not observed under these genetic backgrounds. However, PARGi was able to induce PAR accumulation and γH2AX accumulation (FIG. 12). Selective loss of PARG in PARPi resistance may strictly depend on genetic background and possible loss of BRCA2 and p53 tumor suppressor genes. Indeed, PARG importance in cancer progression is underscored by finding that catalytically active PARG leads to poor prognosis and survival while expression of enzymatically-defective PARG played no part in tumor growth (Marques et al., 2018). This is consistent with TCGA database analysis where most tumors show higher PARG expression compared to matched normal tissues (FIG. 1a) and supports the value of a PARGi for cancer therapeutics.

These results identify targetable structural features of PARG that allowed for the identification and optimization of a pharmacologically useful specific inhibitor. This PARGi is selective, cell-permeable, prevents PAR removal by PARG, and kills cancer cells at a level similar to Olaparib. As such, it is may contribute to understanding the roles of PARG and PAR turnover in multiple aspects of DNA damage responses. PARG is a unique mammalian protein without paralogs, in contrast to the human PARP family consisting of 17 related enzymes (Meyer-Ficca et al., 2004). Thus, PARGi may be used to produce fewer off-target effects than PARP inhibitors currently employed as cancer therapeutics. With these points in mind, beyond its use in methods for treating and/or preventing cancer, JA2131 may enable many studies evaluating the potential value of specifically inhibiting PARG in various cancer therapeutic strategies.

II. COMPOUNDS OF THE PRESENT DISCLOSURE

The compounds of the present disclosure may be depicted by a structural formula as shown below in Table 1.

TABLE 1

Compound IDs, structures of the compounds of the present disclosure, and IC$_{50}$ values.

| Compound ID | Structure | IC$_{50}$ (μM) |
|---|---|---|
| LPF-I-35-1 | | >25 |
| LPF-I-83-1 | | >25 |
| LPF-I-27-1 | | >25 |
| LPF-I-51-1 | | >25 |
| LPF-I-53-1 | | 65 |
| LPF-I-68-1 | | >25 |
| LPF-I-64-1 | | >25 |

TABLE 1-continued

Compound IDs, structures of the compounds of the present disclosure, and IC$_{50}$ values.

| Compound ID | Structure | IC$_{50}$ (μM) |
|---|---|---|
| LPF-I-81-1 | | >25 |
| LPF-I-82-1 | | |
| JA2120 | | 25.7 |
| LPF-I-146-1 (i.e., JA 2131) | | 0.4 |
| LPF-I-153-1 | | |

TABLE 1-continued
Compound IDs, structures of the compounds of the present disclosure, and IC$_{50}$ values.
| Compound ID | Structure | IC$_{50}$ (μM) |
|---|---|---|
| LPF-I-157-1 | 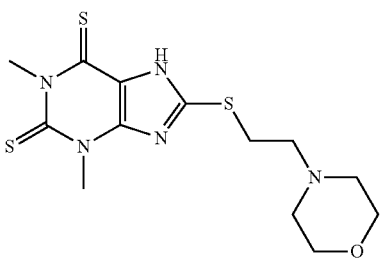 [SMILES: Cn1c(=S)c2[nH]c(SCCN3CCOCC3)nc2n(C)c1=S] | |
| LPF-I-156-1 | 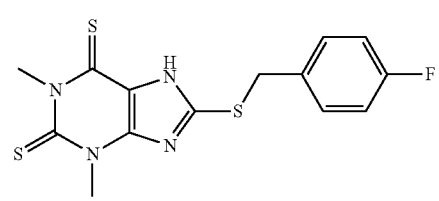 [SMILES: Cn1c(=S)c2[nH]c(SCc3ccc(F)cc3)nc2n(C)c1=S] | |
| BW-I-56 | 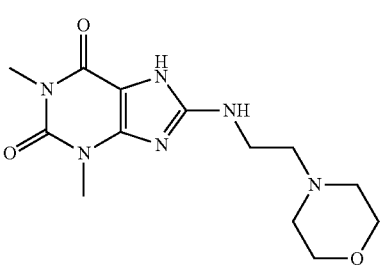 [SMILES: Cn1c(=O)c2[nH]c(NCCN3CCOCC3)nc2n(C)c1=O] | |
| BW-I-45 | 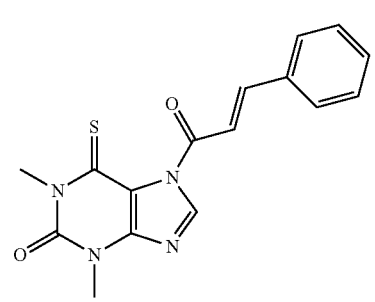 [SMILES: Cn1c(=S)c2c(ncn2C(=O)/C=C/c2ccccc2)n(C)c1=O] | |
| BW-I-8 | 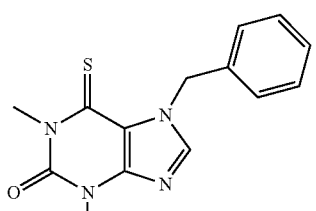 | |
| BW-I-48 | 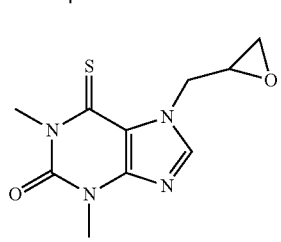 | |

TABLE 1-continued

Compound IDs, structures of the compounds of the present disclosure, and IC$_{50}$ values.

| Compound ID | Structure | IC$_{50}$ (µM) |
|---|---|---|
| BW-I-17 | | |
| BW-I-47 | | |
| LPF-I-175-1 | | |
| LPF-I-177-1 | | |
| LPF-I-178-1 | | |
| LPF-I-179-1 | | |

TABLE 1-continued

Compound IDs, structures of the compounds of the present disclosure, and IC$_{50}$ values.

| Compound ID | Structure | IC$_{50}$ (μM) |
|---|---|---|
| LPF-I-194-1 | | |
| LPF-I-195-1 | | |
| LPF-I-196-1 | | |
| LPF-I-205-1 | | |
| LPF-I-206.1 | | |
| LPF-I-214-1 | | |

TABLE 1-continued

Compound IDs, structures of the compounds of the present disclosure, and IC$_{50}$ values.

| Compound ID | Structure | IC$_{50}$ (µM) |
|---|---|---|
| LPF-I-228-1 | | |
| LPF-I-229-1 | | |
| LPF-I-230-1 | | |
| LPF-I-231-1 | | |
| LPF-I-245-1 | | |
| LPF-I-247-1 | | |

TABLE 1-continued
Compound IDs, structures of the compounds of the present disclosure, and IC$_{50}$ values.
| Compound ID | Structure | IC$_{50}$ (μM) |
|---|---|---|
| LPF-I-249-1 | 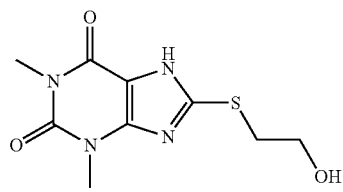 | |
| BW-I-108 | 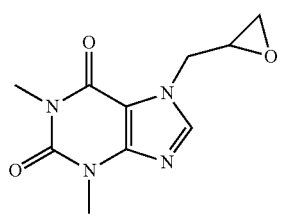 [SMILES: Cn1c(=S)c2c(ncn2CC2CO2)n(C)c1=O] | |
| BW-I-116 | 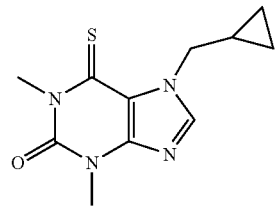 [SMILES: Cn1c(=S)c2c(ncn2CC2CC2)n(C)c1=O] | |
| BW-I-110 | 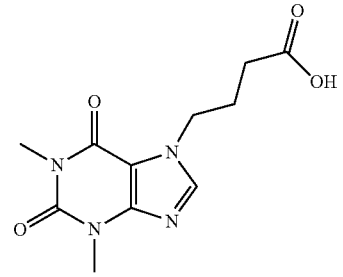 [SMILES: Cn1c(=O)c2c(ncn2CCCC(=O)O)n(C)c1=O] | |
| BW-I-118 (JA2-9) | 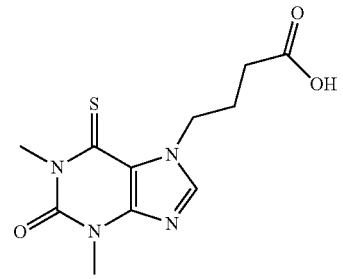 [SMILES: Cn1c(=S)c2c(ncn2CCCC(=O)O)n(C)c1=O] | |
| BW-I-92 | 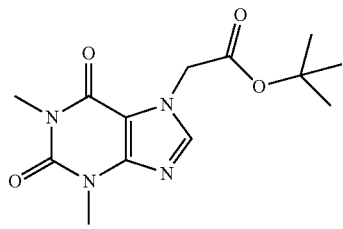 [SMILES: Cn1c(=O)c2c(ncn2CC(=O)OC(C)(C)C)n(C)c1=O] | |

TABLE 1-continued

Compound IDs, structures of the compounds of the present disclosure, and IC$_{50}$ values.

| Compound ID | Structure | IC$_{50}$ (μM) |
|---|---|---|
| BW-I-101 | | |
| BW-I-94 | | |
| BW-I-104 | | |
| BW-I-103 | | |
| BW-I-93 | | |

TABLE 1-continued

Compound IDs, structures of the compounds of the present disclosure, and IC$_{50}$ values.

| Compound ID | Structure | IC$_{50}$ (μM) |
|---|---|---|
| LPF-I-298-1 | | |
| LPF-I-299-1 | | |
| LFP-II-16-1 | | |
| LFP-I-305-1 | | |
| LFP-I-300-1 | | |
| LFP-II-17-1 | | |

TABLE 1-continued

Compound IDs, structures of the compounds of the present disclosure, and IC$_{50}$ values.

| Compound ID | Structure | IC$_{50}$ (μM) |
|---|---|---|
| LFP-II-9-1 | | |
| LPF-II-25-1 | | |
| LPF-II-31-1 | | |
| LPF-II-28-1 | | |
| LPF-II-32-1 | | |
| LPF-II-35-1 | | |
| LPF-II-36-1 | | |

TABLE 1-continued
Compound IDs, structures of the compounds of the present disclosure, and IC$_{50}$ values.
| Compound ID | Structure | IC$_{50}$ (μM) |
|---|---|---|
| LPF-II-38-1 | 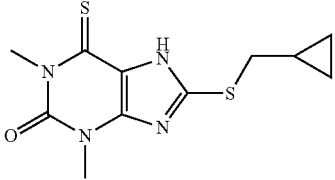 [SMILES: Cn1c(=S)c2[nH]c(SCC3CC3)nc2n(C)c1=O] | |
| LPF-II-40-1 | 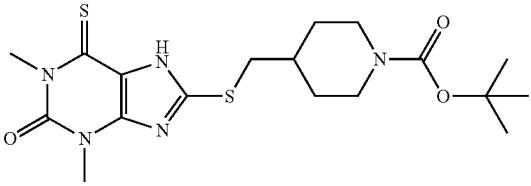 [SMILES: Cn1c(=S)c2[nH]c(SCC3CCN(C(=O)OC(C)(C)C)CC3)nc2n(C)c1=O] | |
| LPF-II-42-1 | 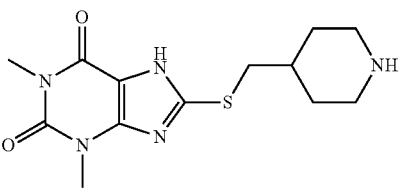 HCl | |
| LPF-II-43-1 | 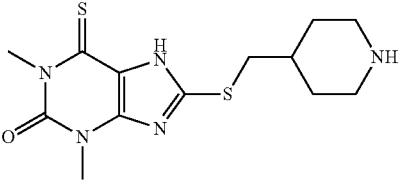 HCl | |
| LPF-II-62-2 | 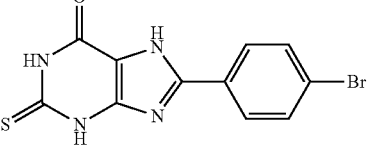 | |
| LPF-II-63-2 | 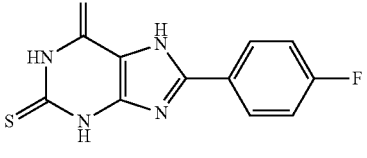 | |
| LPF-II-64-2 | 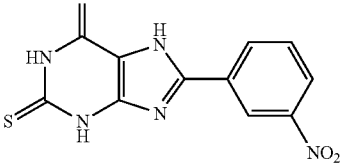 | |

TABLE 1-continued

Compound IDs, structures of the compounds of the present disclosure, and IC$_{50}$ values.

| Compound ID | Structure | IC$_{50}$ (µM) |
|---|---|---|
| LPF-II-65-2 | | |
| LPF-II-68-2 | | |
| LPF-II-69-2 | | |
| LPF-II-70-1 | | |
| LPF-II-71-1 | | |
| LPF-II-75-1 | | |
| LPF-II-78-2 | | |

TABLE 1-continued

Compound IDs, structures of the compounds of the present disclosure, and IC$_{50}$ values.

| Compound ID | Structure | IC$_{50}$ (μM) |
|---|---|---|
| LPF-II-80-2 | | |
| LPF-II-81-1 | | |
| BW-I-131-1 | | |
| BW-I-135-1 | | |
| BW-I-145-1 | | |
| LPS-II-99-1 | | |

TABLE 1-continued

Compound IDs, structures of the compounds of the present disclosure, and IC$_{50}$ values.

| Compound ID | Structure | IC$_{50}$ (µM) |
|---|---|---|
| LPS-II-100-1 | | |
| LPS-II-101-1 | | |
| LPS-II-102-1 | | |
| LPS-II-103-1 | | |
| LPS-II-104-1 | | |
| LPS-II-107-1 | | |

TABLE 1-continued

Compound IDs, structures of the compounds of the present disclosure, and IC$_{50}$ values.

| Compound ID | Structure | IC$_{50}$ (μM) |
|---|---|---|
| LPS-II-109-1 | | |
| LPS-II-110-1 | | |
| LPS-II-112-1 | | |
| LPS-II-115-1 | | |
| LPS-II-116-1 | | |
| LPS-II-118-1 | | |
| LPS-II-120-1 | | |

TABLE 1-continued
Compound IDs, structures of the compounds of the present disclosure, and IC$_{50}$ values.
| Compound ID | Structure | IC$_{50}$ (μM) |
|---|---|---|
| LPS-II-124-1 | 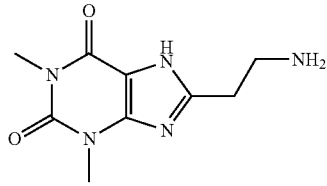 [SMILES: Cn1c(=O)c2[nH]c(CCN)nc2n(C)c1=O] | |
| LPS-II-125-1 | 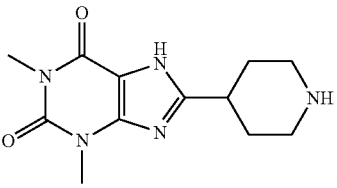 [SMILES: Cn1c(=O)c2[nH]c(C3CCNCC3)nc2n(C)c1=O] | |
| LPS-II-126-1 | 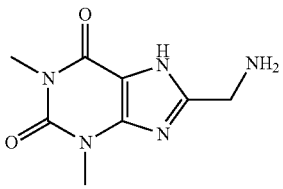 | |
| LPS-II-127-1 | 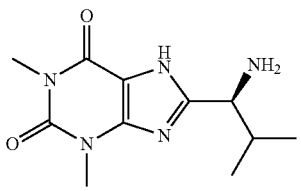 [SMILES: CC(C)[C@H](N)c1nc2c([nH]1)c(=O)n(C)c(=O)n2C] | |
| LPS-II-128-1 | 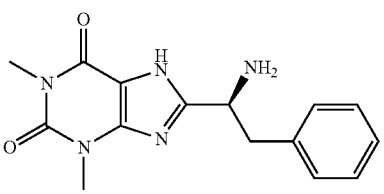 [SMILES: Cn1c(=O)c2[nH]c([C@@H](N)Cc3ccccc3)nc2n(C)c1=O] | |
| LPS-II-130-1 | 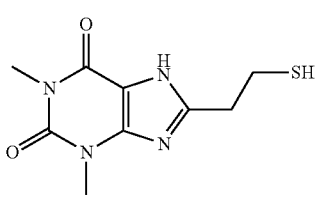 [SMILES: Cn1c(=O)c2[nH]c(CCS)nc2n(C)c1=O] | |
| LPS-II-131-1 | 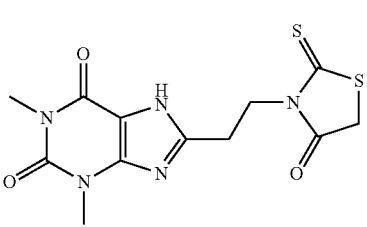 [SMILES: Cn1c(=O)c2[nH]c(CCN3C(=O)CSC3=S)nc2n(C)c1=O] | |

TABLE 1-continued

Compound IDs, structures of the compounds of the present disclosure, and $IC_{50}$ values.

| Compound ID | Structure | $IC_{50}$ ($\mu M$) |
|---|---|---|
| LPS-II-142-1 | | |
| LPS-II-143-1 | | |
| LPS-II-144-1 | | |
| LPS-II-183-1 | | |
| LPS-II-184-1 | | |
| LPS-II-185-1 | | |

TABLE 1-continued
Compound IDs, structures of the compounds of the present disclosure, and $IC_{50}$ values.
| Compound ID | Structure | $IC_{50}$ (μM) |
|---|---|---|
| LPS-II-186-1 | 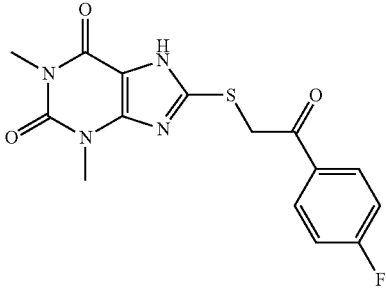 [SMILES: Cn1c(=O)c2[nH]c(SCC(=O)c3ccc(F)cc3)nc2n(C)c1=O] | |
| LPS-II-187-1 | 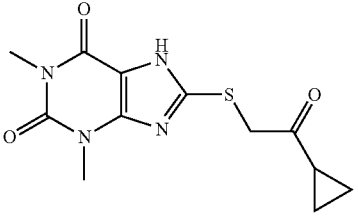 [SMILES: Cn1c(=O)c2[nH]c(SCC(=O)C3CC3)nc2n(C)c1=O] | |
| LPS-II-188-1 | 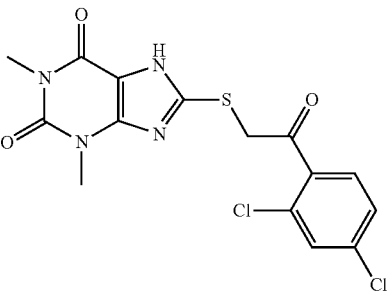 [SMILES: Cn1c(=O)c2[nH]c(SCC(=O)c3ccc(Cl)cc3Cl)nc2n(C)c1=O] | |
| LPS-II-189-1 | 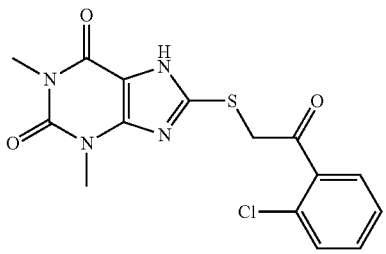 [SMILES: Cn1c(=O)c2[nH]c(SCC(=O)c3ccccc3Cl)nc2n(C)c1=O] | |
| LPS-II-190-1 | 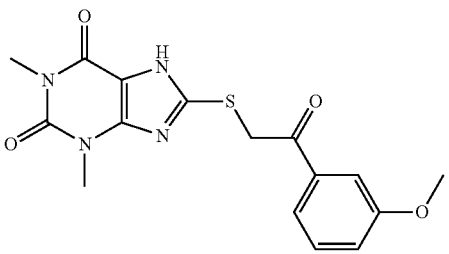 [SMILES: COc1cccc(C(=O)CSc2nc3c([nH]2)c(=O)n(C)c(=O)n3C)c1] | |

TABLE 1-continued

Compound IDs, structures of the compounds of the present disclosure, and IC$_{50}$ values.

| Compound ID | Structure | IC$_{50}$ (μM) |
|---|---|---|
| LPS-II-191-1 | | |
| LPS-II-192-1 | | |
| LPS-II-193-1 | | |
| LPS-II-194-1 | | |
| LPS-II-195-1 | | |

TABLE 1-continued
Compound IDs, structures of the compounds of the present disclosure, and IC$_{50}$ values.
| Compound ID | Structure | IC$_{50}$ (µM) |
|---|---|---|
| LPS-II-196-1 | 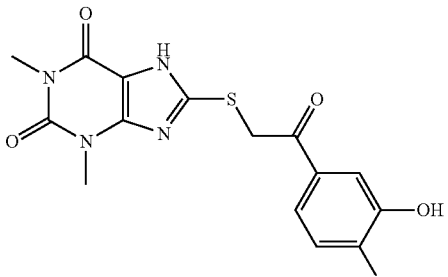 | |
| LPS-II-197-1 | 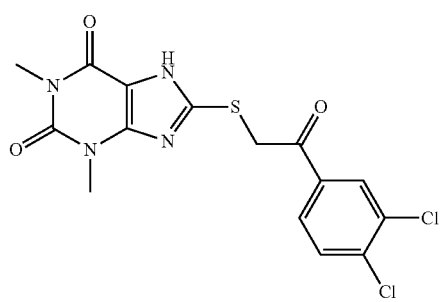 [SMILES: Cn1c(=O)c2[nH]c(SCC(=O)c3ccc(Cl)c(Cl)c3)nc2n(C)c1=O] | |
| LPS-II-198-1 | 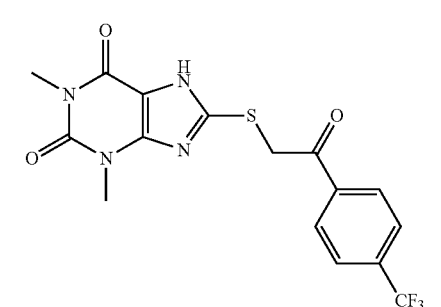 | |
| LPS-II-202-1 | 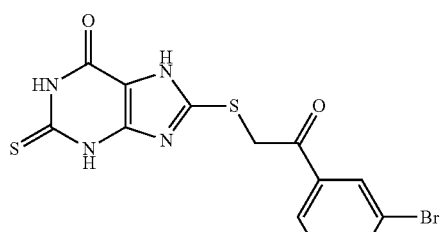 | |
| LPS-II-203-1 | 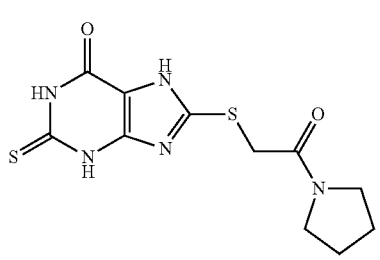 [SMILES: O=C(CSc1nc2[nH]c(=S)[nH]c(=O)c2[nH]1)N1CCCC1] | |

TABLE 1-continued

Compound IDs, structures of the compounds of the present disclosure, and IC$_{50}$ values.

| Compound ID | Structure | IC$_{50}$ (μM) |
|---|---|---|
| LPS-II-204-1 | | |
| LPS-II-205-1 | | |
| LPS-II-206-1 | | |
| LPS-II-207-1 | | |
| LPS-II-208-1 | | |

TABLE 1-continued
Compound IDs, structures of the compounds of the present disclosure, and $IC_{50}$ values.
| Compound ID | Structure | $IC_{50}$ ($\mu M$) |
|---|---|---|
| LPS-II-209-1 | 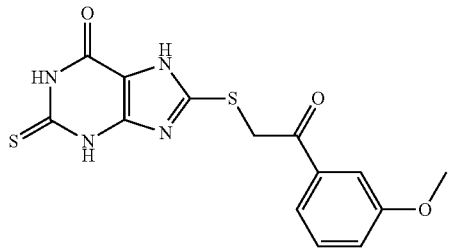 [SMILES: COc1cccc(C(=O)CSc2nc3[nH]c(=S)[nH]c(=O)c3[nH]2)c1] | |
| LPS-II-210-1 | 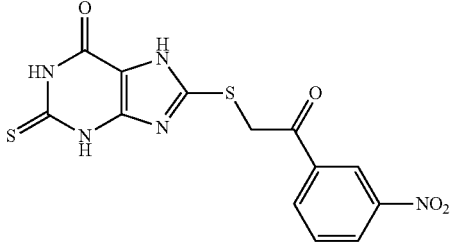 [SMILES: O=C(CSc1nc2[nH]c(=S)[nH]c(=O)c2[nH]1)c1cccc([N+](=O)[O-])c1] | |
| LPS-II-241-1 | 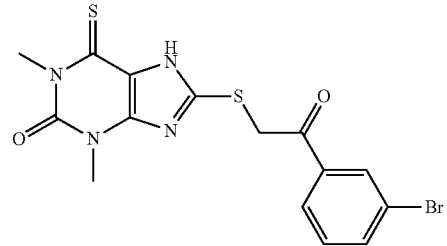 [SMILES: Cn1c(=S)c2[nH]c(SCC(=O)c3cccc(Br)c3)nc2n(C)c1=O] | |
| LPS-II-242-1 | 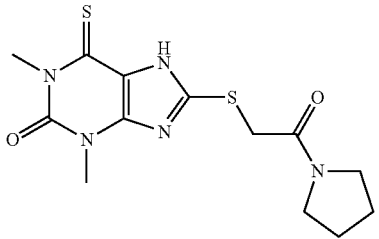 [SMILES: Cn1c(=S)c2[nH]c(SCC(=O)N3CCCC3)nc2n(C)c1=O] | |
| LPS-II-243-1 | 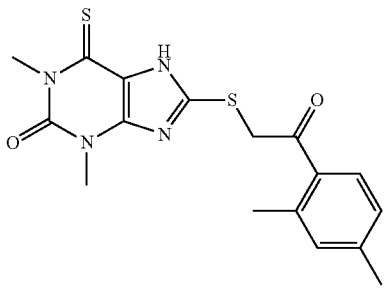 [SMILES: Cc1ccc(C(=O)CSc2nc3c([nH]2)c(=S)n(C)c(=O)n3C)c(C)c1] | |

TABLE 1-continued
Compound IDs, structures of the compounds of the present disclosure, and IC$_{50}$ values.
| Compound ID | Structure | IC$_{50}$ (μM) |
|---|---|---|
| LPS-II-244-1 | 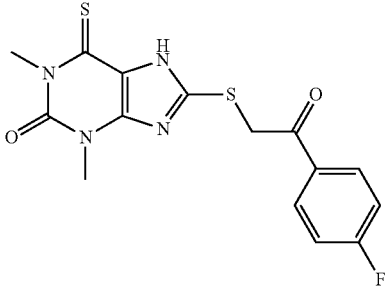 [SMILES: Cn1c(=S)c2[nH]c(SCC(=O)c3ccc(F)cc3)nc2n(C)c1=O] | |
| LPS-II-245-1 | 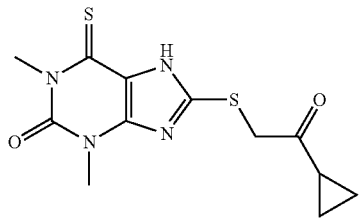 | |
| LPS-II-246-1 | 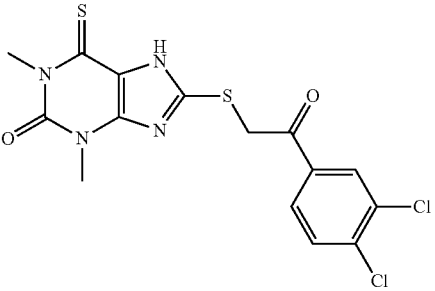 [SMILES: Cn1c(=S)c2[nH]c(SCC(=O)c3ccc(Cl)c(Cl)c3)nc2n(C)c1=O] | |
| LPS-II-247-1 | 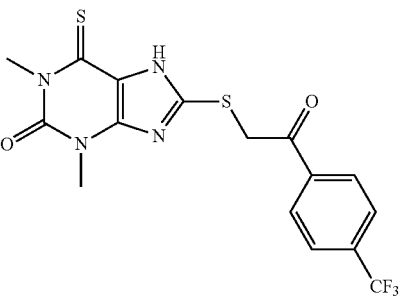 | |
| LPS-II-222-1 | 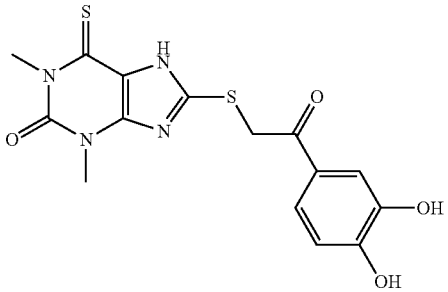 [SMILES: Cn1c(=S)c2[nH]c(SCC(=O)c3ccc(O)c(O)c3)nc2n(C)c1=O] | |

TABLE 1-continued

Compound IDs, structures of the compounds of the present disclosure, and IC$_{50}$ values.

| Compound ID | Structure | IC$_{50}$ (μM) |
|---|---|---|
| LPS-II-248-1 | | |
| LPS-II-224-1 | | |
| LPS-II-225-1 | | |
| LPS-II-226-1 | | |
| LPS-II-227-1 | | |

TABLE 1-continued
Compound IDs, structures of the compounds of the present disclosure, and IC$_{50}$ values.
| Compound ID | Structure | IC$_{50}$ (μM) |
|---|---|---|
| LPS-II-228-1 | 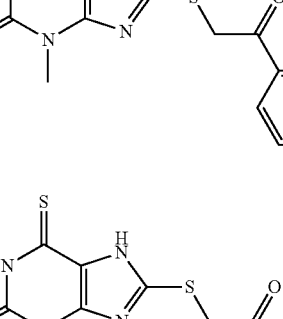 | |
| LPS-II-229-1 | 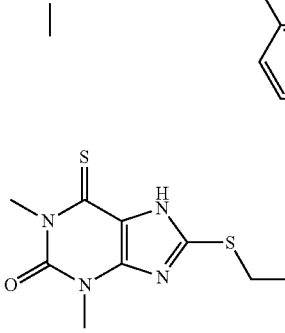 | |
| LPS-II-230-1 | 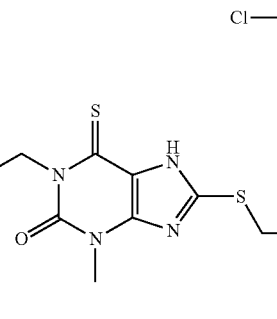 | |
| LPS-II-240-1 | 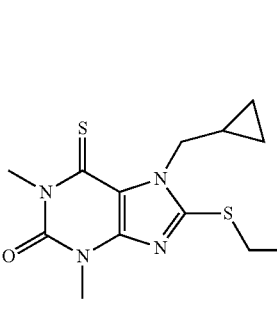 | |
| LPS-II-252-1 |  | |

TABLE 1-continued
Compound IDs, structures of the compounds of the present disclosure, and IC$_{50}$ values.
| Compound ID | Structure | IC$_{50}$ (μM) |
|---|---|---|
| LPS-II-253-1 | 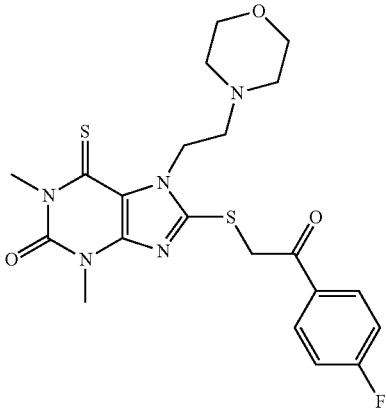 [SMILES: Cn1c(=S)c2c(nc(SCC(=O)c3ccc(F)cc3)n2CCN2CCOCC2)n(C)c1=O] | |
| LPS-II-254-1 | 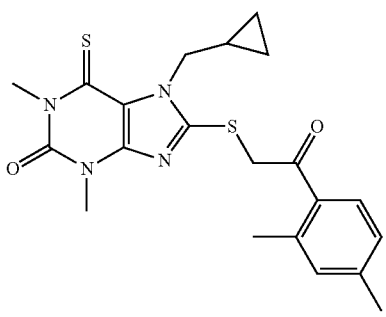 [SMILES: Cc1ccc(C(=O)CSc2nc3c(c(=S)n(C)c(=O)n3C)n2CC2CC2)c(C)c1] | |
| JA2-3 | 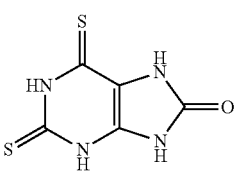 [SMILES: O=c1[nH]c2[nH]c(=S)[nH]c(=S)c2[nH]1] | 0.1 |
| JA2-2 | 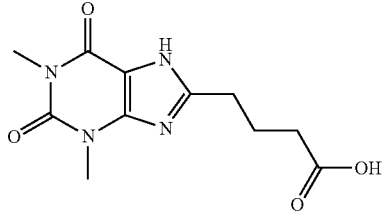 [SMILES: Cn1c(=O)c2[nH]c(CCCC(=O)O)nc2n(C)c1=O] | >100 |
| JA2-9 | 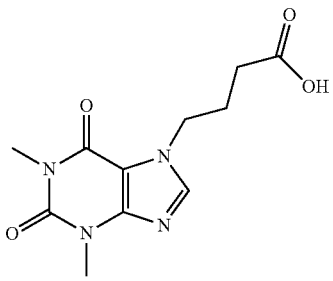 [SMILES: Cn1c(=O)c2c(ncn2CCCC(=O)O)n(C)c1=O] | >100 |

TABLE 1-continued

Compound IDs, structures of the compounds of the present disclosure, and IC$_{50}$ values.

| Compound ID | Structure | IC$_{50}$ (μM) |
|---|---|---|
| JA2-4 | | 0.9 |
| JA2-5 | | 1 |
| LPS-II-159-1 | | |
| LPS-II-160-1 | | |
| LPS-II-161-1 | | |
| LPS-II-162-1 | | |
| LPS-II-163-1 | | |

TABLE 1-continued
Compound IDs, structures of the compounds of the present disclosure, and IC$_{50}$ values.
| Compound ID | Structure | IC$_{50}$ (µM) |
|---|---|---|
| LPS-II-250-1 | 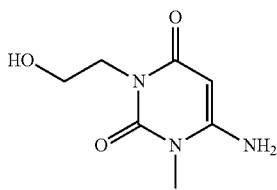 | |
| LPS-II-255-1 | 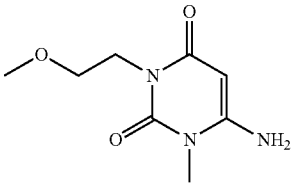 | |
| LPS-II-259-1 | 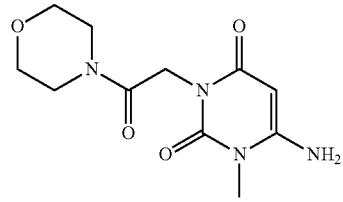 [SMILES: Cn1c(N)cc(=O)n(CC(=O)N2CCOCC2)c1=O] | |
| LPS-II-260-1 | 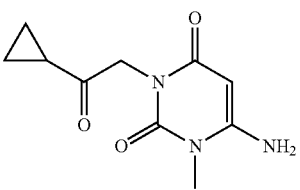 [SMILES: Cn1c(N)cc(=O)n(CC(=O)C2CC2)c1=O] | |
| LPF-IV-159-1 | 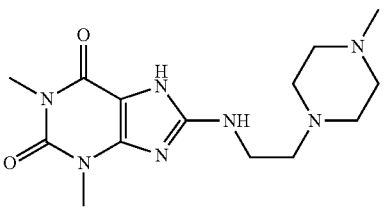 [SMILES: CN1CCN(CCNc2nc3c([nH]2)c(=O)n(C)c(=O)n3C)CC1] | |
| LPF-IV-147-1 | 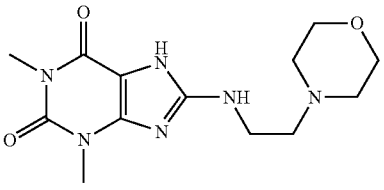 [SMILES: Cn1c(=O)c2[nH]c(NCCN3CCOCC3)nc2n(C)c1=O] | |
| LPF-IV-172-1 | 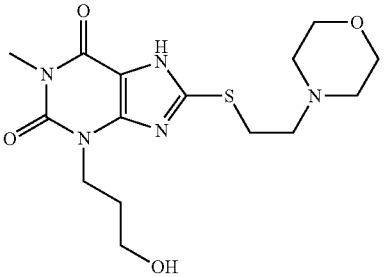 [SMILES: Cn1c(=O)c2[nH]c(SCCN3CCOCC3)nc2n(CCCO)c1=O] | |

TABLE 1-continued

Compound IDs, structures of the compounds of the present disclosure, and IC$_{50}$ values.

| Compound ID | Structure | IC$_{50}$ (μM) |
|---|---|---|
| LPF-IV-128-1 | | |
| LPF-IV-141-1 | | |
| LPF-IV-138-1 | | |
| LPF-III-195-1 | | |
| LPF-III-222-1 | | |
| BW-I-215 | | |

TABLE 1-continued
Compound IDs, structures of the compounds of the present disclosure, and IC$_{50}$ values.
| Compound ID | Structure | IC$_{50}$ (µM) |
|---|---|---|
| BW-II-15 | 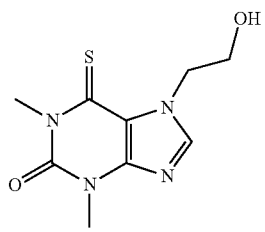 [SMILES: Cn1c(=S)c2c(ncn2CCO)n(C)c1=O] | |
| BW-II-21 | 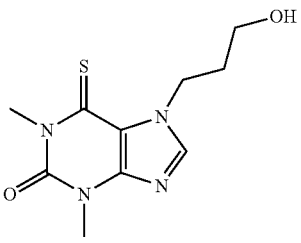 [SMILES: Cn1c(=S)c2c(ncn2CCCO)n(C)c1=O] | |
| SB-1-109 | 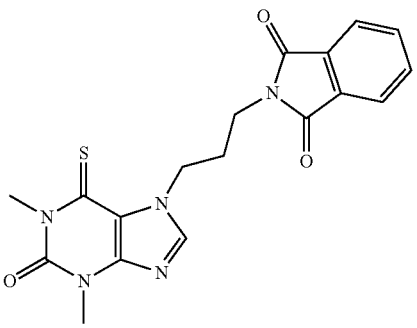 [SMILES: Cn1c(=S)c2c(ncn2CCCN2C(=O)c3ccccc3C2=O)n(C)c1=O] | |
| SB-1-119 | 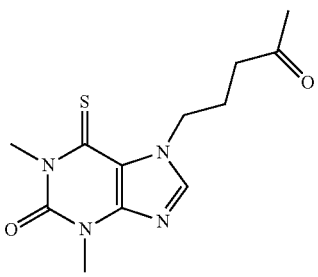 [SMILES: CC(=O)CCCn1cnc2c1c(=S)n(C)c(=O)n2C] | |
| SB-1-122 | 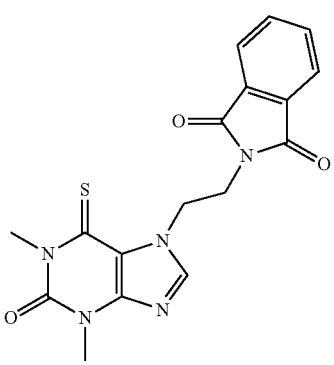 [SMILES: Cn1c(=S)c2c(ncn2CCN2C(=O)c3ccccc3C2=O)n(C)c1=O] | |

TABLE 1-continued
Compound IDs, structures of the compounds of the present disclosure, and $IC_{50}$ values.
| Compound ID | Structure | $IC_{50}$ ($\mu M$) |
|---|---|---|
| SB-1-110 | 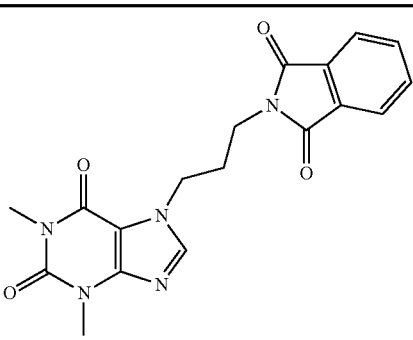 | |
| SB-1-115 | 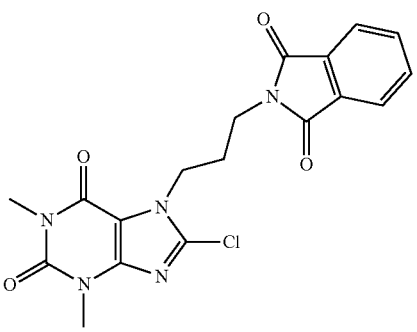 [SMILES: Cn1c(=O)c2c(nc(Cl)n2CCCN2C(=O)c3ccccc3C2=O)n(C)c1=O] | |
| SB-1-25 | 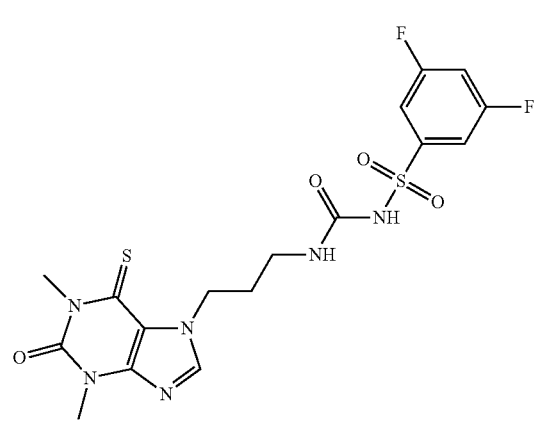 [SMILES: Cn1c(=S)c2c(ncn2CCCNC(=O)NS(=O)(=O)c2cc(F)cc(F)c2)n(C)c1=O] | |
| SB-1-28 | 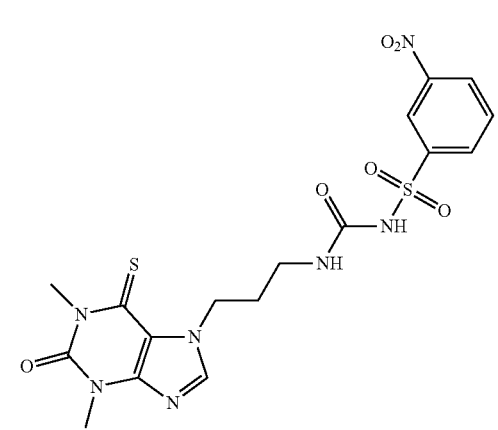 [SMILES: Cn1c(=S)c2c(ncn2CCCNC(=O)NS(=O)(=O)c2cccc([N+](=O)[O-])c2)n(C)c1=O] | |

TABLE 1-continued
Compound IDs, structures of the compounds of the present disclosure, and IC$_{50}$ values.
| Compound ID | Structure | IC$_{50}$ (μM) |
|---|---|---|
| SB-1-29 | 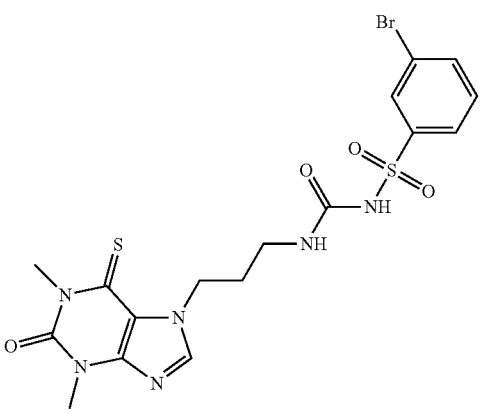 [SMILES: Cn1c(=S)c2c(ncn2CCCNC(=O)NS(=O)(=O)c2cccc(Br)c2)n(C)c1=O] | |
| SB-1-36 | 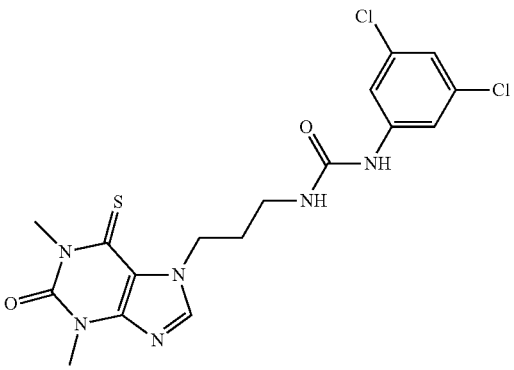 [SMILES: Cn1c(=S)c2c(ncn2CCCNC(=O)Nc2cc(Cl)cc(Cl)c2)n(C)c1=O] | |
| SB-1-68 | 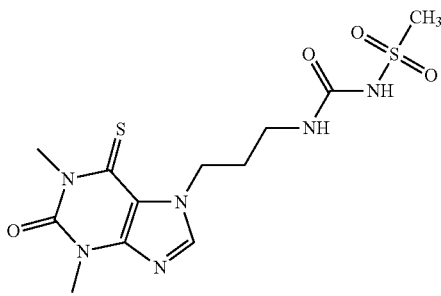 [SMILES: Cn1c(=S)c2c(ncn2CCCNC(=O)NS(C)(=O)=O)n(C)c1=O] | |
| SB-1-38 | 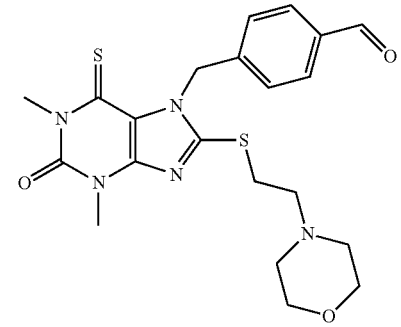 [SMILES: Cn1c(=S)c2c(nc(SCCN3CCOCC3)n2Cc2ccc(C=O)cc2)n(C)c1=O] | |

TABLE 1-continued

Compound IDs, structures of the compounds of the present disclosure, and IC$_{50}$ values.

| Compound ID | Structure | IC$_{50}$ (μM) |
|---|---|---|
| SB-1-49 (Keto/enol tautomers) | | |
| SB-1-50 | | |
| SB-1-51 | | |
| SB-1-55 | | |
| SB-1-61 | | |

TABLE 1-continued
Compound IDs, structures of the compounds of the present disclosure, and IC$_{50}$ values.
| Compound ID | Structure | IC$_{50}$ (μM) |
|---|---|---|
| SB-1-76 | 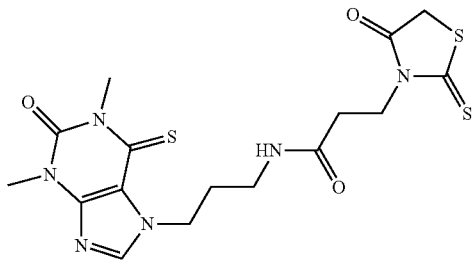 [SMILES: Cn1c(=S)c2c(ncn2CCCNC(=O)CCN2C(=O)CSC2=S)n(C)c1=O] | |
| SB-1-86 | 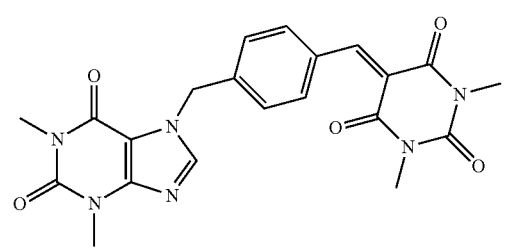 [SMILES: CN1C(=O)C(=Cc2ccc(Cn3cnc4c3c(=O)n(C)c(=O)n4C)cc2)C(=O)N(C)C1=O] | |
| SB-1-88 | 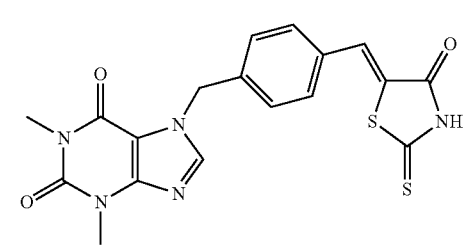 | |
| SB-1-87a (Keto/enol tautomers) | 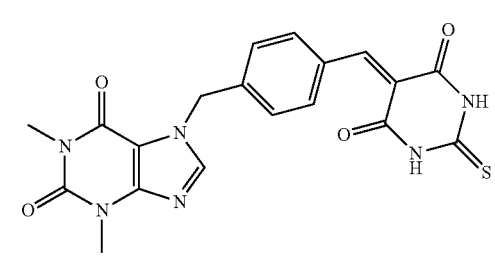 [SMILES: Cn1c(=O)c2c(ncn2Cc2ccc(C=C3C(=O)NC(=S)NC3=O)cc2)n(C)c1=O] | |
| SB-1-87b (Keto/enol tautomers) | 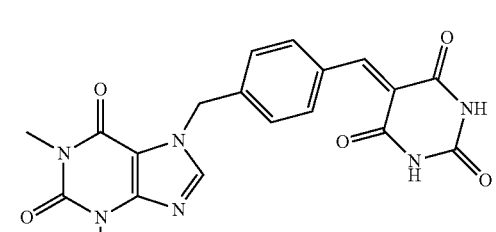 | |
| SB-1-89a | 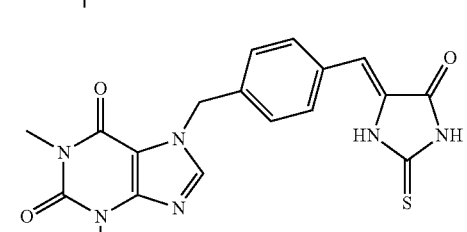 | |

TABLE 1-continued
Compound IDs, structures of the compounds of the present disclosure, and IC$_{50}$ values.
| Compound ID | Structure | IC$_{50}$ (µM) |
|---|---|---|
| SB-1-89b | 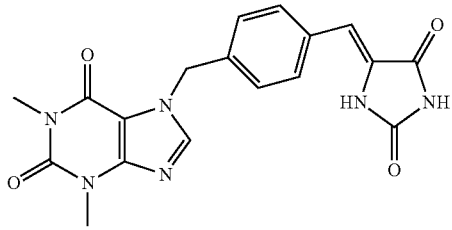 [SMILES: Cn1c(=O)c2c(ncn2Cc2ccc(/C=C3\NC(=O)NC3=O)cc2)n(C)c1=O] | |
| SB-1-90 | 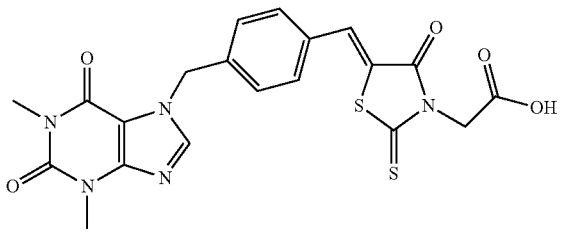 | |
| SB-1-91 | 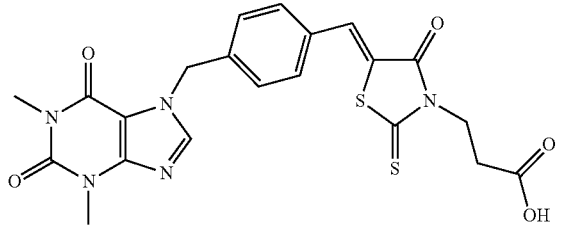 | |
| SB-1-93 | 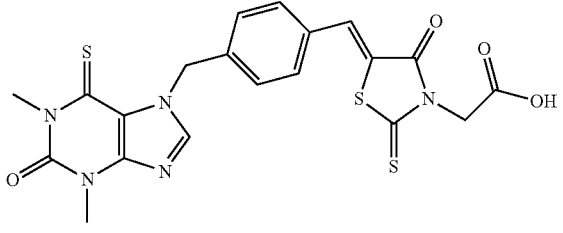 [SMILES: Cn1c(=O)c2c(ncn2Cc2ccc(/C=C3\SC(=S)N(CC(=O)O)C3=O)cc2)n(C)c1=O] | |
| SB-1-94 | 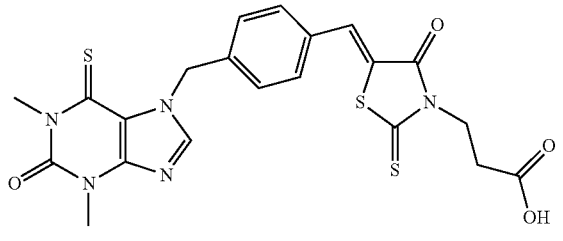 [SMILES: Cn1c(=S)c2c(ncn2Cc2ccc(/C=C3\SC(=S)N(CCC(=O)O)C3=O)cc2)n(C)c1=O] | |

TABLE 1-continued

Compound IDs, structures of the compounds of the present disclosure, and IC$_{50}$ values.

| Compound ID | Structure | IC$_{50}$ (μM) |
|---|---|---|
| SB-1-108 | | |
| BW-II-3 | | |

The compounds of the present disclosure are shown, for example, above, in the summary section, and in the claims below. They may be made using the synthetic methods outlined in the Examples section. These methods can be further modified and optimized using the principles and techniques of organic chemistry as applied by a person skilled in the art. Such principles and techniques are taught, for example, in Smith, *March's Advanced Organic Chemistry: Reactions, Mechanisms, and Structure*, (2013), which is incorporated by reference herein. In addition, the synthetic methods may be further modified and optimized for preparative, pilot- or large-scale production, either batch or continuous, using the principles and techniques of process chemistry as applied by a person skilled in the art. Such principles and techniques are taught, for example, in Anderson, *Practical Process Research & Development—A Guide for Organic Chemists* (2012), which is incorporated by reference herein.

All the compounds of the present disclosure may in some embodiments be used for the prevention and treatment of one or more diseases or disorders discussed herein or otherwise. In some embodiments, one or more of the compounds characterized or exemplified herein as an intermediate, a metabolite, and/or prodrug, may nevertheless also be useful for the prevention and treatment of one or more diseases or disorders. As such unless explicitly stated to the contrary, all the compounds of the present disclosure are deemed "active compounds" and "therapeutic compounds" that are contemplated for use as active pharmaceutical ingredients (APIs). Actual suitability for human or veterinary use is typically determined using a combination of clinical trial protocols and regulatory procedures, such as those administered by the Food and Drug Administration (FDA). In the United States, the FDA is responsible for protecting the public health by assuring the safety, effectiveness, quality, and security of human and veterinary drugs, vaccines and other biological products, and medical devices.

In some embodiments, the compounds of the present disclosure have the advantage that they may be more efficacious than, be less toxic than, be longer acting than, be more potent than, produce fewer side effects than, be more easily absorbed than, more metabolically stable than, more lipophilic than, more hydrophilic than, and/or have a better pharmacokinetic profile (e.g., higher oral bioavailability and/or lower clearance) than, and/or have other useful pharmacological, physical, or chemical properties over, compounds known in the prior art, whether for use in the indications stated herein or otherwise.

Compounds of the present disclosure may contain one or more asymmetrically-substituted carbon or nitrogen atom and may be isolated in optically active or racemic form. Thus, all chiral, diastereomeric, racemic form, epimeric form, and all geometric isomeric forms of a chemical formula are intended, unless the specific stereochemistry or isomeric form is specifically indicated. Compounds may occur as racemates and racemic mixtures, single enantiomers, diastereomeric mixtures and individual diastereomers. In some embodiments, a single diastereomer is obtained. The chiral centers of the compounds of the present disclosure can have the S or the R configuration. In some embodiments, the present compounds may contain two or more atoms which have a defined stereochemical orientation.

Chemical formulas used to represent compounds of the present invention will typically only show one of possibly several different tautomers. For example, many types of ketone groups are known to exist in equilibrium with corresponding enol groups. Similarly, many types of imine groups exist in equilibrium with enamine groups. Regardless of which tautomer is depicted for a given compound, and regardless of which one is most prevalent, all tautomers of a given chemical formula are intended.

In addition, atoms making up the compounds of the present disclosure are intended to include all isotopic forms of such atoms. Isotopes, as used herein, include those atoms having the same atomic number but different mass numbers. By way of general example and without limitation, isotopes of hydrogen include tritium and deuterium, isotopes of fluorine include $^{18}F$, and isotopes of carbon include $^{13}C$ and $^{14}C$.

In some embodiments, compounds of the present disclosure function as prodrugs or can be derivatized to function as prodrugs. Since prodrugs are known to enhance numerous desirable qualities of pharmaceuticals (e.g., solubility, bioavailability, manufacturing, etc.), the compounds employed in some methods of the disclosure may, if desired, be delivered in prodrug form. Thus, the disclosure contemplates prodrugs of compounds of the present disclosure as well as methods of delivering prodrugs. Prodrugs of the compounds employed in the disclosure may be prepared by modifying functional groups present in the compound in such a way that the modifications are cleaved, either in routine manipulation or in vivo, to the parent compound. Accordingly, prodrugs include, for example, compounds described herein in which a hydroxy, amino, or carboxy group is bonded to any group that, when the prodrug is administered to a patient, cleaves to form a hydroxy, amino, or carboxylic acid, respectively.

In some embodiments, compounds of the present disclosure exist in salt or non-salt form. With regard to the salt form(s), in some embodiments the particular anion or cation forming a part of any salt form of a compound provided herein is not critical, so long as the salt, as a whole, is pharmacologically acceptable. Additional examples of pharmaceutically acceptable salts and their methods of preparation and use are presented in Handbook of Pharmaceutical Salts: Properties, and Use (2002), which is incorporated herein by reference.

It will be appreciated that many organic compounds can form complexes with solvents in which they are reacted or from which they are precipitated or crystallized. These complexes are known as "solvates." Where the solvent is water, the complex is known as a "hydrate." It will also be appreciated that many organic compounds can exist in more than one solid form, including crystalline and amorphous forms. All solid forms of the compounds provided herein, including any solvates thereof are within the scope of the present disclosure.

III. CHEMICAL DEFINITIONS

When used in the context of a chemical group: "hydrogen" means —H; "hydroxy" means —OH; "oxo" means=O; "carbonyl" means —C(=O)—; "carboxy" means —C(=O)OH (also written as —COOH or —CO₂H); "halo" means independently —F, —Cl, —Br or —I; "amino" means —NH₂; "hydroxyamino" means —NHOH; "nitro" means —NO₂; imino means=NH; "cyano" means —CN; "isocyanyl" means —N=C=O; "isothiocyanyl" means —N=C=S; "azide" means N₃⁻; "azido" means —N₃; in a monovalent context "phosphate" means —OP(O)(OH)₂ or a deprotonated form thereof; in a divalent context "phosphate" means —OP(O)(OH)O— or a deprotonated form thereof; "mercapto" means —SH; and "thio" means=S; "thiocarbonyl" means —C(=S)—; "sulfonyl" means —S(O)₂—; and "sulfinyl" means —S(O)—.

In the context of chemical formulas, the symbol "—" means a single bond, "=" means a double bond, and "≡" means triple bond. The symbol "----" represents an optional bond, which if present is either single or double. The symbol "⌇" represents a single bond or a double bond. Thus, the formula

covers, for example,

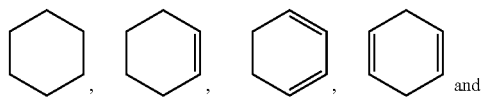

And it is understood that no one such ring atom forms part of more than one double bond. Furthermore, it is noted that the covalent bond symbol "—", when connecting one or two stereogenic atoms, does not indicate any preferred stereochemistry. Instead, it covers all stereoisomers as well as mixtures thereof. The symbol ⌇, when drawn perpendicularly across a bond (e.g.,

for methyl indicates a point of attachment of the group. It is noted that the point of attachment is typically only identified in this manner for larger groups in order to assist the reader in unambiguously identifying a point of attachment. The symbol "◄" means a single bond where the group attached to the thick end of the wedge is "out of the page." The symbol "⫿⫿⫿" means a single bond where the group attached to the thick end of the wedge is "into the page". The symbol "⌇" means a single bond where the geometry around a double bond (e.g., either E or Z) is undefined. Both options, as well as combinations thereof are therefore intended. Any undefined valency on an atom of a structure shown in this application implicitly represents a hydrogen atom bonded to that atom. A bold dot on a carbon atom indicates that the hydrogen attached to that carbon is oriented out of the plane of the paper.

When a variable is depicted as a "floating group" on a ring system, for example, the group "R" in the formula:

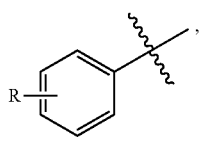

then the variable may replace any hydrogen atom attached to any of the ring atoms, including a depicted, implied, or expressly defined hydrogen, so long as a stable structure is formed. When a variable is depicted as a "floating group" on a fused ring system, as for example the group "R" in the formula:

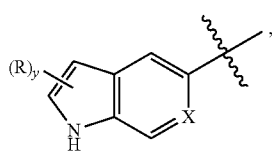

then the variable may replace any hydrogen attached to any of the ring atoms of either of the fused rings unless specified otherwise. Replaceable hydrogens include depicted hydrogens (e.g., the hydrogen attached to the nitrogen in the formula above), implied hydrogens (e.g., a hydrogen of the formula above that is not shown but understood to be present), expressly defined hydrogens, and optional hydrogens whose presence depends on the identity of a ring atom (e.g., a hydrogen attached to group X, when X equals—CH—), so long as a stable structure is formed. In the example depicted, R may reside on either the 5-membered or the 6-membered ring of the fused ring system. In the formula above, the subscript letter "y" immediately following the R enclosed in parentheses, represents a numeric variable. Unless specified otherwise, this variable can be 0, 1, 2, or any integer greater than 2, only limited by the maximum number of replaceable hydrogen atoms of the ring or ring system.

For the chemical groups and compound classes, the number of carbon atoms in the group or class is as indicated as follows: "Cn" or "C=n" defines the exact number (n) of carbon atoms in the group/class. "C≤n" defines the maximum number (n) of carbon atoms that can be in the group/class, with the minimum number as small as possible for the group/class in question. For example, it is understood that the minimum number of carbon atoms in the groups "alkyl$_{(C≤8)}$", "cycloalkanediyl$_{(C≤8)}$", "heteroaryl$_{(C≤8)}$", and "acyl$_{(C≤8)}$" is one, the minimum number of carbon atoms in the groups "alkenyl$_{(C≤8)}$", "alkynyl$_{(C≤8)}$", and "heterocycloalkyl$_{(C≤8)}$" is two, the minimum number of carbon atoms in the group "cycloalkyl$_{(C≤8)}$" is three, and the minimum number of carbon atoms in the groups "aryl$_{(C≤8)}$" and "arenediyl$_{(C≤8)}$" is six. "Cn-n'" defines both the minimum (n) and maximum number (n') of carbon atoms in the group. Thus, "alkyl$_{(C2-10)}$" designates those alkyl groups having from 2 to 10 carbon atoms. These carbon number indicators may precede or follow the chemical groups or class it modifies and it may or may not be enclosed in parenthesis, without signifying any change in meaning. Thus, the terms "C5 olefin", "C5-olefin", "olefin$_{(C5)}$", and "olefin$_{C5}$" are all synonymous. Except as noted below, every carbon atom is counted to determine whether the group or compound falls with the specified number of carbon atoms. For example, the group dihexylamino is an example of a dialkylamino$_{(C=12)}$ group; however, it is not an example of a dialkylamino$_{(C=6)}$ group. Likewise, phenylethyl is an example of an aralkyl$_{(C=8)}$ group. When any of the chemical groups or compound classes defined herein is modified by the term "substituted", any carbon atom in the moiety replacing the hydrogen atom is not counted. Thus methoxyhexyl, which has a total of seven carbon atoms, is an example of a substituted alkyl$_{(c1-6)}$. Unless specified otherwise, any chemical group or compound class listed in a claim set without a carbon atom limit has a carbon atom limit of less than or equal to twelve.

The term "saturated" when used to modify a compound or chemical group means the compound or chemical group has no carbon-carbon double and no carbon-carbon triple bonds, except as noted below. When the term is used to modify an atom, it means that the atom is not part of any double or triple bond. In the case of substituted versions of saturated groups, one or more carbon oxygen double bond or a carbon nitrogen double bond may be present. And when such a bond is present, then carbon-carbon double bonds that may occur as part of keto-enol tautomerism or imine/enamine tautomerism are not precluded. When the term "saturated" is used to modify a solution of a substance, it means that no more of that substance can dissolve in that solution.

The term "aliphatic" signifies that the compound or chemical group so modified is an acyclic or cyclic, but non-aromatic compound or group. In aliphatic compounds/groups, the carbon atoms can be joined together in straight chains, branched chains, or non-aromatic rings (alicyclic). Aliphatic compounds/groups can be saturated, that is joined by single carbon-carbon bonds (alkanes/alkyl), or unsaturated, with one or more carbon-carbon double bonds (alkenes/alkenyl) or with one or more carbon-carbon triple bonds (alkynes/alkynyl).

The term "aromatic" signifies that the compound or chemical group so modified has a planar unsaturated ring of atoms with 4n+2 electrons in a fully conjugated cyclic n system. An aromatic compound or chemical group may be depicted as a single resonance structure; however, depiction of one resonance structure is taken to also refer to any other resonance structure. For example:

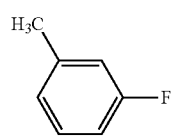

is also taken to refer to

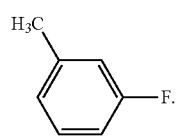

Aromatic compounds may also be depicted using a circle to represent the delocalized nature of the electrons in the fully conjugated cyclic n system, two non-limiting examples of which are shown below:

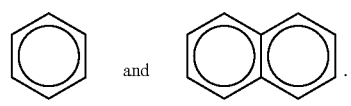

The term "alkyl" refers to a monovalent saturated aliphatic group with a carbon atom as the point of attachment, a linear or branched acyclic structure, and no atoms other than carbon and hydrogen. The groups —CH₃ (Me), —CH₂CH₃ (Et), —CH₂CH₂CH₃ (n-Pr or propyl), —CH(CH₃)₂ (i-Pr, Pr or isopropyl), —CH₂CH₂CH₂CH₃ (n-Bu), —CH(CH₃)CH₂CH₃ (sec-butyl), —CH₂CH(CH₃)₂ (isobutyl), —C(CH₃)₃ (tert-butyl, t-butyl, t-Bu or 'Bu), and —CH₂C(CH₃)₃ (neo-pentyl) are non-limiting examples of alkyl groups. The term "alkanediyl" refers to a divalent saturated aliphatic group, with one or two saturated carbon atom(s) as the point(s) of attachment, a linear or branched acyclic structure, no carbon-carbon double or triple bonds, and no atoms other than carbon and hydrogen. The groups —CH₂— (methylene), —CH₂CH₂—, —CH₂C(CH₃)₂CH₂—, and —CH₂CH₂CH₂— are non-limiting examples of alkanediyl groups. The term "alkanetriyl" refers to a trivalent saturated aliphatic group, with one, two, or three saturated carbon atom(s) as the point(s) of attachment, a linear or branched acyclic structure, no carbon-carbon double or triple bonds, and no atoms other than carbon and hydrogen. The groups

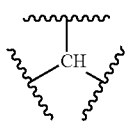

(methinyl),

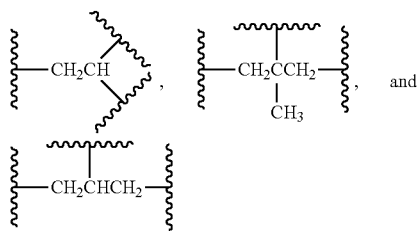 and and are non-limiting examples of alkanediyl groups. The term "alkylidene" refers to the divalent group =CRR' in which R and R' are independently hydrogen or alkyl. Non-limiting examples of alkylidene groups include: =CH₂, =CH(CH₂CH₃), and =C(CH₃)₂. An "alkane" refers to the class of compounds having the formula H–R, wherein R is alkyl as this term is defined above.

The term "cycloalkyl" refers to a monovalent saturated aliphatic group with a carbon atom as the point of attachment, said carbon atom forming part of one or more non-aromatic ring structures, no carbon-carbon double or triple bonds, and no atoms other than carbon and hydrogen. Non-limiting examples include: —CH(CH₂)₂ (cyclopropyl), cyclobutyl, cyclopentyl, or cyclohexyl (Cy). As used herein, the term does not preclude the presence of one or more alkyl groups (carbon number limitation permitting) attached to a carbon atom of the non-aromatic ring structure. The term "cycloalkanediyl" refers to a divalent saturated aliphatic group with two carbon atoms as points of attachment, no carbon-carbon double or triple bonds, and no atoms other than carbon and hydrogen. The group

is a non-limiting example of cycloalkanediyl group. A "cycloalkane" refers to the class of compounds having the formula H–R, wherein R is cycloalkyl as this term is defined above.

The term "alkenyl" refers to a monovalent unsaturated aliphatic group with a carbon atom as the point of attachment, a linear or branched, acyclic structure, at least one nonaromatic carbon-carbon double bond, no carbon-carbon triple bonds, and no atoms other than carbon and hydrogen. Non-limiting examples include: —CH=CH₂ (vinyl), —CH=CHCH₃, —CH=CHCH₂CH₃, —CH₂CH=CH₂ (allyl), —CH₂CH=CHCH₃, and —CH=CHCH=CH₂. The term "alkenediyl" refers to a divalent unsaturated aliphatic group, with two carbon atoms as points of attachment, a linear or branched acyclic structure, at least one nonaromatic carbon-carbon double bond, no carbon-carbon triple bonds, and no atoms other than carbon and hydrogen. The groups —CH=CH—, —CH=C(CH₃)CH₂—, —CH=CHCH₂—, and —CH₂CH=CHCH₂— are non-limiting examples of alkenediyl groups.

It is noted that while the alkenediyl group is aliphatic, once connected at both ends, this group is not precluded from forming part of an aromatic structure. The terms "alkene" and "olefin" are synonymous and refer to the class of compounds having the formula H–R, wherein R is alkenyl as this term is defined above. Similarly, the terms "terminal alkene" and "α-olefin" are synonymous and refer to an alkene having just one carbon-carbon double bond, wherein that bond is part of a vinyl group at an end of the molecule.

The term "alkynyl" refers to a monovalent unsaturated aliphatic group with a carbon atom as the point of attachment, a linear or branched acyclic structure, at least one carbon-carbon triple bond, and no atoms other than carbon and hydrogen. As used herein, the term alkynyl does not preclude the presence of one or more non-aromatic carbon-carbon double bonds. The groups —C≡CH, —C≡CCH₃, and —CH₂C≡CCH₃ are non-limiting examples of alkynyl groups. An "alkyne" refers to the class of compounds having the formula H–R, wherein R is alkynyl.

The term "aryl" refers to a monovalent unsaturated aromatic group with an aromatic carbon atom as the point of attachment, said carbon atom forming part of a one or more aromatic ring structures, each with six ring atoms that are all carbon, and wherein the group consists of no atoms other than carbon and hydrogen. If more than one ring is present, the rings may be fused or unfused. Unfused rings are connected with a covalent bond. As used herein, the term aryl does not preclude the presence of one or more alkyl groups (carbon number limitation permitting) attached to the first aromatic ring or any additional aromatic ring present. Non-limiting examples of aryl groups include phenyl (Ph), methylphenyl, (dimethyl)phenyl, —C₆H₄CH₂CH₃ (ethylphenyl), naphthyl, and a monovalent group derived from biphenyl (e.g., 4-phenylphenyl). The term "arenediyl" refers to a divalent aromatic group with two aromatic carbon atoms as points of attachment, said carbon atoms forming part of one or more six-membered aromatic ring structures, each with six ring atoms that are all carbon, and wherein the divalent group consists of no atoms other than carbon and hydrogen. As used herein, the term arenediyl does not preclude the presence of one or more alkyl groups (carbon number limitation permitting) attached to the first aromatic ring or any additional aromatic ring present. If more than one ring is present, the rings may be fused or unfused. Unfused rings are connected with a covalent bond. Non-limiting examples of arenediyl groups include:

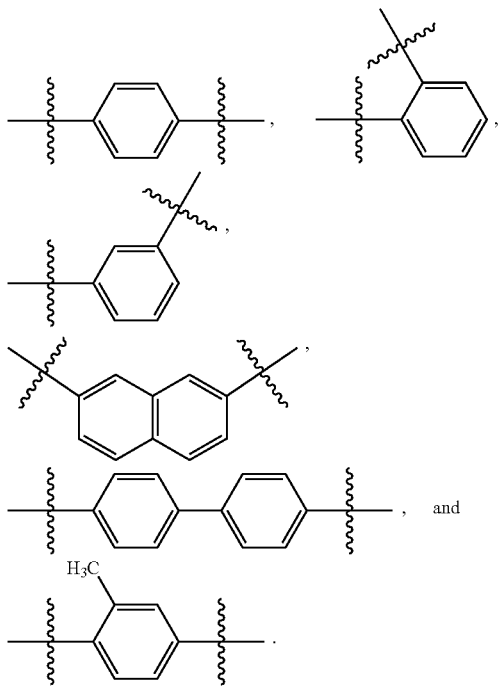

An "arene" refers to the class of compounds having the formula H–R, wherein R is aryl as that term is defined above. Benzene and toluene are non-limiting examples of arenes.

The term "aralkyl" refers to the monovalent group -alkanediyl-aryl, in which the terms alkanediyl and aryl are each used in a manner consistent with the definitions provided above. Non-limiting examples are: phenylmethyl (benzyl, Bn) and 2-phenylethyl.

The term "heteroaryl" refers to a monovalent aromatic group with an aromatic carbon atom or nitrogen atom as the point of attachment, said carbon atom or nitrogen atom forming part of one or more aromatic ring structures, each with three to eight ring atoms, wherein at least one of the ring atoms of the aromatic ring structure(s) is nitrogen, oxygen or sulfur, and wherein the heteroaryl group consists of no atoms other than carbon, hydrogen, aromatic nitrogen, aromatic oxygen and aromatic sulfur. If more than one ring is present, the rings are fused; however, the term heteroaryl does not preclude the presence of one or more alkyl or aryl groups (carbon number limitation permitting) attached to one or more ring atoms. Non-limiting examples of heteroaryl groups include benzoxazolyl, benzimidazolyl, furanyl, imidazolyl (Im), indolyl, indazolyl (Im), isoxazolyl, methylpyridinyl, oxazolyl, oxadiazolyl, phenylpyridinyl, pyridinyl (pyridyl), pyrrolyl, pyrimidinyl, pyrazinyl, quinolyl, quinazolinyl, quinoxalinyl, triazinyl, tetrazolyl, thiazolyl, thienyl, and triazolyl. The term "N-heteroaryl" refers to a heteroaryl group with a nitrogen atom as the point of attachment. A "heteroarene" refers to the class of compounds having the formula H–R, wherein R is heteroaryl. Pyridine and quinoline are non-limiting examples of heteroarenes.

The term "heteroaralkyl" refers to the monovalent group -alkanediyl-heteroaryl, in which the terms alkanediyl and heteroaryl are each used in a manner consistent with the definitions provided above. Non-limiting examples are: pyridinylmethyl and 2-quinolinyl-ethyl.

The term "heterocycloalkyl" refers to a monovalent non-aromatic group with a carbon atom or nitrogen atom as the point of attachment, said carbon atom or nitrogen atom forming part of one or more non-aromatic ring structures, each with three to eight ring atoms, wherein at least one of the ring atoms of the non-aromatic ring structure(s) is nitrogen, oxygen or sulfur, and wherein the heterocycloalkyl group consists of no atoms other than carbon, hydrogen, nitrogen, oxygen and sulfur. If more than one ring is present, the rings are fused. As used herein, the term does not preclude the presence of one or more alkyl groups (carbon number limitation permitting) attached to one or more ring atoms.

Also, the term does not preclude the presence of one or more double bonds in the ring or ring system, provided that the resulting group remains non-aromatic. Non-limiting examples of heterocycloalkyl groups include aziridinyl, azetidinyl, pyrrolidinyl, piperidinyl, piperazinyl, morpholinyl, thiomorpholinyl, tetrahydrofuranyl, tetrahydrothiofuranyl, tetrahydropyranyl, pyranyl, oxiranyl, and oxetanyl. The term "N-heterocycloalkyl" refers to a heterocycloalkyl group with a nitrogen atom as the point of attachment. N-pyrrolidinyl is an example of such a group.

The term "acyl" refers to the group —C(O)R, in which R is a hydrogen, alkyl, cycloalkyl, or aryl as those terms are defined above. The groups, —CHO, —C(O)CH₃ (acetyl, Ac), —C(O)CH₂CH₃, —C(O)CH(CH₃)₂, —C(O)CH(CH₂)₂, —C(O)C₆H₅, and —C(O)C₆H₄CH₃ are non-limiting examples of acyl groups. A "thioacyl" is defined in an analogous manner, except that the oxygen atom of the group —C(O)R has been replaced with a sulfur atom, —C(S)R. The term "aldehyde" corresponds to an alkyl group, as defined above, attached to a —CHO group.

The term "alkoxy" refers to the group —OR, in which R is an alkyl, as that term is defined above. Non-limiting examples include: —OCH₃ (methoxy), —OCH₂CH₃ (ethoxy), —OCH₂CH₂CH₃, —OCH(CH₃)₂ (isopropoxy), or —OC(CH₃)₃ (tert-butoxy). The terms "cycloalkoxy", "alkenyloxy", "alkynyloxy", "aryloxy", "aralkoxy", "heteroaryloxy", "heterocycloalkoxy", and "acyloxy", when used without the "substituted" modifier, refers to groups, defined as —OR, in which R is cycloalkyl, alkenyl, alkynyl, aryl, aralkyl, heteroaryl, heterocycloalkyl, and acyl, respectively. The term "alkylthio" and "acylthio" refers to the group —SR, in which R is an alkyl and acyl, respectively. The term "alcohol" corresponds to an alkane, as defined above, wherein at least one of the hydrogen atoms has been replaced with a hydroxy group. The term "ether" corresponds to an alkane, as defined above, wherein at least one of the hydrogen atoms has been replaced with an alkoxy group.

The term "alkylamino" refers to the group —NHR, in which R is an alkyl, as that term is defined above. Non-limiting examples include: —NHCH₃ and —NHCH₂CH₃. The term "dialkylamino" refers to the group —NRR', in which R and R' can be the same or different alkyl groups. Non-limiting examples of dialkylamino groups include: —N(CH₃)₂ and —N(CH₃)(CH₂CH₃). The terms "cycloalkylamino", "alkenylamino", "alkynylamino", "arylamino", "aralkylamino", "heteroarylamino", "heterocycloalkylamino", and "alkoxyamino" when used without the "substituted" modifier, refers to groups, defined as —NHR, in which R is cycloalkyl, alkenyl, alkynyl, aryl, aralkyl, heteroaryl, heterocycloalkyl, and alkoxy, respectively. A non-limiting example of an arylamino group is —NHC$_6$H$_5$. The terms "dicycloalkylamino", "dialkenylamino", "dialkynylamino", "diarylamino", "diaralkylamino", "diheteroarylamino", "diheterocycloalkylamino", and "dialkoxyamino", refers to groups, defined as —NRR', in which R and R' are both cycloalkyl, alkenyl, alkynyl, aryl, aralkyl, heteroaryl, heterocycloalkyl, and alkoxy, respectively. Similarly, the term alkyl(cycloalkyl)amino refers to a group defined as —NRR', in which R is alkyl and R' is cycloalkyl. The term "amido" (acylamino), when used without the "substituted" modifier, refers to the group —NHR, in which R is acyl, as that term is defined above. A non-limiting example of an amido group is —NHC(O)CH$_3$.

When a chemical group is used with the "substituted" modifier, one or more hydrogen atom has been replaced, independently at each instance, by —OH, —F, —Cl, —Br, —I, —NH$_2$, —NO$_2$, —CO$_2$H, —CO$_2$CH$_3$, —CO$_2$(CH$_3$)$_3$, —CN, —SH, —OCH$_3$, —OCH$_2$CH$_3$, —C(O)CH$_3$, —NHCH$_3$, —NHCH$_2$CH$_3$, —N(CH$_3$)$_2$, —C(O)NH$_2$, —C(O)NHCH$_3$, —C(O)N(CH$_3$)$_2$, —OC(O)CH$_3$, —NHC(O)CH$_3$, —NHCO$_2$(CH$_3$)$_3$, —S(O)$_2$OH, —S(O)$_2$CH$_3$, or —S(O)$_2$NH$_2$. For example, the following groups are non-limiting examples of substituted alkyl groups: —CH$_2$OH, —CH$_2$Cl, —CF$_3$, —CH$_2$CN, —CH$_2$C(O)OH, —CH$_2$C(O)OCH$_3$, —CH$_2$C(O)NH$_2$, —CH$_2$C(O)CH$_3$, —CH$_2$OCH$_3$, —CH$_2$OC(O)CH$_3$, —CH$_2$NH$_2$, —CH$_2$N(CH$_3$)$_2$, and —CH$_2$CH$_2$Cl. The term "haloalkyl" is a subset of substituted alkyl, in which the hydrogen atom replacement is limited to halo (i.e. —F, —Cl, —Br, or —I) such that no other atoms aside from carbon, hydrogen and halogen are present. The group, —CH$_2$Cl is a non-limiting example of a haloalkyl. The term "fluoroalkyl" is a subset of substituted alkyl, in which the hydrogen atom replacement is limited to fluoro such that no other atoms aside from carbon, hydrogen and fluorine are present. The groups —CH$_2$F, —CF$_3$, and —CH$_2$CF$_3$ are non-limiting examples of fluoroalkyl groups. Non-limiting examples of substituted aralkyls are: (3-chlorophenyl)-methyl, and 2-chloro-2-phenyl-eth-1-yl. The groups, —C(O)CH$_2$CF$_3$, —CO$_2$H (carboxyl), —CO$_2$CH$_3$ (methylcarboxyl), —CO$_2$CH$_2$CH$_3$, —C(O)NH$_2$ (carbamoyl), and —CON(CH$_3$)$_2$, are non-limiting examples of substituted acyl groups. The groups —NHC(O)OCH$_3$ and —NHC(O)NHCH$_3$ are non-limiting examples of substituted amido groups.

The use of the word "a" or "an," when used in conjunction with the term "comprising" in the claims and/or the specification may mean "one," but it is also consistent with the meaning of "one or more," "at least one," and "one or more than one."

Throughout this application, the term "about" is used to indicate that a value includes the inherent variation of error for the device, the method being employed to determine the value, or the variation that exists among the study subjects or patients.

An "active ingredient" (AI) or active pharmaceutical ingredient (API) (also referred to as an active compound, active substance, active agent, pharmaceutical agent, agent, biologically active molecule, or a therapeutic compound) is the ingredient in a pharmaceutical drug that is biologically active.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

The term "effective," as that term is used in the specification and/or claims, means adequate to accomplish a desired, expected, or intended result. "Effective amount," "Therapeutically effective amount" or "pharmaceutically effective amount" when used in the context of treating a patient or subject with a compound means that amount of the compound which, when administered to a subject or patient, is sufficient to effect such treatment or prevention of the disease as those terms are defined below.

An "excipient" is a pharmaceutically acceptable substance formulated along with the active ingredient(s) of a medication, pharmaceutical composition, formulation, or drug delivery system. Excipients may be used, for example, to stabilize the composition, to bulk up the composition (thus often referred to as "bulking agents," "fillers," or "diluents" when used for this purpose), or to confer a therapeutic enhancement on the active ingredient in the final dosage form, such as facilitating drug absorption, reducing viscosity, or enhancing solubility. Excipients include pharmaceutically acceptable versions of antiadherents, binders, coatings, colors, disintegrants, flavors, glidants, lubricants, preservatives, sorbents, sweeteners, and vehicles. The main excipient that serves as a medium for conveying the active ingredient is usually called the vehicle. Excipients may also be used in the manufacturing process, for example, to aid in the handling of the active substance, such as by facilitating powder flowability or non-stick properties, in addition to aiding in vitro stability such as prevention of denaturation or aggregation over the expected shelf life. The suitability of an excipient will typically vary depending on the route of administration, the dosage form, the active ingredient, as well as other factors.

The term "hydrate" when used as a modifier to a compound means that the compound has less than one (e.g., hemihydrate), one (e.g., monohydrate), or more than one (e.g., dihydrate) water molecules associated with each compound molecule, such as in solid forms of the compound.

As used herein, the term "IC$_{50}$" refers to an inhibitory dose which is 50% of the maximum response obtained. This quantitative measure indicates how much of a particular drug or other substance (inhibitor) is needed to inhibit a given biological, biochemical or chemical process (or component of a process, i.e. an enzyme, cell, cell receptor or microorganism) by half.

An "isomer" of a first compound is a separate compound in which each molecule contains the same constituent atoms as the first compound, but where the configuration of those atoms in three dimensions differs.

As used herein, the term "patient" or "subject" refers to a living mammalian organism, such as a human, monkey, cow, sheep, goat, dog, cat, mouse, rat, guinea pig, or transgenic species thereof. In certain embodiments, the patient or subject is a primate. Non-limiting examples of human patients are adults, juveniles, infants and fetuses.

As generally used herein "pharmaceutically acceptable" refers to those compounds, materials, compositions, and/or dosage forms which are, within the scope of sound medical judgment, suitable for use in contact with the tissues, organs, and/or bodily fluids of human beings and animals without excessive toxicity, irritation, allergic response, or other problems or complications commensurate with a reasonable benefit/risk ratio.

"Pharmaceutically acceptable salts" means salts of compounds disclosed herein which are pharmaceutically acceptable, as defined above, and which possess the desired pharmacological activity. Such salts include acid addition salts formed with inorganic acids such as hydrochloric acid, hydrobromic acid, sulfuric acid, nitric acid, phosphoric acid, and the like; or with organic acids such as 1,2-ethanedisulfonic acid, 2-hydroxyethanesulfonic acid, 2-naphthalenesulfonic acid, 3-phenylpropionic acid, 4,4'-methylenebis(3-hydroxy-2-ene-1-carboxylic acid), 4-methylbicyclo[2.2.2]oct-2-ene-1-carboxylic acid, acetic acid, aliphatic mono- and dicarboxylic acids, aliphatic sulfuric acids, aromatic sulfuric acids, benzenesulfonic acid, benzoic acid, camphorsulfonic acid, carbonic acid, cinnamic acid, citric acid, cyclopentanepropionic acid, ethanesulfonic acid, fumaric acid, glucoheptonic acid, gluconic acid, glutamic acid, glycolic acid, heptanoic acid, hexanoic acid, hydroxynaphthoic acid, lactic acid, laurylsulfuric acid, maleic acid, malic acid, malonic acid, mandelic acid, methanesulfonic acid, muconic acid, o-(4-hydroxybenzoyl)benzoic acid, oxalic acid, p-chlorobenzenesulfonic acid, phenyl-substituted alkanoic acids, propionic acid, p-toluenesulfonic acid, pyruvic acid, salicylic acid, stearic acid, succinic acid, tartaric acid, tertiarybutylacetic acid, trimethylacetic acid, and the like. Pharmaceutically acceptable salts also include base addition salts which may be formed when acidic protons present are capable of reacting with inorganic or organic bases. Acceptable inorganic bases include sodium hydroxide, sodium carbonate, potassium hydroxide, aluminum hydroxide and calcium hydroxide. Acceptable organic bases include ethanolamine, diethanolamine, triethanolamine, tromethamine, N-methylglucamine and the like. It should be recognized that the particular anion or cation forming a part of any salt of this invention is not critical, so long as the salt, as a whole, is pharmacologically acceptable. Additional examples of pharmaceutically acceptable salts and their methods of preparation and use are presented in *Handbook of Pharmaceutical Salts: Properties, and Use* (P. H. Stahl & C. G. Wermuth eds., Verlag Helvetica Chimica Acta, 2002).

A "pharmaceutically acceptable carrier," "drug carrier," or simply "carrier" is a pharmaceutically acceptable substance formulated along with the active ingredient medication that is involved in carrying, delivering and/or transporting a chemical agent.

Drug carriers may be used to improve the delivery and the effectiveness of drugs, including for example, controlled-release technology to modulate drug bioavailability, decrease drug metabolism, and/or reduce drug toxicity. Some drug carriers may increase the effectiveness of drug delivery to the specific target sites. Examples of carriers include: liposomes, microspheres (e.g., made of poly(lactic-co-glycolic) acid), albumin microspheres, synthetic polymers, nanofibers, protein-DNA complexes, protein conjugates, erythrocytes, virosomes, and dendrimers.

A "pharmaceutical drug" (also referred to as a pharmaceutical, pharmaceutical preparation, pharmaceutical composition, pharmaceutical formulation, pharmaceutical product, medicinal product, medicine, medication, medicament, or simply a drug, agent, or preparation) is a composition used to diagnose, cure, treat, or prevent disease, which comprises an active pharmaceutical ingredient (API) (defined above) and optionally contains one or more inactive ingredients, which are also referred to as excipients (defined above).

"Prevention" or "preventing" includes: (1) inhibiting the onset of a disease in a subject or patient which may be at risk and/or predisposed to the disease but does not yet experience or display any or all of the pathology or symptomatology of the disease, and/or (2) slowing the onset of the pathology or symptomatology of a disease in a subject or patient which may be at risk and/or predisposed to the disease but does not yet experience or display any or all of the pathology or symptomatology of the disease.

"Prodrug" means a compound that is convertible in vivo metabolically into an inhibitor according to the present invention. The prodrug itself may or may not also have activity with respect to a given target protein. For example, a compound comprising a hydroxy group may be administered as an ester that is converted by hydrolysis in vivo to the hydroxy compound. Non-limiting examples of suitable esters that may be converted in vivo into hydroxy compounds include acetates, citrates, lactates, phosphates, tartrates, malonates, oxalates, salicylates, propionates, succinates, fumarates, maleates, methylene-bis-β-hydroxynaphthoate, gentisates, isethionates, di-p-toluoyltartrates, methane-sulfonates, ethanesulfonates, benzenesulfonates, p-toluenesulfonates, cyclohexylsulfamates, quinates, and esters of amino acids. Similarly, a compound comprising an amine group may be administered as an amide that is converted by hydrolysis in vivo to the amine compound.

A "stereoisomer" or "optical isomer" is an isomer of a given compound in which the same atoms are bonded to the same other atoms, but where the configuration of those atoms in three dimensions differs. "Enantiomers" are stereoisomers of a given compound that are mirror images of each other, like left and right hands. "Diastereomers" are stereoisomers of a given compound that are not enantiomers. Chiral molecules contain a chiral center, also referred to as a stereocenter or stereogenic center, which is any point, though not necessarily an atom, in a molecule bearing groups such that an interchanging of any two groups leads to a stereoisomer. In organic compounds, the chiral center is typically a carbon, phosphorus or sulfur atom, though it is also possible for other atoms to be stereocenters in organic and inorganic compounds. A molecule can have multiple stereocenters, giving it many stereoisomers. In compounds whose stereoisomerism is due to tetrahedral stereogenic centers (e.g., tetrahedral carbon), the total number of hypothetically possible stereoisomers will not exceed $2^n$, where n is the number of tetrahedral stereocenters. Molecules with symmetry frequently have fewer than the maximum possible number of stereoisomers. A 50:50 mixture of enantiomers is referred to as a racemic mixture. Alternatively, a mixture of enantiomers can be enantiomerically enriched so that one enantiomer is present in an amount greater than 50%. Typically, enantiomers and/or diastereomers can be resolved or separated using techniques known in the art. It is contemplated that that for any stereocenter or axis of chirality for which stereochemistry has not been defined, that stereocenter or axis of chirality can be present in its R form, S form, or as a mixture of the R and S forms, including racemic and non-racemic mixtures. As used herein, the phrase "substantially free from other stereoisomers" means that the composition contains ≤15%, more preferably ≤10%, even more preferably ≤5%, or most preferably ≤1% of another stereoisomer(s).

"Treatment" or "treating" includes (1) inhibiting a disease in a subject or patient experiencing or displaying the pathology or symptomatology of the disease (e.g., arresting further development of the pathology and/or symptomatology), (2)

ameliorating a disease in a subject or patient that is experiencing or displaying the pathology or symptomatology of the disease (e.g., reversing the pathology and/or symptomatology), and/or (3) effecting any measurable decrease in a disease or symptom thereof in a subject or patient that is experiencing or displaying the pathology or symptomatology of the disease.

The term "unit dose" refers to a formulation of the compound or composition such that the formulation is prepared in a manner sufficient to provide a single therapeutically effective dose of the active ingredient to a patient in a single administration. Such unit dose formulations that may be used include but are not limited to a single tablet, capsule, or other oral formulations, or a single vial with a syringeable liquid or other injectable formulations.

The above definitions supersede any conflicting definition in any reference that is incorporated by reference herein. The fact that certain terms are defined, however, should not be considered as indicative that any term that is undefined is indefinite. Rather, all terms used are believed to describe the invention in terms such that one of ordinary skill can appreciate the scope and practice the present invention.

IV. TREATMENT OF CANCER AND OTHER HYPERPROLIFERATIVE DISEASES

While hyperproliferative diseases can be associated with any disease which causes a cell to begin to reproduce uncontrollably, the prototypical example is cancer. Psoriasis is another example. One of the key elements of cancer is that the cell's normal apoptotic cycle is interrupted and thus agents that interrupt the growth of the cells are important as therapeutic agents for treating these diseases. In some embodiments, the caffeic acid derivatives described herein may be used to decreased cell counts and as such may be used to treat a variety of cancers or other malignancies.

In some embodiments, cancer, cancer tissue, or cancer cells may be treated by the compounds, methods, and compositions disclosed herein. In some embodiments, cancer cells or tissue that may be treated include but are not limited to cells or tissue from the bladder, blood, bone, bone marrow, brain, breast, colon, esophagus, gastrointestine, gum, head, kidney, liver, lung, nasopharynx, neck, ovary, prostate, skin, stomach, pancreas, testis, tongue, cervix, or uterus. In some embodiments, the cancer that may be treated may be of the following histological types: neoplasm, malignant; carcinoma; carcinoma, undifferentiated; giant and spindle cell carcinoma; small cell carcinoma; papillary carcinoma; squamous cell carcinoma; lymphoepithelial carcinoma; basal cell carcinoma; pilomatrix carcinoma; transitional cell carcinoma; papillary transitional cell carcinoma; adenocarcinoma; gastrinoma, malignant; cholangiocarcinoma; hepatocellular carcinoma; combined hepatocellular carcinoma and cholangiocarcinoma; trabecular adenocarcinoma; adenoid cystic carcinoma; adenocarcinoma in adenomatous polyp; adenocarcinoma, familial polyposis *coli*; solid carcinoma; carcinoid tumor, malignant; branchiolo-alveolar adenocarcinoma; papillary adenocarcinoma; chromophobe carcinoma; acidophil carcinoma; oxyphilic adenocarcinoma; basophil carcinoma; clear cell adenocarcinoma; granular cell carcinoma; follicular adenocarcinoma; papillary and follicular adenocarcinoma; nonencapsulating sclerosing carcinoma; adrenal cortical carcinoma; endometroid carcinoma; skin appendage carcinoma; apocrine adenocarcinoma; sebaceous adenocarcinoma; ceruminous adenocarcinoma; mucoepidermoid carcinoma; cystadenocarcinoma; papillary cystadenocarcinoma; papillary serous cystadenocarcinoma; mucinous cystadenocarcinoma; mucinous adenocarcinoma; signet ring cell carcinoma; infiltrating duct carcinoma; medullary carcinoma; lobular carcinoma; inflammatory carcinoma; Paget's disease, mammary; acinar cell carcinoma; adenosquamous carcinoma; adenocarcinoma w/squamous metaplasia; thymoma, malignant; ovarian stromal tumor, malignant; thecoma, malignant; granulosa cell tumor, malignant; androblastoma, malignant; sertoli cell carcinoma; Leydig cell tumor, malignant; lipid cell tumor, malignant; paraganglioma, malignant; extramammary paraganglioma, malignant; pheochromocytoma; glomangiosarcoma; malignant melanoma; amelanotic melanoma; superficial spreading melanoma; lentigo malignant melanoma; acral lentiginous melanomas; nodular melanomas; malignant melanoma in giant pigmented nevus; epithelioid cell melanoma; blue nevus, malignant; sarcoma; fibrosarcoma; fibrous histiocytoma, malignant; myxosarcoma; liposarcoma; leiomyosarcoma; rhabdomyosarcoma; embryonal rhabdomyosarcoma; alveolar rhabdomyosarcoma; stromal sarcoma; mixed tumor, malignant; Mullerian mixed tumor; nephroblastoma; hepatoblastoma; carcinosarcoma; mesenchymoma, malignant; Brenner tumor, malignant; phyllodes tumor, malignant; synovial sarcoma; mesothelioma, malignant; dysgerminoma; embryonal carcinoma; teratoma, malignant; struma ovarii, malignant; choriocarcinoma; mesonephroma, malignant; hemangiosarcoma; hemangioendothelioma, malignant; Kaposi's sarcoma; hemangiopericytoma, malignant; lymphangiosarcoma; osteosarcoma; juxtacortical osteosarcoma; chondrosarcoma; chondroblastoma, malignant; mesenchymal chondrosarcoma; giant cell tumor of bone; Ewing's sarcoma; odontogenic tumor, malignant; ameloblastic odontosarcoma; ameloblastoma, malignant; ameloblastic fibrosarcoma; pinealoma, malignant; chordoma; glioma, malignant; ependymoma; astrocytoma; protoplasmic astrocytoma; fibrillary astrocytoma; astroblastoma; glioblastoma; oligodendroglioma; oligodendroblastoma; primitive neuroectodermal; cerebellar sarcoma; ganglioneuroblastoma; neuroblastoma; retinoblastoma; olfactory neurogenic tumor; meningioma, malignant; neurofibrosarcoma; neurilemmoma, malignant; granular cell tumor, malignant; malignant lymphoma; Hodgkin's disease; paragranuloma; malignant lymphoma, small lymphocytic; malignant lymphoma, large cell, diffuse; malignant lymphoma, follicular; mycosis fungoides; other specified non-Hodgkin's lymphomas; B-cell lymphoma; low grade/follicular non-Hodgkin's lymphoma (NHL); small lymphocytic (SL) NHL; intermediate grade/follicular NHL; intermediate grade diffuse NHL; high grade immunoblastic NHL; high grade lymphoblastic NHL; high grade small non-cleaved cell NHL; bulky disease NHL; mantle cell lymphoma; AIDS-related lymphoma; Waldenstrom's macroglobulinemia; malignant histiocytosis; multiple myeloma; mast cell sarcoma; immunoproliferative small intestinal disease; leukemia; lymphoid leukemia; plasma cell leukemia; erythroleukemia; lymphosarcoma cell leukemia; myeloid leukemia; basophilic leukemia; eosinophilic leukemia; monocytic leukemia; mast cell leukemia; megakaryoblastic leukemia; myeloid sarcoma; and hairy cell leukemia. In certain aspects, the tumor may comprise an osteosarcoma, angiosarcoma, rhabdosarcoma, leiomyosarcoma, Ewing sarcoma, glioblastoma, neuroblastoma, or leukemia, including hairy cell leukemia; chronic lymphocytic leukemia (CLL); acute lymphoblastic leukemia (ALL); acute myeloid leukemia (AML); and chronic myeloblastic leukemia.

In another aspect, the compounds, compositions, and methods disclosed herein may be used to treat cancer or other hyperproliferative diseases. While hyperproliferative diseases can be associated with any disease which causes a cell to begin to reproduce uncontrollably, the prototypical example is cancer. One of the elements of cancer is that the cell's normal apoptotic cycle is interrupted. As such, agents that interrupt the growth of the cells are important as therapeutic agents for treating these diseases. In this disclosure, the compounds of the present disclosure thereof may be used to lead to decreased cell counts and may be used to treat a variety of types of cancer.

In some embodiments, cancer cells that may be treated with the compounds or compositions of the present disclosure include, but are not limited to, bladder, blood, bone, bone marrow, brain, breast, colon, esophagus, gastrointestine, gum, head, kidney, liver, lung, nasopharynx, neck, ovary, prostate, skin, stomach, pancreas, testis, tongue, cervix, and uterus cells.

In some embodiments, tumors for which the present treatment methods are useful include any malignant cell type, such as those found in a solid tumor or a hematological tumor. Exemplary solid tumors can include, but are not limited to, a tumor of an organ selected from the group consisting of pancreas, colon, cecum, stomach, brain, head, neck, ovary, kidney, larynx, sarcoma, lung, bladder, melanoma, prostate, and breast. Exemplary hematological tumors include tumors of the bone marrow, T or B cell malignancies, leukemias, lymphomas, blastomas, myelomas, and the like. Further examples of cancers that may be treated using the methods provided herein include, but are not limited to, lung cancer (including small-cell lung cancer, non-small cell lung cancer, adenocarcinoma of the lung, and squamous carcinoma of the lung), cancer of the peritoneum, gastric or stomach cancer (including gastrointestinal cancer and gastrointestinal stromal cancer), pancreatic cancer, cervical cancer, ovarian cancer, liver cancer, bladder cancer, breast cancer, colon cancer, colorectal cancer, endometrial or uterine carcinoma, salivary gland carcinoma, kidney or renal cancer, prostate cancer, vulval cancer, thyroid cancer, various types of head and neck cancer, and melanoma.

In certain embodiments regarding methods of treating cancer in a patient, comprising administering to the patient a pharmaceutically effective amount of a compound of the present disclosure, the pharmaceutically effective amount is 0.1-1000 mg/kg. In certain embodiments, the pharmaceutically effective amount is administered in a single dose per day. In certain embodiments, the pharmaceutically effective amount is administered in two or more doses per day. The compound may be administered by contacting a tumor cell during ex vivo purging, for example. The method of treatment may comprise any one or more of the following: a) inducing cytotoxicity in a tumor cell; b) killing a tumor cell; c) inducing apoptosis in a tumor cell; d) inducing differentiation in a tumor cell; or e) inhibiting growth in a tumor cell. The tumor cell may be any type of tumor cell, such as a brain cell. Other types of cells include, for example, a bladder cancer cell, a breast cancer cell, a lung cancer cell, a colon cancer cell, a prostate cancer cell, a liver cancer cell, a pancreatic cancer cell, a stomach cancer cell, a testicular cancer cell, a brain cancer cell, an ovarian cancer cell, a lymphatic cancer cell, a skin cancer cell, a brain cancer cell, a bone cancer cell, or a soft tissue cancer cell.

In some embodiments, treatment methods further comprise monitoring treatment progress. In some of these embodiments, the method includes the step of determining a level of changes in hematological parameters and/or cancer stem cell (CSC) analysis with cell surface proteins as diagnostic markers or diagnostic measurement (e.g., screen, assay) in a patient suffering from or susceptible to a disorder or symptoms thereof associated with cancer in which the patient has been administered a therapeutic amount of a compound or composition as described herein. The level of the marker determined in the method can be compared to known levels of marker in either healthy normal controls or in other afflicted patients to establish the patient's disease status. In some embodiments, a second level of the marker in the patient is determined at a time point later than the determination of the first level, and the two levels are compared to monitor the course of disease or the efficacy of the therapy. In some embodiments, a pre-treatment level of marker in the patient is determined prior to beginning treatment according to the methods described herein; this pre-treatment level of marker can then be compared to the level of marker in the patient after the treatment commences, to determine the efficacy of the treatment.

In some embodiments, the patient is a mammal, e.g., a primate, preferably a higher primate, e.g., a human (e.g., a patient having, or at risk of having, a disorder described herein). In some embodiments, the patient is in need of enhancing the patient's immune response. In certain embodiments, the patient is, or is at risk of being, immunocompromised. For example, in some embodiments, the patient is undergoing or has undergone a chemotherapeutic treatment and/or radiation therapy. Alternatively, or in combination, the patient is, or is at risk of being, immunocompromised as a result of an infection.

A. Breast Cancer

Breast cancer refers to cancers originating from breast tissue, most commonly from the inner lining of milk ducts or the lobules that supply the ducts with milk. Cancers originating from ducts are known as ductal carcinomas; those originating from lobules are known as lobular carcinomas. There are many different types of breast cancer, with different stages (spread), aggressiveness, and genetic makeup; survival varies greatly depending on those factors. Computerized models are available to predict survival. With best treatment and dependent on staging, 10-year disease-free survival varies from 98% to 10%. Treatment includes surgery, drugs (hormonal therapy and chemotherapy), and radiation.

Worldwide, breast cancer comprises 10.4% of all cancer incidence among women, making it the second most common type of non-skin cancer (after lung cancer) and the fifth most common cause of cancer death. In 2004, breast cancer caused 519,000 deaths worldwide (7% of cancer deaths; almost 1% of all deaths). Breast cancer is about 100 times more common in women than in men, although males tend to have poorer outcomes due to delays in diagnosis.

Some breast cancers require the hormones estrogen and progesterone to grow, and have receptors for those hormones. After surgery those cancers are treated with drugs that interfere with those hormones, usually tamoxifen, and with drugs that shut off the production of estrogen in the ovaries or elsewhere; this may damage the ovaries and end fertility. After surgery, low-risk, hormone-sensitive breast cancers may be treated with hormone therapy and radiation alone. Breast cancers without hormone receptors, or which have spread to the lymph nodes in the armpits, or which express certain genetic characteristics, are higher-risk, and are treated more aggressively. One standard regimen, popular in the U.S., is cyclophosphamide plus doxorubicin (Adriamycin), known as CA; these drugs damage DNA in the cancer, but also in fast-growing normal cells where they cause serious side effects. Sometimes a taxane drug, such as docetaxel, is added, and the regime is then known as CAT;

taxane attacks the microtubules in cancer cells. An equivalent treatment, popular in Europe, is cyclophosphamide, methotrexate, and fluorouracil (CMF). Monoclonal antibodies, such as trastuzumab (Herceptin), are used for cancer cells that have the HER2 mutation. Radiation is usually added to the surgical bed to control cancer cells that were missed by the surgery, which usually extends survival, although radiation exposure to the heart may cause damage and heart failure in the following years.

While screening techniques (which are further discussed below) are useful in determining the possibility of cancer, a further testing is necessary to confirm whether a lump detected on screening is cancer, as opposed to a benign alternative such as a simple cyst.

In a clinical setting, breast cancer is commonly diagnosed using a "triple test" of clinical breast examination (breast examination by a trained medical practitioner), mammography, and fine needle aspiration cytology. Both mammography and clinical breast exam, also used for screening, can indicate an approximate likelihood that a lump is cancer, and may also identify any other lesions. Fine Needle Aspiration and Cytology (FNAC), which may be done in a doctor's office using local anaesthetic if required, involves attempting to extract a small portion of fluid from the lump. Clear fluid makes the lump highly unlikely to be cancerous, but bloody fluid may be sent off for inspection under a microscope for cancerous cells. Together, these three tools can be used to diagnose breast cancer with a good degree of accuracy.

Other options for biopsy include core biopsy, where a section of the breast lump is removed, and an excisional biopsy, where the entire lump is removed.

In addition vacuum-assisted breast biopsy (VAB) may help diagnose breast cancer among patients with a mammographically detected breast in women according to a systematic review. In this study, summary estimates for vacuum assisted breast biopsy in diagnosis of breast cancer were as follows sensitivity was 98.1% with 95% CI=0.972-0.987 and specificity was 100% with 95% CI=0.997-0.999; however, underestimate rates of atypical ductal hyperplasia (ADH) and ductal carcinoma in situ (DCIS) were 20.9% with 95% CI=0.177-0.245 and 11.2% with 95% CI=0.098-0.128 respectively.

Breast cancer screening refers to testing otherwise-healthy women for breast cancer in an attempt to achieve an earlier diagnosis. The assumption is that early detection will improve outcomes. A number of screening tests have been employed including: clinical and self breast exams, mammography, genetic screening, ultrasound, and magnetic resonance imaging.

A clinical or self breast exam involves feeling the breast for lumps or other abnormalities. Research evidence does not support the effectiveness of either type of breast exam, because by the time a lump is large enough to be found it is likely to have been growing for several years and will soon be large enough to be found without an exam. Mammographic screening for breast cancer uses x-rays to examine the breast for any uncharacteristic masses or lumps. In women at high risk, such as those with a strong family history of cancer, mammography screening is recommended at an earlier age and additional testing may include genetic screening that tests for the BRCA genes and/or magnetic resonance imaging.

Breast cancer is sometimes treated first with surgery, and then with chemotherapy, radiation, or both. Treatments are given with increasing aggressiveness according to the prognosis and risk of recurrence. Stage 1 cancers (and DCIS) have an excellent prognosis and are generally treated with lumpectomy with or without chemotherapy or radiation. Although the aggressive HER2+cancers should also be treated with the trastuzumab (Herceptin) regime. Stage 2 and 3 cancers with a progressively poorer prognosis and greater risk of recurrence are generally treated with surgery (lumpectomy or mastectomy with or without lymph node removal), radiation (sometimes) and chemotherapy (plus trastuzumab for HER2+cancers). Stage 4, metastatic cancer, (i.e., spread to distant sites) is not curable and is managed by various combinations of all treatments from surgery, radiation, chemotherapy and targeted therapies. These treatments increase the median survival time of stage 4 breast cancer by about 6 months.

In some embodiments, the present disclosure provides methods of treating and/or preventing breast cancer in a patient comprising administering to the patient a compound of the present disclosure. In some embodiments, the breast cancer may be triple-negative breast cancer. In some embodiments, the patient may have intact BRCA1 and/or BRCA2 genes.

B. Ovarian Cancer

Ovarian cancer is a cancerous growth arising from different parts of the ovary. Most (>90%) ovarian cancers are classified as "epithelial" and were believed to arise from the surface (epithelium) of the ovary. However, recent evidence suggests that the Fallopian tube could also be the source of some ovarian cancers. Since the ovaries and tubes are closely related to each other, it is hypothesized that these cells can mimic ovarian cancer. Other types arise from the egg cells (germ cell tumor) or supporting cells (sex cord/stromal).

In 2004, in the United States, 25,580 new cases were diagnosed and 16,090 women died of ovarian cancer. The risk increases with age and decreases with pregnancy. Lifetime risk is about 1.6%, but women with affected first-degree relatives have a 5% risk. Women with a mutated BRCA1 or BRCA2 gene carry a risk between 25% and 60% depending on the specific mutation. Ovarian cancer is the fifth leading cause of death from cancer in women and the leading cause of death from gynecological cancer.

Ovarian cancer causes non-specific symptoms. Early diagnosis would result in better survival, on the assumption that stage I and II cancers progress to stage III and IV cancers (but this has not been proven). Most women with ovarian cancer report one or more symptoms such as abdominal pain or discomfort, an abdominal mass, bloating, back pain, urinary urgency, constipation, tiredness and a range of other non-specific symptoms, as well as more specific symptoms such as pelvic pain, abnormal vaginal bleeding or involuntary weight loss. There can be a build-up of fluid (ascites) in the abdominal cavity.

Diagnosis of ovarian cancer starts with a physical examination (including a pelvic examination), a blood test (for CA-125 and sometimes other markers), and transvaginal ultrasound. The diagnosis must be confirmed with surgery to inspect the abdominal cavity, take biopsies (tissue samples for microscopic analysis) and look for cancer cells in the abdominal fluid. Treatment usually involves chemotherapy and surgery, and sometimes radiotherapy.

In most cases, the cause of ovarian cancer remains unknown. Older women, and in those who have a first or second degree relative with the disease, have an increased risk. Hereditary forms of ovarian cancer can be caused by mutations in specific genes (most notably BRCA1 and BRCA2, but also in genes for hereditary nonpolyposis colorectal cancer). Infertile women and those with a condition called endometriosis, those who have never been pregnant and those who use postmenopausal estrogen replacement therapy are at increased risk. Use of combined oral contraceptive pills is a protective factor. The risk is also lower in women who have had their uterine tubes blocked surgically (tubal ligation).

Ovarian cancer is classified according to the histology of the tumor, obtained in a pathology report. Histology dictates many aspects of clinical treatment, management, and prognosis. Surface epithelial-stromal tumour, also known as ovarian epithelial carcinoma, is the most common type of ovarian cancer. It includes serous tumour, endometrioid tumor and mucinous cystadenocarcinoma. Sex cord-stromal tumor, including estrogen-producing granulosa cell tumor and virilizing Sertoli-Leydig cell tumor or arrhenoblastoma, accounts for 8% of ovarian cancers. Germ cell tumor accounts for approximately 30% of ovarian tumors but only 5% of ovarian cancers, because most germ cell tumors are teratomas and most teratomas are benign (see Teratoma). Germ cell tumor tends to occur in young women and girls. The prognosis depends on the specific histology of germ cell tumor, but overall is favorable. Mixed tumors, containing elements of more than one of the above classes of tumor histology.

Ovarian cancer can also be a secondary cancer, the result of metastasis from a primary cancer elsewhere in the body. Seven percent of ovarian cancers are due to metastases while the rest are primary cancers. Common primary cancers are breast cancer and gastrointestinal cancer (a common mistake is to name all peritoneal metastases from any gastrointestinal cancer as Krukenberg cancer, but this is only the case if it originates from primary gastric cancer). Surface epithelial-stromal tumor can originate in the peritoneum (the lining of the abdominal cavity), in which case the ovarian cancer is secondary to primary peritoneal cancer, but treatment is basically the same as for primary surface epithelial-stromal tumor involving the peritoneum.

Ovarian cancer staging is by the FIGO staging system and uses information obtained after surgery, which can include a total abdominal hysterectomy, removal of (usually) both ovaries and fallopian tubes, (usually) the omentum, and pelvic (peritoneal) washings for cytopathology. The AJCC stage is the same as the FIGO stage. The AJCC staging system describes the extent of the primary Tumor (T), the absence or presence of metastasis to nearby lymph Nodes (N), and the absence or presence of distant Metastasis (M).

The AJCC/TNM staging system includes three categories for ovarian cancer, T, N and M. The T category contains three other subcategories, T1, T2 and T3, each of them being classified according to the place where the tumor has developed (in one or both ovaries, inside or outside the ovary). The T1 category of ovarian cancer describes ovarian tumors that are confined to the ovaries, and which may affect one or both of them. The sub-subcategory T1a is used to stage cancer that is found in only one ovary, which has left the capsule intact and which cannot be found in the fluid taken from the pelvis. Cancer that has not affected the capsule, is confined to the inside of the ovaries and cannot be found in the fluid taken from the pelvis but has affected both ovaries is staged as T1b. T1c category describes a type of tumor that can affect one or both ovaries, and which has grown through the capsule of an ovary or it is present in the fluid taken from the pelvis. T2 is a more advanced stage of cancer. In this case, the tumor has grown in one or both ovaries and is spread to the uterus, fallopian tubes or other pelvic tissues. Stage T2a is used to describe a cancerous tumor that has spread to the uterus or the fallopian tubes (or both) but which is not present in the fluid taken from the pelvis. Stages T2b and T2c indicate cancer that metastasized to other pelvic tissues than the uterus and fallopian tubes and which cannot be seen in the fluid taken from the pelvis, respectively tumors that spread to any of the pelvic tissues (including uterus and fallopian tubes) but which can also be found in the fluid taken from the pelvis. T3 is the stage used to describe cancer that has spread to the peritoneum. This stage provides information on the size of the metastatic tumors (tumors that are located in other areas of the body, but are caused by ovarian cancer).

These tumors can be very small, visible only under the microscope (T3a), visible but not larger than 2 centimeters (T3b) and bigger than 2 centimeters (T3c).

This staging system also uses N categories to describe cancers that have or not spread to nearby lymph nodes. There are only two N categories, N0 which indicates that the cancerous tumors have not affected the lymph nodes, and N1 which indicates the involvement of lymph nodes close to the tumor. The M categories in the AJCC/TNM staging system provide information on whether the ovarian cancer has metastasized to distant organs such as liver or lungs. M0 indicates that the cancer did not spread to distant organs and M1 category is used for cancer that has spread to other organs of the body. The AJCC/TNM staging system also contains a Tx and a Nx sub-category which indicates that the extent of the tumor cannot be described because of insufficient data, respectively the involvement of the lymph nodes cannot be described because of the same reason.

Ovarian cancer, as well as any other type of cancer, is also graded, apart from staged. The histologic grade of a tumor measures how abnormal or malignant its cells look under the microscope. There are four grades indicating the likelihood of the cancer to spread and the higher the grade, the more likely for this to occur. Grade 0 is used to describe non-invasive tumors. Grade 0 cancers are also referred to as borderline tumors. Grade 1 tumors have cells that are well differentiated (look very similar to the normal tissue) and are the ones with the best prognosis. Grade 2 tumors are also called moderately well differentiated and they are made up by cells that resemble the normal tissue. Grade 3 tumors have the worst prognosis and their cells are abnormal, referred to as poorly differentiated.

The signs and symptoms of ovarian cancer are most of the times absent, but when they exist they are nonspecific. In most cases, the symptoms persist for several months until the patient is diagnosed.

A prospective case-control study of 1,709 women visiting primary care clinics found that the combination of bloating, increased abdominal size, and urinary symptoms was found in 43% of those with ovarian cancer but in only 8% of those presenting to primary care clinics.

The exact cause is usually unknown. The risk of developing ovarian cancer appears to be affected by several factors. The more children a woman has, the lower her risk of ovarian cancer. Early age at first pregnancy, older age of final pregnancy and the use of low dose hormonal contraception have also been shown to have a protective effect. Ovarian cancer is reduced in women after tubal ligation.

The relationship between use of oral contraceptives and ovarian cancer was shown in a summary of results of 45 case-control and prospective studies. Cumulatively these studies show a protective effect for ovarian cancers. Women who used oral contraceptives for 10 years had about a 60% reduction in risk of ovarian cancer. (risk ratio 0.42 with statistical significant confidence intervals given the large study size, not unexpected). This means that if 250 women took oral contraceptives for 10 years, 1 ovarian cancer would be prevented. This is by far the largest epidemiological study to date on this subject (45 studies, over 20,000 women with ovarian cancer and about 80,000 controls).

The link to the use of fertility medication, such as Clomiphene citrate, has been controversial. An analysis in 1991 raised the possibility that use of drugs may increase the risk of ovarian cancer. Several cohort studies and case-control studies have been conducted since then without demonstrating conclusive evidence for such a link. It will remain a complex topic to study as the infertile population differs in parity from the "normal" population.

There is good evidence that in some women genetic factors are important. Carriers of certain mutations of the BRCA1 or the BRCA2 gene are notably at risk. The BRCA1 and BRCA2 genes account for 5%-13% of ovarian cancers and certain populations (e.g. Ashkenazi Jewish women) are at a higher risk of both breast cancer and ovarian cancer, often at an earlier age than the general population. Patients with a personal history of breast cancer or a family history of breast and/or ovarian cancer, especially if diagnosed at a young age, may have an elevated risk. In some embodiments, the compounds of the present disclosure may be used to inhibit PARG in cells having intact BRCA1 and/or BRCA2. In some embodiments, the compounds of the present disclosure may be used to treat or prevent cancer in a patient having a cancer with intact BRCA1 and/or BRCA2.

A strong family history of uterine cancer, colon cancer, or other gastrointestinal cancers may indicate the presence of a syndrome known as hereditary nonpolyposis colorectal cancer (HNPCC, also known as Lynch syndrome), which confers a higher risk for developing ovarian cancer. Patients with strong genetic risk for ovarian cancer may consider the use of prophylactic, i.e. preventative, oophorectomy after completion of childbearing.[citation needed] Australia being member of International Cancer Genome Consortium is leading efforts to map ovarian cancer's complete genome.

Ovarian cancer at its early stages(I/II) is difficult to diagnose until it spreads and advances to later stages (III/IV). This is because most symptoms are non-specific and thus of little use in diagnosis.

When an ovarian malignancy is included in the list of diagnostic possibilities, a limited number of laboratory tests are indicated. A complete blood count (CBC) and serum electrolyte test should be obtained in all patients.

The serum BHCG level should be measured in any female in whom pregnancy is a possibility. In addition, serum alpha-fetoprotein (AFP) and lactate dehydrogenase (LDH) should be measured in young girls and adolescents with suspected ovarian tumors because the younger the patient, the greater the likelihood of a malignant germ cell tumor.

A blood test called CA-125 is useful in differential diagnosis and in follow up of the disease, but it by itself has not been shown to be an effective method to screen for early-stage ovarian cancer due to its unacceptable low sensitivity and specificity. However, this is the only widely-used marker currently available.

Current research is looking at ways to combine tumor markers proteomics along with other indicators of disease (i.e., radiology and/or symptoms) to improve accuracy. The challenge in such an approach is that the very low population prevalence of ovarian cancer means that even testing with very high sensitivity and specificity will still lead to a number of false positive results (i.e., performing surgical procedures in which cancer is not found intra-operatively). However, the contributions of proteomics are still in the early stages and require further refining. Current studies on proteomics mark the beginning of a paradigm shift towards individually tailored therapy.

A pelvic examination and imaging including CT scan and trans-vaginal ultrasound are essential. Physical examination may reveal increased abdominal girth and/or ascites (fluid within the abdominal cavity). Pelvic examination may reveal an ovarian or abdominal mass. The pelvic examination can include a rectovaginal component for better palpation of the ovaries. For very young patients, magnetic resonance imaging may be preferred to rectal and vaginal examination.

To definitively diagnose ovarian cancer, a surgical procedure to take a look into the abdomen is required. This can be an open procedure (laparotomy, incision through the abdominal wall) or keyhole surgery (laparoscopy). During this procedure, suspicious areas will be removed and sent for microscopic analysis. Fluid from the abdominal cavity can also be analysed for cancerous cells. If there is cancer, this procedure can also determine its spread (which is a form of tumor staging).

Women who have had children are less likely to develop ovarian cancer than women who have not, and breastfeeding may also reduce the risk of certain types of ovarian cancer. Tubal ligation and hysterectomy reduce the risk and removal of both tubes and ovaries (bilateral salpingo-oophorectomy) dramatically reduces the risk of not only ovarian cancer but breast cancer also. The use of oral contraceptives (birth control pills) for five years or more decreases the risk of ovarian cancer in later life by 50%.

Tubal ligation is believed to decrease the chance of developing ovarian cancer by up to 67% while a hysterectomy may reduce the risk of getting ovarian cancer by about one-third. Moreover, according to some studies, analgesics such as acetaminophen and aspirin seem to reduce one's risks of developing ovarian cancer. Yet, the information is not consistent and more research needs to be carried on this matter.

Routine screening of women for ovarian cancer is not recommended by any professional society—this includes the U.S. Preventive Services Task Force, the American Cancer Society, the American College of Obstetricians and Gynecologists, and the National Comprehensive Cancer Network. This is because no trial has shown improved survival for women undergoing screening. Screening for any type of cancer must be accurate and reliable—it needs to accurately detect the disease and it must not give false positive results in people who do not have cancer. As yet there is no technique for ovarian screening that has been shown to fulfil these criteria. However, in some countries such as the UK, women who are likely to have an increased risk of ovarian cancer (for example if they have a family history of the disease) can be offered individual screening through their doctors, although this will not necessarily detect the disease at an early stage.

Researchers are assessing different ways to screen for ovarian cancer. Screening tests that could potentially be used alone or in combination for routine screening include the CA-125 marker and transvaginal ultrasound. Doctors can measure the levels of the CA-125 protein in a woman's blood—high levels could be a sign of ovarian cancer, but this is not always the case. And not all women with ovarian cancer have high CA-125 levels. Transvaginal ultrasound involves using an ultrasound probe to scan the ovaries from inside the vagina, giving a clearer image than scanning the abdomen. The UK Collaborative Trial of Ovarian Cancer Screening is testing a screening technique that combines CA-125 blood tests with transvaginal ultrasound.

The purpose of screening is to diagnose ovarian cancer at an early stage, when it is more likely to be treated successfully. However, the development of the disease is not fully understood, and it has been argued that early-stage cancers may not always develop into late-stage disease. With any screening technique there are risks and benefits that need to be carefully considered, and health authorities need to assess these before introducing any ovarian cancer screening programs.

The goal of ovarian cancer screening is to detect the disease at stage I. Several large studies are ongoing, but none have identified an effective technique. In 2009, however, early results from the UK Collaborative Trial of Ovarian Cancer Screening (UKCTOCS) showed that a technique combining annual CA-125 tests with ultrasound imaging did help to detect the disease at an early stage. However, it is not yet clear if this approach could actually help to save lives—the full results of the trial will be published in 2015.

Surgical treatment may be sufficient for malignant tumors that are well-differentiated and confined to the ovary. Addition of chemotherapy may be required for more aggressive tumors that are confined to the ovary. For patients with advanced disease a combination of surgical reduction with a combination chemotherapy regimen is standard. Borderline tumors, even following spread outside of the ovary, are managed well with surgery, and chemotherapy is not seen as useful.

Surgery is the preferred treatment and is frequently necessary to obtain a tissue specimen for differential diagnosis via its histology. Surgery performed by a specialist in gynecologic oncology usually results in an improved result. Improved survival is attributed to more accurate staging of the disease and a higher rate of aggressive surgical excision of tumor in the abdomen by gynecologic oncologists as opposed to general gynecologists and general surgeons.

The type of surgery depends upon how widespread the cancer is when diagnosed (the cancer stage), as well as the presumed type and grade of cancer. The surgeon may remove one (unilateral oophorectomy) or both ovaries (bilateral oophorectomy), the fallopian tubes (salpingectomy), and the uterus (hysterectomy). For some very early tumors (stage 1, low grade or low-risk disease), only the involved ovary and fallopian tube will be removed (called a "unilateral salpingo-oophorectomy," USO), especially in young females who wish to preserve their fertility.

In advanced malignancy, where complete resection is not feasible, as much tumor as possible is removed (debulking surgery). In cases where this type of surgery is successful (i.e., <1 cm in diameter of tumor is left behind ["optimal debulking" ]), the prognosis is improved compared to patients where large tumor masses (>1 cm in diameter) are left behind. Minimally invasive surgical techniques may facilitate the safe removal of very large (greater than 10 cm) tumors with fewer complications of surgery.

Chemotherapy has been a general standard of care for ovarian cancer for decades, although with highly variable protocols. Chemotherapy is used after surgery to treat any residual disease, if appropriate. This depends on the histology of the tumor; some kinds of tumor (particularly teratoma) are not sensitive to chemotherapy. In some cases, there may be reason to perform chemotherapy first, followed by surgery.

For patients with stage IIIC epithelial ovarian adenocarcinomas who have undergone successful optimal debulking, a recent clinical trial demonstrated that median survival time is significantly longer for patient receiving intraperitoneal (IP) chemotherapy. Patients in this clinical trial reported less compliance with IP chemotherapy and fewer than half of the patients received all six cycles of IP chemotherapy. Despite this high "drop-out" rate, the group as a whole (including the patients that didn't complete IP chemotherapy treatment) survived longer on average than patients who received intravenous chemotherapy alone.

Some specialists believe the toxicities and other complications of IP chemotherapy will be unnecessary with improved IV chemotherapy drugs currently being developed.

Although IP chemotherapy has been recommended as a standard of care for the first-line treatment of ovarian cancer, the basis for this recommendation has been challenged.

Radiation therapy is not effective for advanced stages because when vital organs are in the radiation field, a high dose cannot be safely delivered. Radiation therapy is then commonly avoided in such stages as the vital organs may not be able to withstand the problems associated with these ovarian cancer treatments.

Ovarian cancer usually has a poor prognosis. It is disproportionately deadly because it lacks any clear early detection or screening test, meaning that most cases are not diagnosed until they have reached advanced stages. More than 60% of women presenting with this cancer already have stage III or stage IV cancer, when it has already spread beyond the ovaries. Ovarian cancers shed cells into the naturally occurring fluid within the abdominal cavity. These cells can then implant on other abdominal (peritoneal) structures, included the uterus, urinary bladder, bowel and the lining of the bowel wall omentum forming new tumor growths before cancer is even suspected.

The five-year survival rate for all stages of ovarian cancer is 45.5%. For cases where a diagnosis is made early in the disease, when the cancer is still confined to the primary site, the five-year survival rate is 92.7%.

C. Chemotherapy

A wide variety of chemotherapeutic agents may be used in accordance with the present invention. The term "chemotherapy" refers to the use of drugs to treat cancer. A "chemotherapeutic agent" is used to connote a compound or composition that is administered in the treatment of cancer. These agents or drugs are categorized by their mode of activity within a cell, for example, whether and at what stage they affect the cell cycle. Alternatively, an agent may be characterized based on its ability to directly cross-link DNA, to intercalate into DNA, or to induce chromosomal and mitotic aberrations by affecting nucleic acid synthesis.

Examples of chemotherapeutic agents include alkylating agents, such as thiotepa and cyclosphosphamide; alkyl sulfonates, such as busulfan, improsulfan, and piposulfan; aziridines, such as benzodopa, carboquone, meturedopa, and uredopa; ethylenimines and methylamelamines, including altretamine, triethylenemelamine, trietylenephosphoramide, triethiylenethiophosphoramide, and trimethylolomelamine; acetogenins (especially bullatacin and bullatacinone); a camptothecin (including the synthetic analogue topotecan); bryostatin; callystatin; CC-1065 (including its adozelesin, carzelesin and bizelesin synthetic analogues); cryptophycins (particularly cryptophycin 1 and cryptophycin 8); dolastatin; duocarmycin (including the synthetic analogues, KW-2189 and CB1-TM1); eleutherobin; pancratistatin; a sarcodictyin; spongistatin; nitrogen mustards, such as chlorambucil, chlornaphazine, cholophosphamide, estramustine, ifosfamide, mechlorethamine, mechlorethamine oxide hydrochloride, melphalan, novembichin, phenesterine, prednimustine, trofosfamide, and uracil mustard; nitrosureas, such as carmustine, chlorozotocin, fotemustine, lomustine, nimustine, and ranimnustine; antibiotics, such as the enediyne antibiotics (e.g., calicheamicin, especially calicheamicin gammaII and calicheamicin omegaI1); dynemicin, including dynemicin A; bisphosphonates, such as clodronate; an esperamicin; as well as neocarzinostatin chromophore and related chromoprotein enediyne antiobiotic chromophores, aclacinomysins, actinomycin, authrarnycin, azaserine, bleomycins, cactinomycin, carabicin, carminomycin, carzinophilin, chromomycinis, dactinomycin, daunorubicin, detorubicin, 6-diazo-5-oxo-L-norleucine, doxorubicin (including morpholino-doxorubicin, cyanomorpholino-doxorubicin, 2-pyrrolino-doxorubicin and deoxydoxorubicin), epirubicin, esorubicin, idarubicin, marcellomycin, mitomycins, such as mitomycin C, mycophenolic acid, nogalarnycin, olivomycins, peplomycin, potfiromycin, puromycin, quelamycin, rodorubicin, streptonigrin, streptozocin, tubercidin, ubenimex, zinostatin, and zorubicin; anti-metabolites, such as methotrexate and 5-fluorouracil (5-FU); folic acid analogues, such as denopterin, pteropterin, and trimetrexate; purine analogs, such as fludarabine, 6-mercaptopurine, thiamiprine, and thioguanine; pyrimidine analogs, such as ancitabine, azacitidine, 6-azauridine, carmofur, cytarabine, dideoxyuridine, doxifluridine, enocitabine, and floxuridine; androgens, such as calusterone, dromostanolone propionate, epitiostanol, mepitiostane, and testolactone; anti-adrenals, such as mitotane and trilostane; folic acid replenisher, such as frolinic acid; aceglatone; aldophosphamide glycoside; aminolevulinic acid; eniluracil; amsacrine; bestrabucil; bisantrene; edatraxate; defofamine; demecolcine; diaziquone; elformithine; elliptinium acetate; an epothilone; etoglucid; gallium nitrate; hydroxyurea; lentinan; lonidainine; maytansinoids, such as maytansine and ansamitocins; mitoguazone; mitoxantrone; mopidanmol; nitraerine; pentostatin; phenamet; pirarubicin; losoxantrone; podophyllinic acid; 2-ethylhydrazide; procarbazine; PSKpolysaccharide complex; razoxane; rhizoxin; sizofiran; spirogermanium; tenuazonic acid; triaziquone; 2,2',2"-trichlorotriethylamine; trichothecenes (especially T-2 toxin, verracurin A, roridin A and anguidine); urethan; vindesine; dacarbazine; mannomustine; mitobronitol; mitolactol; pipobroman; gacytosine; arabinoside ("Ara-C"); cyclophosphamide; taxoids, e.g., paclitaxel and docetaxel gemcitabine; 6-thioguanine; mercaptopurine; platinum coordination complexes, such as cisplatin, oxaliplatin, and carboplatin; vinblastine; platinum; etoposide (VP-16); ifosfamide; mitoxantrone; vincristine; vinorelbine; novantrone; teniposide; edatrexate; daunomycin; aminopterin; xeloda; ibandronate; irinotecan (e.g., CPT-11); topoisomerase inhibitor RFS 2000; difluorometlhylornithine (DMFO); retinoids, such as retinoic acid; capecitabine; carboplatin, procarbazine, plicomycin, gemcitabien, navelbine, farnesyl-protein tansferase inhibitors, transplatinum, and pharmaceutically acceptable salts, acids, or derivatives of any of the above. In some embodiments, the PARG inhibitors of the present disclosure may be used in combination with one or more additional chemotherapeutic agents.

D. Radiotherapy

Other factors that cause DNA damage and have been used extensively include what are commonly known as γ-rays, X-rays, and/or the directed delivery of radioisotopes to tumor cells. Other forms of DNA damaging factors are also contemplated, such as microwaves, proton beam irradiation (U.S. Pat. Nos. 5,760,395 and 4,870,287), and UV-irradiation. It is most likely that all of these factors affect a broad range of damage on DNA, on the precursors of DNA, on the replication and repair of DNA, and on the assembly and maintenance of chromosomes. Dosage ranges for X-rays range from daily doses of 50 to 200 roentgens for prolonged periods of time (3 to 4 wk), to single doses of 2000 to 6000 roentgens. Dosage ranges for radioisotopes vary widely, and depend on the half-life of the isotope, the strength and type of radiation emitted, and the uptake by the neoplastic cells. In some embodiments, the PARGi of the present disclosure may be used to sensitize cancer cells to radiotherapy. In some embodiments, the PARGi inhibitors of the present disclosure may be used in combination with radiotherapy.

E. Immunotherapy

The skilled artisan will understand that immunotherapies may be used in combination or in conjunction with methods of the present disclosure. In the context of cancer treatment, immunotherapeutics, generally, rely on the use of immune effector cells and molecules to target and destroy cancer cells. Rituximab (Rituxan®) is such an example. The immune effector may be, for example, an antibody specific for some marker on the surface of a tumor cell. The antibody alone may serve as an effector of therapy or it may recruit other cells to actually affect cell killing. The antibody also may be conjugated to a drug or toxin (chemotherapeutic, radionuclide, ricin A chain, cholera toxin, pertussis toxin, etc.) and serve merely as a targeting agent. Alternatively, the effector may be a lymphocyte carrying a surface molecule that interacts, either directly or indirectly, with a tumor cell target. Various effector cells include cytotoxic T cells and NK cells.

In one aspect of immunotherapy, the tumor cell must bear some marker that is amenable to targeting, i.e., is not present on the majority of other cells. Many tumor markers exist and any of these may be suitable for targeting in the context of the present invention.

Common tumor markers include CD20, carcinoembryonic antigen, tyrosinase (p97), gp68, TAG-72, HMFG, Sialyl Lewis Antigen, MucA, MucB, PLAP, laminin receptor, erb B, and p155. An alternative aspect of immunotherapy is to combine anticancer effects with immune stimulatory effects. Immune stimulating molecules also exist including: cytokines, such as IL-2, IL-4, IL-12, GM-CSF, gamma-IFN, chemokines, such as MIP-1, MCP-1, IL-8, and growth factors, such as FLT3 ligand. In some embodiments, the PARG inhibitors of the present disclosure may be used in combination with an immunotherapy.

F. Surgery

Approximately 60% of persons with cancer will undergo surgery of some type, which includes preventative, diagnostic or staging, curative, and palliative surgery. Curative surgery includes resection in which all or part of cancerous tissue is physically removed, excised, and/or destroyed and may be used in conjunction with other therapies, such as the treatment of the present invention, chemotherapy, radiotherapy, hormonal therapy, gene therapy, immunotherapy, and/or alternative therapies. Tumor resection refers to physical removal of at least part of a tumor. In addition to tumor resection, treatment by surgery includes laser surgery, cryosurgery, electrosurgery, and microscopically-controlled surgery (Mohs' surgery).

Upon excision of part or all of cancerous cells, tissue, or tumor, a cavity may be formed in the body. Treatment may be accomplished by perfusion, direct injection, or local application of the area with an additional anti-cancer therapy. Such treatment may be repeated, for example, every 1, 2, 3, 4, 5, 6, or 7 days, or every 1, 2, 3, 4, and 5 weeks or every 1, 2, 3, 4, 5, 6, 7, 8, 9, 10, 11, or 12 months. These treatments may be of varying dosages as well.

V. Pharmaceutical Formulations and Methods of Treatment

In another aspect, for administration to a patient in need of such treatment, pharmaceutical formulations (also referred to as a pharmaceutical preparations, pharmaceutical compositions, pharmaceutical products, medicinal products, medicines, medications, or medicaments) comprise a therapeutically effective amount of a compound disclosed herein formulated with one or more excipients and/or drug carriers appropriate to the indicated route of administration. In some embodiments, the compounds disclosed herein are formulated in a manner amenable for the treatment of human and/or veterinary patients. In some embodiments, formulation comprises admixing or combining one or more of the compounds disclosed herein with one or more of the following excipients: lactose, sucrose, starch powder, cellulose esters of alkanoic acids, cellulose alkyl esters, talc, stearic acid, magnesium stearate, magnesium oxide, sodium and calcium salts of phosphoric and sulfuric acids, gelatin, acacia, sodium alginate, polyvinylpyrrolidone, and/or polyvinyl alcohol. In some embodiments, e.g., for oral administration, the pharmaceutical formulation may be tableted or encapsulated. In some embodiments, the compounds may be dissolved or slurried in water, polyethylene glycol, propylene glycol, ethanol, corn oil, cottonseed oil, peanut oil, sesame oil, benzyl alcohol, sodium chloride, and/or various buffers. In some embodiments, the pharmaceutical formulations may be subjected to pharmaceutical operations, such as sterilization, and/or may contain drug carriers and/or excipients such as preservatives, stabilizers, wetting agents, emulsifiers, encapsulating agents such as lipids, dendrimers, polymers, proteins such as albumin, nucleic acids, and buffers.

Pharmaceutical formulations may be administered by a variety of methods, e.g., orally or by injection (e.g. subcutaneous, intravenous, and intraperitoneal). Depending on the route of administration, the compounds disclosed herein may be coated in a material to protect the compound from the action of acids and other natural conditions which may inactivate the compound. To administer the active compound by other than parenteral administration, it may be necessary to coat the compound with, or co-administer the compound with, a material to prevent its inactivation. In some embodiments, the active compound may be administered to a patient in an appropriate carrier, for example, liposomes, or a diluent. Pharmaceutically acceptable diluents include saline and aqueous buffer solutions. Liposomes include water-in-oil-in-water CGF emulsions as well as conventional liposomes.

The compounds disclosed herein may also be administered parenterally, intraperitoneally, intraspinally, or intracerebrally. Dispersions can be prepared in glycerol, liquid polyethylene glycols, and mixtures thereof and in oils. Under ordinary conditions of storage and use, these preparations may contain a preservative to prevent the growth of microorganisms.

Pharmaceutical compositions suitable for injectable use include sterile aqueous solutions (where water soluble) or dispersions and sterile powders for the extemporaneous preparation of sterile injectable solutions or dispersion. The carrier can be a solvent or dispersion medium containing, for example, water, ethanol, polyol (such as, glycerol, propylene glycol, and liquid polyethylene glycol, and the like), suitable mixtures thereof, and vegetable oils. The proper fluidity can be maintained, for example, by the use of a coating such as lecithin, by the maintenance of the required particle size in the case of dispersion and by the use of surfactants. Prevention of the action of microorganisms can be achieved by various antibacterial and antifungal agents, for example, parabens, chlorobutanol, phenol, ascorbic acid, thimerosal, and the like. In many cases, it will be preferable to include isotonic agents, for example, sugars, sodium chloride, or polyalcohols such as mannitol and sorbitol, in the composition. Prolonged absorption of the injectable compositions can be brought about by including in the composition an agent which delays absorption, for example, aluminum monostearate or gelatin.

The compounds disclosed herein can be administered orally, for example, with an inert diluent or an assimilable edible carrier. The compounds and other ingredients may also be enclosed in a hard or soft-shell gelatin capsule, compressed into tablets, or incorporated directly into the patient's diet. For oral therapeutic administration, the compounds disclosed herein may be incorporated with excipients and used in the form of ingestible tablets, buccal tablets, troches, capsules, elixirs, suspensions, syrups, wafers, and the like. The percentage of the therapeutic compound in the compositions and preparations may, of course, be varied. The amount of the therapeutic compound in such pharmaceutical formulations is such that a suitable dosage will be obtained.

The therapeutic compound may also be administered topically to the skin, eye, ear, or mucosal membranes. Administration of the therapeutic compound topically may include formulations of the compounds as a topical solution, lotion, cream, ointment, gel, foam, transdermal patch, or tincture. When the therapeutic compound is formulated for topical administration, the compound may be combined with one or more agents that increase the permeability of the compound through the tissue to which it is administered. In other embodiments, it is contemplated that the topical administration is administered to the eye. Such administration may be applied to the surface of the cornea, conjunctiva, or sclera. Without wishing to be bound by any theory, it is believed that administration to the surface of the eye allows the therapeutic compound to reach the posterior portion of the eye. Ophthalmic topical administration can be formulated as a solution, suspension, ointment, gel, or emulsion. Finally, topical administration may also include administration to the mucosa membranes such as the inside of the mouth. Such administration can be directly to a particular location within the mucosal membrane such as a tooth, a sore, or an ulcer. Alternatively, if local delivery to the lungs is desired the therapeutic compound may be administered by inhalation in a dry-powder or aerosol formulation.

In some embodiments, it may be advantageous to formulate parenteral compositions in dosage unit form for ease of administration and uniformity of dosage. Dosage unit form as used herein refers to physically discrete units suited as unitary dosages for the patients to be treated; each unit containing a predetermined quantity of therapeutic compound calculated to produce the desired therapeutic effect in association with the required pharmaceutical carrier. In some embodiments, the specification for the dosage unit forms of the disclosure are dictated by and directly dependent on (a) the unique characteristics of the therapeutic compound and the particular therapeutic effect to be achieved, and (b) the limitations inherent in the art of compounding such a therapeutic compound for the treatment of a selected condition in a patient. In some embodiments, active compounds are administered at a therapeutically effective dosage sufficient to treat a condition associated with a condition in a patient. For example, the efficacy of a compound can be evaluated in an animal model system that may be predictive of efficacy in treating the disease in a human or another animal.

In some embodiments, the effective dose range for the therapeutic compound can be extrapolated from effective doses determined in animal studies for a variety of different animals. In some embodiments, the human equivalent dose (HED) in mg/kg can be calculated in accordance with the following formula (see, e.g., Reagan-Shaw et al., FASEB J., 22(3):659-661, 2008, which is incorporated herein by reference):

$$HED(mg/kg)=Animal\ dose(mg/kg) \times (Animal\ K_m/Human\ K_m)$$

Use of the $K_m$ factors in conversion results in HED values based on body surface area (BSA) rather than only on body mass. $K_m$ values for humans and various animals are well known. For example, the $K_m$ for an average 60 kg human (with a BSA of 1.6 m$^2$) is 37, whereas a 20 kg child (BSA 0.8 m$^2$) would have a $K_m$ of 25. $K_m$ for some relevant animal models are also well known, including: mice $K_m$ of 3 (given a weight of 0.02 kg and BSA of 0.007); hamster $K_m$ of 5 (given a weight of 0.08 kg and BSA of 0.02); rat $K_m$ of 6 (given a weight of 0.15 kg and BSA of 0.025) and monkey $K_m$ of 12 (given a weight of 3 kg and BSA of 0.24).

Precise amounts of the therapeutic composition depend on the judgment of the practitioner and are specific to each individual. Nonetheless, a calculated HED dose provides a general guide. Other factors affecting the dose include the physical and clinical state of the patient, the route of administration, the intended goal of treatment and the potency, stability and toxicity of the particular therapeutic formulation.

The actual dosage amount of a compound of the present disclosure or composition comprising a compound of the present disclosure administered to a patient may be determined by physical and physiological factors such as type of animal treated, age, sex, body weight, severity of condition, the type of disease being treated, previous or concurrent therapeutic interventions, idiopathy of the patient and on the route of administration. These factors may be determined by a skilled artisan. The practitioner responsible for administration will typically determine the concentration of active ingredient(s) in a composition and appropriate dose(s) for the individual patient. The dosage may be adjusted by the individual physician in the event of any complication.

In some embodiments, the therapeutically effective amount typically will vary from about 0.001 mg/kg to about 1000 mg/kg, from about 0.01 mg/kg to about 750 mg/kg, from about 100 mg/kg to about 500 mg/kg, from about 1 mg/kg to about 250 mg/kg, from about 10 mg/kg to about 150 mg/kg in one or more dose administrations daily, for one or several days (depending of course of the mode of administration and the factors discussed above).

Other suitable dose ranges include 1 mg to 10,000 mg per day, 100 mg to 10,000 mg per day, 500 mg to 10,000 mg per day, and 500 mg to 1,000 mg per day. In some embodiments, the amount is less than 10,000 mg per day with a range of 750 mg to 9,000 mg per day.

In some embodiments, the amount of the active compound in the pharmaceutical formulation is from about 2 to about 75 weight percent. In some of these embodiments, the amount if from about 25 to about 60 weight percent.

Single or multiple doses of the agents are contemplated. Desired time intervals for delivery of multiple doses can be determined by one of ordinary skill in the art employing no more than routine experimentation. As an example, patients may be administered two doses daily at approximately 12-hour intervals. In some embodiments, the agent is administered once a day.

The agent(s) may be administered on a routine schedule. As used herein a routine schedule refers to a predetermined designated period of time. The routine schedule may encompass periods of time which are identical, or which differ in length, as long as the schedule is predetermined. For instance, the routine schedule may involve administration twice a day, every day, every two days, every three days, every four days, every five days, every six days, a weekly basis, a monthly basis or any set number of days or weeks there-between.

Alternatively, the predetermined routine schedule may involve administration on a twice daily basis for the first week, followed by a daily basis for several months, etc. In other embodiments, the disclosure provides that the agent(s) may be taken orally and that the timing of which is or is not dependent upon food intake. Thus, for example, the agent can be taken every morning and/or every evening, regardless of when the patient has eaten or will eat.

VI. EXAMPLES

The following examples are included to demonstrate preferred embodiments of the disclosure. It should be appreciated by those of skill in the art that the techniques disclosed in the examples which follow represent techniques discovered by the inventor to function well in the practice of the disclosure, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosure.

Example 1—Results

Figure 6:
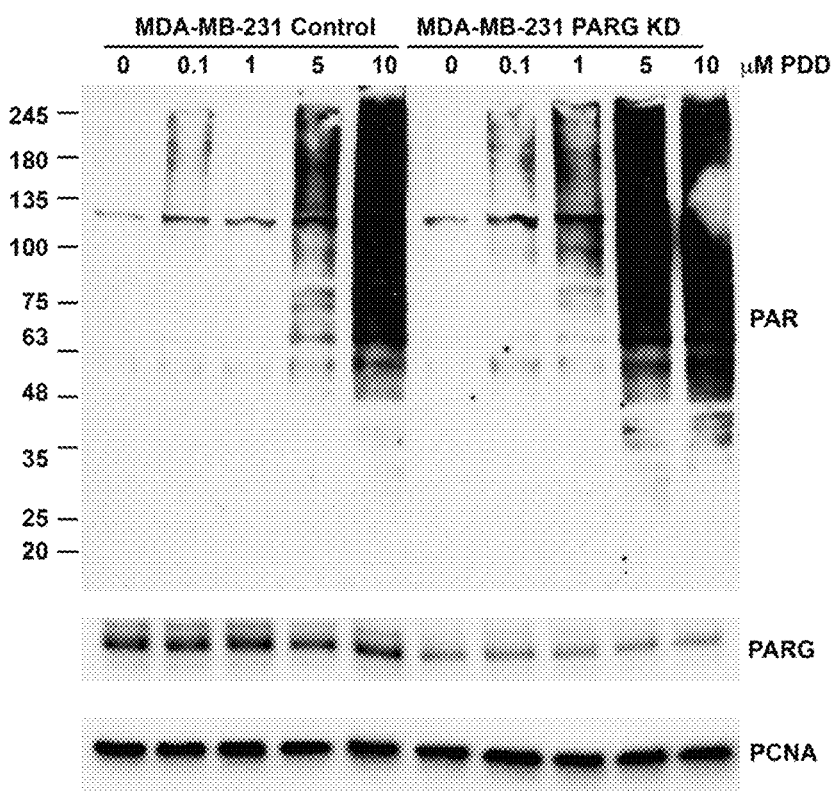
FIG. 6 shows PDD dose response in PARG depleted and normal control cells: MDA-MB-231 cells with or without PARG depletion were treated with identical concentration of PDD overnight, cell lysates were immunoblotted with anti-PAR followed by PARG and PCNA. The results here show dose dependent PAR accumulation in response to PDD treatment. There was no difference in PAR accumulation between control and PARG-depleted cells further suggesting PDD act non-specifically in cells.
Figure 7:
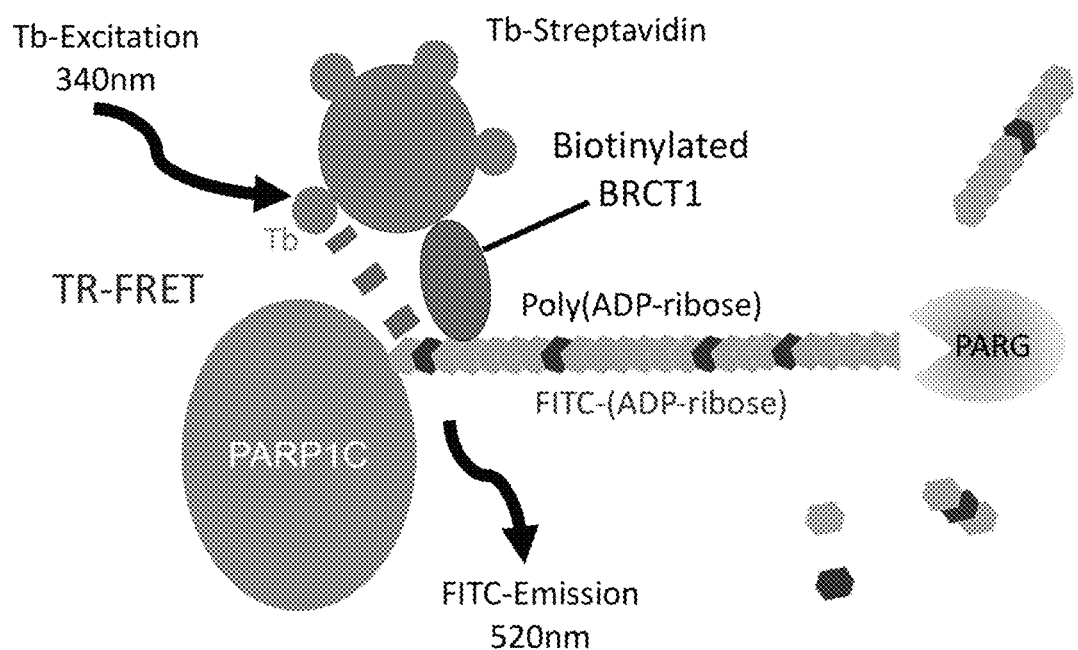
FIG. 7 shows a high-throughput TR-FRET assay for PAR turnover. The fluorescein (FITC) molecules are incorporated into PAR chains during enzymatic PARylation of PARP1C (see Methods). The FITC-labeled PARP1C (FRET acceptor) is bound to the biotinylated BRCT1 domain of XRCC1 that is complexed with a $Tb^{3+}$-streptavidin conjugate (FRET donor). The TR-FRET intensity ratio ($F_{520}/F_{495}$) resulting from PARP1-XRCC1 complex formation is >10-fold higher than the background signal when the FITC-PARP1 acceptor or the BRCT1 domain is omitted from the reaction. Addition of PARG to the labeled PARP1-XRCC1 complex removes the PAR posttranslational modification from PARP1, causing the complex to fall apart with loss of the TR-FRET signal (FIG. 2b). For full detail see Kim et. al., 2015. A quantitative assay reveals ligand specificity of the DNA scaffold repair protein XRCC1 and efficient disassembly of complexes of XRCC1 and the poly(ADP-ribose) polymerase 1 by poly(ADP-ribose) glycohydrolase. Adapted from Kim et al., (2015).

Identification of specific PARG inhibitors. TCGA database analysis revealed that in most human cancers PARG expression is upregulated (FIG. 1a). PARG enzymatic function can be required for tumorigenesis (Marques et al., 2018). The relatively potent quinazolinedione sulfonamide PARG inhibitor, PDD00017273 (hereafter referred to as PDD; James et al., 2016) was examined to test its selectivity using human prostate adenocarcinoma (PC3) and U2OS osteosarcoma cells that show measurable differences in endogenous PARG protein expression. By using PAR accumulation as a direct readout for PARG inhibition, it was found that the level of PAR accumulation by PDD treatment was nearly identical in both cell-lines despite substantially different PARG protein expression (FIG. 1b). To further test this finding, a stable PARG-knockdown MDA-MB-231 cell-line was generated with >90% reduction in PARG protein levels. PDD-induced PAR accumulation was then evaluated between the control and PARG-knockdown (PARG-KD) cells (FIG. 1c). PDD-induced PAR accumulation was unaffected in PARG-KD cells despite limited PARG protein expression (FIG. 1d). PDD-induced PAR levels were further assessed in a dose response assay using varying doses of PDD. At all tested PDD concentrations (0.1 to 10 μM), comparable PAR accumulation was observed between the control and PARG-KD cells (FIG. 6). Below is described a PARG-selective inhibitor that does not alter the level of PAR accumulation in PARG-KD cells yet measurably increases PAR levels in the MDA-MB-231 cells expressing PARG.

Together these data call into question the target/inhibitory selectivity of PDD in human cancer cells.

One goal was to identify a selective PARG inhibitor through robust PARG enzyme kinetic assay (Kim et al., 2015), which quantitatively monitors real-time PAR-mediated PARP1-XRCC1 interactions and disassembly in a multi-well format. A strong TR-FRET signal was generated upon assembly of the $Tb^{3+}$-chelated XRCC1 (FRET donor) with PARylated PARP1, which incorporates fluorescein-labeled ADP-ribose moieties into PAR chains (FRET acceptor). Addition of PARG caused a time-dependent loss of the TR-FRET signal by reversing PARylation and disassembling the PARP1-XRCC1 complex (Kim et al., 2015).

The NCI Diversity Set II library (1,990 compounds) was screened against rat PARG then human PARG was used to validate and optimize PARG inhibitors. The accuracy of the screen was determined by the calculated Z-scores of control reactions, which were between 0.6 and 0.8 throughout the plates, indicative of high reproducibility (FIG. 2a). In subsequent analyses, two enzyme concentrations (12.5 nM and 25 nM) were used in subsequent analyses, with the rationale that potent inhibitors would inhibit PARG activity at both enzyme concentrations, while weaker inhibitors would inhibit PARG activity only at the lowest PARG concentration. The rate of TR-FRET signal loss in the presence of each candidate inhibitor was compared to that of control reactions containing DMSO only (FIG. 2b). Initially, 104 compounds were selected that inhibited PARG enzymatic activity at both enzyme concentrations. Thirty-nine of these compounds were discarded as they altered fluorescence intensity of donor or acceptor ($F_{520}$ and $F_{495}$) by >40% at the first time point. An additional twelve compounds containing metals (e.g. Pt, Hg, or As), and five compounds resembling short chain fatty acids and steroids were also discarded, leaving 51 candidate inhibitors (hit rate of 2.6%), including 12 potent hits showing ~100% inhibition at both PARG concentrations (Table 2). For the selected compounds, gel-based assays were performed to directly monitor inhibition of PARP1 dePARylation by PARG (FIG. 2c).

TABLE 2

Hits selected from the high-throughput screen of PARG inhibitors.

| Hit number | NSC number | Chemo-type | ~100% PARG inhibition at both 12.5 nM and 25 nM |
|---|---|---|---|
| 1 | 19630 (JA1-1) | JA1 | Yes |
| 2 | 69575 (JA1-5) | JA1 | Yes |
| 3 | 29192 (JA2-3) | JA2 | Yes |
| 4 | 99657 (JA2-4) | JA2 | |
| 5 | 99667 (JA2-5) | JA2 | Yes |
| 6 | 107684 (JA2-6) | JA2 | Yes |
| 7 | 659162 (JA2-7) | JA2 | Yes |
| 8 | 97999 | JA2 | |
| 9 | 62586 | JA2 | |
| 10 | 45741 | JA2 | |
| 11 | 371777 | JA2 | |
| 12 | 35334 | JA2 | |
| 13 | 49789 | JA2 | |
| 14 | 85433 | JA2 | |
| 15 | 90737 | JA2 | |
| 16 | 2805 (JA3-1) | JA3 | Yes |
| 17 | 22907 (JA3-2) | JA3 | Yes |
| 18 | 121838 (JA3-3) | JA3 | Yes |
| 19 | 125034 (JA3-4) | JA3 | |
| 20 | 668394 (JA3-7) | JA3 | |
| 21 | 125908 | JA3 | |
| 22 | 112200 | JA3 | |
| 23 | 48693 | JA3 | |
| 24 | 125910 | JA3 | |
| 25 | 9608 | JA3 | |
| 26 | 1012 | JA3 | |
| 27 | 1011 | JA3 | |
| 28 | 157307 | JA3 | |
| 29 | 228148 (JA4-2) | JA4 | Yes |
| 30 | 348401 | JA4 | |
| 31 | 130796 | JA4 | |
| 32 | 150289 | JA4 | |
| 33 | 147758 | JA4 | |
| 34 | 113997 | JA4 | |
| 35 | 73101 | JA4 | |
| 36 | 128884 | JA4 | |
| 37 | 22225 | JA4 | |
| 38 | 17173 (JA5-1) | JA5 | |
| 39 | 27236 (JA5-2) | JA5 | |
| 40 | 45382 (JA5-3) | JA5 | Yes |
| 41 | 75140 (JA5-4) | JA5 | |
| 42 | 77393 (JA5-5) | JA5 | |
| 43 | 134196 (JA5-6) | JA5 | |
| 44 | 134149 | JA5 | |
| 45 | 34238 | JA5 | |
| 46 | 37031 | JA5 | |
| 47 | 7223 | JA5 | |
| 48 | 83217 | JA5 | |
| 49 | 88947 | JA5 | Yes |
| 50 | 16168 | JA5 | |
| 51 | 128437 | JA5 | |

Figure 8:
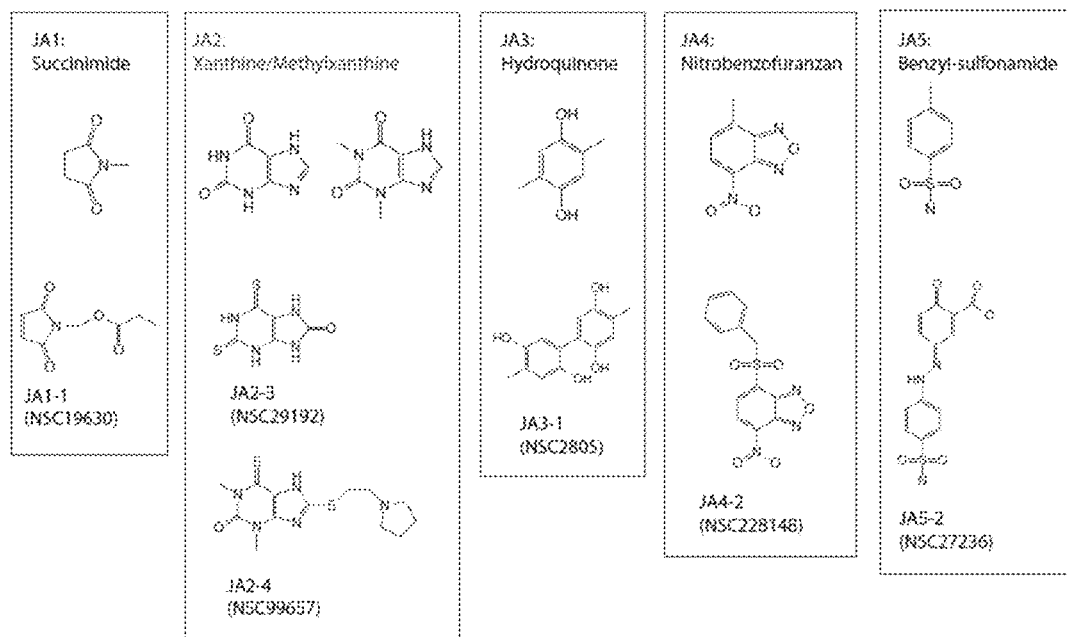
FIG. 8 shows five main chemotypes identified from the high-throughput screening (HTS). A total of 51 hits were identified from the HTS, and subsequently grouped into five chemotypes (JA1, JA2, JA3, JA4, and JA5). Representative HTS hits for each scaffold are shown. All 51 initial hits selected from the HTS are listed in Table 2. Among five chemotypes, xanthine/methylxanthine (JA2) was selected as the lead pharmacophore for further analysis and optimization, based on the structural similarities to adenine, potency in vitro, and their potential bioavailability.
Figures 9A, 9B:
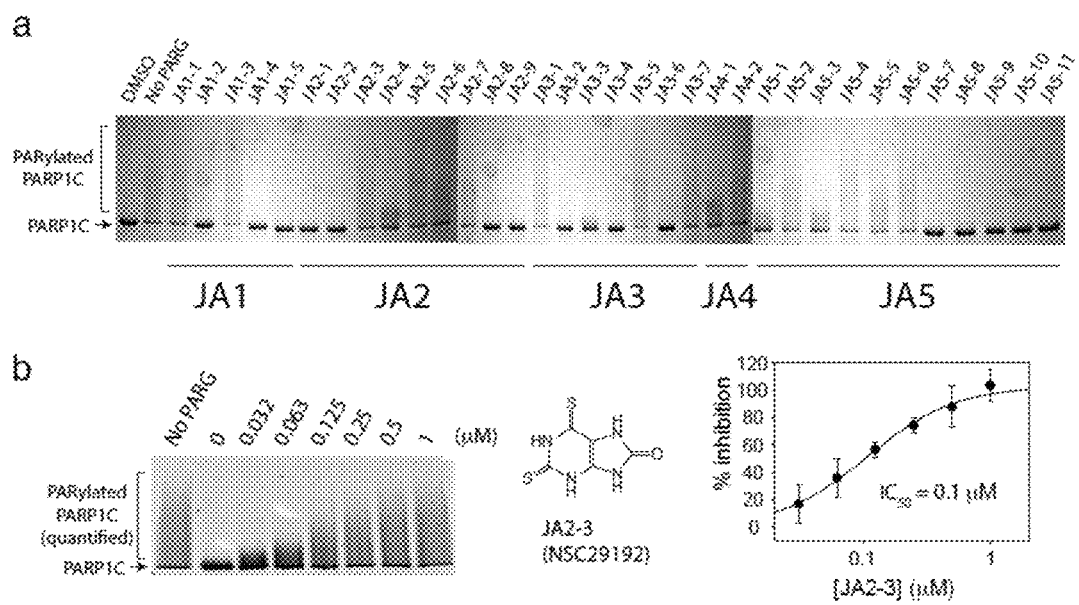
FIGS. 9a & 9b show structure-activity relationships (SAR) of compounds from five main chemotypes.

Most initial hits from the HTS contained 5- or 6-member rings and were grouped into five main chemotypes (FIG. 8); succinimide (JA1: 2 hits), xanthine/methylxanthine (JA2: 13 hits), hydroquinone (JA3: 13 hits), nitrobenzofuranzan (JA4: 9 hits), and benzyl-sulfonamide (JA5: 14 hits). A total of 34 compounds containing representative hits and available analogues from each chemotype were then analyzed in dose-response curves using both the TR-FRET assay and the gel-based assay. It was confirmed that 19 compounds from five chemotypes inhibit PARG activity at concentrations of 0.1-10 µM (FIG. 9 and FIG. 29).

The TR-FRET assay is an indirect measurement of PARG activity as it monitors PARG-mediated reversal of a PAR-dependent PARP1-XRCC1 interaction. Furthermore, loss of the TR-FRET signal was not detected until all PAR chains were degraded to lengths shorter than 7 ADP-ribose units (Kim et al., 2015). Nonetheless, this assay enabled the measurement of steady-state PAR turnover rate, which was adequate for detecting enzyme inhibitors. In contrast, the gel-based assay directly monitors the enzymatic conversion of PARylated PARP1 to an unmodified product by PARG, enabling a semi-quantitative measurement of enzyme inhibition (FIG. 9). The $IC_{50}$ value of a known PARG inhibitor, adenosine diphosphate (hydroxymethyl)pyrrolidinediol (ADP-HPD), determined by the gel-based assay (1.07 µM, FIG. 10) was in agreement with its published values (0.1-1.4 µM; Tucker et al., 2012; Koh et al., 2003; Slama et al., 1995). Therefore, the gel-based PARG activity assay was employed in subsequent studies.

Inspection of the five identified chemotypes of PARG inhibitors (FIG. 8) suggests that the JA2 series of xanthine/methylxanthine derivatives were the most attractive for several reasons. First, these compounds are structurally analogous to the adenine base of ADP-ribose (ADPR), an enzymatic product of PARG and have good potential for site-specific binding. Second, xanthine/methylxanthine-based compounds typically show good bioavailability, as evidenced by caffeine and the widely used bronchodilator, theophylline (Muller and Jacobson, 2011). Third, the fused 5- and 6-membered rings of the xanthine core are synthetically tractable for analoging (Muller and Jacobson, 2011). Most importantly, three thio-xanthine/methylxanthine derivatives (JA2-3/NSC29192, JA2-4/NSC99657, and JA2-5/NSC99667) were among the most potent dose-dependent inhibitors of PARG activity as assessed by HTS, with $IC_{50}$ values between 0.1 and 1.0 µM (FIG. 2d).

JA2-4 specifically binds to the hPARG adenine-binding pocket. To identify the binding sites of JA2-3, JA2-4, and JA2-5, these compounds were soaked into crystals of human PARG (hPARG) catalytic domain (residues 448-976). Crystals of hPARG diffracted to high resolution and the crystal packing arrangement was more amenable to binding compounds in the enzyme active site (Tucker et al., 2012), compared to crystals of rat and mouse PARG (Kim et al., 2012; Wang et al., 2014). The hPARG active site has two deep pockets that specifically engage the adenine and diphosphate group of ADPR. Tyr795 at the tip of the Tyr clasp points towards the heart of the active site and simultaneously interacts with the adenine and diphosphate moieties.

The crystal structure of JA2-4 bound to hPARG refined at 1.7 Å resolution (FIG. 3 and Tables 4 & 5) identifies a single JA2-4 molecule in the adenine-binding pocket. The 6'-thiocarbonyl sulfur of JA2-4 was assigned by the size and orientation of the electron density compared to that of the corresponding 6'-carbonyl oxygen of JA2120 (FIGS. 3a & 4b). JA2-4 makes extensive site-specific interactions with hPARG, consistent with its potent inhibitory activity ($IC_{50}$ of 0.9 µM) (FIG. 2d). The methylxanthine head of JA2-4 makes π-stacking interactions with Phe902 side chain. The tail of JA2-4 extends from the 8'-position of the xanthine ring and is highly curved, which serves to make van der Waals contacts with Asn869. The terminal pyrrole of JA2-4 is rotated~900 and is perpendicular to the xanthine ring system.

A number of protein-JA2-4 interactions come from the conserved macrodomain fold. Despite the large conformational change (described below), the Tyr clasp generates limited direct contact with JA2-4; only the $C_\beta$ of Tyr795 interacts with the thioether group of JA2-4 (FIG. 3a). JA2-4 has a surface area of 484 Å$^2$ of which 89% (432 Å$^2$) is masked by direct contacts with hPARG, which can explain the relatively high potency of the JA2-4 series compounds.

Structural superposition of hPARG bound to JA2-4 and ADP-HPD reveals that the methylxanthine core of JA2-4 occupies the same binding site as the adenine of ADP-HPD (FIG. 3b), consistent with a competitive block of substrate binding activity. However, the ring system of the xanthine core is flipped horizontally and rotated ~-15° clockwise relative to the adenine ring of ADP-HPD, and translated 0.8 Å towards the tip of the Tyr clasp. This distinctive ring orientation reflects a direct interaction of the 6'-thiocarbonyl group with the main chain amide of Asn869 (FIG. 3a). A thiol substituent at the 6' position of the methylxanthine pharmacophore increases potency (FIG. 4). Additionally, the 2'-carbonyl oxygen of JA2-4 hydrogen bonds with the main chain amide of Ile726. This interaction is not made by ADP-HPD, and it displaces the methylxanthine ring by 0.8 Å with respect to the adenine ring of ADP-HPD (FIGS. 3a & 3b). The 2'-carbonyl oxygen of JA2-4 also serves as a pivot point for rotation of the methylxanthine ring. Collectively, these structures suggest specific and potent inhibition of PARG activity by JA2-4 and support a mechanism of competitive inhibition by JA2 series xanthine/methylxanthine derivatives.

Identification of key contact points of JA2-4. The JA2-4 interaction with hPARG elicits a change in the Tyr clasp conformation (FIG. 3c). The JA2-4 binding site is obstructed by the side chain of Tyr795 in the unbound hPARG and in hPARG bound to ADP-HPD. To accommodate JA2-4, the Tyr795 side chain is flipped out from the adenine-binding pocket (with ~90° rotation), which positions the thioether of JA2-4 in contact with $C_\beta$ of Tyr795. Furthermore, the interaction of JA2-4 with Tyr795 pushes on the tip of the Tyr clasp, which is displaced ~0.9 Å towards the N-terminal helical bundle (FIG. 3c).

Twisting of the Tyr clasp induced by JA2-4 binding involves several new interactions with a neighboring helix α6 (FIG. 3c). For instance, JA2-4 binding causes the Arg671 side chain to swing ~9 Å towards the tip of the Tyr clasp, where it makes an electrostatic interaction with Glu797 side chain and hydrogen bonds to the main chain carbonyl of Ala750 (not shown in this view). This Arg671 pivoting motion constitutes a switch that serves as a backstop to secure the Tyr clasp in contact with the N-terminal helical bundle, which is ~30 Å away from Tyr795. Taken together, and without wishing to be bound by any particular theory, this previously undetected structural switching of the Tyr clasp may explain the basis of JA2-4 binding and its inhibition of PARG activity.

Structure-based design improved PARGi potency and selectivity. Structure-activity relationships (SAR) of JA2-4 analogs (FIG. 4b) in competitive inhibition experiments were investigated. JA2131/NSC98003 contains a terminal morpholine in place of the pyrrole of JA2-4 and shows improved activity, which, without being bound by any particular theory, may derive from a polar interaction mediated by the 1'-oxygen of the morpholine (FIG. 4c). Without being bound by any particular theory, the 6'-thiocarbonyl group of JA2131 may be another driver of inhibitory potency. Substitution with a carbonyl at this position decreases potency more than 50-fold ($IC_{50}$ of JA2131=0.4 µM, $IC_{50}$ of JA2120/NSC81474=25.7 µM, FIG. 4c), even though the 6'-carbonyl oxygen of the methylxanthine of JA2120 can make a hydrogen bond with the main chain amide of Asn869. The position of the thiocarbonyl group can be changed without the loss of activity, since JA2131 (6'-thiocarbonyl; $IC_{50}$ of 0.4 µM; FIG. 4c) and JA2-5 (2'-thiocarbonyl; $IC_{50}$ of 1.0 µM) (FIG. 2d) exhibit comparable potencies.

To further test the molecular basis for these SAR data, crystal structures of hPARG bound to JA2131 and JA2120 were determined at 1.9 and 1.8 Å resolution, respectively (FIGS. 4a & 4b). JA2131 and JA2120 bind to the adenine-binding pocket of hPARG in the same orientation as JA2-4. As for JA2-4, the 6'-thiocarbonyl of JA2131 makes a direct van der Waals contact with the main chain amide of Asn869 (3.6 Å) from the conserved macrodomain fold (FIG. 4a). Without being bound by any particular theory, the morpholine oxygen of JA2131 may accept a hydrogen from the side chain amine of Asn869, which may account for the modest increase in potency compared to JA2-4 (FIG. 4c).

In contrast, the distance between 6'-carbonyl of JA2120 and the main chain amide of Asn869 is significantly longer than that of 6'-thiocarbonyl of JA2131 and is beyond the range of direct polar or van der Waals interactions (4.3 Å; FIG. 4b). Instead, a bound water molecule, which is absent in the JA2131- and JA2-4-bound structures, is positioned between JA2120 and Asn869. The bound water molecule relays an indirect hydrogen bond from 6'-carbonyl of JA2120 to the main chain amide of Asn869 and to the main chain carbonyl of Phe902 (FIG. 4b). A bound water molecule is also present at this site in structures of apo hPARG and hPARG bound to ADP-HPD. The 6'-thiocarbonyl group of JA2-4 series inhibitors displaces this water molecule to form enhanced interactions with the adenine-binding pocket of hPARG.

PARG regulates PARP1 modification in cells. To identify suitable cell lines to test PARGi, PARG protein expression patterns were evaluated on a panel of prototypic cancer cell lines. Cells were fractionated into cytoplasmic, nuclear and chromatin, and then PARG expression and localization were evaluated using an anti-PARG antibody (FIG. 11a). A varying level of PARG was detected in three cellular compartments. In prostate adenocarcinoma (PC3) and breast mammary epithelial (MCF-7) cells, PARG level was the highest in the cytoplasm, followed by the nucleus, with the lowest expression in the chromatin fraction. The triple negative MDA-MB-231 breast cancer and U2OS osteocarcinoma cells showed comparable expression between cytoplasm and nucleus. The PC3 cell line, with one of the highest levels of PARG expression, was selected for our initial PARGi testing. PC3 cells were treated with either DMSO or JA2131 for 2 hrs, then exposed to 7 Gy of ionizing radiation and allowed to recover for a designated time period before harvesting and cell fractionation. Chromatin fractions of the cell-lysates were analyzed by immunoblotting with PARP1 specific antibody (FIG. 11e), and the PARylation states of PARP1 was monitored as a marker for PARG inhibition. A high molecular weight (HMW) PARP1-containing band in the chromatin fractions, suggestive of hyper-PARylated PARP1, was only seen in cells treated with JA2131 PARGi. Cells treated with both JA2131 and ionizing radiation (IR) displayed enhanced levels of PARylation-trapped PARP1 (FIG. 11a, 0.5 h versus 1.0 h). In these cells, PARylated PARP1 in response to PARG inhibition appeared as a discrete HMW (DHMW) proteins with limited smearing, as observed previously (Vyas et al., 2014). The DHMW was only seen when chromatin fractions were immunoblotted with the PARP1 antibody; by contrast, nuclear fractions and total cell lysates showed a contiguous smear, typically associated with PARylated PARP1. To assess whether DHMW was due to PARylation and not any other post-translational modifications, chromatin fractions of the PARGi-treated PC3 cell-lysates were treated with purified PARG followed by anti-PARP1 western blotting. This led to the restoration of LMW PARP1 indicating PARylation was indeed causing the DHMW (FIGS. 11c & 11d). Thus, a dynamic equilibrium between DHMW and LMW nuclear PARP1 exists in cells, and PARGi shifts this equilibrium towards DHMW (FIG. 12). Without being bound by any theory, PARGi induces PARP1 DHMW as a result of persistent PARylation, which may be reversed in vitro with exogenous purified PARG, and may suggest a selective role of PARG in the dynamic regulation of PARP1 modification and signaling.

PARGi induces PAR accumulation and $\gamma H_2AX$ foci in nuclei. As inhibition of PARG increases PARP1 in a PARylated DHMW form, it was next determined whether PARGi augments the level of PAR accumulation and of double-stranded DNA (dsDNA) breaks in cells treated with IR. Following IR, cells treated with JA2131 show a significant increase in PAR accumulation in comparison to untreated cells (20-fold increase with JA2131). DMSO treated cells show a modest post-IR PAR accumulation that is comparable to the untreated FIGS. 13a & 13b, DMSO versus JA2131). A low magnification 3×3 image montage clearly shows distinct PAR accumulation and $7H_2AX$ foci formation (FIG. 13a). Quantification revealed PAR accumulation coincided with $\gamma H_2AX$ staining and foci formation, which was >10-fold higher in PARGi-treated cells than in control cells (FIG. 13c). Furthermore, at least 50% of cells showed colocalization of PAR and TH2AX foci (FIG. 13d, $\gamma H_2AX$/PAR foci against total cell counts FIG. 13e). Western blot analyses also indicated that JA2131-induced PAR accumulation (FIG. 13f). Inspection of images at high magnification validate the automated quantification of observed JA2131 induced PAR/$\gamma H_2AX$ colocalization (FIGS. 13b-e). DMSO treated cells display diffused, low level PAR staining in the nucleus of cells with limited $\gamma H_2AX$ puncta. However, for cells treated with the PARGi JA2131, PAR staining is localized to distinct nuclear foci that also contain the phosphorylated $H_2AX$ ($\gamma H_2AX$) (FIG. 13g). Some $\gamma H_2AX$ foci were observed in DMSO treated cells, but only if the contrast is independently adjusted (see FIGS. 21a & 21b bottom panels). Indeed, PAR accumulation caused by the treatment of cells with ionizing radiation was further augmented by the PARGi, indicating that it may function as a DNA damage sensitizer. It was previously reported that genetic knockdown of PARG results in sensitization of cancer cells to chemotherapeutic agents and radiation (Shirai et al., 2013; Ame et al., 2009; Shirai et al., 2013; Fujihara et al., 2009), and tumor-specific killing in BRCA2-deficient cancer cells (Fathers et al., 2012). Herein is revealed an effective PAR accumulation that coincides with elevated $7H_2AX$ following treatment with PARGi in PC3 cells that have intact BRCA1 and BRCA2 genes (Rauh-Adelmann et al., 2000).

Figures 10A, 10B:
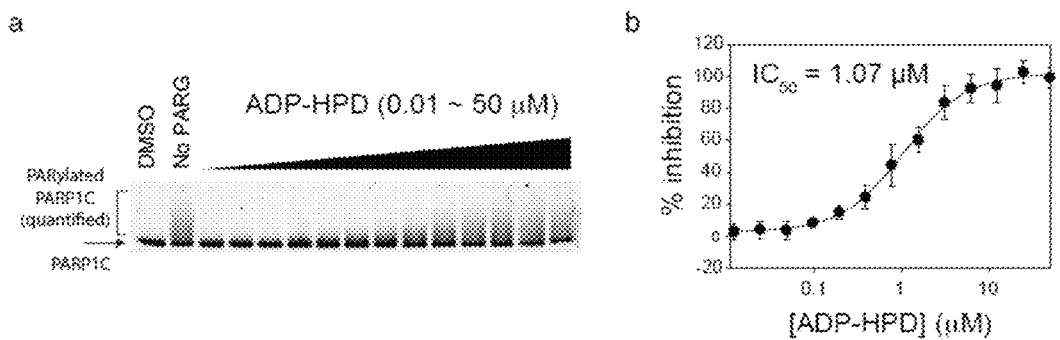
FIGS. 10a & 10b show dose dependent inhibition of PARG by ADP-HDP. Quantification of the dose-response PARG inhibition by ADP-HDP using the gel-based PARG activity assay. hPARG (1 nM) was preincubated with increasing concentrations (0.032-1 µM) of ADP-HDP for 1 hr at room temperature before PARylated PARP1C (500 nM) was added.

JA2131 kills cancer cells through selective PARG inhibition. To test the radiation sensitization effect of PARGi, a clonogenic cell-survival assay was used to measure radiation sensitization in PC3, MDA-MB-231 and MCF-7 cell lines treated with JA2131. Radiation dose response and the optimum cell plating number for each cell-line was first determined (FIGS. 14b & 10). DMSO and the PARPi Olaparib were used as a negative and positive control, respectively (FIG. 17). The results show PARG inhibitor JA2131 inhibits colony formation in all three cell lines. MCF-7 cells were less sensitive to JA2131 than the PC3 cells. The triple negative breast cancer cells MDA-MB-231 cells were most the sensitive among the three cell lines treated with JA2131 (FIG. 14c). MCF-7 cells with the highest level of cytoplasmic PARG showed greatest sensitivity to the commercially available PDD00017273 (i.e., PDD) (FIG. 17). Without being bound by any theory, these data may suggest underlying genetic variations that dictate PARG protein expression patterns and signaling could play an important role in the effectiveness of PARGi with implications for vetting future PARGi patient groups. The effect of sustained JA2131 treatment was also tested alone or in combination with IR in colony formation. Indeed, JA2131 alone was sufficient to inhibit PC3 survival but when combined with IR, there was a synergistic reduction the number of surviving cell-colonies (FIG. 18).

The triple negative breast cancer cells MDA-MB-231 showed the largest response in our clonogenic survival assay (FIG. 14c). Thus, dose-dependent JA2131-induced cellular PARylation with and without IR was investigated. For combined IR treatment, MDA-MB-231 cells were treated with JA2131 for 2 h, followed by 7 Gy X-ray and then allowed to recover for an hour before cellular extraction and Western blotting analysis. PARGi-treated cells alone show a dose-dependent increase in cellular PARylation between 1 M and 5 µM doses. However, PARGi combined with IR induced a massive increase in cellular PARylation at 100 nM (FIG. 22a). Notably, cells treated with radiation alone (FIG. 22a, lane 1) or inhibitor alone (FIG. 22a, lanes 2-5) did not show the level of PARylation observed when both treatments were combined, (FIG. 22a, lane 7-10) suggesting a synergistic, rather than an additive effect.

Using shRNA, next, a stable MDA-MB-231 PARG knockdown (PARG-KD) cell-line was generated (FIG. 23). Comparison of PARGi JA2131-induced PARylation in PARG-KD and control cells was performed. It was reasoned that PARG-KD cells would show a reduced response to a selective PARGi as the stable PARG-KD cells would have to adopt a PARG-independent survival mechanism. MDA-MB-231 control cells and PARG-KD cells were treated with JA2131 then total cell lysates were subjected to immunoblotting with anti-PAR antibody, followed by immunodetection for anti-PARG, PARP1 and actin antibody (FIG. 22b). Untreated PARG-KD cells show a higher baseline level of PARylation than the control cells. Treatment with JA2131 did not affect the level of PAR accumulation in PARG-KD cells whereas a measurable increase in PAR was seen in the MDA-MB-231 cells. Treatment of the cells under the same inhibitor regime with IR showed equivalent results (see FIG. 24). Dose-response curves comparing control and PARG-KD cells further validate the selective action of JA2131 on control cells expressing PARG, but not on the PARG-KD cells (FIG. 25). As a comparison, inhibitor PDD induced PARylation in both control and PARG-KD cells. However, both cells-lines responded with increased PARylation from the PDD inhibitor, suggesting potential non-selectivity towards other cellular glycohydrolase (FIG. 1d).

To further evaluate the selectivity of JA2131, Sulforhodamine B (SRB; Vichai and Kirtikara, 2006) cytotoxicity tests were performed in MDA-MB-231 control and PARG-KD cells (FIG. 22c). The results show approximately a 10-fold higher $IC_{50}$ value for PARG-depleted cells, compared to control cells with a normal level of PARG (see FIG. 22c, $IC_{50}$ table). Notably, only 50% of the PARG-KD cells responded to the PARGi to produce the indicated $IC_{50}$. In addition, the normal human lung fibroblast cell-line MRC-5 was used to determine whether JA2131 exhibits specificity towards cancer cells. Results show that the cytotoxic dose of JA2131 in MRC-5 cells is an order of magnitude higher than that seen for MDA-MB-231 cells (FIG. 22d, $IC_{50}$ table). Doxorubicin and PARPi Veliparib were used as a positive and negative control, respectively. Thus, the collective cytotoxicity data show that JA2131 indeed acts through inhibition of PARG and that it selectively kills cancer cells. To further validate the inhibition of PARG in cells by JA2131, the cellular thermal shift assay (CETSA; Molina et al., 2013) was performed on PC3 cells treated with either DMSO or JA2131. The results show JA2131 treatment induced a 9° C. stabilization of PARG proteins in cells (FIG. 22e and FIG. 26); whereas, the PCNA control showed no significant change in thermal stability in response to JA2131 treatment (FIG. 22e).

JA2131's specificity was also evaluated in vitro as an inhibitor of purified hPARG in the presence and absence of detergent (Triton-X 100, 0.1%) or a non-specific target protein (bovine serum albumin BSA, 0.1 mg/ml). This concentration of Triton-X 100 is -10-fold higher than its critical micelle concentration (CMC, 0.0155%), so it can effectively distinguish promiscuous and aggregating compounds (Finch et al., 2012). Neither the addition of Triton-X 100 nor BSA significantly altered the inhibitory potency of JA2131 (FIG. 16A). It was also examined whether or not JA2131 could nonspecifically interfere with PARP1 activation. PARP1 is an abundant nuclear enzyme and PARylated PARP1 is an abundant substrate for PARG following DNA damage. JA2131 did not inhibit PARP1 activation up to 100 μM, whereas a potent PARP inhibitor Olaparib completely shuts down PAR synthesis by PARP1 (FIG. 16b). These results, together with the observed extensive physical interactions between JA2131 and its binding site on hPARG (FIG. 11), support the conclusion that JA2131 selectively inhibits PARG activity.

JA2131 causes replication fork defects. In the BRCA2-negative background, depletion of PARG inhibits cell growth (Fathers et al., 2012). Yet PC3 cells with intact BRCA2 show exquisite DNA damage induction by JA2131 as seen by $\gamma H_2AX$ foci formation (FIG. 13) and poor long-term survival. It was investigated whether this JA2131-induced massive $\gamma H_2AX$ foci formation leads to growth arrest and cell death. JA2131-induced cellular cytotoxicity in PC3 cells with or without IR along with commonly used DNA damaging agents and the chemotherapeutic agents Doxorubicin and Nedaplatin (FIG. 20g, inset table). There was no added benefit for combining PARGi with IR, in fact, cells actually survived slightly better in this 72 h assay period (see FIG. 20g, $IC_{50}$ table). This is contrary to long-term clonogenic survival (FIG. 14c) and massive $\gamma H_2AX$ foci formation (FIG. 13c) observed with combined PARGi and IR treatment. Indeed, a similar phenomenon was also observed with Olaparib-treated PC3 cells, where IR induced higher $IC_{50}$ values compared to the non-IR treated samples (see FIG. 27). Therefore, it was reasoned that IR exposure activates homology-directed repair (HDR), which counteracts PARGi effects in the short term. However, PARGi-treated dividing cells accumulate damage from replication stress over time that decreases long-term survival as observed in clonogenic assays.

Furthermore, the presently disclosed inhibitors were tested in A172 glioblastoma cells that are resistant to PARPi and platinum-based chemotherapeutic agents. Cellular cytotoxicity assay shows our PARGi was more effective than Veliparib, but comparable in potency to Nedaplatin (FIG. 20h, inset $IC_{50}$ table), indicating another cancer where PARGi could play an important therapeutic solution.

PARG depletion has previously been shown to cause recruitment of double-strand-break-repair factors to chromatin in the absence of damage and to slow replication fork progression (Ray Chaudhuri et al., 2015), consistent with PARG function in replication stress protection through the resolution of dysfunctional replication-structures. Because the presently disclosed PARGi effectively killed cancer cells in the absence of DNA damage (FIG. 22c and FIGS. 20g & 20h), it was reasoned that JA2131 could be acting at the replication fork. Therefore, it was tested whether the PARGi could induce replication stress defects. HeLa cells pretreated with JA2131 or DMSO for 2 hrs were used to evaluate fork progression in DNA fiber assay (FIGS. 20e & 20f). Indeed, PARGi alone was sufficient to induce a significant reduction in replication progression in the absence of genotoxic stress. Under these conditions PARGi induced a statistically significant reduction in the average IdU tract from 7.5 to 6.0 μm. Replication progression was tested in the presence of mild genotoxic stress delivered by a low dose of hydroxyurea (FIGS. 20e & 20f). Under this mild genotoxic stress-condition, a reduction in the average IdU tract length to 5.0 μm was observed. These findings show that the present PARGi recapitulates reported replication defects caused by PARG depletion (Ray Chaudhuri et al., 2015), a finding that further supports JA2131 selective action against PARG.

PARG was evaluated as a therapeutic option for patients who become PARP1 inhibitor resistant. PARP1 inhibitor resistant SUM149PT triple negative breast cancer cell-lines were generated with 100 nM talazoparib for 5 constitutive days and then with 15-50 nM talazoparib until resistant cells grew into clones. The resulting resistant cell clones were propagated and expanded to generate PARP inhibitor resistant SUM149PT derivative cells that no longer responded to PARP1i treatment. It was then investigated whether the PARP resistant breast cancer cells would respond to the PARG inhibitors. Four PARPi resistant SUM149PT cell clones together with wild type cells were treated with JA2131. PAR accumulation and $\gamma H_2AX$ foci formation were analyzed by high content imaging (FIG. 21). Treatment of cells with JA2131 showed increased PAR accumulation as well as $\gamma H_2AX$ staining seen by increased immunofluorescence signals. The PAR accumulation and $\gamma H_2AX$ foci formation was very similar to those observed for PC3 cells (FIG. 14c) suggesting a potential new therapeutic opportunity for PARP1 resistant patients.

PARG is present in *Trypanosoma brucei* that causes African sleeping sickness and in *Trypanosoma curzi* that causes Chagas disease. For *Trypanosoma curzi*, PARG inhibition appears to inhibit parasite infection (Larrea et al., 2013, which is incorporated by reference herein). It is contemplated that the compounds of the present disclosure may be used to treat or prevent diseases associated with parasites, such as African sleeping sickness, Chagas disease, Toxoplasmosis, and human body louse diseases (see Badiaga and Brouqui, 2012, which is included by reference herein).

Example 2—Methods

Chemicals. All NSC compounds were obtained from the Developmental Therapeutics Program (DTP) repository at NCI/NIH. JA1-5 (JS-2088), JA5-8 (BAS 05169959), and JA5-9 (AO-476/12797006) were purchased from Ryan Scientific. JA2-9 (Z57032584), JA5-10 (EN300-63858), and JA5-11 (Z385453050) were purchased from Enamine. JA2-8 (JFD03560SC) was purchased from Maybridge, and JA5-7 (F3350-0573) was purchased from Life chemicals. All inhibitors were dissolved at 40 mM concentrations in DMSO. Hydroxyurea, Nedaplatin, Doxorubicin, Veliparib, and Olaparib were purchased from SelleckChem. PDD00017273 was from Tocris.

Protein expression and purification. The catalytic domain of rat PARG (residues 385-972) was purified as described previously (Kim et al., 2012). The human PARG (hPARG) catalytic domain (residues 389-976) was cloned in pET28a (Novagen) with an N-terminal His-tag and expressed in *E. coli* Rosetta cells. hPARG$^{389-976}$ was purified by Ni-NTA (Qiagen) affinity chromatography, loaded onto a heparin column (GE Healthcare), and then eluted with a salt gradient (0-1 µM NaCl). hPARG$^{389-976}$ was further purified using a Superdex 200 size-exclusion chromatography. For preparation of PARylated PARP1, the DNA binding domain (DBD; residues 1-374) of human PARP1 and the PARP1C catalytic domain (residues 375-1014) were purified as described previously (Kim et al., 2012). For crystallization, human PARG catalytic domain (residues 448-976) containing the six surface entropy reduction mutations (Tucker et al., 2012) was cloned in pET28a vector with an N-terminal His-tag and expressed in *E. coli* HMS174 cells expressing GroESL chaperon. The GST-tagged central BRCT domain of human XRCC1 (BRCT1, residues 294-417; cloned in pGEX-6p1) was expressed in *E. coli* Rosetta cells and purified by glutathione affinity chromatography. Following cleavage of the GST-tag with PreScission protease (GE Healthcare), the BRCT1 domain was purified using a Sephacryl 100 (GE Healthcare) size-exclusion column. For biotinylation of BRCT1, the BRCT1 domain of XRCC1 was cloned in pGEX-6p1 with a C-terminal biotin acceptor peptide (BAP) tag and co-expressed with the BirA biotin ligase (pA-CYC184-BirA plasmid; Avidity) in *E. coli* BL21 (DE3) cells. The biotinylated BRCT1 was purified using the same protocol as the GST-BRCT1 protein.

TR-FRET PAR turnover assay. For a high-throughput screening (HTS) of PARG inhibitors, a high-throughput PARG activity assay was developed using the TR-FRET system. Briefly, the fluorescein molecule (FITC) was enzymatically incorporated into PARP1 in a reaction containing PARP1C (2 µM), the PARP1 DBD (2 µM), a 24 mer nicked DNA oligo (2 µM), and a mixture of unlabeled NAD$^+$ (Sigma) and FITC-NAD$^+$ (Trevigen) substrates (total NAD+ concentration of 100 µM).

After incubation for 1 hr at 37° C., PARylated PARP1 was desalted using a PD-10 desalting column (GE healthcare) in a buffer containing 25 mM Tris-HCl (pH 7.5), 50 mM NaCl, and 0.01% NP-40 and used as the FRET acceptor. The biotin-tagged BRCT1 domain of XRCC1 (BRCT1, 5 nM) was conjugated with an equimolar concentration of Tb$^{3+}$-chelated streptavidin (Life Technologies) in TR-FRET assay buffer (FRET donor). To monitor dose-response inhibition of PARG activity (FIG. 29), rat PARG$^{385-972}$ (12.5 nM) was preincubated with compounds for 1 hr at room temperature. The reaction was started by the addition of the FRET pair of FITC-labeled PARP1 (42 nM) and Tb$^{3+}$-BRCT1 (5 nM). The TR-FRET signal was subsequently monitored for 60 min.

High-throughput screening of PARG inhibitors. Small molecule inhibitors of PARG were identified by high-throughput screening (HTS) using the TR-FRET PAR turnover assay. Compounds (final concentration of 6.7 µM) from the NCI Diversity Set II library (1,990 compounds) were predispensed into black polystyrene 384-well plates (Corning) using a Hummingbird liquid handler (Digilab). Then, 10 µL of rat PARG$^{385-972}$ (12.5 nM and 25 nM) was subsequently dispensed into plates using a multi-drop combi nL reagent dispenser (Thermo Scientific), and incubated with compounds for 1 hr at 4° C. The reaction was initiated by the addition of 20 µl of the premixed FRET pair of FITC-labeled PARP1 (42 nM) and Tb$^{3+}$-BRCT1 (5 nM), and the TR-FRET signal was monitored every four minutes for 40 min (11 data points). Hits were selected by visually comparing the rate of the TR-FRET signal decrease in each well to that of negative control reactions containing DMSO (FIG. 1b and see Text for details). The HTS was performed at the High-Throughput Screening Core (HTSC) at Washington University School of Medicine.

Gel-based PARG activity assay. PARP1C (2 µM) is enzymatically auto-modified in a reaction containing the PARP1 DBD (2 µM), a 24 mer nicked DNA oligo (2 µM), and NAD+(300 µM) for 1 hr at 37° C., as described previously (Kim et al., 2012). Human PARG$^{389}$-976 (1 nM) was pre-incubated with compounds for 1 hr at room temperature. The reaction was initiated by addition of PARylated PARP1 (final concentration of 500 nM) and quenched after 30 min incubation at room temperature by adding SDS-PAGE sample buffer. The gel was visualized by sypro-ruby staining (Kim et al., 2012) and the retained PARylated PARP1C species were quantified using ImageJ (Schneider et al., 2012).

PARylated PARP1C that migrates slower than unmodified PARP1C was quantified. Control reactions in the absence of PARG (100%) or compound (0%) were used for normalization of the degree of PARG inhibition by compounds (% inhibition). The $IC_{50}$ values were determined by fitting the dose-response data for each compound to a four-parameter logistic equation using SigmaPlot (Systat Software Inc.).

To test specificity of JA2131, human $PARG^{389}$-976 (1 nM) was pre-incubated with JA2131 (5, 10, and 20 µM) in the presence and absence of 0.1% Triton-X 100 or 0.1 mg/ml BSA for 1 hr at room temperature. The reaction was initiated, quenched, visualized, and quantified as described above.

Crystallization of human PARG catalytic domain. Crystals of the unliganded $hPARG^{448-976}$ were grown by hanging drop vapor diffusion as described previously (Tucker et al., 2012). $hPARG^{448}$-976 (7.5 mg/ml) was mixed with an equal volume of well solution containing 16-24% (w/v) PEG 3350, 0.1 µM PCTP (0.04 µM sodium propionate, 0.02 µM sodium cacodylate, 0.04 µM Bis-Tris propane) pH 7.5 and 0.15 µM $MgCl_2$, and incubated at 22° C. To soak inhibitors, crystals were harvested in a cryoprotectant solution containing 26% PEG 3350, 0.05 µM PCTP pH 7.5, 0.1 µM NaCl, 0.15 µM $MgCl_2$, and 2.5% glycerol. Crystals were soaked with inhibitors at 5 or 10 mM concentrations for 15 hrs, and then were flash-cooled in liquid nitrogen. X-ray diffraction data for 5 structures were collected in-house at 100 K using a Rigaku MicroMax007 rotating anode X-ray generator equipped with Xenocs Mirrors and a MAR image plate, and processed using HKL2000 (Otwinowski et al., 1997) and SCALEPACK(Otwinowski et al., 1997; Pflugrath et al., 1999). All crystals have one hPARG molecule per asymmetric unit and diffracted to 1.7~2.0 Å resolution. X-ray diffraction data statistics are shown in Table 4. The structures of hPARG bound to the methylxanthine derivatives were determined by molecular replacement using Molrep of the CCP4i suite (Winn et al., 2011) with the unliganded $hPARG^{448-976}$ structure (PDB ID: 4B1G; Tucker et al., 2012) as a search model. The crystallographic models for the hPARG-inhibitor complexes were constructed using COOT (Emsley and Cowtan, 2004) and refined using REFMAC (Murshudov et al., 1997). Crystallographic data statistics are shown in Table 4. All structural figures were prepared using PyMOL or Chimera (Pettersen et al., 2004).

TABLE 4

Crystallographic data statistics.

| | hPARG-JA2-4 complex | hPARG-JA2131 complex | hPARG-JA2120 complex | hPARG-JA2-8 complex | hPARG-JA2-9 complex |
|---|---|---|---|---|---|
| Data collection | | | | | |
| Space group | $P2_1$ | $P2_1$ | $P2_1$ | $P2_1$ | $P2_1$ |
| Cell dimentions | | | | | |
| a, b, c (Å) | 44.0, 65,8, 88.4 | 44.7, 66.0, 88.0 | 44.6, 65.7, 88.4 | 44.7, 06.0, 88.6 | 44.7, 66.2, 88.9 |
| α, β, γ (°) | 90.0, 95.2, 90.0 | 90.0, 95.5, 90.0 | 99.0, 95.0, 90.0 | 90.0, 95.2, 90.0 | 90.0, 95.6, 90.0 |
| Wavelength | 1.54 | 1.54 | 1.54 | 1.54 | 1.54 |
| Resolution (Å) | 30-1.7 | 30-1.9 | 30-1.8 | 30-2.0 | 30-2.0 |
| $R_{sym}$ (%) | 6.0 (39.8) | 12.7 (46.3) | 7.4 (29.7) | 11.2 (58.0) | 8.1 (40.1) |
| I / σI | 27.0 (2.8) | 11.8 (1.9) | 21.7 (3.9) | 12.5 (1.4) | 17.5 (2.1) |

TABLE 4-continued

Crystallographic data statistics.

| | hPARG-JA2-4 complex | hPARG-JA2131 complex | hPARG-JA2120 complex | hPARG-JA2-8 complex | hPARG-JA2-9 complex |
|---|---|---|---|---|---|
| Completeness (%) | 97.2 (89.4) | 97.3 (82.1) | 93.8 (85.3) | 98.4 (84.4) | 99.1 (89.2) |
| Redundancy | 5.7 (3.5) | 3.8 (2.2) | 4.9 (3.9) | 3.9 (2.2) | 4.0 (2.6) |
| Refinement | | | | | |
| Resolution (Å) | 30-1.7 | 30-1.9 | 30-1.8 | 30-2.0 | 30-2.0 |
| No. reflections | 51558 | 37412 | 42142 | 32438 | 32975 |
| $R_{work}/R_{free}$ | 15.5/19.5 | 17.9/22.5 | 16.8/20.3 | 18.4/24.1 | 17.1/22.1 |
| No. atoms | | | | | |
| Protein | 4025 | 4010 | 4008 | 4003 | 4008 |
| Ligand/ion | 21 | 22 | 22 | 23 | 19 |
| Water | 465 | 248 | 300 | 228 | 242 |
| B-factors | | | | | |
| Protein | 26.3 | 26.3 | 21.6 | 30.0 | 30.3 |
| Ligand/ion | 35.2 | 44.5 | 18.8 | 53.4 | 39.3 |
| Water | 39.1 | 30.9 | 28.6 | 34.6 | 34.5 |
| R.m.s deviations | | | | | |
| Bond length (Å) | 0.019 | 0.017 | 0.018 | 0.016 | 0.017 |
| Bond angles (°) | 1.94 | 1.80 | 1.82 | 1.72 | 1.69 |

*Values in parentheses are for highest-resolution shell.
Each dataset was collected from a single crystal.

To show reproducibility and confirm the in-house PARG-inhibitor structures, hPARG crystals were also prepared for synchrotron data collection. hPARG crystals were grown as described, soaked with 10 mM JA2131 or JA2120 compound for 1-2 hours, then flash-cooled in liquid nitrogen. X-ray diffraction data were acquired at Stanford Synchrotron Radiation Lightsource (SSRL) beamline 9-2 (Kabsch, 2010; Russi et al., 2016). Data were processed with XDS to 1.6-1.7 Å (Kabsch, 2010; Kabsch, 2010), solved by molecular replacement as described, and refined in Phenix (Adams et al., 2010). Diffraction and crystallographic data statistics are shown in Table 5. PARG-inhibitor structures determined from synchrotron data were similar in resolution and conformation to complexes determined from in-house data despite having a different space group.

TABLE 5

Synchrotron data collection and refinement statistics for PARG-inhibitor complexes.

| | hPARG-JA2131 | hPARG-JA2120 |
|---|---|---|
| Wavelength | 0.98 | 0.98 |
| Resolution range | 35.3-1.7 (1.76-1.7) | 34.4-1.6 (1.66-1.6) |
| Space group | $P2_1 2_1 2_1$ | $P2_1 2_1 2_1$ |
| Unit cell | 66.5 89.3 94.2 90 90 90 | 66.3 89.1 94.3 90 90 90 |
| Total reflections | 1190409 (79669) | 1469470 (148377) |
| Unique reflections | 62296 (6098) | 74163 (7334) |
| Multiplicity | 19.1 (13.1) | 19.8 (20.2) |
| Completeness (%) | 1.00 (0.99) | 1.00 (1.00) |
| Mean I/sigma(I) | 17.71 (0.93) | 18.6 (0.99) |
| Wilson B-factor | 24.5 | 24.8 |
| R-merge | 0.139 (2.688) | 0.118 (3.582) |
| R-meas | 0.143 (2.798) | 0.1211 (3.672) |

TABLE 5-continued

Synchrotron data collection and refinement statistics for PARG-inhibitor complexes.

|  | hPARG-JA2131 | hPARG-JA2120 |
|---|---|---|
| CC1/2 | 0.999 (0.431) | 1 (0.431) |
| CC* | 1 (0.776) | 1 (0.776) |
| Reflections used in refinement | 62266 (6079) | 74153 (7329) |
| Reflections used for R-free | 3235 (287) | 3687 (385) |
| R-work | 0.1826 (0.3118) | 0.1825 (0.3011) |
| R-free | 0.2089 (0.3519) | 0.2153 (0.3546) |
| CC(work) | 0.958 (0.727) | 0.958 (0.705) |
| CC(free) | 0.951 (0.636) | 0.940 (0.628) |
| Number of non-hydrogen atoms | 4324 | 4411 |
| macromolecules | 3942 | 4030 |
| ligands | 22 | 22 |
| Protein residues | 498 | 499 |
| RMS (bonds) | 0.005 | 0.010 |
| RMS (angles) | 0.81 | 1.02 |
| Ramachandran favored (%) | 98 | 97 |
| Ramachandran allowed (%) | 2.2 | 2.8 |
| Ramachandran outliers (%) | 0 | 0 |
| Rotamer outliers (%) | 0 | 0 |
| Clashscore | 1.03 | 0.13 |
| Average B-factor | 29.0 | 30.9 |
| macromolecules | 28.1 | 30.2 |
| ligands | 54.3 | 28.0 |
| solvent | 36.7 | 39.1 |

Statistics for the highest-resolution shell are shown in parentheses.

Cell culture. PC3, MDA-MB-231 cells were maintained in RPMI 1640, MCF-7 cells in Eagle's Minimum Essential Medium (EMEM), MCF-5 cells in EMEM, and Hela and U2OS cells in Dulbecco's modified Eagle's high glucose medium (DMEM) supplemented with 10% (v/v) fetal bovine serum (FBS) and 1% antibiotic/antimycotic (Lonza) in a humidified incubator with 10% $CO_2$. All cell lines were purchased from ATCC and regularly checked for *mycoplasma* and cell authentication. SUM 149PT cells were cultured in F-12 Hams (Gibco) supplemented with 5% fetal bovine serum, insulin, and hydrocortisone. Colony formation assays were carried out in 6-well plates, 500 cells were used per well and following designated treatment, and colonies were grown for 2-3 weeks. Cells were fixed with methanol (100%), stained with crystal violet and analyzed using a GelCount instrument (Oxford Optronix Ltd). Crystal Violet C6158 was purchased from Sigma. PARG knockdown cells were generated by infecting MDA-MB-231 cells with shPARG lentiviral particles (sc-106355-V, Santa Cruz Biotechnology), which contain a pool of three shRNA plasmids. After 24 h infection, 3 µg/mL puromycin (Invitrogen) was added and antibiotic-resistant cells were further expanded and used for experimentation. Sequence-1; hairpin sequence: GATCCGGAAACGGTACTCTACTAATT-CAAGAGATTAGTAGAGTACCGTTTCC TTTTT (SEQ ID NO: 1), sense: GGAAACGGUACUCUACUAAtt (SEQ ID NO: 2), Antisense: UUAGUAGAGUACCGUUUCCtt (SEQ ID NO: 3). Sequence-2; hairpin sequence, GATCCGAAGGATGCTATTCTGAAATTCAAGAGAT-TTCAGAATAGCAT-CCTTCTTTTT (SEQ ID NO: 4), sense: GAAGGAUGCUAUUCUGAAAtt (SEQ ID NO: 5), antisense: UUUCAGAAUAGCAUCCUUCtt (SEQ ID NO: 6). Sequence-3; hairpin sequence: GATCCGGAAACCG-GAGAAACTIAATTCAAGAGATTAAGTTTCTCC-GGTTTCCTTTTT (SEQ ID NO: 7), sense: GGAAACCG- GAGAAACUUAAtt (SEQ ID NO: 8), antisense: UUAAGUUUCUCC-GGUUUCCtt (SEQ ID NO: 9). Control cells were generated using the same process except that scramble lentiviral particles with scrambled sequences were used (sc-108080).

Cellular thermal shift assay (CETSA). CETSA was performed as described in Molina et al., 2013. Briefly, PC3 cells were treated with 10 µM JA2131 or an equivalent volume of DMSO for 2 h, washed three times with PBS and extracted for total cell lysate. 10% glycerol was added to the samples before subjecting to heat. Gradient thermal cycler (C1000 Touch, Bio-Rad) was used to heat samples at 42, 57, 66, 72, 77 and 85° C. for 3 min and chilled on ice for 5 min. Then, samples were centrifuged at 14,000 rpm for 20 min at 4° C. Supernatants were carefully removed and analyzed by Western blotting analysis.

Antibodies and western blots. Cells were grown in 6-well plates and 10 cm dishes, treated with PARGi for 2 hours, irradiated and recovered for 1 hour before harvesting. Cells were irradiated, ranging from 1 to 10 Gy using RAD SOURCE, RS-2000, Biological System, RadSource.com. Cells were washed with phosphate buffer and saline (PBS) and lysed with buffer containing 50 mM Hepes, pH 7.5, 1% (v/v) igepal-C630, 1 mg/ml bacitracin, 1 mM EDTA, 10 mM NaF, 1 mM sodium orthovanadate, 10% (v/v) glycerol, 50 mM NaCl, 1 mM PMSF, and Protease Inhibitor Cocktail Set III (EMD Millipore). The detergent-soluble fraction was used for Western blotting. Cell fractionation was carried out using the Subcellular Protein Fractionation Kit (#78840, ThermoFisher) according to the manufacturer's instruction. Primary antibodies were purchased from the following sources; Actin, γH2AX and Histone-H3 was from Cell Signaling Technology. H2AX and LAMB1 were from Invitrogen/ThermoFisher. PCNA and p53 were from Santa Cruz biotechnology. Anti-PAR (10H) was from EMD Millipore, anti-PARG was from Cell Signaling Technology, and Anti-PARP1 was from ABCAM. Secondary antibodies were conjugated HRP (Cell Signaling) and ECL Clarity was purchased from Bio-Rad. All primary and secondary antibodies were diluted 1:1000 with 5% non-fat Blotting Grade Blocking Reagent in 1× TBST, except for anti-PAR 1:500. Uncropped western data are presented in FIG. 28).

Immuno-staining and imaging. PC3 cells were grown to 75% confluence in 24-well 25 µm film bottom Eppendorf black cell Imaging plates (0030741005), treated with either DMSO or designated inhibitors for 2 hours, irradiated 7 Gy X-ray and allowed to recover for an hour before fixing with 4% (wt/vol) paraformaldehyde, pH 8.0. All subsequent steps were performed at pH8.0. Cells were washed 6-7 times with PBS, permeabilized 0.5% Triton X-100 in PBS on ice for 20 min, blocked overnight with PBS/5% Goat serum/3% BSA/0.5% Triton X-100. Cells were incubated with primary antibody 1:250 dilution in PBS/5% BSA/0.5% Triton X-100 overnight at 4° C. Following 6× wash with PBS pH 8.0, cells were exposed to fluorescence labelled secondary antibody diluted 1:500 in PBS/5% BSA/0.5% Triton X-100 for 1 hour at room temperature. Following 6-7× PBS washes, cells were fixed again with 4% PFA at room temperature for 20 min. After a further 6× PBS washes cells were imaged in PBS buffer using ImageXpress high-content imager (Molecular Devices Inc). Statistical analysis was performed with MetaXpress Software.

Sulforhodamine B (SRB) Cytotoxicity Assay. Cells were plated in 96-well plates, treated as designated in reduced 5% FBS and fixed with trichloroacetic acid after 72 hours, as previously described in Vichai et al., 2006. PARG inhibitor JA2131 was titrated typically from 300-0.15 µM. Colorimetric or fluorescence analysis was performed in a FlexStation 3, using SoftMax Pro 7.0, Molecular Devices. Normalized graphs were generated with Prism 8 software, non-linear 4-parameter data fitting was performed for $IC_{50}$ calculation.

DNA fiber assay. DNA fiber assay was conducted as described previously (Castillo et al. 2014). Briefly, cells pretreated with JA2131 (10 µM) or DMSO for 2 hrs were labeled with 100 µM CldU for 30 min and exposed to 250 µM IdU (with or without 0.4 mM hydroxyurea treatment) for another 30 min or 3 hrs. After labeling and treatment, cells were lysed and DNA fibers stretched onto glass slides. Immunofluorescence was carried out using α-IdU/α-BrdU (BD Biosciences) and α-CldU/α-BrdU (Abcam) and secondary antibodies, including Alexa Fluor 488 (green) and Alexa Fluor 555 (Invitrogen). Images were taken using a Nikon 80 microscope and analyzed using ImageJ software. Statistics were calculated using Prism software. 5-Chloro-2'-deoxyuridine (CldU) and 5-Iodo-2'-deoxyuridine (IdU) were from Sigma.

TCGA analysis. TCGA-Assembler suite (Wei et al., 2018) with the Assay Platform option set to gene was employed. Normalized RNAseq to obtain the normalized Rsem RNA-seq gene expression data from TCGA project. Data were processed with in-house scripts (C++ and Bash) and plotted with the R package "ggp1lot2" and "ggpubr".

Data availability. The data supporting the findings of the present disclosure are available upon request. Coordinates and structure-factor files for human PARG complexed with JA2-4, JA2-8, JA2-9, JA2120 and JA2131 have been deposited in the Protein Data Bank with accession codes 6O9X, 6O9Y, 6OA0, 6OA1, and 6OA3.

Example 3—Synthesis and Characterization

Scheme 1

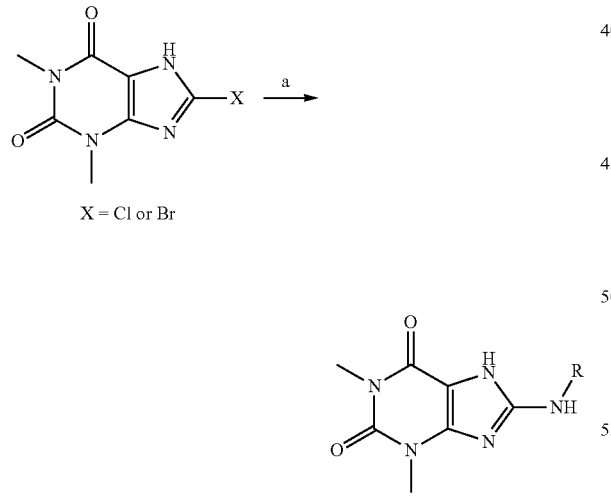

Reagents and conditions: a) R-NH$_2$, DMF, reflux.

LPF-IV-159-1—1H-NMR (400 MHz, DMSO-D6) δ 11.87-11.68 (1H), 8.01 (s, 1H), 3.48 (s, 4H), 3.35 (s, 3H), 3.23 (d, J=6.0 Hz, 2H), 3.19 (s, 3H), 2.50 (s, 3H), 2.46 (s, 4H), 2.39 (t, J=6.6 Hz, 2H); 13C-NMR (101 MHz, DMSO-D6) 6161.12, 154.58, 152.62, 151.20, 148.80, 102.19, 56.76, 51.77, 45.53, 34.50, 29.57, 27.51

LPF-IV-147-1—1H-NMR (400 MHz, CHLOROFORM-D) δ 12.47 (s, 1H), 5.53 (s, 1H), 3.76 (s, 4H), 3.50 (s, 3H), 3.48 (d, J=5.0 Hz, 2H), 3.38 (s, 3H), 2.62 (t, J=5.0 Hz, 2H), 2.52 (s, 4H); 13C-NMR (101 MHz, CHLOROFORM-D) δ 155.59, 154.16, 151.92, 150.64, 102.90, 66.92, 58.30, 53.60, 39.80, 30.24, 28.23

LPF-I-175-1—1H-NMR (400 MHz, DMSO-D6) δ 11.90-11.03 (1H), 6.97 (q, J=4.4 Hz, 2H), 6.87 (d, J=8.7 Hz, 2H), 4.35 (d, J=6.4 Hz, 2H), 3.75 (s, 3H), 3.70 (s, 3H), 3.33 (s, 3H); 13C-NMR (101 MHz, DMSO-D6) δ 159.41, 154.62, 152.30, 151.21, 149.34, 131.32, 130.58, 128.57, 113.66, 55.24, 41.72, 29.57, 27.45.

LPF-I-177-1-1 H-NMR (400 MHz, DMSO-D6) δ 7.56-7.73 (m, 3H), 7.28 (s, 1H), 4.53 (s, 2H), 3.31 (s, 3H), 3.15 (s, 3H) LPF-I-178-1—1H-NMR (400 MHz, DMSO-D6) δ 11.80 (s, 1H), 9.51 (s, 1H), 7.56-7.59 (m, 2H), 7.08-7.13 (m, 2H), 3.39 (s, 3H), 3.19 (s, 3H); 13C-NMR (101 MHz, DMSO-D6) δ 158.40, 155.85, 152.90, 151.19, 149.92, 148.25, 136.37, 119.26, 115.28, 29.79, 27.5

LPF-I-179-1—1H-NMR (400 MHz, DMSO-D6) δ 12.03 (s, 1H), 9.71 (s, 1H), 7.54-7.58 (m, 1H), 7.25-7.32 (m, 2H), 6.70-6.75 (m, 1H), 3.41 (s, 3H), 3.20 (s, 3H); 13C-NMR (101 MHz, DMSO-D6) δ 163.56, 161.15, 153.02, 151.14, 149.03, 148.03, 141.82, 130.29, 113.33, 107.41, 103.89, 29.77, 27.59

LPF-I-214-1—1H-NMR (400 MHz, DMSO-D6) δ 12.36-10.68 (1H), 7.18 (t, J=5.7 Hz, 1H), 3.61 (t, J=4.4 Hz, 2H), 3.41 (s, 4H), 3.33 (s, 3H), 3.23 (q, J=6.6 Hz, 1H), 3.18 (s, 3H), 2.42 (s, 4H), 2.36 (t, J=6.4 Hz, 2H), 1.69 (td, J=14.9, 7.2 Hz, 2H); 13C-NMR (101 MHz, DMSO-D6) δ 169.36, 154.96, 152.57, 151.61, 149.70, 66.05, 55.37, 53.06, 40.43, 37.64, 29.54, 27.71

Scheme 2

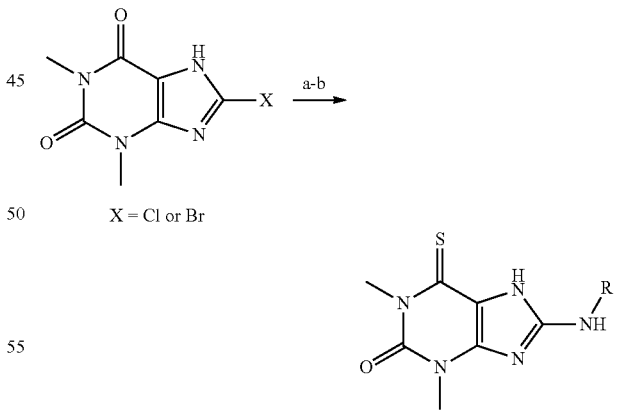

Reagents and conditions: a) P$_4$S$_{10}$, pyridine reflux; b) R-NH$_2$, DMF, reflux.

General procedure Scheme 1: 10 mL DMF was added to theophylline (1 mmol) and stirbar in a 40 mL heating vial and stirred at room temperature until all the starting material dissolved. Next 1.2 mmol of the amine was added to the reaction mixture. The solution was refluxed for 24 h. The solvent was removed and the crude product was purified by column chromatography.

LPF-I-196-1—1H-NMR (400 MHz, DMSO-D6) δ 3.36 (s, 1H), 2.49 (q, J=1.8 Hz, 1H)

LPF-I-195-1—1H-NMR (400 MHz, DMSO-D6) δ 8.47 (s, 2H), 7.97 (s, 2H), 7.19-7.70 (m, 4H), 5.71 (s, 1H), 4.07 (s, 1H), 3.11-3.58 (m, 3H)

LPF-I-194-1—1H-NMR (400 MHz, DMSO-D6) δ 3.32 (s, 1H), 2.46 (q, J=1.8 Hz, 1H).

Scheme 3

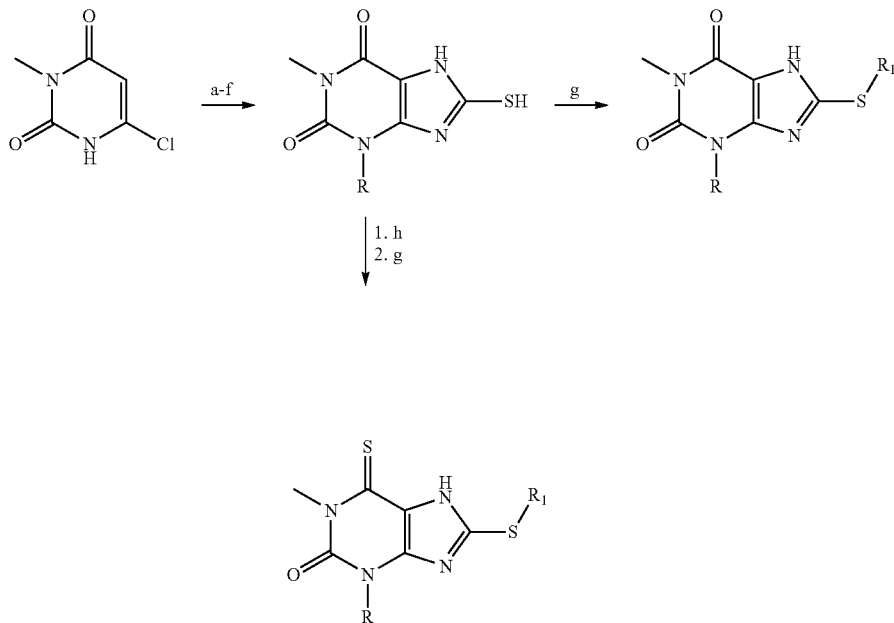

Reagents and conditions: a) K$_2$CO$_3$, R-X, DMF, 60° C., 4-6 h; b) NaN$_3$, DMF; c) H$_2$, Pd/C, EtOH; d) NaNO$_2$, AcOH, RT.; e) H$_2$, Pd/C, EtOH; f) CS$_2$, DMF, reflux; g) R$_1$-X, 1% NaOH, RT; h) P$_4$S$_{10}$, pyridine reflux.

General procedure Scheme 3 step g: 5 mL of 1% NaOH solution was added to xanthine (1 mmol) and stirbar in a 30 mL vial and stirred at room temperature until all the starting material dissolved. Next the alkyl halide (1.2 mmol) was dissolved in a minimum volume of water and then added to the reaction mixture dropwise. The solution was stirred at room temperature for 24 and monitored by TLC. After the starting material was consumed, the solvent was removed and the crude was purified by column chromatography.

LPF-IV-172-1-1 H-NMR (400 MHz, CHLOROFORM-D) δ 4.21 (t, J=5.7 Hz, 2H), 4.04 (s, 4H), 3.47 (t, J=5.3 Hz, 2H), 3.39 (s, 3H), 3.13 (t, J=4.4 Hz, 2H), 2.99 (t, J=4.6 Hz, 2H), 2.71 (s, 4H), 1.91 (d, J=5.5 Hz, 2H); 13C-NMR (101 MHz, CHLOROFORM-D) δ 154.34, 152.00, 151.08, 149.66, 108.85, 65.73, 61.97, 57.95, 54.08, 40.16, 31.18, 29.19, 28.39

LPF-IV-128-1—1H-NMR (400 MHz, CHLOROFORM-D) δ 4.32 (t, J=5.5 Hz, 2H), 4.11 (s, 4H), 3.83 (s, 3H), 3.74 (t, J=5.7 Hz, 2H), 3.35 (s, 3H), 3.15 (t, J=10.1 Hz, 2H), 2.96 (t, 2H), 2.69 (s, 4H); 13C-NMR (101 MHz, CHLOROFORM-D) δ 174.23, 153.95, 150.20, 144.56, 121.47, 69.21, 65.61, 62.16, 59.07, 54.80, 43.60, 34.65, 29.49

LPF-IV-141-1—1H-NMR (400 MHz, DMSO-D6) δ 13.52 (s, 1H), 10.27 (s, 1H), 4.13 (s, 2H), 3.99 (d, J=11.9 Hz, 2H), 3.78 (d, J=11.4 Hz, 2H), 3.70 (t, J=5.7 Hz, 2H), 3.65 (d, J=0.9 Hz, 3H), 3.55 (t, J=12.4 Hz, 4H), 3.20 (d, J=14.7 Hz, 4H); 13C-NMR (101 MHz, DMSO-D6) δ 173.19, 151.30, 149.31, 143.83, 120.73, 63.30, 57.58, 55.14, 51.31, 46.16, 33.92, 24.56

LPF-IV-138-1—1H-NMR (400 MHz, DMSO-D6) δ 5.10-4.45 (1H), 4.02 (t, J=6.2 Hz, 2H), 3.60-3.65 (m, 6H), 3.35 (t, J=6.4 Hz, 2H), 3.22 (s, 3H), 2.69 (t, J=6.4 Hz, 2H), 2.47 (s, 4H); 13C-NMR (101 MHz, DMSO-D6) δ 153.47, 150.82, 149.50, 148.47, 108.04, 65.85, 57.98, 57.68, 52.89, 45.21, 28.65, 27.71

Scheme 4

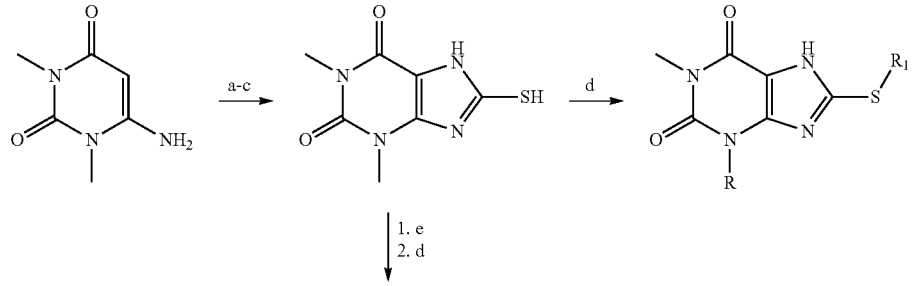

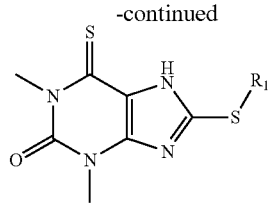

Reagents and conditions: a) NaNO$_2$, AcOH, RT; b) H$_2$, Pd/C, EtOH; c) CS$_2$, DMF, reflux; d) R$_1$-X, 1% NaOH, RT; e) P$_4$S$_{10}$, pyridine reflux.

LPF-III-195-2—1H-NMR (400 MHz, DMSO-D6) δ 3.61 (s, 3H), 3.46 (s, 4H), 3.41 (s, 3H), 3.35 (t, J=6.6 Hz, 2H), 2.71 (t, J=6.6 Hz, 2H), 2.56 (s, 4H), 2.28 (s, 3H); 13C-NMR (101 MHz, DMSO-D6) δ 172.56, 153.93, 149.61, 144.16, 136.69, 120.96, 56.47, 53.06, 50.51, 33.88, 30.33, 28.52

LPF-III-222-1—1H-NMR (400 MHz, DMSO-D6) δ 13.24-13.90 (1H), 3.65 (d, J=3.7 Hz, 2H), 3.49 (d, J=3.7 Hz, 2H), 3.39 (s, 11H); 13C-NMR (101 MHz, DMSO-D6) δ 172.9, 151.7, 149.6, 143.8, 120.6, 56.2, 54.7, 48.1, 47.8, 33.9, 30.5

LPF-I-35-1—1H-NMR (400 MHz, DMSO-D6) δ 13.60 (s, 1H), 4.12 (q, J=7.2 Hz, 4H), 3.37 (s, 3H), 3.20 (s, 3H), 1.17 (t, J=7.1 Hz, 3H); 13C-NMR (101 MHz, DMSO-D6) δ 168.36, 153.34, 150.91, 148.18, 147.90, 107.92, 61.25, 33.61, 29.70, 27.71, 14.03

LPF-I-83-1—1H-NMR (400 MHz, DMSO-D6) δ 13.54 (s, 1H), 4.07 (q, J=7.0 Hz, 2H), 3.40 (s, 5H), 3.21 (s, 3H), 2.79 (t, J=6.9 Hz, 2H), 1.18 (t, J=7.1 Hz, 3H); 13C-NMR (101 MHz, DMSO-D6) δ 171.08, 153.29, 150.93, 148.38, 107.81, 60.26, 34.13, 30.69, 29.76, 27.69, 26.93, 14.05

LPF-I-27-1—1H-NMR (400 MHz, DMSO-D6) δ 13.57 (s, 1H), 4.02 (s, 2H), 3.38 (s, 3H), 3.20 (s, 3H), 1.46-1.24 (9H); 13C-NMR (101 MHz, DMSO-D6) δ 167.26, 153.29, 150.89, 148.18, 148.11, 107.80, 81.41, 34.57, 29.68, 27.69, 27.58

LPF-I-51-1—1H-NMR (400 MHz, DMSO-D6) δ 13.57 (s, 1H), 7.40 (d, J=8.2 Hz, 2H), 7.31 (t, J=7.6 Hz, 2H), 7.23-7.27 (m, 1H), 4.48 (s, 2H), 3.43 (s, 3H), 3.21 (s, 3H), 2.50 (d, J=1.4 Hz, 1H); 13C-NMR (101 MHz, DMSO-D6) δ 153.31, 150.93, 148.27, 137.28, 128.94, 128.52, 127.46, 107.81, 35.59, 29.79, 27.71

LPF-I-53-1—1H-NMR (101 MHz, DMSO-D6) δ 13.57 (s, 1H), 7.44 (dd, J=8.2, 5.5 Hz, 2H), 7.13 (t, J=8.7 Hz, 2H), 4.48 (d, J=11.0 Hz, 2H), 3.43 (s, 3H), 3.24-3.17 (3H); 13C-NMR (400 MHz, DMSO-D6) δ 153.32, 150.94, 148.28, 148.10, 133.69, 131.03, 130.95, 115.40, 115.19, 34.76, 29.80, 27.72

LPF-I-68-1—1H-NMR (400 MHz, DMSO-D6) δ 13.75 (s, 1H), 7.33-7.51 (m, 4H), 4.69 (s, 2H), 3.41 (s, 3H), 3.22 (s, 3H), 2.50 (t, J=1.6 Hz, 2H); 13C-NMR (101 MHz, DMSO-D6) δ 153.43, 150.92, 148.26, 146.74, 134.96, 132.37, 130.45, 128.75, 108.17, 32.90, 29.79, 27.73

LPF-I-64-1—1H-NMR (400 MHz, DMSO-D6) δ 13.54 (s, 1H), 7.27 (d, J=6.4 Hz, 2H), 7.10 (d, J=6.4 Hz, 2H), 4.43 (s, 2H), 3.43 (s, 3H), 3.21 (s, 3H), 2.25 (s, 3H); 13C-NMR (101 MHz, DMSO-D6) δ 153.28, 150.93, 148.37, 148.28, 136.69, 134.08, 129.06, 128.85, 107.76, 35.43, 29.77, 27.70, 20.69

LPF-I-81-1—1H-NMR (400 MHz, DMSO-D6) δ 13.51 (s, 1H), 7.71 (s, 4H), 3.96 (d, J=5.0 Hz, 2H), 3.53 (s, 2H), 3.24 (s, 3H), 3.12 (s, 3H); 13C-NMR (101 MHz, DMSO-D6) δ 167.38, 152.90, 150.59, 147.89, 147.73, 134.04, 131.20, 122.61, 107.45, 38.15, 30.69, 30.20, 29.50, 27.51

LPF-I-82-1—1H-NMR (400 MHz, DMSO-D6) δ 13.49 (s, 1H), 7.84 (d, J=3.7 Hz, 4H), 3.69 (t, J=6.2 Hz, 2H), 3.26 (s, 3H), 3.19-3.24 (m, 5H), 2.01 (t, J=6.6 Hz, 2H); 13C-NMR (101 MHz, DMSO-D6) δ167.99, 150.88, 134.34, 131.66, 122.99, 36.34, 30.69, 29.51, 28.90, 28.60, 27.67

LPF-I-298-1—1H-NMR (400 MHz, DMSO-D6) δ 13.40 (s, 1H), 4.08 (q, J=7.2 Hz, 2H), 3.64 (s, 3H), 3.44 (t, J=7.1 Hz, 5H), 2.82 (t, J=6.9 Hz, 2H), 1.18 (t, J=7.1 Hz, 3H); 13C-NMR (101 MHz, DMSO-D6) δ 172.71, 171.16, 152.77, 149.55, 143.87, 120.50, 60.31, 34.01, 33.87, 30.36, 26.55, 14.09

LPF-I-299-1—1H-NMR (400 MHz, DMSO-D6) δ 4.82 (s, 2H), 4.12 (q, J=6.7 Hz, 2H), 3.61 (s, 3H), 3.50 (s, 3H), 3.33 (s, 12H), 1.15-1.22 (m, 3H);

LPF-II-9-1—1H-NMR (400 MHz, DMSO-D6) δ 13.47 (s, 1H), 3.39 (s, 3H), 3.20 (s, 3H), 3.16 (d, J=6.9 Hz, 2H), 1.11-1.14 (m, 1H), 0.51-0.56 (m, 2H), 0.29 (td, J=5.3, 3.8 Hz, 2H); 13C-NMR (101 MHz, DMSO-D6) δ 153.24, 150.94, 149.17, 148.38, 107.62, 37.31, 29.76, 27.68, 10.98, 5.65

LPF-II-17-1—1H-NMR (400 MHz, DMSO-D6) δ 13.52 (s, 1H), 12.18 (s, 1H), 3.40 (s, 3H), 3.22 (t, J=6.4 Hz, 5H), 2.35 (t, J=7.3 Hz, 2H), 1.84-1.91 (m, 2H); 13C-NMR (101 MHz, DMSO-D6) δ 173.81, 153.30, 150.97, 148.65, 148.41, 107.76, 32.25, 31.04, 29.79, 27.72, 24.78

LFP-I-305-1—1H-NMR (400 MHz, DMSO-D6) δ 4.03 (q, J=7.0 Hz, 2H), 3.37 (d, J=9.2 Hz, 3H), 3.21 (t, J=6.4 Hz, 5H), 2.42 (t, J=7.3 Hz, 2H), 1.87-1.94 (m, 2H), 1.16 (t, J=7.3 Hz, 3H); 13C-NMR (101 MHz, DMSO-D6) δ 172.25, 153.35, 150.95, 148.57, 148.40, 108.02, 59.93, 32.15, 30.96, 29.75, 27.67, 24.77, 14.08

LPF-II-198-1—1H-NMR (400 MHz, DMSO-D6) δ 13.24-13.88 (1H), 8.21 (d, J=6.9 Hz, 2H), 7.94 (t, J=6.6 Hz, 2H), 5.00 (s, 2H), 3.27 (s, 3H), 3.20 (s, 3H); 13C-NMR (101 MHz, DMSO-D6) δ 193.1, 153.3, 150.9, 148.2, 138.9, 133.0, 132.7, 129.5, 129.2, 125.8, 107.9, 38.9, 29.7, 27.7

LPF-II-196-1—1H-NMR (400 MHz, DMSO-D6) δ 7.47-7.40 (m, 2H), 6.85 (d, J=7.8 Hz, 1H), 4.85 (s, 2H), 3.35 (s, 3H), 3.21 (s, 3H); 13C-NMR (101 MHz, DMSO-D6) δ 191.6, 153.6, 151.4, 151.0, 148.9, 148.5, 145.4, 127.2, 122.0, 115.2, 115.2, 108.6, 40.1, 39.9, 39.7, 39.5, 39.3, 39.1, 38.9, 30.7, 29.8, 27.7

LPF-II-195-1—1H-NMR (400 MHz, DMSO-D6) δ 13.44 (s, 1H), 4.35 (s, 2H), 3.62 (d, J=4.6 Hz, 4H), 3.55 (q, J=4.7 Hz, 4H), 3.39 (s, 3H), 3.21 (s, 3H); 13C-NMR (101 MHz, DMSO-D6) δ 165.5, 153.2, 150.9, 148.7, 107.7, 66.0, 45.9, 42.0, 40.1, 39.9, 39.7, 39.5, 39.3, 39.1, 38.9, 35.3, 29.8, 27.7

LPF-II-194-1—1H-NMR (400 MHz, DMSO-D6) δ 13.53 (s, 1H), 7.94 (d, J=8.2 Hz, 2H), 7.37 (d, J=8.2 Hz, 2H), 4.96 (s, 2H), 3.31 (s, 3H), 3.21 (s, 3H), 2.40 (s, 3H); 13C-NMR (101 MHz, DMSO-D6) δ 192.8, 153.3, 150.9, 148.5, 148.3, 144.3, 132.9, 129.3, 128.5, 107.8, 30.7, 29.7, 27.7, 21.2

LPF-II-193-1—1H-NMR (400 MHz, DMSO-D6) δ 8.02 (d, J=8.7 Hz, 2H), 7.03 (d, J=9.2 Hz, 2H), 4.59 (s, 2H), 3.84

(s, 3H), 3.32 (s, 3H), 3.17 (s, 3H); 13C-NMR (101 MHz, DMSO-D6) δ 193.9, 163.2, 156.2, 151.5, 150.9, 150.3, 130.9, 128.6, 115.9, 113.9, 55.6, 38.5, 29.9, 27.4

LPF-II-192-1—1H-NMR (400 MHz, DMSO-D6) δ 13.58 (s, 1H), 7.83 (d, J=7.8 Hz, 1H), 7.57-7.47 (m, 3H), 4.80 (s, 2H), 3.32 (s, 3H), 3.20 (s, 3H); 13C-NMR (101 MHz, DMSO-D6) δ 195.4, 153.3, 150.9, 148.2, 136.9, 132.9, 130.6, 130.0, 127.3, 107.9, 41.5, 29.7, 27.7

LPF-II-191-1—1H-NMR (400 MHz, DMSO-D6) δ 13.57 (s, 1H), 8.72 (s, 1H), 8.48 (dd, J=18.5, 7.6 Hz, 2H), 7.89-7.83 (m, 1H), 5.03 (s, 2H), 3.26 (s, 3H), 3.19 (s, 3H); 13C-NMR (101 MHz, DMSO-D6) δ 192.4, 153.3, 150.9, 148.2, 148.0, 136.8, 134.6, 130.7, 127.8, 122.7, 107.9, 30.7, 29.6, 27.7

LPF-II-188-1—1H-NMR (400 MHz, DMSO-D6) δ 13.09-13.97 (1H), 7.86 (d, J=8.7 Hz, 1H), 7.73 (d, J=2.3 Hz, 1H), 7.58 (dd, J=8.2, 1.8 Hz, 1H), 4.77 (s, 2H), 3.30 (s, 3H), 3.19 (s, 3H); 13C-NMR (101 MHz, DMSO-D6) δ 194.5, 153.3, 150.9, 148.1, 147.8, 136.8, 135.5, 131.6, 131.5, 130.1, 127.5, 107.9, 41.5, 29.7, 27.7

LPF-II-187-1—1H-NMR (400 MHz, DMSO-D6) δ 13.49 (s, 1H), 4.40 (s, 2H), 3.36 (s, 3H), 3.19 (s, 3H), 2.24 (s, 1H), 0.97-0.91 (m, 4H); 13C-NMR (101 MHz, DMSO-D6) δ 203.6, 153.2, 150.9, 148.3, 148.1, 107.8, 41.6, 29.7, 27.7, 19.7, 10.9

LPF-II-186-1—1H-NMR (400 MHz, DMSO-D6) δ 8.14-8.10 (m, 2H), 7.36-7.31 (m, 2H), 4.66 (s, 2H), 3.32 (s, 3H), 3.18 (s, 3H); 13C-NMR (101 MHz, DMSO-D6) δ 194.2, 163.9, 156.3, 151.5, 150.8, 150.4, 132.6, 131.6, 131.6, 115.8, 115.6, 29.9, 27.5

LPF-II-185-1—1H-NMR (400 MHz, DMSO-D6) δ 13.53 (s, 1H), 7.87 (d, J=7.3 Hz, 1H), 7.18-7.14 (m, 2H), 4.83 (s, 2H), 3.32 (s, 3H), 3.21 (s, 3H), 2.36 (s, 3H), 2.32 (s, 3H); 13C-NMR (101 MHz, DMSO-D6) δ 196.4, 153.8, 151.4, 149.1, 148.7, 142.7, 138.5, 133.8, 132.9, 130.2, 126.9, 108.3, 42.0, 30.2, 28.2, 21.5, 21.3

LPF-II-184-1—1H-NMR (400 MHz, DMSO-D6) δ 13.45 (s, 1H), 4.21 (s, 2H), 3.53 (t, J=6.2 Hz, 2H), 3.38 (s, 3H), 3.30 (t, J=6.2 Hz, 2H), 3.20 (s, 3H), 1.85 (dt, J=47.8, 6.2 Hz, 4H); 13C-NMR (101 MHz, DMSO-D6) δ 164.9, 153.2, 150.9, 148.9, 107.6, 46.3, 35.7, 29.7, 27.7, 25.7, 24.0

LPF-II-183-1—1H-NMR (400 MHz, DMSO-D6) δ 8.17 (s, 1H), 8.02 (d, J=7.8 Hz, 1H), 7.88 (d, J=7.8 Hz, 1H), 7.53 (t, J=7.8 Hz, 1H), 4.95 (s, 2H), 3.28 (s, 3H), 3.19 (s, 3H), 2.50 (s, 1H)); 13C-NMR (101 MHz, DMSO-D6) δ 193.9, 155.3, 151.3, 149.9, 149.4, 137.8, 136.0, 131.1, 131.0, 127.5, 122.1, 113.2, 38.9, 29.8, 27.5

LPF-II-222-1—1H-NMR (400 MHz, DMSO-D6) δ 13.40 (s, 1H), 10.04 (s, 1H), 9.45 (s, 1H), 7.49-7.39 (m, 2H), 6.86 (d, J=8.2 Hz, 1H), 4.92 (s, 2H), 3.64 (s, 3H), 3.35 (s, 3H); 13C-NMR (101 MHz, DMSO-D6) δ 191.3, 172.6, 153.0, 151.4, 149.6, 145.4, 143.8, 127.2, 122.0, 120.5, 115.2, 115.2, 48.6, 33.9, 30.3

LPF-II-243-1—1H-NMR (400 MHz, CHLOROFORM-D) δ 7.62 (d, J=7.8 Hz, 1H), 7.42 (d, J=7.8 Hz, 1H), 7.27 (d, J=0.9 Hz, 1H), 4.16 (s, 2H), 3.80 (s, 3H), 3.65 (s, 3H), 2.42 (s, 3H), 2.34 (s, 3H); 13C-NMR (101 MHz, CHLOROFORM-D) δ 193.06, 169.14, 157.32, 149.21, 140.41, 139.45, 133.39, 133.07, 129.74, 129.44, 126.75, 126.34, 41.00, 34.45, 31.90, 21.82, 21.61

LPF-II-245-1—1H-NMR (400 MHz, CHLOROFORM-D) δ 4.03 (s, 2H), 3.75 (s, 3H), 3.67 (s, 3H), 2.32-2.38 (m, 1H), 1.12 (t, J=3.2 Hz, 2H), 0.89-0.92 (m, 2H); 13C-NMR (101 MHz, CHLOROFORM-D) δ 206.01, 168.30, 157.22, 149.10, 146.72, 128.27, 41.98, 34.36, 31.86, 19.93, 12.00

LPF-II-224-1—1H-NMR (400 MHz, CHLOROFORM-D) δ 7.86 (d, J=7.8 Hz, 2H), 7.76 (d, J=8.2 Hz, 2H), 4.27 (s, 2H), 3.80 (s, 3H), 3.64 (s, 3H), 2.39 (s, 3H); 13C-NMR (101 MHz, CHLOROFORM-D) δ 193.81, 168.96, 157.40, 149.18, 144.54, 133.23, 129.79, 129.48, 128.88, 128.79, 38.43, 34.48, 31.90, 21.91

LPF-II-225-1—1H-NMR (400 MHz, DMSO-D6) δ 7.92 (dd, J=8.5, 2.5 Hz, 2H), 6.98 (dd, J=8.2, 2.7 Hz, 2H), 4.35 (s, 2H), 3.84 (s, 3H), 3.67 (s, 3H), 3.48 (s, 3H); 13C-NMR (101 MHz, DMSO-D6) δ 192.29, 166.81, 163.36, 156.55, 148.53, 130.66, 128.15, 127.30, 114.05, 113.89, 55.58, 38.09, 34.09, 31.38

LPF-II-227-1—1H-NMR (400 MHz, DMSO-D6) δ 13.47 (s, 1H), 8.27 (d, J=8.2 Hz, 2H), 8.05 (d, J=4.6 Hz, 2H), 4.42 (s, 2H), 3.68 (s, 3H), 3.63 (s, 3H), 3.43 (s, 3H); 13C-NMR (101 MHz, DMSO-D6) δ 193.86, 172.79, 152.31, 147.08, 144.61, 143.64, 139.48, 129.27, 128.24, 127.43, 127.08, 43.16, 31.38, 30.20

LPF-II-228-1—1H-NMR (400 MHz, CHLOROFORM-D) δ 8.41 (s, 1H), 8.29 (d, J=8.2 Hz, 11H), 8.14 (d, J=8.2 Hz, 11H), 7.66 (t, J=7.8 Hz, 11H), 4.29 (s, 2H), 3.81 (s, 3H), 3.61 (s, 3H) JA 2131—1H-NMR (400 MHz, DMSO-D6) δ 3.65 (s, 3H), 3.59 (s, 4H), 3.45 (s, 3H), 3.41 (t, J=6.6 Hz, 2H), 2.70 (t, J=6.6 Hz, 2H), 2.47 (s, 4H); 13C-NMR (101 MHz, DMSO-D6) δ 172.52, 153.89, 149.58, 144.03, 120.65, 65.87, 57.45, 52.89, 33.87, 30.32, 28.41

LPF-I-245-1—1H-NMR (400 MHz, DMSO-D6) δ 3.39 (s, 3H), 3.21 (s, 3H), 3.10 (s, 4H), 3.02 (s, 2H), 2.81 (s, 2H), 1.75 (d, J=5.0 Hz, 4H), 1.48 (s, 2H);

LPF-I-247-1—1H-NMR (400 MHz, DMSO-D6) δ 13.47 (s, 1H), 7.26 (s, 2H), 4.08 (s, 2H), 3.38 (s, 3H), 3.20 (s, 3H); 13C-NMR (101 MHz, DMSO-D6) δ 169.89, 168.94, 153.55, 150.98, 148.09, 107.81, 35.52, 29.99, 27.74

LFP-I-300-1—1H-NMR (400 MHz, DMSO-D6) δ 4.03 (q, J=7.0 Hz, 2H), 3.65 (s, 3H), 3.57 (s, 3H), 3.08 (t, J=7.6 Hz, 2H), 2.41 (t, J=8.0 Hz, 2H), 1.89 (t, J=7.1 Hz, 2H), 1.15 (t, J=7.1 Hz, 3H)

LPF-II-31-1—1H-NMR (400 MHz, DMSO-D6) δ 12.82-12.14 (LH), 3.38 (s, 3H), 3.34 (t, J=6.9 Hz, 2H), 3.18 (s, 3H), 2.70 (t, J=6.9 Hz, 2H); 13C-NMR (101 MHz, DMSO-D6) δ 172.70, 153.27, 150.93, 148.66, 148.38, 107.78, 34.27, 29.79, 27.71, 27.06

LFP-II-16-1—1H-NMR (400 MHz, DMSO-D6) δ 13.94-12.79 (1H), 4.09 (s, 2H), 3.37 (s, 3H), 3.19 (s, 3H); 13C-NMR (101 MHz, DMSO-D6) δ 169.57, 153.32, 150.95, 148.28, 148.20, 107.85, 33.95, 29.80, 27.74

LPF-II-35-1—1H-NMR (400 MHz, DMSO-D6) δ 13.41 (s, 1H), 3.63 (s, 3H), 3.45 (s, 3H), 3.38-3.41 (m, 2H), 2.74 (t, J=6.9 Hz, 2H); 13C-NMR (101 MHz, DMSO-D6) δ 172.67, 172.61, 150.98, 149.59, 143.90, 120.49, 34.18, 30.39, 26.69, 24.09

LPF-II-38-1—1H-NMR (400 MHz, DMSO-D6) δ 13.37 (s, 1H), 3.65 (s, 3H), 3.46 (s, 3H), 3.22 (d, J=7.3 Hz, 2H), 1.14-1.23 (m, 1H), 0.56 (q, J=6.1 Hz, 2H), 0.29-0.35 (m, 2H); 13C-NMR (101 MHz, DMSO-D6) δ 172.55, 153.60, 149.59, 143.94, 120.39, 36.95, 33.86, 30.35, 10.94, 5.76

LPS-II-247-1—1H-NMR (400 MHz, CHLOROFORM-D) δ 8.13 (d, J=7.8 Hz, 2H), 7.96 (d, J=8.2 Hz, 2H), 4.27 (s, 2H), 3.82 (s, 3H), 3.62 (s, 3H)

LPS-II-248-1—1H-NMR (400 MHz, DMSO-D6) δ 13.35 (s, 1H), 4.41 (s, 2H), 3.64 (s, 7H), 3.56 (s, 4H), 3.45 (s, 3H)

LPS-II-229-1—1H-NMR (400 MHz, DMSO-D6) δ 13.70-13.29 (1H), 8.75 (t, J=8.9 Hz, 1H), 8.46-8.55 (m, 2H), 7.90 (q, J=8.2 Hz, 1H), 5.06 (s, 2H), 3.45-3.37 (3H), 3.28 (s, 3H)

LPS-II-244-1—1H-NMR (400 MHz, DMSO-D6) δ 7.99-8.05 (m, 2H), 7.38 (q, J=8.5 Hz, 2H), 4.39 (s, 2H), 3.68 (s, 3H), 3.45 (s, 3H)

LPS-II-242-1—1H-NMR (400 MHz, CHLOROFORM-D) δ 3.95 (s, 2H), 3.81 (s, 3H), 3.56-3.62 (m, 7H), 2.03-2.09 (m, 2H), 1.91-1.98 (m, 2H)

LPS-II-190-1—1H-NMR (400 MHz, DMSO-D6) δ 13.54 (s, 1H), 7.26-7.70 (m, 4H), 4.97 (s, 2H), 3.82 (s, 3H), 3.34 (d, J=27.0 Hz, 6H)

LPS-II-189-1—1H-NMR (400 MHz, DMSO-D6) δ 13.58 (s, 1H), 7.83 (d, J=7.8 Hz, 1H), 7.47-7.57 (m, 3H), 4.80 (s, 2H), 3.32 (s, 3H), 3.20 (s, 3H).

LPF-II-43-1—1H-NMR (400 MHz, DMSO-D6) δ 13.74-13.23 (1H), 3.64 (s, 3H), 3.46 (s, 3H), 3.21 (s, 2H), 2.81 (s, 4H), 2.32 (s, 11H), 1.49 (s, 4H); 13C-NMR (101 MHz, DMSO-D6) δ 161.28, 149.82, 136.23, 118.91, 49.33, 42.51, 42.36, 35.58, 27.30, 25.80

Scheme 5

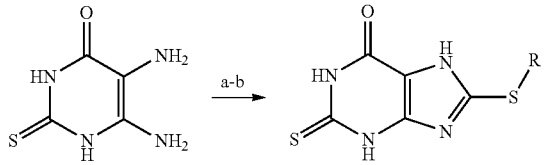

Reagents and conditions: a) CS$_2$, DMF, reflux' b) R$_1$-X, 1% NaOH, RT

General Procedure Scheme 5, Step b:

The xanthine (1.5 mmol) was stirred with a solution of 1% NaOH (5 mL) until a clear solution was obtained. Next, the alkyl halide (1.5 mmol) was added dropwise and the reaction was stirred at room temperature overnight until completion. The solution was evaporated under vacuum and the crude product was purified using column chromatography to yield the final product.

LPS-II-100-1—1H-NMR (400 MHz, DMSO-D6) δ 9.57 (s, 1H), 4.04-4.14 (m, 4H), 1.03-1.19 (m, 3H)

LPS-II-101-1—1H-NMR (400 MHz, DMSO-D6) δ 12.89 (s, 1H), 4.05-4.07 (m, 2H), 3.32 (dt, J=20.0, 6.2 Hz, 2H), 2.75 (d, J=5.5 Hz, 2H), 1.16 (t, J=5.7 Hz, 3H)

LPS-II-102-1—1H-NMR (400 MHz, DMSO-D6) δ 12.46 (s, 1H), 4.01 (qd, J=7.0, 3.1 Hz, 2H), 3.13-3.21 (m, 2H), 2.40 (t, J=7.3 Hz, 2H), 1.86-1.93 (m, 2H), 1.12 (t, J=7.1 Hz, 3H)

LPS-II-104-1—1H-NMR (400 MHz, DMSO-D6) δ 12.42 (s, 1H), 3.08-3.18 (m, 2H), 1.65 (t, J=6.4 Hz, 2H), 0.93-0.96 (m, 3H)

LPS-II-210-1—1H-NMR (400 MHz, DMSO-D6) δ 12.65 (s, 1H), 8.71 (s, 1H), 8.43-8.49 (m, 3H), 7.83-7.88 (m, 1H), 4.93 (s, 2H)

LPS-II-209-1—1H-NMR (400 MHz, DMSO-D6) δ 12.62 (s, 1H), 7.62 (t, J=6.6 Hz, 2H), 7.45-7.51 (m, 1H), 7.25 (s, 1H), 4.98 (s, 2H), 3.34 (s, 3H)

LPS-II-208-1—1H-NMR (400 MHz, DMSO-D6) δ 12.62 (s, 1H), 8.03 (dd, J=8.4, 6.8 Hz, 2H), 7.61 (t, J=4.4 Hz, 2H), 4.97 (s, 2H)

LPS-II-207-1—1H-NMR (400 MHz, DMSO-D6) δ 12.62 (s, 1H), 7.97 (t, J=9.4 Hz, 1H), 7.82 (d, J=8.2 Hz, 2H), 4.94 (s, 2H)

LPS-II-205-1—1H-NMR (400 MHz, DMSO-D6) δ 12.75 (s, 1H), 8.11 (d, J=5.5 Hz, 2H), 7.38 (d, J=7.8 Hz, 2H), 4.94 (s, 2H)

LPS-II-204-1—1H-NMR (400 MHz, CHLOROFORM-D) δ 7.79 (d, J=7.3 Hz, 1H), 7.08 (d, J=7.8 Hz, 2H), 4.73-4.86 (m, 2H), 2.49 (s, 3H), 2.36 (s, 3H)

LPS-II-120-1—1H-NMR (400 MHz, DMSO-D6) δ 13.03-12.19 (1H), 6.02 (s, 1H), 4.54 (s, 2H), 3.74 (s, 3H), 2.04 (s, 2H)

LPS-II-118-1—1H-NMR (400 MHz, DMSO-D6) δ 12.66-10.81 (1H), 4.04 (t, J=7.1 Hz, 2H), 3.36 (t, J=7.1 Hz, 2H), 3.17 (s, 4H), 1.76 (q, J=6.0 Hz, 4H), 1.50 (s, 2H)

Scheme 5

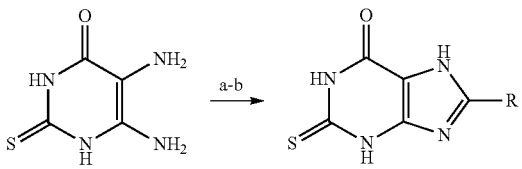

Reagents and conditions: a) R-CHO, EtOH, AcOH, reflux; b) DIAD, toluene, reflux.

General procedure Scheme 6: To a stirred solution of the xanthine (3 mmol) in EtOH (20 mL) and AcOH (20 mL) was added the aldehyde (4 mmol) and refluxed until completion. Next, the resulting solid was filtered, washed with ether and stirred in toluene (20 mL) and was added diisopropyl azodicarboxylate (DIAD) (2 eq). The solution was refluxed again until completion and the resulting solid was filtered, washed with ether and dried.

LPF-II-62-2—1H-NMR (400 MHz, DMSO-D6) δ 12.02 (s, 1H), 9.64 (s, 1H), 7.84-7.88 (m, 2H), 7.58 (d, J=8.2 Hz, 2H), 7.19 (s, 1H); 13C-NMR (101 MHz, DMSO-D6) δ 171.98, 157.07, 152.32, 150.00, 137.51, 131.46, 129.38, 122.79, 101.89

LPF-II-63-2—1H-NMR (400 MHz, DMSO-D6) δ 11.99 (s, 1H), 9.64 (s, 1H), 7.94-7.98 (m, 2H), 7.23 (t, J=8.9 Hz, 2H), 6.78 (s, 1H); 13C-NMR (101 MHz, DMSO-D6) δ 171.89, 157.09, 152.18, 150.26, 134.89, 129.63, 129.55, 115.57, 115.36, 101.88

LPF-II-64-2—1H-NMR (400 MHz, DMSO-D6) δ 12.05 (s, 1H), 9.75 (s, 1H), 8.64 (s, 1H), 8.33 (d, J=7.8 Hz, 1H), 8.17 (dd, J=8.2, 1.4 Hz, 1H), 7.68 (t, J=7.8 Hz, 1H), 7.53-6.50 (1H); 13C-NMR (101 MHz, DMSO-D6) δ 172.24, 157.06, 152.63, 148.79, 148.53, 140.09, 133.67, 129.98, 123.67, 121.35, 101.88

LPF-II-65-2—1H-NMR (400 MHz, DMSO-D6) δ 11.91 (s, 1H), 9.51 (s, 1H), 7.69 (s, 2H), 6.71 (d, J=6.4 Hz, 2H), 6.53 (s, 1H), 3.00 (d, J=26.6 Hz, 6H); 13C-NMR (101 MHz, DMSO-D6) δ 171.13, 157.17, 152.71, 151.41, 151.25, 128.93, 126.16, 111.60, 102.50, 39.85

LPF-II-78-2—1H-NMR (400 MHz, DMSO-D6) δ 12.05 (s, 1H), 9.69 (s, 1H), 9.02 (s, 1H), 8.54 (t, J=2.1 Hz, 1H), 8.32 (d, J=6.0 Hz, 1H), 7.40-7.42 (m, 1H), 6.98 (s, 1H); 13C-NMR (101 MHz, DMSO-D6) δ 172.16, 157.09, 152.57, 150.03, 149.22, 148.40, 134.00, 133.76, 123.71, 102.03, 40.15, 39.94, 39.73, 39.52, 39.31, 39.10, 38.89

LPS-II-142-1—1H-NMR (400 MHz, DMSO-D6) δ 12.82 (s, 1H), 8.15 (s, 1H), 7.93 (d, J=8.2 Hz, 1H), 7.68 (d, J=8.7 Hz, 1H)

Scheme 7

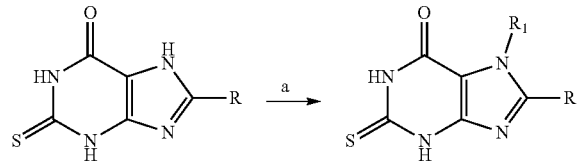

Reagents and conditions: a) R$_1$-X, K$_2$CO$_3$, DMF.

General procedure Scheme 7: The substituted xanthine (0.7 mmol) was stirred with $K_2CO_3$ (0.9 mmol), and DMF (22 mL) for 20 minutes. Next, the alkyl halide (1 mmol) was added dropwise and stirred while heating at 80° C. until completion. The solution was cooled to room temperature and extracted with ethyl acetate(3×). The organic layer was dried over $MgSO_4$, filtered and the solvent removed to yield the final product which was dried under vacuum.

LPF-II-71-1—1H-NMR (400 MHz, DMSO-D6) δ 7.98-8.04 (m, 1H), 7.21-7.31 (m, 2H), 6.97 (d, J=44.9 Hz, 1H), 3.31-3.33 (m, 2H), 1.07-1.29 (m, 1H), 0.27-0.59 (m, 4H)

Scheme 8

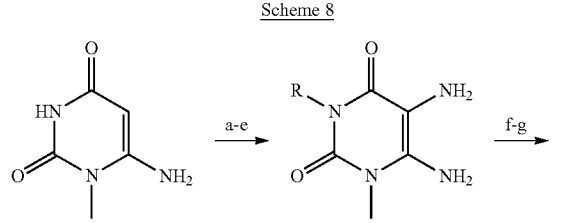

Reagents and conditions: a) DMF-DMA; b) R-X, $K_2CO_3$, DMF; c) $NH_4OH$, EtOH; d) $NaNO_2$, AcOH, RT; e) $H_2$, Pd/C, EtOH; f) $CS_2$, DMF, reflux; g) $R_1$-X, 1% NaOH, RT.

General procedure Scheme 8, step g: 5 mL of 1% NaOH solution was added to the N-3 substituted xanthine (1 mmol) and stirbar in a 30 mL vial and stirred at room temperature until all the starting material dissolved. Next the alkyl halide (1.2 mmol) was dissolved in a minimum volume of water and then added to the reaction mixture dropwise. The solution was stirred at room temperature for 24 and monitored by TLC. After the starting material was consumed, the solvent was removed under reduced pressure and the crude mixture was purified by column chromatography.

LPF-II-81-1—1H-NMR (400 MHz, DMSO-D6) δ 3.71 (d, J=6.9 Hz, 2H), 3.39 (s, 3H), 3.15 (d, J=7.3 Hz, 2H), 1.07-1.13 (m, 2H), 0.49-0.53 (m, 2H), 0.25-0.38 (m, 6H); 13C-NMR (101 MHz, DMSO-D6) δ 153.26, 150.99, 149.37, 107.81, 44.85, 37.38, 29.84, 11.07, 10.13, 5.72, 3.59

LPF-II-75-1—1H-NMR (400 MHz, DMSO-D6) δ 12.09 (s, 1H), 4.07 (t, J=6.9 Hz, 2H), 3.90 (s, 4H), 3.73 (d, J=6.9 Hz, 2H), 3.65 (t, J=7.8 Hz, 2H), 3.44 (s, 3H), 3.21 (d, J=45.8 Hz, 4H), 1.14 (dd, J=12.4, 5.0 Hz, 1H), 0.31-0.39 (m, 4H); 13C-NMR (101 MHz, DMSO-D6) δ 153.30, 150.92, 148.40, 147.28, 108.16, 63.12, 55.00, 51.13, 44.82, 36.90, 29.92, 10.08, 3.53.

LPS-II-240-1—1H-NMR (400 MHz, DMSO-D6) δ 8.02 (dd, J=6.9, 1.8 Hz, 2H), 7.03 (dd, J=6.9, 1.8 Hz, 2H), 4.59 (s, 2H), 3.84 (s, 3H), 3.72 (d, J=6.9 Hz, 2H), 3.32 (s, 3H), 1.25-1.07 (1H), 0.29-0.35 (m, 4H).

Scheme 9

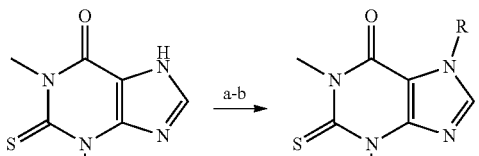

Reagents and conditions: a) $P_4S_{10}$, pyridine reflux; b) $R_1$-X, $K_2CO_3$, DMF.

General procedure Scheme 9, step b: 6-thiotheophylline (2 mmol) was stirred with 8.2 mL DMF and $K_2CO_3$ (10 mmol) with stirring for 20 minutes. Next, the alkyl halide (2 mmol) was added dropwise and refluxed until completion. The solution was cooled to room temperature and 30 mL water was added. The reaction mixture was extracted with ethyl ether three times. The organic layer was dried ($MgSO_4$) and filtered. The solvent was removed under vacuum to afford the final product.

LPF-I-205-1—1H-NMR (400 MHz, DMSO-D6) δ 8.18 (s, 1H), 4.05 (s, 3H), 3.65 (s, 3H), 3.46 (s, 3H); 13C-NMR (101 MHz, DMSO-D6) δ 176.15, 149.51, 146.11, 144.43, 117.41, 35.15, 33.68, 30.05

LPF-I-206.1—1H-NMR (400 MHz, DMSO-D6) δ 8.23 (s, 1H), 6.00-6.09 (m, 1H), 5.27 (q, J=1.7 Hz, 2H), 5.15-5.18 (m, 1H), 3.64 (s, 3H), 3.47 (s, 3H); 13C-NMR (101 MHz, DMSO-D6) δ 175.58, 149.45, 145.77, 144.73, 134.41, 117.12, 116.50, 48.09, 33.69, 30.10

LPF-I-228-1—1H-NMR (400 MHz, DMSO-D6) δ 8.12 (s, 1H), 7.77 (d, J=58.6 Hz, 5H), 3.66 (s, 3H), 3.48 (s, 3H); 13C-NMR (101 MHz, DMSO-D6) δ 176.30, 166.63, 149.84, 143.29, 143.18, 131.70, 131.30, 130.02, 126.89, 118.67, 34.06, 30.31

LPF-I-230-1—1H-NMR (400 MHz, DMSO-D6) δ 8.45 (s, 1H), 8.12-8.17 (m, 3H), 7.36 (d, J=8.2 Hz, 1H), 3.66 (s, 3H), 3.47 (s, 3H), 3.34 (s, 2H); 13C-NMR (101 MHz, DMSO-D6) δ 175.68, 149.76, 146.50, 145.02, 143.29, 127.80, 123.66, 118.47, 48.57, 34.05, 30.30

LPF-I-231-1—1H-NMR (400 MHz, DMSO-D6) δ 8.43 (s, 1H), 7.36 (s, 1H), 7.28 (s, 1H), 7.16 (s, 2H), 5.93 (s, 2H), 3.64 (s, 3H), 3.49 (s, 3H); 13C-NMR (101 MHz, DMSO-D6) δ 175.63, 162.93, 160.45, 149.47, 146.25, 131.42, 129.27, 116.44, 115.22, 47.93, 33.72, 30.1

BW-I-45—1H NMR (400 MHz, DMSO) δ 7.91 (s, 1H), 7.58 (d, J=6.8 Hz, 2H), 7.43 (d, J=16 Hz, 1H), 7.34 (m, 3H), 7.35, 6.49 (d, J=16 Hz, 1H), 3.64 (s, 3H), 3.44 (s, 3H); 13C NMR (400 MHz, DMSO) δ 176.46, 168.76, 150.44, 145.53, 144.46, 142.28, 135.38, 130.15, 129.35, 128.38, 122.47, 121.51, 34.53, 30.83

BW-I-8—1H NMR (400 MHz, DMSO) δ 8.38 (s, 1H), 7.28 (m, 2H), 7.26 (m, 1H), 7.15 (m, 2H), 5.93 (s, 2H), 3.62 (s, 3H), 3.48 (s, 3H); 13C NMR (400 MHz, DMSO) δ 176.21, 150.03, 146.87, 145.57, 138.06, 129.07, 128.03, 127.44, 117.09, 49.15, 34.24, 30.67

BW-I-17—¹H NMR (400 MHz, DMSO) δ 8.16 (s, 1H), 4.69 (t, J=6.4 Hz, 2H), 3.63 (s, 3H), 3.48 (t, J=4.0 Hz, 4H), 3.44 (s, 3H), 2.63 (t, J=5.6 Hz, 2H), 2.37 (br m, 4H); ¹³C NMR (400 MHz, DMSO) δ 176.06, 149.99, 147.23, 145.48, 117.06, 66.71, 58.78, 53.75, 43.65, 34.31, 30.65

BW-I-104—¹H NMR (400 MHz, DMSO) δ 8.20 (s, 1H), 4.58 (t, J=7.2 Hz, 2H), 3.97 (q, J=7.2 Hz, 2H), 3.63 (s, 3H), 3.44 (s, 3H) 2.25 (t, J=8.0 Hz, 2H), 2.03 (m, 2H), 1.11 (t, J=7.2 Hz, 3H); ¹³C NMR (400 MHz, DMSO) δ 175.63, 172.05, 149.47, 145.94, 145.07, 116.77, 59.96, 45.89, 33.92, 30.19, 30.08, 26.15, 14.03

BW-I-118—¹H NMR (400 MHz, DMSO) δ 8.24 (s, 1H), 4.61 (t, J=6.8 Hz, 2H), 3.68 (s, 3H), 3.48 (s, 3H), 2.22 (t, J=8.0 Hz, 2H), 2.04 (t, J=7.2 Hz, 2H); ¹³C NMR (400 MHz, DMSO) δ 175.66, 173.66, 149.50, 145.92, 145.05, 116.79, 45.71, 33.83, 30.26, 30.12, 26.41

BW-I-103—¹H NMR (400 MHz, DMSO) δ 8.20 (s, 1H), 4.79 (t, J=7.2 Hz, 2H), 4.04 (q, J=6.8 Hz, 2H), 3.67 (s, 3H), 3.47 (s, 3H), 2.94 (t, J=7.6 Hz, 2H), 1.15 (t, J=7.2 Hz, 3H); ¹³C NMR (400 MHz, DMSO) δ 175.48, 170.29, 149.44, 146.42, 145.02, 116.64, 60.26, 42.28, 35.29, 33.86, 30.11, 14.00

BW-I-47—¹H NMR (400 MHz, DMSO) δ 8.33 (s, 1H), 7.38 (m, 2H), 7.30 (m, 2H), 7.28 (m, 1H), 7.47 (m, 2H), 5.46 (d, J=5.2 Hz, 2H), 3.67 (s, 3H), 3.49 (s, 3H); ¹³C NMR (400 MHz, DMSO) δ 176.21, 150.06, 146.31, 145.45, 136.44, 132.53, 129.17, 128.43, 126.93, 126.17, 117.18, 48.26, 34.28, 30.67

BW-I-215—¹H NMR (400 MHz, DMSO) δ 8.13 (s, 1H), 5.76 (s, 1H), 3.62 (s, 3H), 3.49 (s, 3H), 2.21 (m, 1H), 1.02 (m, 2H), 0.92 (m, 2H); ¹³C NMR (400 MHz, DMSO) δ 203.12, 175.75, 149.44, 146.61, 144.35, 116.68, 55.52, 33.59, 30.13, 17.95, 10.75

BW-I-116—¹H NMR (400 MHz, DMSO) δ 8.29 (s, 1H), 4.46 (d, J=6.8 Hz, 2H), 3.67 (s, 3H), 3.48 (s, 3H), 1.41 (m, 1H), 0.46 (m, 4H); ¹³C NMR (400 MHz, DMSO) δ 176.24, 150.00, 146.21, 145.53, 117.26, 51.24, 34.35, 30.65, 13.11, 4.07

BW-II-15—1H-NMR (400 MHz, DMSO-D6) δ 8.14 (d, J=8.7 Hz, 1H), 4.89 (t, J=5.3 Hz, 1H), 4.66 (t, J=5.4 Hz, 2H), 3.72 (q, J=5.2 Hz, 2H), 3.67 (d, J=3.2 Hz, 3H), 3.48-3.51 (m, 3H); 13C-NMR (101 MHz, DMSO-D6) δ 175.64, 149.43, 146.83, 145.09, 116.65, 59.96, 48.95, 33.78, 30.08

BW-II-21—1H-NMR (400 MHz, DMSO-D6) δ 8.18 (s, 1H), 4.60-4.63 (m, 3H), 3.65 (d, J=0.9 Hz, 3H), 3.46 (d, J=0.9 Hz, 3H), 3.38 (t, J=5.5 Hz, 2H), 1.88-1.95 (m, 2H); 13C-NMR (101 MHz, DMSO-D6) δ 175.59, 149.44, 145.95, 144.97, 116.76, 57.20, 43.82, 33.79, 30.06

SB-1-109: ¹H-NMR (400 MHz, CDCl₃) δ 7.90-7.87 (m, 3H), 7.78-7.76 (m, 2H), 4.68 (t, J=7.6 Hz, 2H), 4.15 (t, J=7.2 Hz, 2H), 3.78 (s, 3H), 3.62 (s, 3H), 2.30 (p, J=5.8 Hz, 2H).

SB-1-119—¹H-NMR (400 MHz, CDCl₃) δ 7.64 (s, 1H), 4.68 (t, J=8.4 Hz, 2H), 3.84 (s, 3H), 3.64 (s, 3H), 2.53 (t, J=7.2 Hz, 2H), 2.17-2.14 (m, 5H).

SB-1-122: ¹H-NMR (400 MHz, CDCl₃) δ 7.82-7.80 (m, 2H), 7.75-7.73 (m, 2H), 7.4 3 (s, 1H), 5.01 (t, J=5.2 Hz, 2H), 4.25 (t, J=5.6 Hz, 2H), 3.83 (s, 3H), 3.60 (s, 3H); ¹³C-NMR (101 MHz, CDCl₃) δ 176.9, 167.9, 150.1, 144.7, 143.7, 134.4, 131.4, 123.5, 117.6, 45.5, 38.7, 34.2, 30.3.

Scheme 10

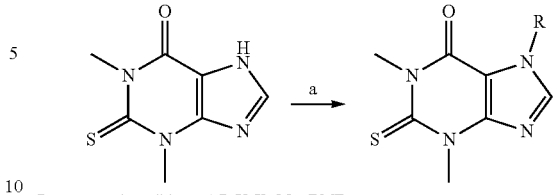

Reagents and conditions: a) R-X, K₂CO₃, DMF.

General procedure Scheme 10: DMF (15 mL) was added to thioxanthine (0.5 mmol) and stirbar in a 50 mL round bottom flask and stirred at room temperature until dissolved. Potassium carbonate was then added, and the solution was stirred for 15 minutes. The solution usually changed color from yellow to blue green after the addition of base. The alkylating agent was then slowly added (dropwise/portionwise), and the solution was heated to 80° C. and stirred for 8-24 hours while monitored by TLC. After starting material was consumed, the reaction was cooled to room temperature and DMF was removed by roto-evaporation. The product was extracted between ethyl acetate and water. The organic layer was dried over MgSO₄, filtered through celite and concentrated under vacco. The product was purified by column chromatography using a 95:5 (DCM:MeOH) solvent ratio.

BW-I-110—¹H NMR (400 MHz, DMSO) δ 8.06 (s, 1H), 4.26 (t, J=6.4 Hz, 2H), 3.41 (s, 3H), 3.22 (s, 3H), 2.18 (t, J=6.8 Hz, 2H), 2.01 (quin, J=6.8 Hz, 2H); ¹³C NMR (400 MHz, DMSO) δ 173.83, 154.35, 151.05, 148.49, 142.48, 106.04, 45.69, 30.56, 29.45, 27.58, 25.7

BW-I-92—¹H NMR (400 MHz, DMSO) δ 8.04 (s, 1H), 5.05 (s, 2H), 3.44 (s, 3H), 3.20 (s, 3H), 1.42 (s, 9H); ¹³C NMR (400 MHz, DMSO) δ 166.64, 154.39, 151.02, 147.95, 143.13, 106.36, 82.11, 47.70, 29.48, 27.68, 27.48

BW-I-94—¹H NMR (400 MHz, DMSO) δ 8.06 (s, 1H), 4.27 (t, J=6.6 Hz, 2H), 4.00 (q, J=7.2 Hz, 2H), 3.42 (s, 3H), 3.22 (s, 3H), 2.27 (t, J=7.6 Hz, 2H) 2.04 (m, 2H), 1.14 (t, J=6.8 Hz, 3H); ¹³C NMR (400 MHz, DMSO) δ 172.02, 154.33, 151.02, 148.46, 142.50, 106.04, 59.93, 45.51, 30.27, 29.42, 27.55, 25.52, 14.00.

BW-I-101—¹H NMR (400 MHz, DMSO) δ 8.06 (s, 1H), 5.07 (s, 2H), 3.42 (s, 3H), 3.19 (s, 3H); ¹³C NMR (400 MHz, DMSO) δ 169.03, 154.47, 51.06, 147.93, 143.25, 106.42, 47.27, 29.54, 27.51.

SB-1-110: ¹H-NMR (400 MHz, CDCl₃) δ 7.87-7.85 (m, 2H), 7.81 (s, 1H), 7.76-7.74 (m, 2H), 4.34 (t, J=5.8 Hz, 2H), 3.73 (t, J=6.0 Hz, 2H), 3.57 (s, 3H), 3.38 (s, 3H), 2.31 (p, J=5.8 Hz, 2H).

SB-1-115: ¹H-NMR (400 MHz, CDCl₃) δ 7.86-7.84 (m, 2H), 7.75-7.73 (m, 2H), 4.45 (t, J=7.6 Hz, 2H), 3.81 (t, J=7.2 Hz, 2H), 3.52 (s, 3H), 3.33 (s, 3H), 2.28 (p, J=7.2 Hz, 2H).

Scheme 11

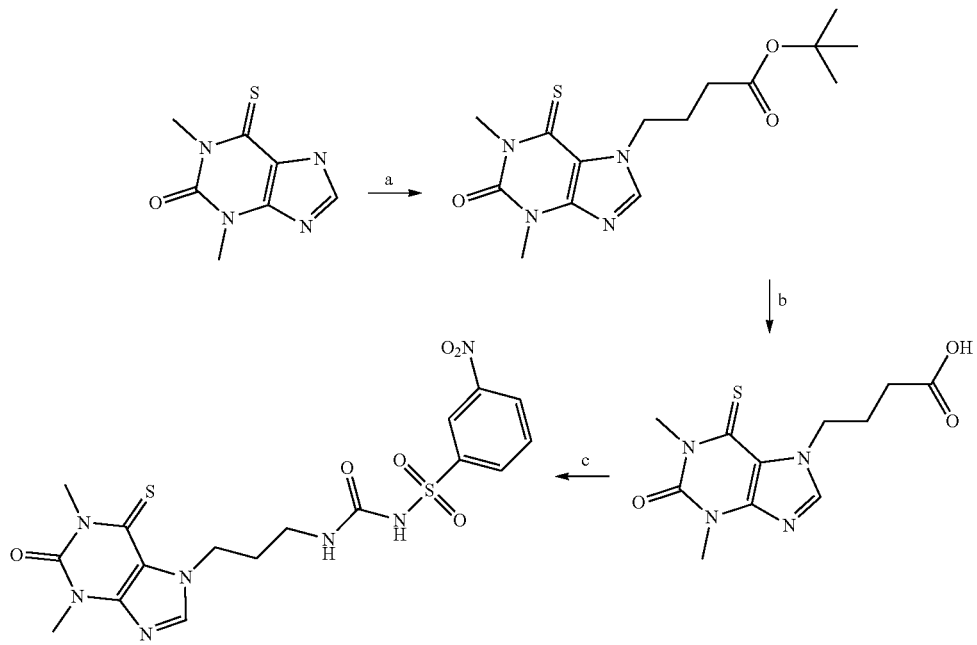

Reagents and conditions for Scheme 11: a) K₂CO₃, 3-bromo tert-butyl butanoate, DMF, 70° C., 4-6 h; b) 2 M HCl in dioxane, RT, 12 h; c) DPPA, K₂CO₃, sulfonamides, 1,4-dioxane, 90° C., 12 h.

Reaction procedure Scheme 11 step c: To a stirred mixture of thioxanthene carboxylic acid (0.4 mmol), sulfonamide (0.4 mmol) and potassium carbonate (1.3 mmol) in 1,4-dioxane (5 mL) was added diphenylphosphoryl azide (0.5 mmol) under nitrogen. The mixture was then heated at 85° C. for 12 h. The cooled mixture was diluted with dichloromethane, filtered through the celite, solvent was removed under reduced pressure and purified by column chromatoghrapy to give the desired product in 50% yield.

SB-1-25: ¹H-NMR (400 MHz, CDCl₃) δ 7.76 (s, 1H), 7.51 (d, J=4.0 Hz, 2H), 7.01 (brs, 1H), 4.64 (t, J=6.4 Hz, 2H), 3.81 (s, 3H), 3.63 (s, 3H), 3.24 (t, J=6.4 Hz, 2H), 2.09 (p, J=6.4 Hz, 2H).

SB-1-28: ¹H-NMR (400 MHz, CDCl₃) δ 8.77 (s, 1H), 8.40 (d, J=6.8 Hz, 1H), 8.34 (d, J=8.0 Hz, 1H), 7.77 (s, 1H), 7.71 (brs, 1H), 4.63 (t, J=8.0 Hz, 2H), 3.79 (s, 3H), 3.64 (s, 3H), 3.22 (t, J=6.0 Hz, 2H), 2.06 (p, J=6.8 Hz, 2H).

SB-1-29: ¹H-NMR (400 MHz, CDCl₃) δ 8.07 (s, 1H), 7.90 (d, J=7.6 Hz, 1H), 7.75 (s, 1H), 7.73 (d, J=6.0 Hz, 1H), 7.44 (t, J=7.6 Hz, 1H), 6.66 (brs, 1H), 4.65 (t, J=6.8 Hz, 2H), 3.82 (s, 3H), 3.63 (s, 3H), 3.34 (q, J=7.6 Hz, 2H), 2.13 (p, J=6.4 Hz, 2H).

SB-1-36: ¹H-NMR (400 MHz, CDCl₃) δ 7.91 (s, 1H), 7.38 (s, 2H), 6.97 (s, 2H), 5.32 (s, 1H), 4.72 (t, J=7.6 Hz, 2H), 3.82 (s, 3H), 3.63 (s, 3H), 3.59 (t, J=7.2 Hz, 2H), 2.21 (p, J=6.4 Hz, 2H); ¹³C-NMR (100 MHz, CDCl₃) δ 176.6, 155.6, 150.1, 144.7, 144.5, 141.5, 134.8, 121.7, 117.5, 116.4, 53.3, 44.7, 36.1, 34.1, 32.1.

SB-1-68: ¹H-NMR (400 MHz, CDCl₃) δ 7.87 (s, 1H), 7.27-7.21 (m, 1H), 7.09 (t, J=7.6 Hz, 1H), 4.87 (t, J=6.0 Hz, 2H), 3.79 (s, 3H), 3.59 (s, 3H), 3.08 (s, 3H), 2.92 (t, J=6.0 Hz, 2H).

Scheme 12

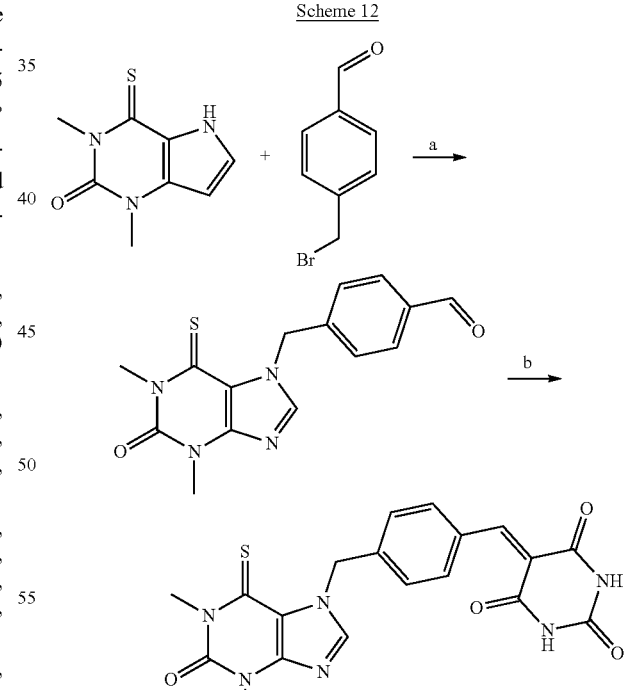

Reagents and conditions: a) K₂CO₃, 4-bromo methyl benzaldehyde, DMF, RT, 4-6 h; b) Ethanol, 110° C., MW, 10-15 min.

Reaction procedure Scheme 12 Step b: A mixture of thioxanthene aldehyde (0.2 mmol) and barbituric acid (0.25 mmol) in 3 mL of ethanol was heated to 110° C. for 15 min under microwave irradiation. The resulting precipitate was washed with ether/dichloromethane (5 mL) to furnish the desired product. If necessary, the product was purified by flash chromatography.

SB-1-38: $^1$H-NMR (400 MHz, CDCl$_3$) δ 10.0 (s, 1H), 7.85 (d, J=8.0 Hz, 2H), 7.55 (d, J=8.4 Hz, 2H), 5.32 (s, 2H), 3.69 (s, 3H), 3.42 (s, 3H), 3.66-3.63 (m, 7H), 3.79 (t, J=8.4 Hz, 2H), 2.81 (t, J=8.0 Hz, 2H), 2.49 (t, J=4.4 Hz, 4H).

SB-1-48(Keto/enol tautomers): $^1$H-NMR (400 MHz, DMSO-D6) δ 11.37 (s, 1H), 11.22 (s, 1H), 9.99 (s, 1H), 8.45 (s, 1H), 8.23 (s, 11H), 8.05 (d, J=8.0 Hz, 2H), 7.23 (d, J=8.0 Hz, 2H), 7.05 (d, J=8.0 Hz, 1H), 6.95 (d, J=8.0 Hz, 1H), 6.03 (s, 2H), 5.87 (s, 1H), 3.64 (s, 5H), 3.51 (s, 5H).

SB-1-49(Keto/enol tautomers): $^1$H-NMR (400 MHz, DMSO-D6) δ 12.44 (s, 1H), 12.32 (s, 1H), 11.58 (s, 1H), 8.44 (s, 1H), 8.23 (s, 1H), 8.10 (d, J=8.0 Hz, 2H), 7.23 (d, J=8.0 Hz, 2H), 7.04 (d, J=8.0 Hz, 1H), 6.93 (d, J=8.0 Hz, 1H), 6.03 (s, 2H), 5.88 (s, 1H), 3.67 (s, 5H), 3.51 (s, 5H).

SB-1-50: $^1$H-NMR (400 MHz, DMSO-D6) δ 8.45 (s, 1H), 8.31 (s, 1H), 7.99 (d, J=8.4 Hz, 2H), 7.23 (d, J=8.0 Hz, 2H), 6.03 (s, 2H), 3.64 (s, 3H), 3.51 (s, 3H), 3.22 (s, 3H), 3.16 (s, 3H).

SB-1-51: $^1$H-NMR (400 MHz, DMSO-D6) δ 11.60 (s, 1H), 11.48 (s, 1H), 7.25 (d, J=8.4 Hz, 2H), 6.98 (d, J=8.0 Hz, 2H), 5.24 (s, 2H), 3.54 (brs, 6H), 3.45-3.33 (brs, 8H).

SB-1-55: $^1$H-NMR (400 MHz, CDCl$_3$) δ 7.77 (s, 1H), 7.56 (s, 1H), 7.47 (d, J=8.4 Hz, 2H), 7.32 (d, J=8.0 Hz, 2H), 6.02 (s, 2H), 3.81 (s, 3H), 3.66 (s, 3H).

SB-1-61: $^1$H-NMR (400 MHz, DMSO-D6) δ 12.22 (brs, 2H), 8.44 (s, 1H), 7.70 (d, J=8.0 Hz, 2H), 7.23 (d, J=8.0 Hz, 2H), 6.43 (s, 1H), 5.97 (s, 2H), 3.64 (s, 3H), 3.50 (s, 3H).

SB-1-76: $^1$H-NMR (400 MHz, CDCl$_3$) δ 7.82 (s, 1H), 6.42 (s, 1H), 4.72 (t, J=7.2 Hz, 2H), 4.33 (t, J=7.2 Hz, 2H), 4.01 (s, 2H), 3.84 (s, 3H), 3.64 (s, 3H), 3.29 (q, J=6.4 Hz, 2H), 2.61 (t, J=7.6 Hz, 2H), 2.09 (p, J=6.8 Hz, 2H).

SB-1-86: $^1$H-NMR (400 MHz, CDCl$_3$) δ 8.52 (s, 1H), 8.02 (d, J=8.4 Hz, 2H), 7.72 (s, 1H), 7.40 (d, J=8.0 Hz, 2H), 5.57 (s, 2H), 3.59 (s, 3H), 3.42 (s, 3H), 3.38 (s, 3H), 3.35 (s, 3H).

SB-1-88: $^1$H-NMR (400 MHz, DMSO-D6) δ 8.28 (s, 1H), 7.51 (d, J=8.0 Hz, 1H), 7.41 (d, J=8.4 Hz, 1H), 7.31 (s, 1H), 5.51 (s, 2H), 3.41 (s, 3H), 3.19 (s, 3H); $^{13}$C-NMR (100 MHz, DMSO-D6) δ 154.4, 151.0, 148.5, 142.6, 138.0, 133.9, 130.2, 129.8, 128.2, 128.1, 105.9, 48.7, 29.5, 27.6.

SB-1-87a (Keto/enol tautomers): $^1$H-NMR (400 MHz, DMSO-D6) δ 11.58 (s, 1H), 11.45 (s, 1H), 9.97 (s, 1H), 8.30 (s, 1H), 8.21 (s, 1H), 7.89 (d, J=7.6 Hz, 1H), 7.48 (d, J=8.4 Hz, 1H), 7.17 (d, J=7.6 Hz, 2H), 6.95 (d, J=7.6 Hz, 2H), 5.59 (s, 1H), 5.39 (s, 2H), 3.43 (s, 5H), 3.20 (s, 5H).

SB-1-87b (Keto/enol tautomers): 1H-NMR (400 MHz, DMSO-D6) δ 11.38 (s, 1H), 11.22 (s, 1H), 9.95 (s, 2H), 8.30 (s, 1H), 8.22 (d, J=8.8 Hz, 2H), 8.04 (d, J=8.4 Hz, 2H), 7.36 (d, J=8.4 Hz, 2H), 7.15 (d, J=7.6 Hz, 2H), 6.97 (d, J=7.6 Hz, 2H), 5.56 (s, 2H), 5.38 (s, 2H), 3.43 (s, 3H), 3.39 (s, 3H), 3.20 (s, 6H), 3.16 (s, 3H).

SB-1-89a: 1H-NMR (400 MHz, DMSO-D6) δ 8.29 (s, 1H), 7.71 (d, J=8.4 Hz, 2H), 7.37 (d, J=8.0 Hz, 2H), 6.42 (s, 1H), 5.49 (s, 2H), 3.41 (s, 3H), 3.20 (s, 3H); $^{13}$C-NMR (100 MHz, DMSO-D6) δ 179.7, 166.3, 154.8, 151.4, 148.9, 143.0, 138.2, 132.5, 130.8, 128.3, 111.1, 106.2, 49.2, 29.8, 27.9.

SB-1-89b: 1H-NMR (400 MHz, CDCl$_3$) δ 10.0 (s, 1H), 7.89 (d, J=8.0 Hz, 2H), 7.64 (s, 1H), 7.46 (d, J=8.0 Hz, 1H), 5.58 (s, 2H), 3.60 (s, 3H), 3.39 (s, 3H).

SB-1-90: $^1$H-NMR (400 MHz, DMSO-D6) δ 8.30 (s, 1H), 7.72 (s, 1H), 7.60 (d, J=8.0 Hz, 2H), 7.41 (d, J=8.4 Hz, 2H), 5.55 (s, 2H), 4.25 (s, 2H), 3.42 (s, 3H), 3.19 (s, 3H); $^{13}$C-NMR (100 MHz, DMSO-D6) δ 193.0, 166.9, 165.3, 154.4, 151.0, 148.5, 142.7, 139.5, 132.7, 131.3, 130.8, 128.3, 123.3, 105.9, 48.7, 48.6, 29.5, 27.5.

SB-1-91: $^1$H-NMR (400 MHz, DMSO-D6) δ 8.26 (s, 1H), 7.71 (s, 1H), 7.57 (d, J=8.0 Hz, 2H), 7.41 (d, J=8.4 Hz, 2H), 5.51 (s, 2H), 4.12 (t, J=8.4 Hz, 2H), 3.38 (s, 3H), 3.15 (s, 3H), 2.15 (t, J=8.4 Hz, 2H); $^{13}$C-NMR (100 MHz, DMSO-D6) δ 193.0, 171.2, 166.8, 154.4, 151.0, 148.5, 142.7, 139.6, 132.6, 131.9, 130.9, 128.3, 122.9, 109.5, 105.8, 48.7, 42.7, 34.6, 29.4, 27.5.

SB-1-93: $^1$H-NMR (400 MHz, DMSO-D6) δ 8.44 (s, 1H), 7.78 (s, 1H), 7.65 (d, J=8.8 Hz, 2H), 7.38 (d, J=8.8 Hz, 2H), 6.00 (s, 2H), 4.49 (s, 2H), 3.62 (s, 3H), 3.50 (s, 3H); $^{13}$C-NMR (100 MHz, DMSO-D6) δ 193.5, 176.0, 167.4, 167.0, 149.9, 146.8, 145.4, 141.0, 132.8, 132.5, 131.3, 128.1, 122.8, 116.9, 49.0, 43.8, 34.1, 30.6.

SB-1-94: $^1$H-NMR (400 MHz, DMSO-D6) δ 8.43 (s, 1H), 7.75 (s, 1H), 7.58 (d, J=8.8 Hz, 2H), 7.30 (d, J=8.8 Hz, 2H), 6.00 (s, 2H), 4.19 (t, J=5.4 Hz, 2H), 3.62 (s, 3H), 3.50 (s, 3H), 2.40 (t, J=5.2 Hz, 2H); $^{13}$C-NMR (101 MHz, DMSO-D6) δ 193.5, 176.0, 173.0, 167.2, 149.9, 146.8, 145.4, 141.0, 132.6, 132.5, 131.2, 128.2, 122.9, 116.9, 49.0, 41.7, 34.1, 33.1, 30.5.

Scheme 13

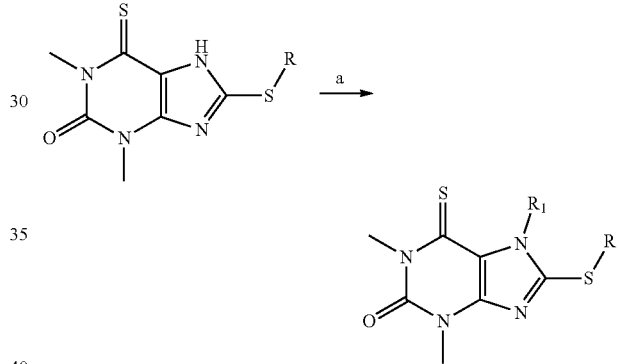

Reagents and conditions:
a) K$_2$CO$_3$, N-(3-bromo propyl) phthalimide, DMF, 70° C., 4-6 h.

Reaction procedure Scheme 13: To the stirred solutions of thioxanthene (0.3 mmol) in dry DMF (3 mL) under nitrogen at room temperature, N-(3-Bromo propyl) phthalimide (0.4 mmol) was added followed by potassium carbonate (0.9 mmol). The resulting reaction mixture was allowed to stir at 70° C. for 4-6 h. After completion of the reaction, the reaction mixture filtered through the celite using ethyl acetate (2×30 mL) and from the obtained filtrate, the solvent was removed under reduced pressure, purified by column chromatography to afford the desired product in 60% yield.

SB-1-108: $^1$H-NMR (400 MHz, CDCl$_3$) δ 7.85-7.84 (m, 2H), 7.75-7.73 (m, 2H), 3.99 (t, J=7.2 Hz, 2H), 3.87 (t, J=6.8 Hz, 2H), 3.74-3.72 (m, 4H), 3.69-3.67 (m, 8H), 3.55 (p, J=7.2 Hz, 2H), 2.78 (t, J=7.6 Hz, 2H), 2.62-2.50 (m, 6H), 2.21 (p, J=6.8 Hz, 2H).

BW-II-3-13C-NMR (101 MHz, DMSO-D6) δ 173.92, 172.97, 154.92, 149.24, 145.13, 118.66, 66.11, 57.17, 52.91, 44.54, 33.63, 30.75, 30.05, 29.24, 25.47.

LPS-II-253-1—1H-NMR (400 MHz, DMSO-D6) δ 8.30-7.89 (OH), 7.57-7.12 (OH), 3.15 (s, OH), 2.97-3.03 (m, 1H), 2.84 (s, OH), 2.46 (q, J=1.8 Hz, OH), 1.16 (t, J=7.3 Hz, 1H)

LPS-II-252-1—1H-NMR (400 MHz, DMSO-D6) δ 3.29-3.35 (m, 4H), 3.04-3.17 (m, 7H), 1.23-1.15 (4H), 1.04 (d, J=6.9 Hz, 1H), 0.65 (t, J=7.1 Hz, 2H), 0.40 (d, J=4.6 Hz, 2H)

LPS-II-254-1—1H-NMR (400 MHz, DMSO-D6) δ 7.12 (d, J=5.0 Hz, 2H), 3.27-3.34 (m, 5H), 3.15 (d, J=6.9 Hz, 1H), 3.08 (q, J=7.3 Hz, 4H), 2.29-2.38 (m, 3H), 1.17-1.21 (m, 13H), 1.03-1.06 (m, 1H), 0.64-0.69 (m, 2H), 0.40 (q, J=5.0 Hz, 2H).

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

REFERENCES

The following references, to the extent that they provide exemplary procedural or other details supplementary to those set forth herein, are specifically incorporated herein by reference.

Anderson, *Practical Process Research & Development—A Guide for Organic Chemists*, 2nd ed., Academic Press, New York, 2012.
*Handbook of Pharmaceutical Salts: Properties, and Use*, Stahl and Wermuth Eds., Verlag Helvetica Chimica Acta, 2002.
Reagan-Shaw et al., *FASEB J.*, 22(3):659-661, 2008.
Smith, *March's Advanced Organic Chemistry: Reactions, Mechanisms, and Structure*, 7th Ed., Wiley, 2013.
Adams et al., *Acta Crystallogr D Biol Crystallogr*, 66:213-221, 2010.
Ame et al., *J Cell Sci*, 122:1990-2002, 2009.
Andrabi et al., *Proc Natl Acad Sci USA*, 103:18308-18313, 2006.
Badiaga and Brouqui, "Human louse-transmitted infectious diseases", Clin. *Microbiol. Infect.*, 18(4):332-337, 2012.
Barkauskaite et al., *Nat Commun*, 4:2164, 2013.
Barkauskaite et al., *Mol Cell*, 58: 935-946, 2015.
Blenn et al., *Molecules*, 16:1854-1877, 2011.
Brochu et al., *Biochim Biophys Acta*, 1219:342-350, 1994.
Cortes et al., *Mol Cell Biol*, 24:7163-7178, 2004.
Cuzzocrea et al., *FASEB J*, 19:558-566, 2005.
Davidovic et al., *Exp Cell Res*, 268:7-13, 2001.
Di Meglio et al., *Biochim Biophys Acta*, 1692:35-44, 2004.
Dunstan et al., *Nat Commun*, 3:878, 2012.
Emsley and Cowtan, *Acta Crystallogr D Biol Crystallogr*, 60:2126-2132, 2004.
Falsig et al., *Eur J Pharmacol*, 497:7-16, 2004.
Fathers et al., *Cell Cycle*, 11:990-997, 2012.
Finch et al., *ACS Chem Biol*, 7:563-570, 2012.
Fisher et al., *Mol Cell Biol*, 27:5597-5605, 2007.
Fujihara et al., *Curr Cancer Drug Targets*, 9:953-962, 2009.
Gagne et al., *Curr Opin Cell Biol*, 18:145-151, 2006.
Garcin, et al., *Nat Chem Biol*, 4:700-707, 2008.
Gibson and Kraus, *Nat Rev Mol Cell Biol*, 13:411-424, 2012.
Gogola et al., *Cancer Cell*, 33:1078-1093, e12, 2018.
Gupte et al., *Genes Dev*, 31:101-126, 2017.
James et al., *ACS Chem Biol*, 11:3179-3190, 2016.
Jankevicius et al., *Nat Struct Mol Biol*, 20:508-514, 2013.
Kabsch, *Acta Crystallogr D Biol Crystallogr*, 66:133-144, 2010.
Kabsch, *Acta Crystallogr D Biol Crystallogr*, 66:125-132, 2010.
Kanai et al., *Mol Cell* Biol, 23:2451-2462, 2003.
Kassab and Yu, *DNA Repair*, 76:20-29, 2019.
Kim et al., *Nat Struct Mol Biol*, 19:653-656, 2012.
Kim et al., *J Biol Chem*, 290:3775-3783, 2015.
Koh et al., *Proc Natl Acad Sci USA*, 101:17699-17704, 2004.
Koh et al., *J Med Chem*, 46:4322-4332, 2003.
Larrea et al., *PLoS One*, 8(6):e67356, 2013.
Margalef et al., *Cell*, 172:439-453, e14, 2018.
Marques et al., *Oncogene*, 38:2177-2191, 2018.
Masutani et al., *Cell Mol Life Sci*, 62:769-783, 2005.
Meyer-Ficca et al., *Exp Cell Res*, 297:521-532, 2004.
Min and Wang, *Frontiers Biosci*, 14:1619-1626, 2009.
Molina et al., *Science*, 341:84-87, 2013.
Mortusewicz et al., *Nucleic Acids Research*, 39:5045-5056, 2011.
Mueller-Dieckmann et al., *Proc Natl Acad Sci USA*, 103: 15026-15031, 2006.
Muller and Jacobson, *Handb Exp Pharmacol*, 151-199, 2011.
Murshudov et al., *Acta Crystallogr D Biol Crystallogr*, 53:240-255, 1997.
Nazaretyan et al., *J Bacteriol*, 200(6):e00713-17, 2017.
Noll et al., *Cancer Cell Int*, 16:53, 2016.
Otwinowski and Minor, *Methods Enzymol*, 276:307-326, 1997.
Pflugrath, *Acta Crystallogr D Biol Crystallogr*, 55:1718-1725, 1999.
Rauh-Adelmann et al., *Mol Carcinog*, 28:236-246, 2000.
Ray Chaudhuri et al., *Mol Cell* Biol, 35:856-865, 2015.
Rosenthal et al., *Nat Struct Mol Biol*, 20:502-507, 2013.
Russi et al., *J Appl Crystallogr*, 49:622-626, 2016.
Schneider et al., *Nat Methods*, 9:671-675, 2012.
Sharifi et al., *EMBO J*, 32:1225-1237, 2013.
Shibata et al., *Mol Cell*, 53:7-18, 2014.
Shirai et al., *Cell Death Dis*, 4:e656, 2013.
Shirai et al., *Biochem Biophys Res Commun*, 435:100-106, 2013.
Slade et al., *Nature*, 477:616-620, 2011.
Slama et al., *J Med Chem*, 38:389-393, 1995.
Sun et al., *Anticancer Drugs*, 23:979-990, 2012.
Tsutsumi et al., *Carcinogenesis*, 22:1-3, 2001.
Tucker et al., *PLoS One*, 7:e50889, 2012.
Vichai and Kirtikara, *Nat Protoc*, 1:1112-1116, 2006.
Vyas et al., *Nat Commun*, 5:4426, 2014.
Wang et al., *Front Med*, 6:156-164, 2012.
Wang et al., *Oncol Rep*, 41:2657-2666, 2019.
Wang et al., *PLoS One*, 9:e86010, 2014.
Wei et al., *Bioinformatics*, 34:1615-1617, 2018.
Winn et al., *Acta Crystallogr D Biol Crystallogr*, 67:235-242, 2011.
Yu et al., *Proc Natl Acad Sci USA*, 103:18314-18319, 2006.

What is claimed is:

1. A compound of the formula:

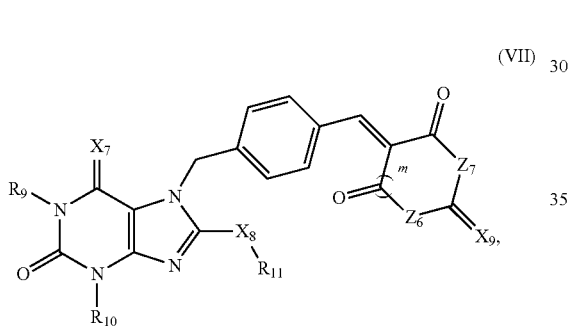

(VII)

wherein:
   m is 0 or 1;
   $R_9$ and $R_{10}$ are each independently hydrogen, alkyl$_{(C \leq 12)}$, or substituted alkyl$_{(C \leq 12)}$;
   $R_{11}$ is hydrogen; or
      heterocycloalkyl$_{(C \leq 12)}$, substituted heterocycloalkyl$_{(C \leq 12)}$, -alkanediyl$_{(C \leq 12)}$-heterocycloalkyl$_{(C \leq 12)}$, or substituted -alkanediyl$_{(C \leq 12)}$-heterocycloalkyl$_{(C \leq 12)}$;
   $X_7$ and $X_9$ are each independently O or S;
   $X_8$ is a covalent bond, O, S, or NH; and
   $Z_6$ and $Z_7$ are each independently O, S, or $NR_a$, wherein:
      $R_a$ is hydrogen, alkyl$_{(C \leq 12)}$, or substituted alkyl$_{(C \leq 12)}$;
or a pharmaceutically acceptable salt thereof.

2. The compound of claim 1, wherein the compound is further defined as:

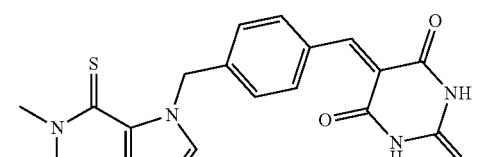

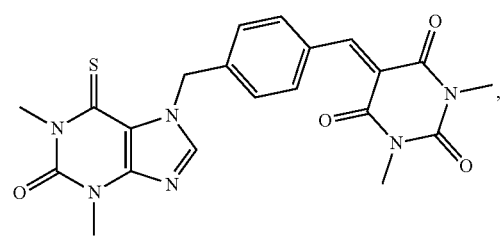

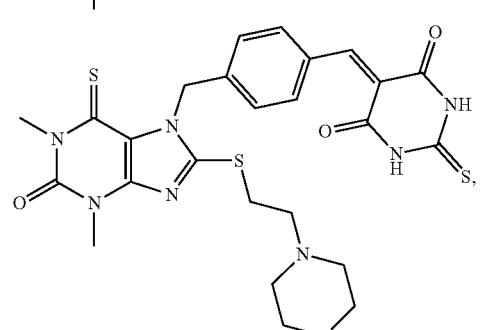

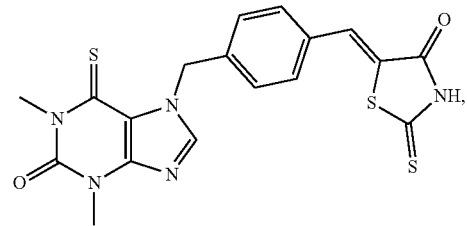

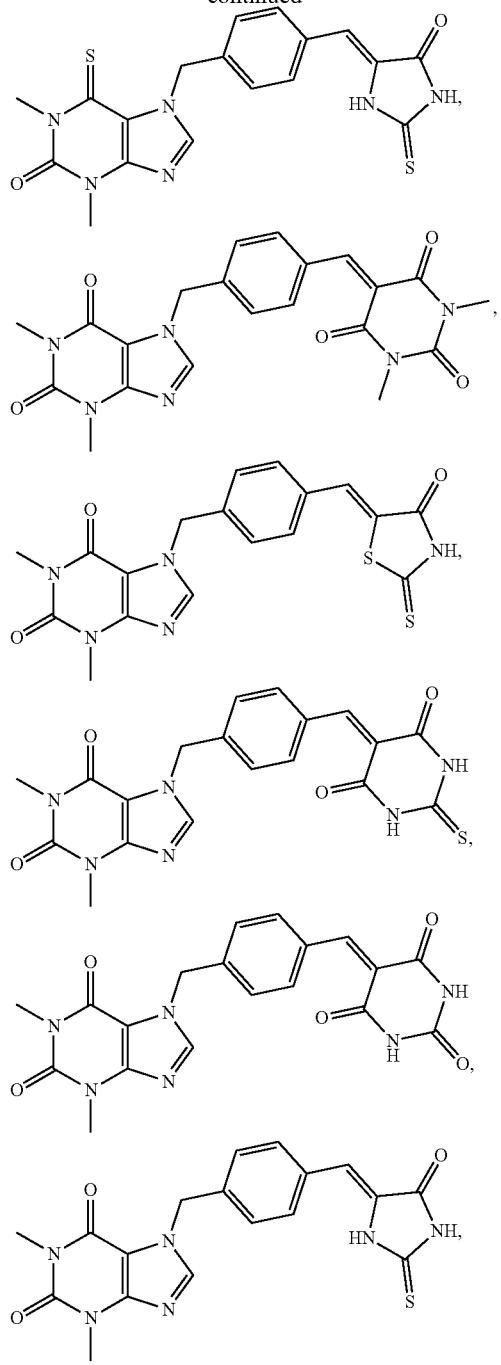
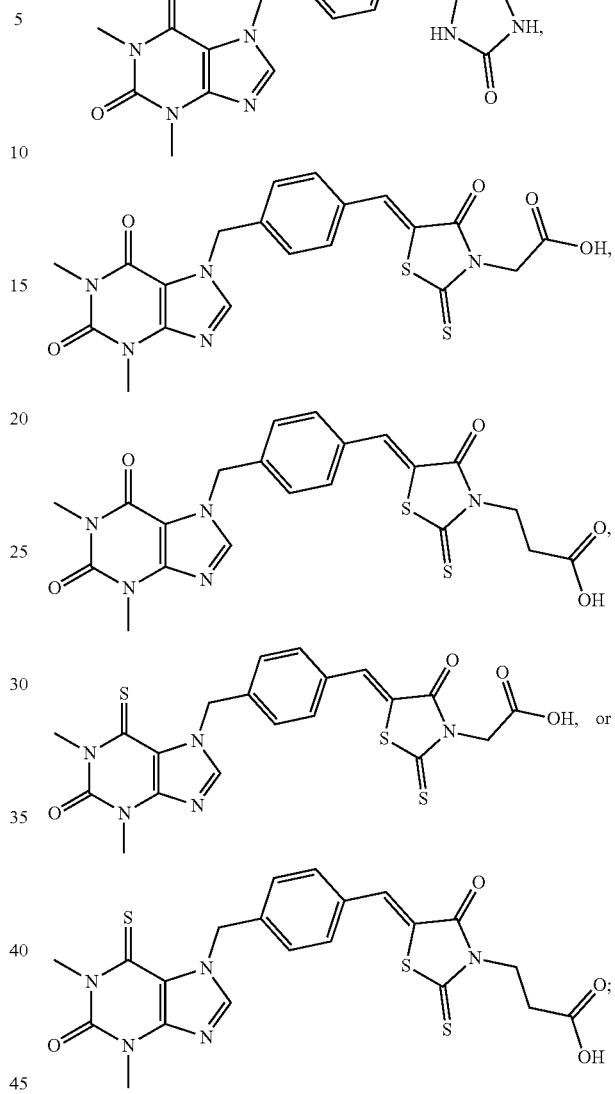
or a pharmaceutically acceptable salt thereof.
3. A pharmaceutical composition comprising:
(a) a compound of claim 1; and
(b) an excipient.
* * * * *

SEQUENCE LISTING

<160> NUMBER OF SEQ ID NOS: 9

<210> SEQ ID NO 1
<211> LENGTH: 57

-continued

```
<212> TYPE: DNA
<213> ORGANISM: Artificial sequence
<220> FEATURE:
<223> OTHER INFORMATION: Synthetic plasmid

<400> SEQUENCE: 1
gatccggaaa cggtactcta ctaattcaag agattagtag agtaccgttt cctttt       57

<210> SEQ ID NO 2
<211> LENGTH: 21
<212> TYPE: DNA
<213> ORGANISM: Artificial sequence
<220> FEATURE:
<223> OTHER INFORMATION: Synthetic plasmid

<400> SEQUENCE: 2
ggaaacggua cucuacuaat t                                              21

<210> SEQ ID NO 3
<211> LENGTH: 21
<212> TYPE: DNA
<213> ORGANISM: Artificial sequence
<220> FEATURE:
<223> OTHER INFORMATION: Synthetic plasmid

<400> SEQUENCE: 3
uuaguagagu accguuucct t                                              21

<210> SEQ ID NO 4
<211> LENGTH: 57
<212> TYPE: DNA
<213> ORGANISM: Artificial sequence
<220> FEATURE:
<223> OTHER INFORMATION: Synthetic plasmid

<400> SEQUENCE: 4
gatccgaagg atgctattct gaaattcaag agatttcaga atagcatcct tctttt        57

<210> SEQ ID NO 5
<211> LENGTH: 21
<212> TYPE: DNA
<213> ORGANISM: Artificial sequence
<220> FEATURE:
<223> OTHER INFORMATION: Synthetic plasmid

<400> SEQUENCE: 5
gaaggaugcu auucugaaat t                                              21

<210> SEQ ID NO 6
<211> LENGTH: 21
<212> TYPE: DNA
<213> ORGANISM: Artificial sequence
<220> FEATURE:
<223> OTHER INFORMATION: Synthetic plasmid

<400> SEQUENCE: 6
uuucagaaua gcauccuuct t                                              21

<210> SEQ ID NO 7
<211> LENGTH: 57
<212> TYPE: DNA
<213> ORGANISM: Artificial sequence
<220> FEATURE:
<223> OTHER INFORMATION: Synthetic plasmid

<400> SEQUENCE: 7
```

-continued

```
gatccggaaa ccggagaaac ttaattcaag agattaagtt tctccggttt ccttttt        57

<210> SEQ ID NO 8
<211> LENGTH: 21
<212> TYPE: DNA
<213> ORGANISM: Artificial sequence
<220> FEATURE:
<223> OTHER INFORMATION: Synthetic plasmid

<400> SEQUENCE: 8
ggaaaccgga gaaacuuaat t                                               21

<210> SEQ ID NO 9
<211> LENGTH: 21
<212> TYPE: DNA
<213> ORGANISM: Artificial sequence
<220> FEATURE:
<223> OTHER INFORMATION: Synthetic plasmid

<400> SEQUENCE: 9
uuaaguuucu ccgguuucct t                                               21
```